United States Patent
Goolkasian et al.

(10) Patent No.: US 11,983,697 B2
(45) Date of Patent: May 14, 2024

(54) EMBEDDED APPLICATION WITHIN A BUYER APPLICATION

(71) Applicant: Block, Inc., San Francisco, CA (US)

(72) Inventors: Philip Goolkasian, San Francisco, CA (US); Brandon Labbe, San Francisco, CA (US); Vitaly Odemchuk, San Francisco, CA (US); Shaun Forouzandeh, San Francisco, CA (US)

(73) Assignee: Block, Inc., Oakland, CA (US)

( * ) Notice: Subject to any disclaimer, the term of this patent is extended or adjusted under 35 U.S.C. 154(b) by 0 days.

(21) Appl. No.: 17/114,128

(22) Filed: Dec. 7, 2020

(65) Prior Publication Data

US 2022/0036336 A1    Feb. 3, 2022

Related U.S. Application Data

(60) Provisional application No. 63/058,841, filed on Jul. 30, 2020.

(51) Int. Cl.
  *G06Q 20/32*    (2012.01)
  *G06Q 20/08*    (2012.01)
  (Continued)

(52) U.S. Cl.
  CPC ..... *G06Q 20/3267* (2020.05); *G06Q 20/0855* (2013.01); *G06Q 20/223* (2013.01); *H04L 67/01* (2022.05); *H04L 67/34* (2013.01)

(58) Field of Classification Search
  CPC ........... G06Q 20/3267; G06Q 20/0855; G06Q 20/223; H04L 67/01; H04L 67/34
  (Continued)

(56) References Cited

U.S. PATENT DOCUMENTS 10,510,058 B1    12/2019    Kamvysselis
11,023,672 B1    6/2021    Pistol et al.
(Continued)

FOREIGN PATENT DOCUMENTS

CN    108351791 B  *  7/2021  .......... G06F 3/0414
WO    2022026227 A1    2/2022

OTHER PUBLICATIONS

H. R. Hasan and K. Salah, "Proof of Delivery of Digital Assets Using Blockchain and Smart Contracts," in IEEE Access, vol. 6, pp. 65439-65448, 2018. (Year: 2018).*

(Continued)

*Primary Examiner* — Virpi H Kanervo
(74) *Attorney, Agent, or Firm* — Lee & Hayes P.C.

(57) ABSTRACT

Techniques described herein are directed to application(s), or parts thereof, that are embedded into a buyer application. In an example, engagement with a buyer application on a computing device of a buyer can be detected. A particular, discrete functionality of a merchant application of the merchant can be triggered to be initialized in response to the engagement and the particular, discrete functionality associated with the merchant application can be accessed. In an example, an indication of a transaction between the merchant and the buyer can be received and the indication of the transaction can be associated with stored activity data of one or more transactions of the buyer, wherein the one or more transactions are associated with the buyer application.

20 Claims, 57 Drawing Sheets

(51) Int. Cl.
  *G06Q 20/22* (2012.01)
  *H04L 67/00* (2022.01)
  *H04L 67/01* (2022.01)
(58) Field of Classification Search
  USPC .......................................................... 705/4
  See application file for complete search history.

(56) References Cited

U.S. PATENT DOCUMENTS

| | | | |
|---|---|---|---|
| 11,064,047 | B1 | 7/2021 | Stegall et al. |
| 2003/0120593 | A1 | 6/2003 | Bansal et al. |
| 2004/0206821 | A1 | 10/2004 | Longacre et al. |
| 2006/0178986 | A1 | 8/2006 | Giordano et al. |
| 2009/0100356 | A1 | 4/2009 | Kujda |
| 2010/0251243 | A1 | 9/2010 | Gill et al. |
| 2012/0124192 | A1* | 5/2012 | Daoud ................ G06F 16/248 709/224 |
| 2012/0124676 | A1* | 5/2012 | Griffin ................ H04L 63/0815 726/28 |
| 2013/0290203 | A1 | 10/2013 | Purves et al. |
| 2013/0346302 | A1 | 12/2013 | Purves et al. |
| 2014/0035855 | A1 | 2/2014 | Feldman et al. |
| 2014/0249999 | A1* | 9/2014 | Johnson ................ G06Q 20/20 705/39 |
| 2014/0344106 | A1* | 11/2014 | Lee ................ G06Q 30/0633 705/26.8 |
| 2015/0120345 | A1 | 4/2015 | Rose |
| 2015/0178784 | A1 | 6/2015 | Oliver et al. |
| 2016/0162148 | A1 | 6/2016 | Murphy et al. |
| 2016/0192106 | A1 | 6/2016 | Fu et al. |
| 2017/0278174 | A1* | 9/2017 | Harrell ................ G06Q 30/0643 |
| 2018/0032997 | A1 | 2/2018 | Gordon et al. |
| 2018/0330451 | A1 | 11/2018 | Volberg et al. |
| 2018/0367483 | A1 | 12/2018 | Rodriguez et al. |
| 2020/0028753 | A1 | 1/2020 | Power et al. |
| 2020/0110592 | A1 | 4/2020 | Straub |
| 2020/0167877 | A1 | 5/2020 | Christensen et al. |
| 2020/0334649 | A1 | 10/2020 | Veznedaroglu |
| 2021/0065143 | A1* | 3/2021 | Batra ................ G06Q 20/027 |
| 2021/0174344 | A1 | 6/2021 | Fowler et al. |
| 2021/0248657 | A1 | 8/2021 | Tilley et al. |
| 2022/0038522 | A1 | 2/2022 | Goolkasian et al. |
| 2022/0038570 | A1 | 2/2022 | Goolkasian et al. |
| 2022/0207626 | A1 | 6/2022 | Swanson et al. |

OTHER PUBLICATIONS

R. Wang, S. Chen, X. Wang and S. Qadeer, "How to Shop for Free Online—Security Analysis of Cashier-as-a-Service Based Web Stores," 2011 IEEE Symposium on Security and Privacy, Oakland, CA, USA, 2011, pp. 465-480. (Year: 2011).*

Lee et al., "An Assistant Service for Customers in QR-payment with the Merchant Presented Mode" (Jan. 2020), proceedings of the 34th international conference on information Networking (ICOIN 2020), Retrieved fom Internet URL:- https://ieeexplore.ieee.org/stamp/stamp.jsp?arnumber=9016491], pp. 682-686.

Non-Final Office Action dated Feb. 23, 2022, for U.S. Appl. No. 17/114,015, of Stegall, B., et al., filed Dec. 7, 2020.

International Search Report and Written Opinion dated Dec. 20, 2021, for PCT Application No. PCT/US21/042140.

Notice of Allowance dated Mar. 8, 2021, for U.S. Appl. No. 17/114,080, of Stegall, B., et al., filed Dec. 7, 2020.

Notice of Allowance dated Sep. 2, 2022, for U.S. Appl. No. 17/114,015, of Goolkasian, P., et al., filed Dec. 7, 2020.

Corrected Notice of Allowance dated Sep. 14, 2022, for U.S. Appl. No. 17/114,015, of Goolkasian, P., et al., filed Dec. 7, 2020.

* cited by examiner

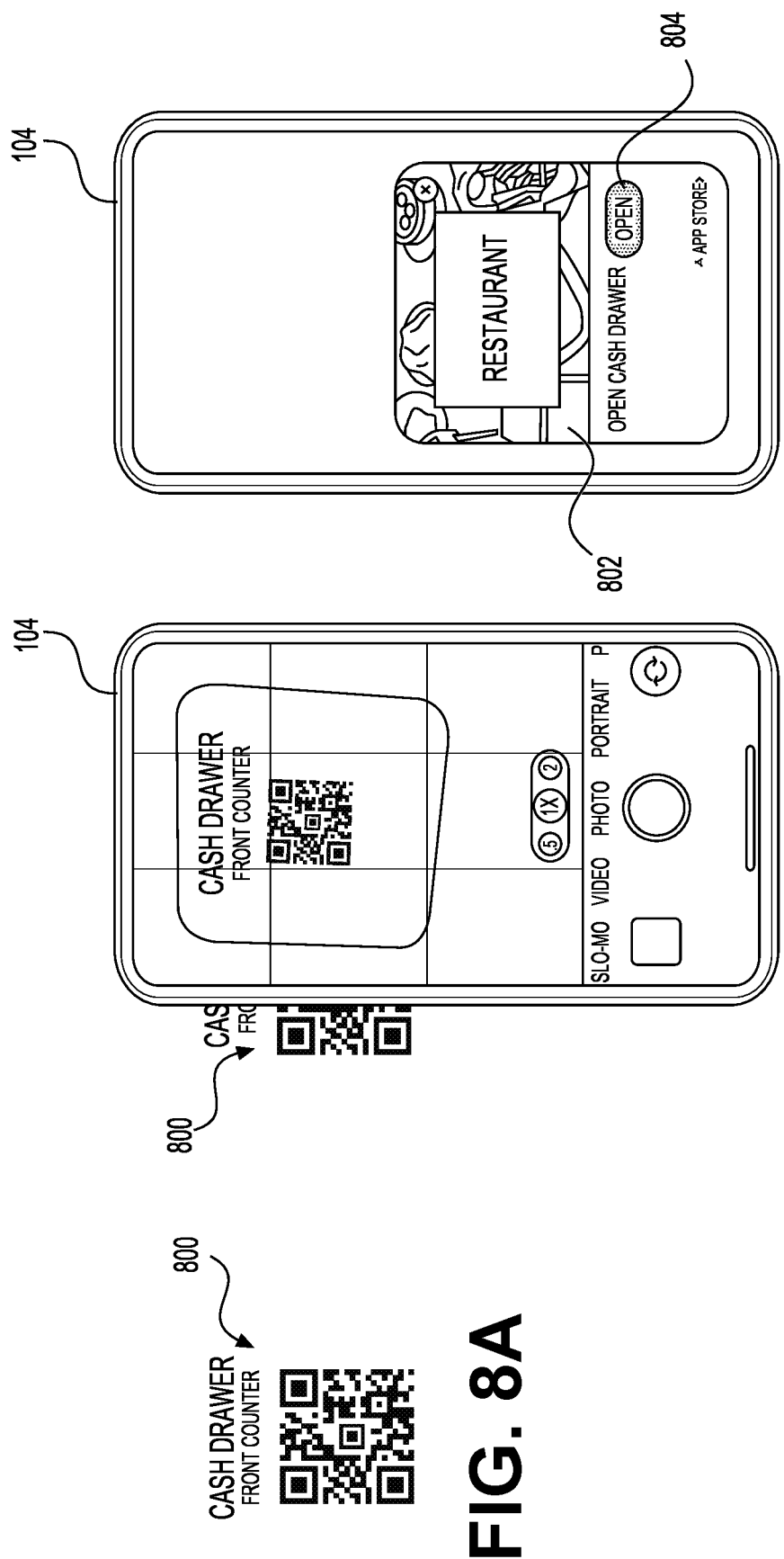

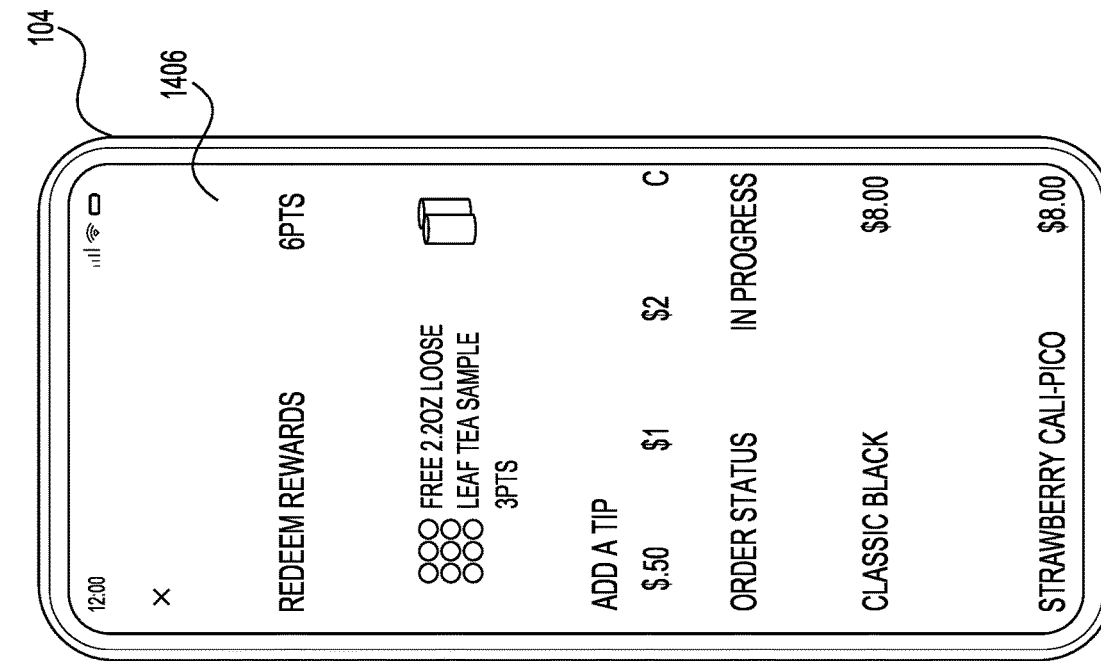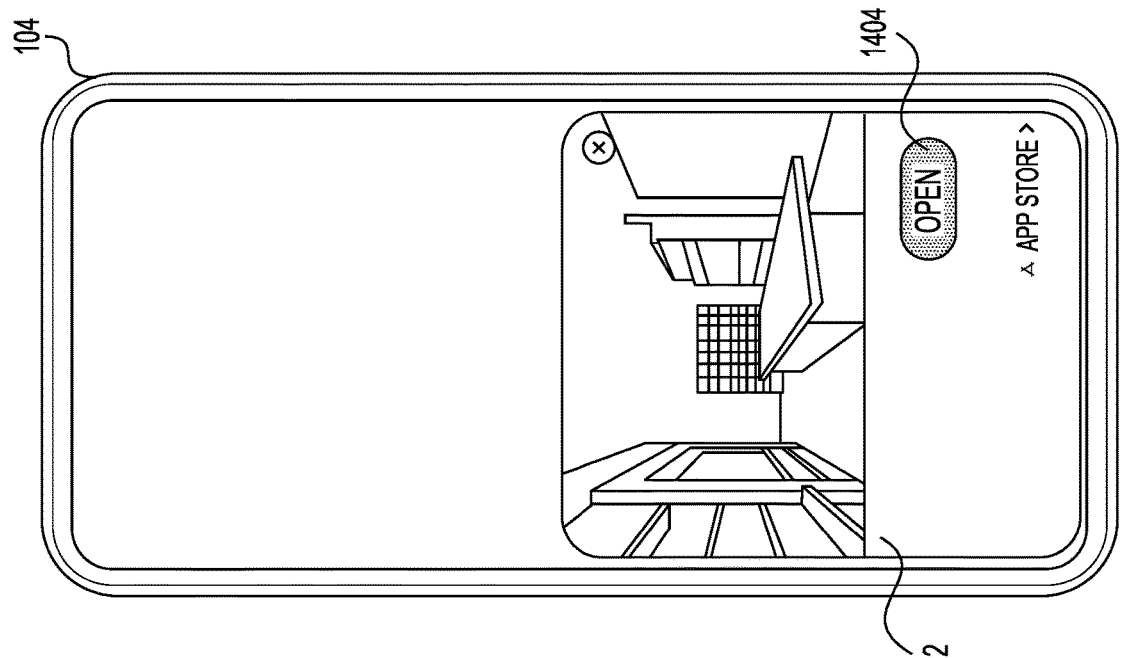
FIG. 14

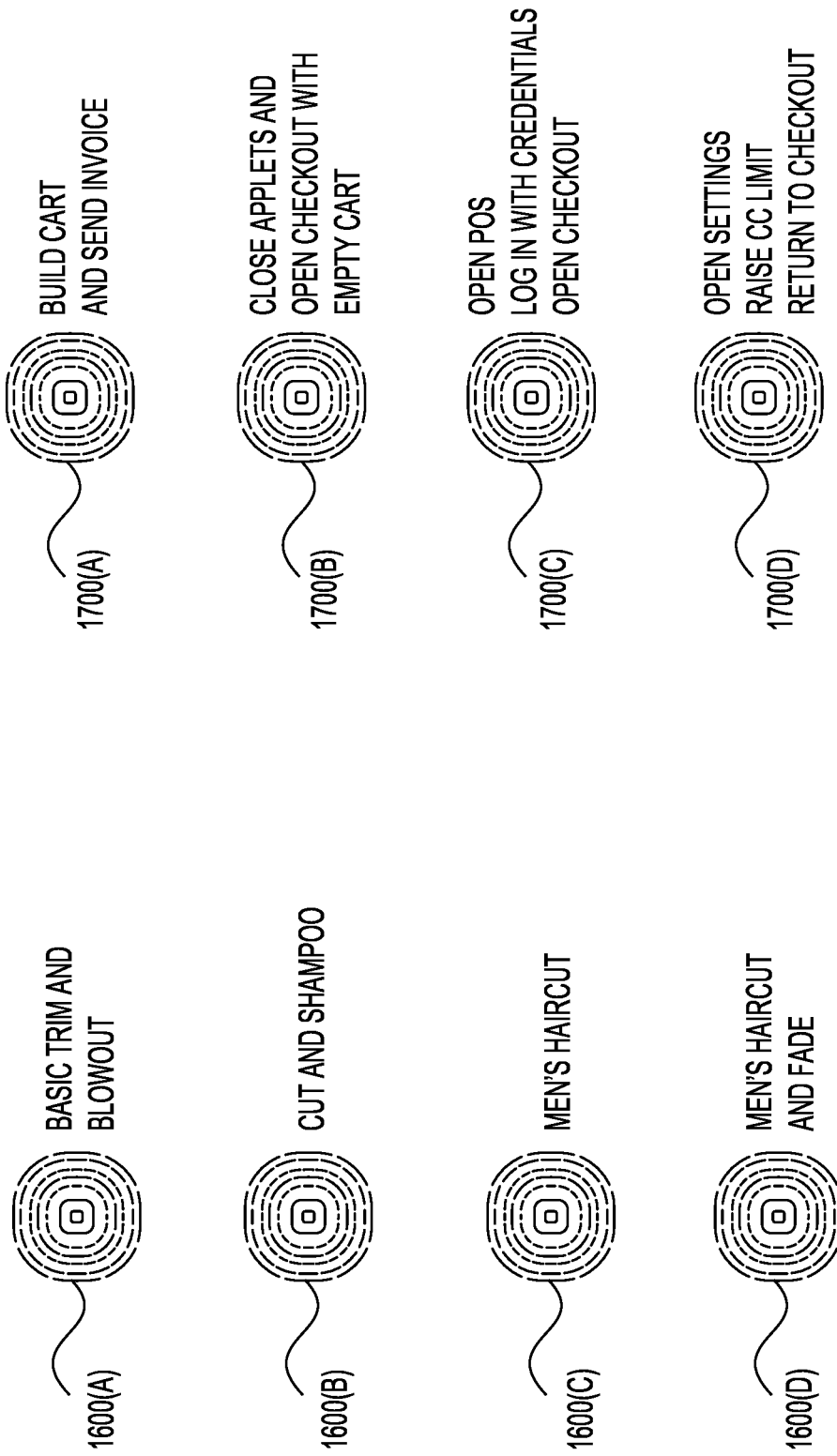

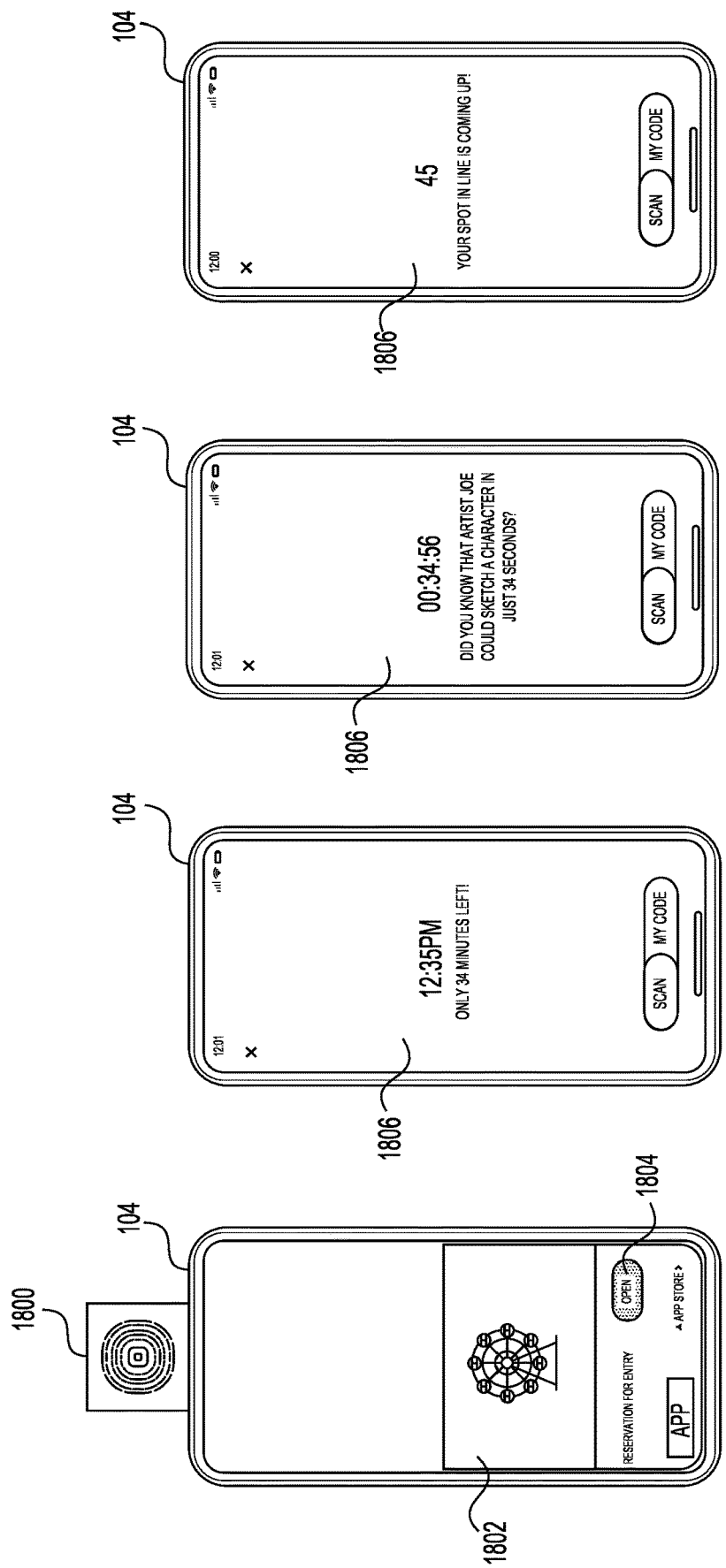

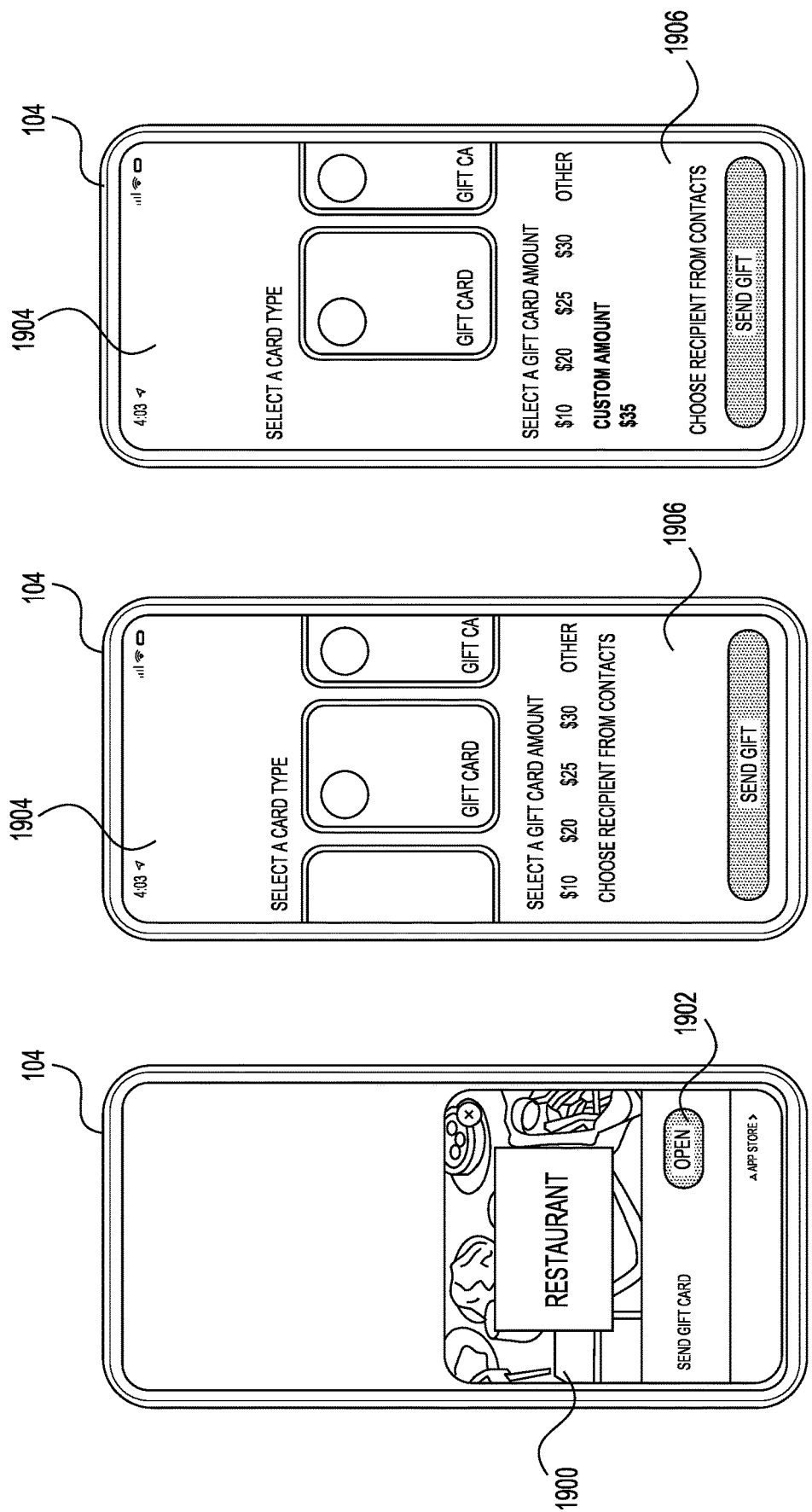

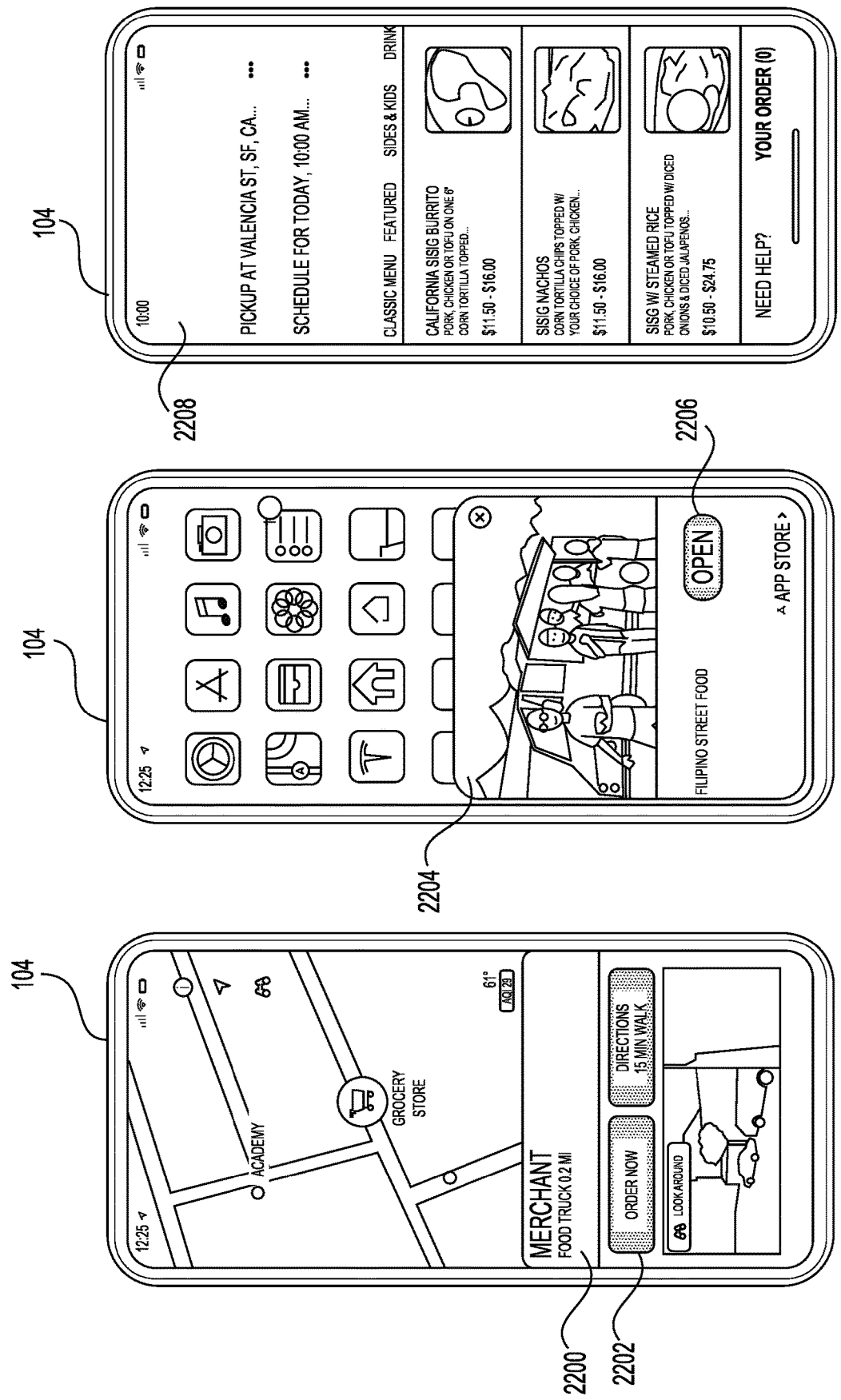

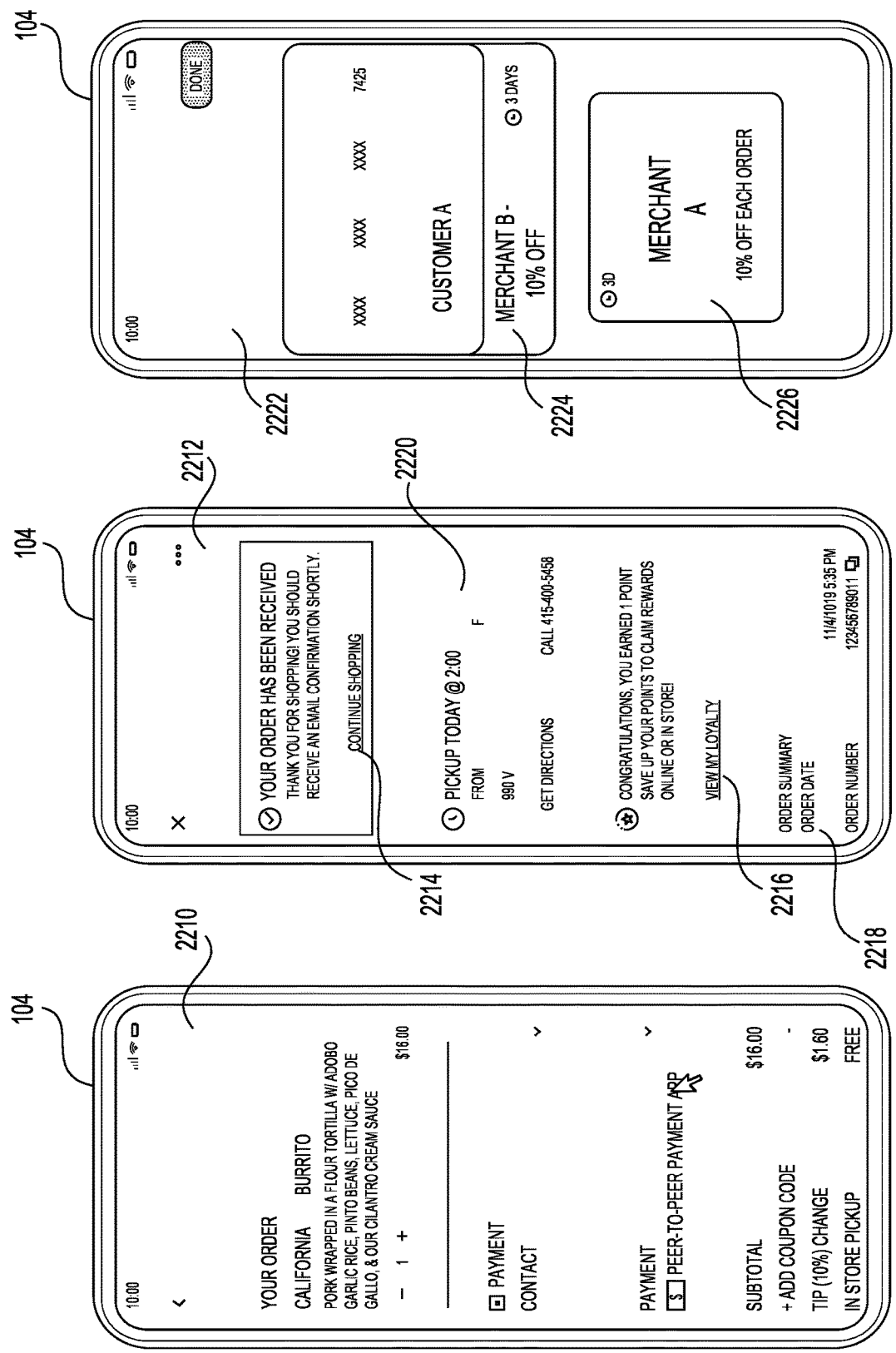

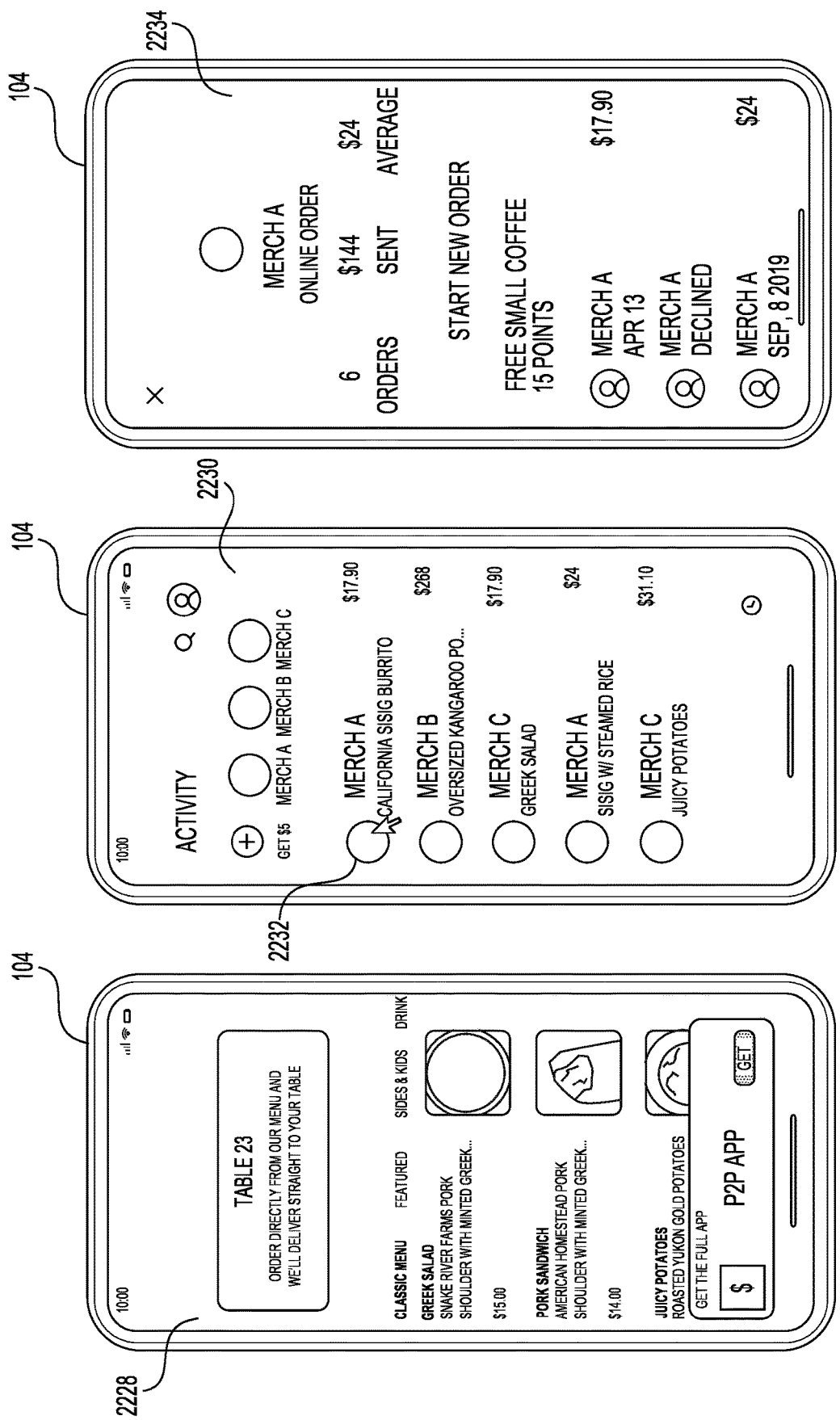

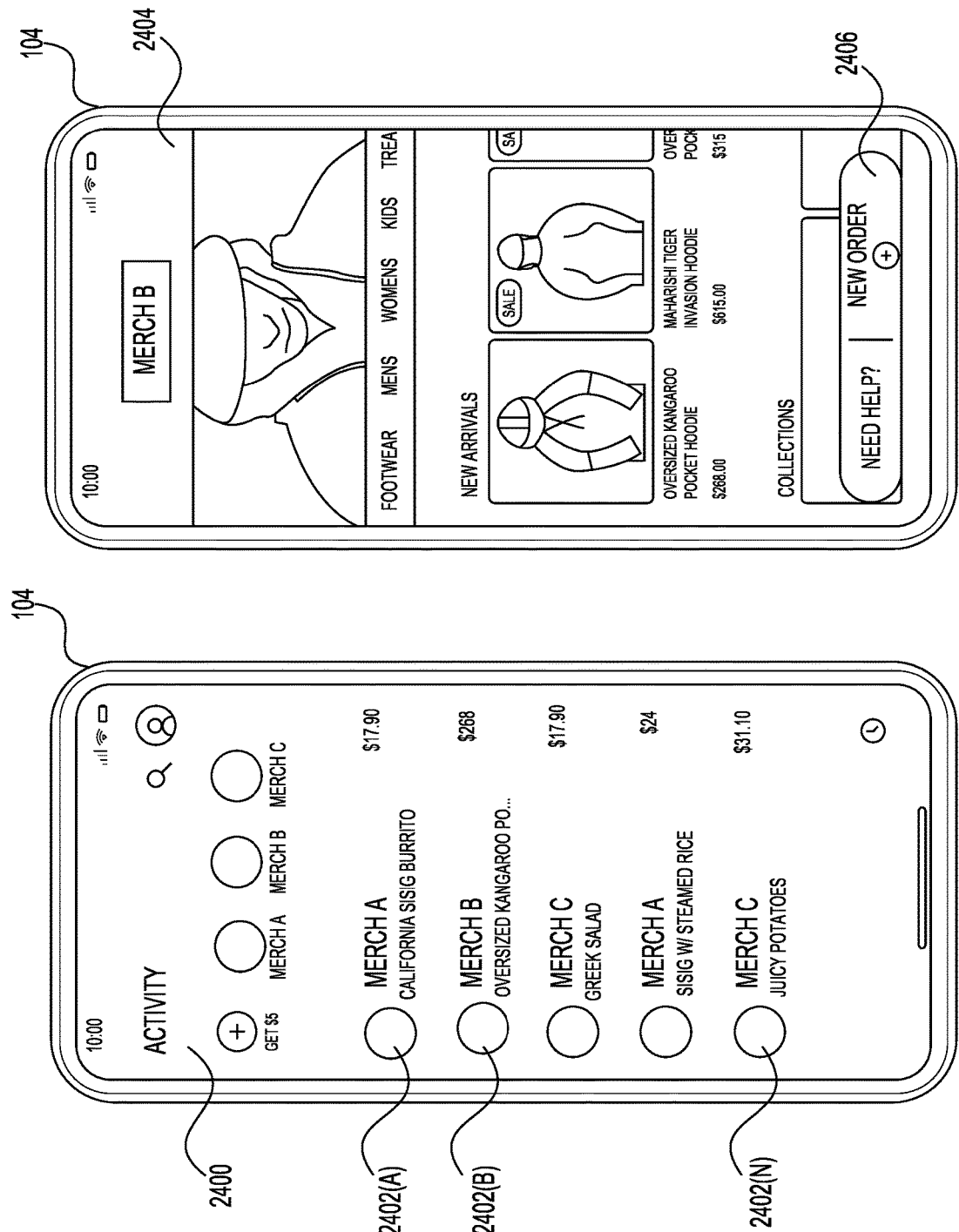

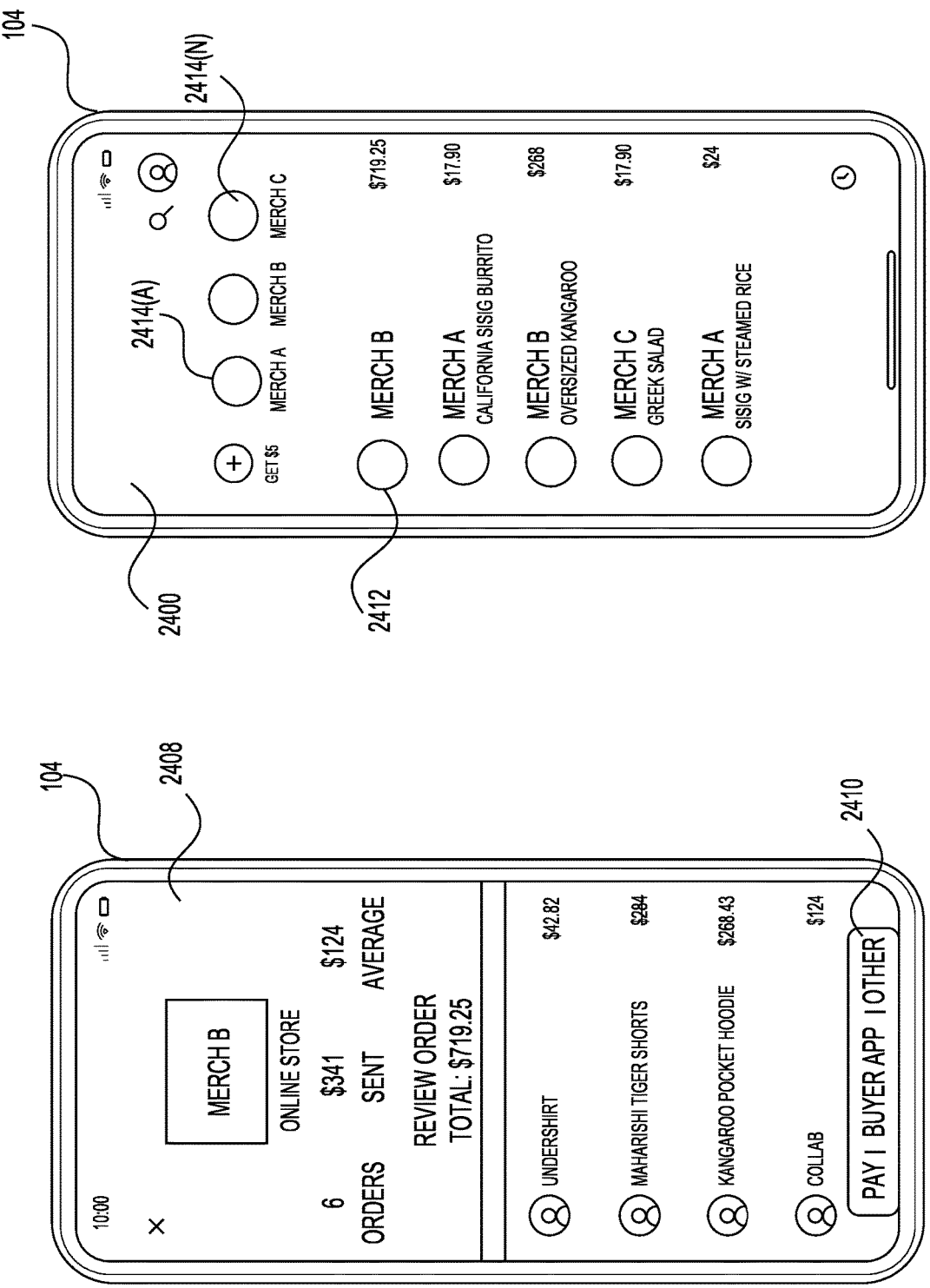

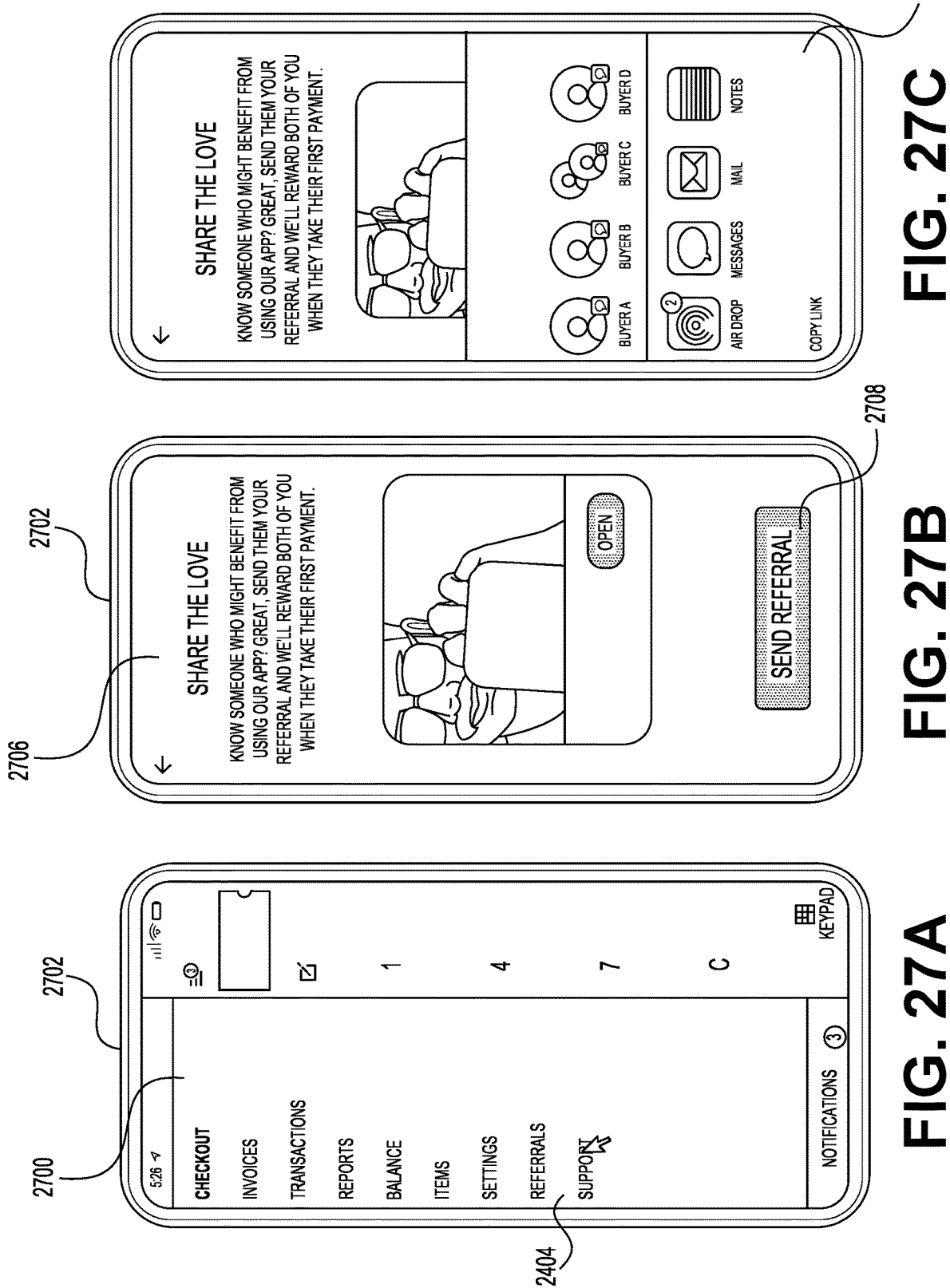

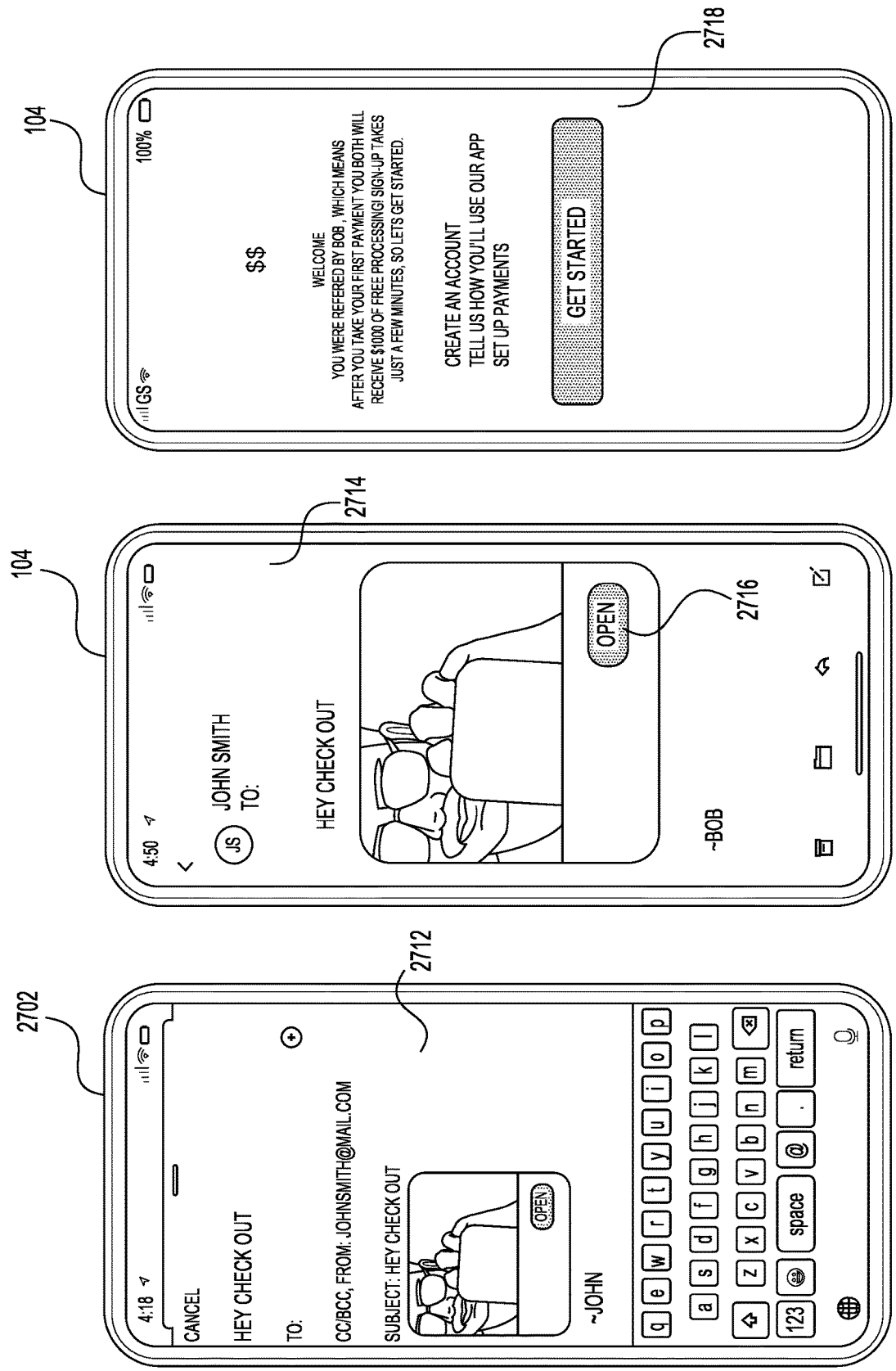

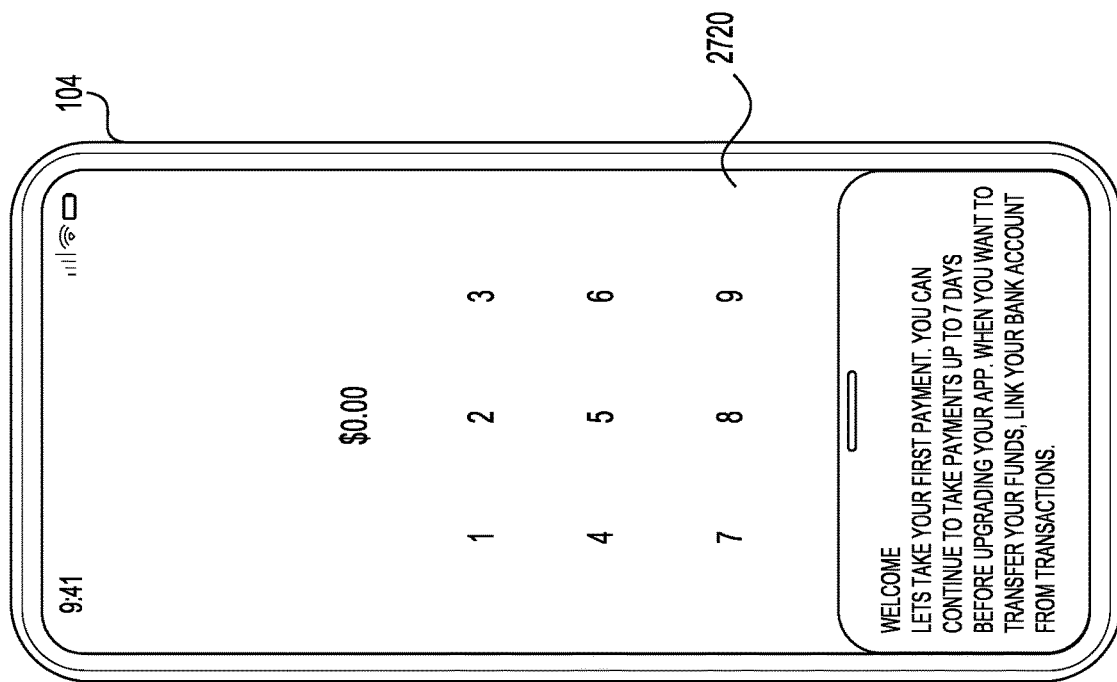

US 11,983,697 B2

EMBEDDED APPLICATION WITHIN A BUYER APPLICATION

PRIORITY APPLICATION

This application claims priority to U.S. Provisional Application No. 63/058,841, which was filed on Jul. 30, 2020, the entire contents of which are incorporated by reference herein.

TECHNICAL FIELD

Applications implemented on user computing devices have been developed for a variety of purposes, including business, social, payment, and other purposes. These applications provide a graphical user interface to present data to users as well as allowing the users to interact with the applications. Such applications (i.e., native applications) are generally downloaded, for example, for security and authentication reasons, on the computing device if the user wants to use all of the embedded functionalities.

BRIEF DESCRIPTION OF DRAWINGS

Features of the present disclosure, its nature and various advantages, will be more apparent upon consideration of the following detailed description, taken in conjunction with the accompanying drawings. The drawings are not drawn to scale.

FIGS. 8A-8J illustrate an example of presenting an instant application to enable a user to perform a worker-specific task.

FIG. 14 illustrates another example of utilizing an instant application to enable a buyer to provide a tip via their own computing device, redeem loyalty points, collect loyalty points, review and/or modify an order and/or cart, pay with an application on the computing device.

FIG. 16 illustrates a plurality of interactable elements which can represent different items and/or bundles of items that can be ordered and/or purchased via a scan, read, or other interaction with individual of the plurality of interactable elements.

FIG. 17 illustrates a plurality of interactable elements which can represent different functionalities that can be availed to a user via a computing device.

FIGS. 18A-18D illustrates a plurality of user interfaces associated with notifications and/or data that can be presented via an instant application.

FIGS. 19A-19F illustrate an example where a user can utilize an instant application to order a stored balance card.

FIGS. 22A-22J illustrate an example process associated with ordering via an instant application.

FIGS. 24A-24D illustrate an example of transitioning between a buyer application and another application, or part thereof, that is embedded in the buyer application.

FIGS. 27A-27G illustrate an example of sharing an instant application with another user, for example as a referral.

DETAILED DESCRIPTION

Figure 1:
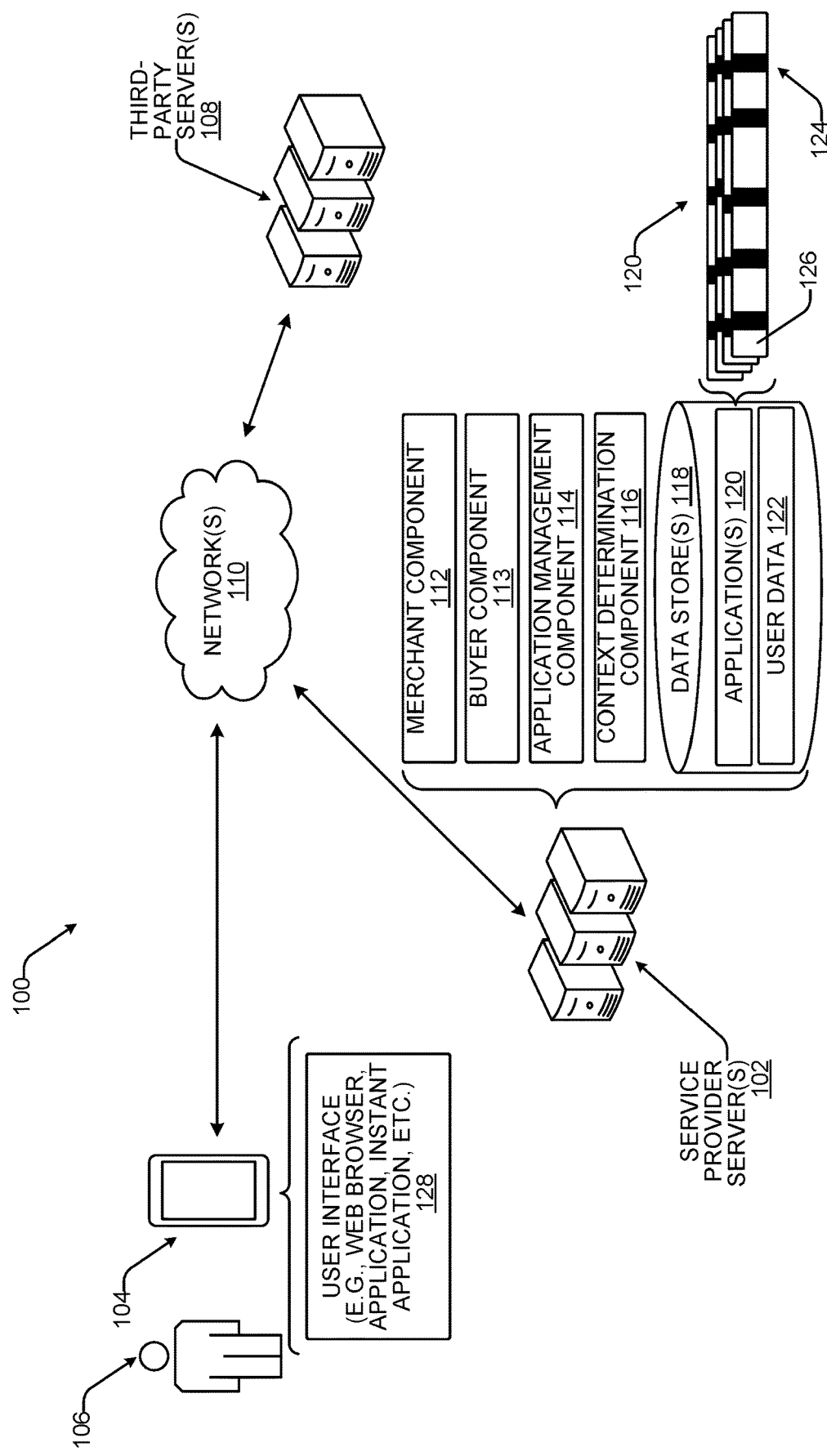
FIG. 1 illustrates an example environment for performing techniques described herein.

Parts of applications can be executed on a user computing device quickly and without a user needing to download the entire application onto the user computing device. That is, a part of an application can include instructions (e.g., code) for enabling a particular, discrete functionality (e.g., a single task, a couple of tasks, etc.) that can be performed by a user computing device without the user needing to download the entire application. Such a part of an application, which can be called an "instant application," can be downloaded to and opened quickly on a user computing device, even when it is not already on the user computing device. That is, such an instant application can provide means for running application code "on demand" on a user computing device and can act as a representation of a full application—native or web—before the user commits to downloading the full application. In some examples, data input to an instant application (e.g., via a user interface associated therewith) can persist so that such data can be integrated into the full application when the remaining part(s) of the application are downloaded onto the user computing device. In some examples, data input to an instant application can be used to customize and/or personalize the application, other part(s) of the application or other application(s) to surface, and/or data presented via user interface(s) associated therewith. In one example, an instant application is a portion of a full application, and as such, the instant application can have a set of functionalities smaller than the set of functionalities in the full application. An instant application, or application, can be "surfaced" on a user computing device by being downloaded on, or otherwise provided to, the user computing device. A user interface associated with the instant application, or application, can be presented based at least in part on the instant application, or application, having been surfaced on the user computing device.

Instant applications can be discoverable. In some examples, users can use a computing device (e.g., a user computing device) to scan, read, or otherwise interact with an interactable element associated with a particular application (or a portion thereof). Such an interactable element can be a Quick Response (QR) code, a radio-frequency identification (RFID) tag, a barcode, a near-field communication (NFC) tag, a uniform resource identifier (URI), an image, etc. In some examples, interactable elements, which can be associated with identification codes, can be affixed to, or otherwise associated with, physical objects, such as tables, designated seating areas, paper or electronic receipts, bicycles, scooters, vehicles, doors, items offered for sale, etc. In some examples, an interactable element can be presented via an electronic device (e.g., a buyer-facing display of a point-of-sale device, a user computing device, a kiosk, etc.).

As described above, a user can cause an interaction between a user computing device and an interactable element. In some examples, a sensor associated with the user computing device can scan, read, or otherwise interact with an interactable element to obtain data embedded in, or otherwise associated with, the interactable element. In some examples, the sensor can be a reader device capable of reading encoded data associated with RFID tags, NFC tags, or the like. In some examples, interaction with an interactable element can cause an instant application to be surfaced, activated, or otherwise availed on a user computing device. In some examples, a user can tap their user computing device to a card reader or another NFC device to cause an instant application to be surfaced, activated, or otherwise availed on the user computing device. In some examples, an instant application can be discoverable via a banner associated with a web page, a link in a message, a map user interface, a library of recently used instant applications, a segment of a full application, or the like. In some examples, instant applications can be discoverable based at least in part on a geolocation of a user computing device, a time, a date, an event, or any other context.

In at least one example, interaction with an interactable element can direct to an application server hosting a corresponding application (e.g., available via application stores for download on the computing device) and/or instant application(s) associated with the corresponding application (e.g., one or more pages, one or more functions, etc.). In such an example, the corresponding application and/or instant application(s) can be downloaded or otherwise surfaced via a user computing device. That is, upon discovery, a part of an application (e.g., an instant application) can be downloaded onto, and therefore executable by, a user computing device and a user interface can be presented to enable a user to interact with the portion of the application executable by the user computing device. An instant application can be discoverable "on-demand," at a time when or a location where users can use it, and can be focused on a specific task (e.g., booking, ordering, paying, etc.). Non-limiting examples of how instant applications can be useful include ordering take-out from a restaurant (without downloading the full application associated with the restaurant or the take-out service provider), renting a scooter (without downloading the full application associated with the scooter service provider), setting up a new connected appliance (without downloading the full application associated with the appliance service provider), paying for parking (without downloading the full parking application), or the like. In some examples, users can start and finish an experience in seconds, minutes, or other periods of time, and at a later time, users can be presented with the opportunity to download the full application (or additional portions thereof). In some examples, the full application may have been previously downloaded but the user needs only to access a portion thereof to perform a task. As such, a part of an application—instead of the full application—can be executed to perform the task, which can conserve computing resources on the user computing device. Additional details are provided below.

In at least one example, a user can interact with instant applications without downloading corresponding applications. In some examples, if a user launches an instant application (even without downloading the full application), the instant application can store data from previous uses or sessions and can leverage intelligence to learn about the user and/or their interactions with the instant application. Such intelligence can be used to present recommendations, expedite an ordering process, expedite a checkout flow, customize an application, an instant application, and/or data presented via a user interface associated with the application and/or instant application, and/or the like. In some examples, if a user decides to download the full instant application, data previously provided to the instant application can be used by the full application to streamline the handoff. In some examples, authorization provided for access to a camera, a microphone, Bluetooth, etc., which has already been requested by the instant application, can be provided to the full application to further streamline the handoff. In another example, data input via the instant application can be stored and transferred to the full application when downloaded. Such data can be used for customization and/or personalization and can expedite processes associated with the full application. As an example, if a portion of onboarding is completed via an instant application, the storage and transfer of data associated with the portion of onboarding completed can expedite onboarding via the full application. The user need not re-enter data previously provided and thus can access functionality associated with the full application faster and with fewer interactions with a user interface of the full application.

In some examples, a service provider can be associated with multiple instant applications. As an example, a service provider can have multiple instant applications to support multiple selling verticals and/or horizontals including, but not limited to, restaurants, retail stores, appointments, peerto-peer payments, etc. Techniques described herein can intelligently determine which instant application(s) to surface to a user computing device and/or when to surface such instant application(s) based at least in part on context data. In some examples, such intelligence can be provided by one or more models, trained via machine learning mechanisms, based at least in part on data previously received by a service provider. Such data can be received in association with one or more interactions and/or transactions between users of service(s) of the service provider. Additional details are provided below.

In at least one example, a service provider can offer multiple different applications for use by merchants, and each application can have one or more parts that can be accessible via an instant application. Examples of merchant-facing applications can include a point-of-sale application for managing point-of-sale interactions, an ecommerce application for managing online interactions, an employer application for worker management (e.g., management of employees, independent contractors, agents, and/or the like), a payroll application for managing payroll, an appointments application for managing appointments, an inventory application for managing inventory, and/or the like. Additional or alternative applications can be available for one or more of the services availed by the service provider, as described below. In some examples, individual merchants can customize aspects of applications used by the merchants.

Further, in some examples, the service provider can have one or more applications for use by buyers, and each application can have one or more parts that can be accessible as an instant application. An example of a buyer-facing application can include an application that enables buyers to browse inventory, place orders, track fulfillment, make payments, and/or the like. Other examples of applications associated with a service provider, that can be associated with one or more parts, can be a peer-to-peer payment application, a mobile payment application, a wallet application, or the like. Such applications can be used by buyers or non-buyers.

Techniques described herein can intelligently and dynamically determine which instant application(s), or which combination or sequence of instant application(s), to present for a specific context (e.g., a particular user, date, time, location, etc.). In at least one example, such "on-demand" determinations can be based, at least in part, on context data. For instance, techniques described herein can utilize context data to determine which instant application to cause to be downloaded, or otherwise surfaced, on a user computing device responsive to receiving an indication of an interactable element that is mapped to or otherwise associated with multiple instant applications (e.g., a multi-function interactable element). In an additional or alternative example, techniques described herein can utilize context data to determine which instant application to recommend or otherwise present to a user (which, in some examples can implement dynamic interactable elements). That is, techniques described herein are directed to dynamically and/or intelligently determining which instant applications to avail to users—and, in some examples, when—based at least in part on context data. Additional details are described below.

Techniques described herein can use machine learning to determine which instant applications to surface, thus allowing a string of unrelated instant applications (server-specific or merchant-specific) to be connected by trigger actions. Some merchants may be using a single payment processing system, credit management system, lending system, etc., and those systems can leverage associated data to stitch unaffiliated merchants, and their instant applications, together. As described below, techniques described herein can be implemented in a multi-party, networked ecosystem, wherein a service provider can provide applications (or parts thereof) to specially configure end-user computing devices to perform operations as described herein. In some examples, multiple, different merchants, buyers, and/or other users can utilize the service provider for different services, as described below. Instant applications, as described herein, can be associated with parts of applications offered by the service provider and/or users utilizing services availed thereby. With a centralized, remote location, the server(s) can have access to applications and/or instant applications associated with its own services and/or applications and/or instant applications associated with merchants, for example, using services of the service provider. Accordingly, by leveraging the multi-party, networked ecosystem, the server(s) can dynamically determine which instant application(s) to surface to individual users based on context data, as described herein. The server(s) can do so, with more personalization and/or customization, and, in some examples, with more accuracy and/or precision, than existing technologies. That is, techniques described herein can leverage the multi-party, networked ecosystem to dynamically determine which instant application(s) to surface to user(s) and, in some examples, when to surface such instant application(s), with more efficiency and personalization and/or customization than existing technologies.

In some examples, an instant application can leverage an existing, but unrelated, full application to offer some of the functionalities associated with the instant application. In such examples, the instant application can rely on a previously downloaded full application to provide a limited set of functionalities within the full application without needing to download another full application corresponding to the instant application. Accordingly, techniques described herein relate to a more resource-efficient way to re-use and/or share memory allocated to one application.

Instant applications can offer improvements to existing computing technologies. For instance, instant applications can enable users to download and utilize a portion of an application (i.e., a small amount of code) that can be downloaded quickly without having to download the entire application, which can be associated with more code and therefore longer and more computationally intensive downloads. Not only can instant applications enable users to consume less data (and thus less network resources), instant applications can further enable a reduction in storage resources associated with storing applications that are not used and/or a majority of which are not used. As described above, applications can require a significant amount of memory and can be used so infrequently that downloading the entire application can be a waste of computing resources. Thus, techniques described herein can be useful for conserving storage resources in addition to conserving network resources.

Instant applications can be merchant-facing, buyer-facing, or both. In some example, the same instant application can present different data to the buyer and merchant, depending on context data, for example, for the same transaction. That is, techniques described herein can utilize context data to dynamically offer one or more instant applications to different users based on their individual contexts. In some examples, the same instant application(s) can be presented in the same order to different users. In some examples, the same instant application(s) can be presented in different orders to different users. In some examples, different instant application(s) can be presented in the same or different orders to different users. In some examples, data presented via instant applications can be the same or different, dependent on user context.

In some implementations, an application programming interface (API) can be used to automate adding/removing/modifying instant applications from a user computing device and determining which user data persists and which does not. In some examples, APIs can be used to embed or otherwise integrate third-party applications, or parts thereof, into native applications, or parts thereof. Examples are provided below.

While techniques described herein describe a small amount (e.g., less than LOMB) of data to surface an instant application, it can be understood that examples described herein can be implemented using progressive web applications (PWAs). Additionally or alternatively, techniques described herein can also be applied with technologies that allow viewing of data without any download on a local device. Further, these technologies can also be applied to generate a "shell" of the full application, which can be a condensed version of the full application, made to look and feel like a full application. Moreover, in some examples, techniques described herein can be applicable to full applications.

FIG. 1 illustrates an example environment 100 for performing techniques described herein. The example environment 100 includes server(s) associated with a service provider (i.e., "service provider server(s)" 102) and at least one user computing device 104, which can be operable by a user 106. While only a single user computing device 104 and user 106 are illustrated, the environment can have tens, hundreds, thousands, millions, etc. of user computing devices and users in practice. The service provider server(s) 102 can communicate with the user computing device 104 and/or server(s) associated with third-party(s) (i.e., "third-party server(s)" 108) via network(s) 110. Additional details associated with the user computing device 104 and/or the server(s) (e.g., the service provider server(s) 102 and/or the third-party server(s) 108) are described below.

In at least one example, the service provider server(s) 102 can have one or more functional components for providing operations described herein. As illustrated, the service provider server(s) 102 can optionally include a merchant component 112, a buyer component 113, an application management component 114, a context determination component 116, and one or more data stores 118. In at least one example, operations attributed to the "service provider" can be performed by one or more of the functional components associated with the service provider server(s) 102.

In at least one example, the merchant component 112 can be configured to receive transaction data from point-of-sale (POS) systems and/or ecommerce systems as described herein. That is, the merchant component 112 can enable the service provider to provide, among other services, payment processing services on behalf of a plurality of different merchants. The service provider can be an intermediary or aggregator that can receive transaction data associated with transactions between buyers and merchants and can utilize payment data associated with the transaction data to process payments for the transactions. For example, the merchant component 112 can transmit requests (e.g., authorization, capture, settlement, etc.) to payment service server computing device(s) to process payments for the transactions. Additional details are provided below.

In at least one example, the buyer component 113 can be configured to communicate with buyer application(s) as described herein. In at least one example, a buyer application can be a peer-to-peer payment application and the buyer component 113 can facilitate peer-to-peer payments between users associated with the service provider. In at least one example, the service provider can provide a peer-to-peer payment service that enables peer-to-peer payments between two or more users (e.g., the user 106 and another user). In at least one example, the buyer component 113 can communicate with an instance of the peer-to-peer payment application (or other access point) installed on the user computing device 104. In an example, the user 106 can be a payor, and an instance of the peer-to-peer payment application executing on the user computing device 104 can send a request to the buyer component 113 to transfer an amount of funds (e.g., fiat currency or non-fiat currency such as cryptocurrency, securities, and related assets) from an account of the payor to an account of a payee (e.g., a peer-to-peer payment). The buyer component 113 can facilitate the transfer and can send a notification to an instance of the payment application executing on another user computing device operated by the payee that the transfer is in process (or has been completed). In an example where the user 106 is a payee, the user computing device 104 can receive such a notification and can cause the notification to be presented via the user computing device 104. In some examples, the buyer component 113 can send additional or alternative data to the instance of the peer-to-peer payment application (e.g., low balance to the payor, current balance to the payor or the payee, etc.). Additional details are provided below. In examples where the buyer application is another application, the buyer component 113 can be configured to facilitate operations associated therewith.

In at least one example, the application management component 114 can generate interactable elements associated with one or more applications and/or part(s) associated therewith (e.g., instant application(s) associated therewith). The parts may include a subset (or all) of the pages and/or functionality of the overall application. Examples of interactable elements are described throughout.

In at least one example, an interactable element can be directed to one or more applications, which can include, but are not limited to, instant applications or PWAs. As described above, an instant application can comprise a part of a full application. In at least one example, an instant application is a non-persistent application that may be dynamically downloaded and installed on a user computing device 104. Furthermore, instant applications correspond to a subset of an application that can be chosen based on a particular function to be performed, while the remainder of the application can be downloaded later (or as part of a background process). For example, the instant application may be a subset of a merchant POS application that performs a variety of functions, while the instant application can comprise one or more parts of merchant POS application and/or a subset of functions provided by the POS application, e.g., payments functionality or inventory functionality. A PWA can be an application, or part thereof, that can be built using web technologies (e.g., HTML, CSS, JavaScript) and can be delivered through a web browser. PWAs can be on-demand applications that execute in a web browser and remain persistent when executing on a user computing device 104. For example, a PWA can be allocated storage of a user computing device 104 and can be updated in the background when new functionality is added to the PWA. A PWA can correspond to a subset of an application that is chosen based on a particular function to be performed.

In at least one example, the application management component 114 can utilize context data associated with the user computing device 104 to select applications and/or part(s) associated therewith (e.g., instant application(s)) to surface to the user computing device 104. In some examples, the application management component 114 can determining a timing associated with surfacing of application(s) and/or part(s) associated therewith and/or a sequence (e.g., order) associated with surfacing a plurality of applications or part(s) associated therewith. In some examples, the application management component 114 can access data associated with the user 106 and/or the user computing device 104 to customize and/or personalize an application, a part associated therewith (e.g., an instant application), and/or data presented via a user interface associated with the application and/or the instant application. In some examples, the application management component 114 can receive a request to download an application (e.g., via an associated instant application) and can facilitate such a download. Additional details are provided below.

In at least one example, the context determination component 116 can determine and/or receive context data associated with user computing device(s), such as the user computing device 104. In at least one example, context data can include location data indicating a location of the user computing device 104. In some examples, the context data can include interaction data indicating whether the user 106 is interacting with the user computing device 104, an application with which the user 106 is interacting, and/or the like. In some examples, context data be associated with time data (e.g., timestamps, etc.), date data (e.g., datestamps, etc.), event data (e.g., data indicating details associated with events), calendar data (e.g., data associated with an electronic calendar, holidays, etc.), activity data (e.g., data associated with past transactions and/or interactions of a user, etc.), transaction data (e.g., data associated with previous, current, and/or future transactions), user data, device data (e.g., version of software executing on the user device 104, network configuration, etc.) and/or the like. In some examples, at least a portion of the context data can be accessed and/or received from the data store(s) 118.

The data store(s) 118 can manage and/or store data. In at least one example, the data store(s) 118 can include application(s) 120 and user data 122. The application(s) 120 can comprise one or more applications provided by the service provider (e.g., developed and/or managed by the service provider). The application(s) 120 can comprise one or more applications provided by one or more third parties (e.g., developed and/or managed by an entity other than the service provider). In at least one example, an application 124 of the application(s) 120 can comprise multiple parts. As described above, parts of applications can be executed on user computing device(s) quickly and without user(s) needing to download the entire application onto the user computing device(s). That is, in an example, a part of an application can include instructions (e.g., code) for enabling a particular, discrete functionality (e.g., a single task, a couple of tasks, etc.) that can be performed by the user computing device 104 without the user 106 needing to download the entire application. Each part, such as the part 126, can be associated with an instant application and can be downloaded to and opened quickly on the user computing device 104, even when it is not already on the user computing device 104. That is, such an instant application can provide means for running application code "on demand" on the user computing device 104 and can act as a representation of a full application—native or web—before the user commits to downloading the full application.

In some examples, the application(s) 120 and/or instant applications associated therewith can be customizable such that users can designate context for when particular instant applications should be presented, what functionality(s) are available via an instant application, in which order (if applicable), and the like. In some examples, some application(s) can be stored and/or accessible via the third-party server(s) 108. In examples where one or more applications are stored in third-party server(s) 108, the third-party server(s) 108 can ping the service provider server(s) 102 when the user starts to interact with an application associated with the third-party server(s) 108. The third-party server(s) 108 and the service provider server(s) 102 can transmit data to facilitate operations as described herein.

As described above, the data store(s) 118 can provide a specific partition of the memory or memory address to be used in one or more of the server(s) for the application(s) 120. This allows the data store(s) 118 to overlap instant applications and prevent instant application(s) associated with a single server from taking too many memory and network resources. In some examples, however, the data store(s) 118 can allow a plurality of applications to be on a server computing device depending on whether the instant applications will be used contemporaneously or are otherwise dependent on each other.

The user data 122 can comprise user data associated with one or more users of services availed via the service provider. In some examples, the user data 122 can include merchant profiles and buyer profiles.

Merchant profiles can store, or otherwise be associated with, data associated with merchants. For instance, a merchant profile can store, or otherwise be associated with, data about a merchant (e.g., name of the merchant, geographic location of the merchant, operating hours of the merchant, worker data, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan data associated with the merchant (e.g., previous loans made to the merchant, previous defaults on said loans, etc.), risk data associated with the merchant (e.g., indications of risk, instances of fraud, chargebacks, etc.), appointments data (e.g., previous appointments, upcoming (scheduled) appointments, timing of appointments, lengths of appointments, etc.), payroll data (e.g., workers, payroll frequency, payroll amounts, etc.), worker data, reservations data (e.g., previous reservations, upcoming (scheduled) reservations, interactions associated with such reservations, etc.), inventory data, buyer service data, etc. The merchant profile can securely store bank account data as provided by the merchant.

Buyer profiles can store buyer data including, but not limited to, buyer data (e.g., name, phone number, address, banking data, etc.), buyer preferences (e.g., learned or buyer-specified), purchase history data (e.g., identifying one or more items purchased (and respective item data), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, buyer service data, etc.

In some examples, the user data 122 can be associated with user profiles of other users of the service provider, such as users of peer-to-peer payment services. In such examples, a user profile can store user data including, but not limited to, user data (e.g., name, phone number, address, banking data, etc.), user preferences (e.g., learned or user-specified), purchase history data (e.g., identifying one or more items purchased (and respective item data), payment instruments used to purchase one or more items, returns associated with one or more orders, statuses of one or more orders (e.g., preparing, packaging, in transit, delivered, etc.), etc.), peer-to-peer activity data (e.g., payments made to other users, payments received from other users, etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, etc.

The user computing device 104 can present a user interface 128, which can be provided by a web browser, application, instant application, or the like. In some examples, content presented via the user interface 128 can be customized and/or personalized based at least in part on context data and/or data received via input(s) to the user interface 128. Additional details associated with the user interface 128 and/or web browser(s), application(s), instant application(s), or the like that can present the user interface 128 are provided below. That is, any of the user interfaces described below can correspond to the user interface 128, which can enable the user 106 to interact with the associated web browser, application, instant application, or the like.

While techniques described below are described with reference to instant applications (i.e., parts of full applications), in some examples, techniques can be applicable to full applications in addition to, or as an alternative of, instant applications. That is, to the extent selection of an instant application is described, in some examples, same or similar techniques can be used for selecting an application instead of an instant application.

Figure 2:
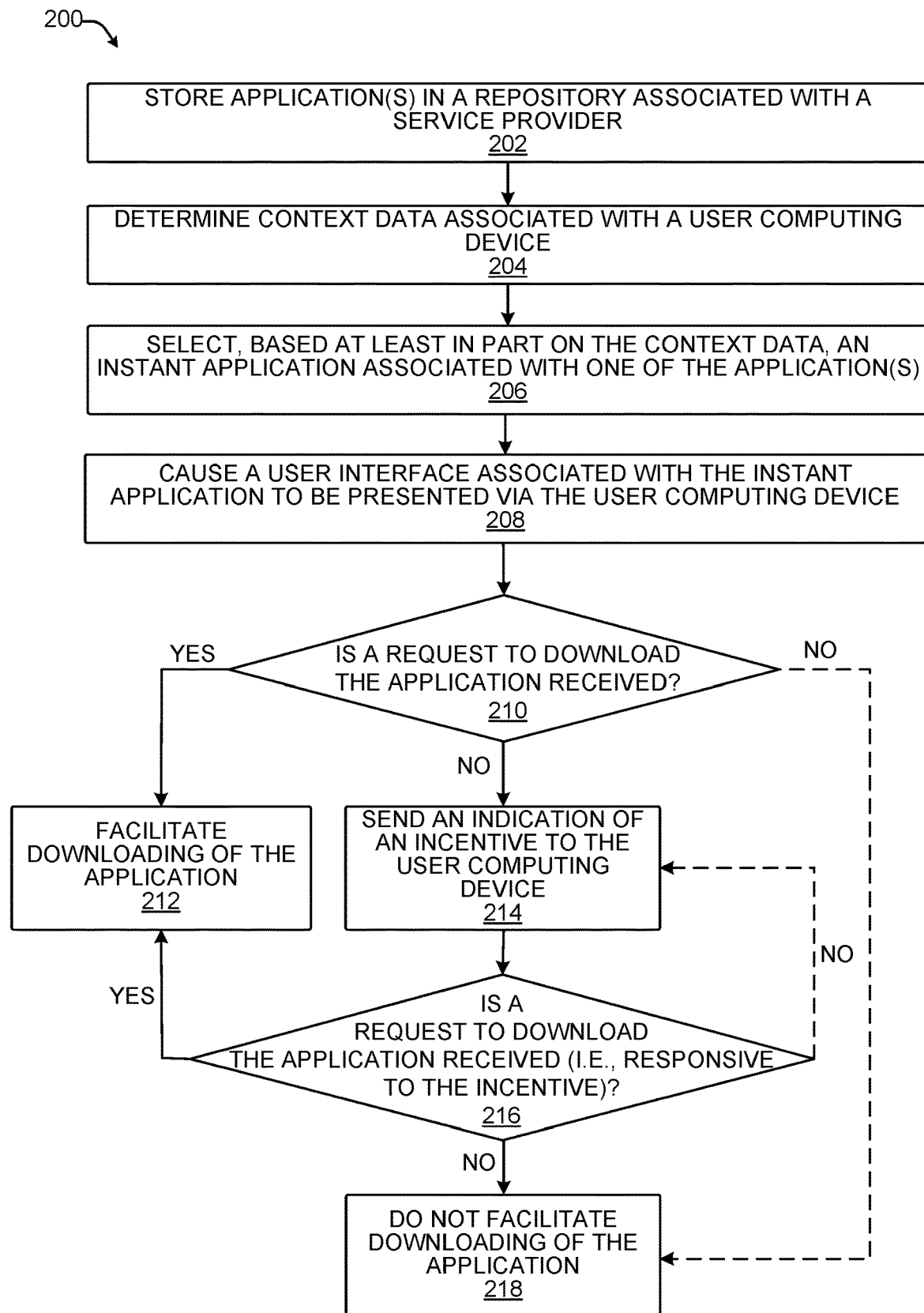
FIG. 2 illustrates an example process for selecting and/or surfacing an instant application based at least in part on context data associated with a computing device.

FIG. 2 illustrates an example process 200 for selecting an instant application based at least in part on context data associated with a user computing device and causing a user interface associated with the selected instant application to be surfaced via the user computing device.

At operation 202, application(s) 120 can be stored in a repository (e.g., the data store(s) 118) associated with a service provider. As described above, the data store(s) 118 can manage and/or store data. In at least one example, the data store(s) 118 can include application(s) 120 and user data 122. The application(s) 120 can comprise one or more applications provided by the service provider (e.g., developed and/or managed by the service provider). The application(s) 120 can comprise one or more applications provided by one or more third parties (e.g., developed and/or managed by an entity other than the service provider). In at least one example, an application 124 of the application(s) 120 can comprise multiple parts. Each part, such as the part 126, can be associated with an instant application, as described above, which can provide a particular, discrete functionality when downloaded.

At operation 204, the context determination component 116 can determine context data associated with a user computing device 104. In at least one example, the context determination component 116 can determine and/or receive context data associated with user computing device(s), such as the user computing device 104. In at least one example, context data can include location data indicating a location of the user computing device 104. In some examples, the context data can include interaction data indicating whether the user 106 is interacting with the user computing device 104, an application with which the user 106 is interacting, and/or the like. In some examples, context data be associated with time data (e.g., timestamps, etc.), date data (e.g., datestamps, etc.), event data (e.g., data indicating details associated with events), calendar data (e.g., data associated with an electronic calendar, holidays, etc.), activity data (e.g., data associated with past transactions and/or interactions of a user, etc.), transaction data (e.g., data associated with previous, current, and/or future transactions), user data, and/or the like. In some examples, at least a portion of the context data can be accessed and/or received from the data store(s) 118.

In at least one example, the context determination component 116 can determine context data which can include, but is not limited to, a location of the user computing device 104, a date, a time, a current behavior of one or more friends of the user, a preference of the user, an occurrence of an event, and/or the like.

In at least one example, context data can be associated with a location of the user computing device 104. The location of a user computing device 104 can be determined using one or more techniques. For example, the location of a user computing device 104 can be determined based at least in part on an interaction with another computing device associated with a known location (e.g., a merchant computing device associated with a particular location). In some examples, the location of the user computing device 104 can be determined based at least in part on determining that the user computing device 104 is within a threshold distance of another computing device associated with a known location (e.g., a merchant computing device associated with a particular location). In at least one example, a location of the user computing device 104 can be determined, based at least in part on Bluetooth/BLE beacons associated with another computing device associated with a known location (e.g., a merchant computing device associated with a particular location). For example, if the user computing device 104 is determined to be within a threshold distance of a computing device of a merchant, the context determination component 116 can determine that the location of the user of the computing device 104 corresponds to the merchant.

In at least one example, location data (e.g., GPS data) received from the user computing device 104 can be used to determine the location of the user computing device 104. In some examples, signal strength can be used to determine the location of the user computing device 104. For instance, the location of the user computing device 104 can be determined based at least in part on determining how the user computing device 104 responds to a signal emitted by another computing device associated with a known location (e.g., a merchant computing device associated with a particular location). Moreover, in at least one example, the location of the user computing device 104 can be determined based at least in part on determining that the user computing device 104 has joined a same network as another computing device associated with a known location (e.g., a merchant computing device associated with a particular location).

In at least one example, a time and/or date can be determined based at least in part on time or date data associated with the user computing device 104 and/or the service provider server(s) 102.

In at least one example, at least a portion of the user data 122 (e.g., buyer data, merchant data, etc.) can be used to determine context data. For example, based at least in part on receiving an identifier associated with a user (e.g., a device identifier or other device data associated with the user computing device 104, an email, a user name, a phone number, a cookie, a token, etc.), the context determination component 116 can access data associated with the user, which in some examples, can be stored in profile(s) stored in the data store(s) 118. Additional details associated with such profile(s) and/or associated data are described below. Such user data can be used to identify user preferences of the user, friends of the user, behaviors of the user (and/or friends of the user), and the like. Additional or alternative third-party data sources can also be accessed, e.g., via APIs, to refine context. For example, such sources can provide data such as restaurant menus, merchant MCCs, etc.

In some examples, the context determination component 116 can determine an occurrence of an event, such as an order, payment, or the like, and can determine context data based at least in part on the occurrence of the event. That is, the occurrence of an event can be used to determine context data. In some examples, events can be determined based at least in part on interaction data representative of interactions between buyers and merchants and/or other users associated with the service provider. Such interaction data can include transaction data, which can be used for processing payments for transactions, order data, payroll data, appointment data, lending data, or the like.

In some examples, the context determination component 116 can determine context data based at least in part on device data, which can include device attributes, of the user computing device 104. For example, the device attributes may be used to determine which functionality to present. Other example attributes describing the user computing device 104 can include detected versions of software installed in the operating system of the user computing device 104, the speed of a network connection of the user computing device 104, remaining battery life of the user computing device 104, etc. So, for example, if the user computing device 104 has a slow network connection and/or little remaining battery life, the applications, or parts thereof, selected may be the ones with the appropriate size that can perform the required functions.

At operation 206, the application management component 114 can select, based at least in part on the context data, an instant application associated with one of the application(s) 120. In at least one example, the application management component 114 can utilize context data associated with the user computing device 104 to select applications and/or part(s) associated therewith (e.g., instant application(s)) to surface to the user computing device 104. That is, in at least one example, the application management component 114 can determine which instant application to surface to the user computing device 104 based at least in part on the context data.

In at least one example, the application management component 114 can analyze the context data using a machine-trained model, such that the model can be trained with context data of one or more users (e.g., users similar to the user, users of a cohort, all users associated with the service provider, etc.), as an example. The machine-trained model can output one or more recommended instant applications to provide to the user computing device 104 based at least in part on the context data associated with the user computing device 104. In some examples, individual of the recommended instant applications can be associated with relevance scores, or other metrics, indicating a relevance to the user in view of the context data. In some examples, the recommended instant applications can be ranked based at least in part on the relevance scores. In some examples, the application management component 114 can select a highest-ranking recommended instant application, an instant application with a relevance score above a threshold, or the like.

In at least one example, the application management component 114 can generate interactable elements associated with one or more applications and/or part(s) associated therewith (e.g., instant application(s) associated therewith). In some examples, an interactable element can be mapped one-to-one to an instant application. In such examples, the application management component 114 can select the instant application mapped to the interactable element based at least in part on receiving the indication of the interaction with the interactable element. In some examples, an interactable element can be mapped to multiple instant applications (e.g., one-to-many) as a multi-functional interactable element. In such examples, the application management component 114 receive an indication of an interaction with the multi-functional interactable element and can analyze the context data to select an instant application of the multiple instant applications associated with the multi-functional interactable element to recommend for surfacing on the user computing device 104. In some examples, the application management component 114 can use statistics, machine-learning, or other techniques to select an instant application. In some examples, the application management component 114 can use context data to determine risk associated with the user. Such risk can also factor into determining which of the instant applications the user qualifies for, and thus, which instant application(s) to present to the user.

In some examples, the application management component 114 can receive context data over a period of time. In such examples, the application management component 114 can determine changes and/or otherwise track the user 106 and/or user computing device 104 over the period of time. In some examples, the application management component 114 can select an instant application based at least in part on such changes and/or tracking. As an example, the application management component 114 can receive location data over a period of time. Using the location data, the application management component 114 can track the user computing device 104 and can select the instant application based at least in part on such tracking. That is, if the user computing device 104 is moving toward a particular entity associated with an instant application (e.g., a bicycle, a food truck, a merchant, etc.), the application management component 114 can select an instant application associated with the entity. As a non-limiting example, if the user computing device 104 is moving toward a restaurant, the application management component 114 can select an instant application associated with the restaurant to enable the user 106 to add their name to a wait list, make a reservation, place an order, or the like.

At operation 208, the application management component 114 can cause a user interface 128 associated with the instant application to be presented via the user computing device 104. In at least one example, the application management component 114 can send instructions and/or code related to the selected instant application over the network(s) 110 to enable the user computing device 104 to provisionally or temporarily download the instant application. Functionality associated with the instant application can be made available "on demand" or in near-real time. As such, the user can quickly access the functionality, without having to download the entire application.

In some examples, the instant application can be downloaded upon determining such a recommendation (e.g., based on an implied or explicit consent from the user). In some examples, a recommendation or other notification associated with an instant application can be presented via the user interface 128 of the user computing device 104 and/or another computing device (from which an interactable element can be presented). In some examples, the recommendation can include an interactable element or other mechanism for the user 106 to provide an input to initiate the download of the instant application. In such examples, the user 106 can provide an input indicating consent for the instant application to be downloaded on the user computing device 104. In some examples, such an input can comprise interacting with the interactable element (e.g., scanning or otherwise reading the interactable element), which can be provided to the service provider server(s) 102 and the application management component 114 can thereby cause the instant application to be downloaded on the user computing device 104 based at least in part on receiving the indication of the interaction with the interactable element.

In at least one example, based at least in part on receiving the instructions and/or code, the user computing device 104 can cause the user interface 128 to be presented via the user computing device 104. In some examples, content presented via the user interface 128 can be customized and/or personalized based at least in part on the context data. In at least one example, the user interface 128 enables the user 106 of the user computing device 104 to input data for enabling the particular, discrete functionality. Non-limiting examples of such a user interface are provided below. In at least one example, the instant application can present the user interface 128 to enable the user 106 to input data into the application. In some examples, such data can be a name and password. In some examples, such data can be payment data. In some examples, such data can be an address (e.g., for delivery). In some examples, the user interface 128 can enable a user to perform an operation such as ordering an item, purchasing an item, redeeming loyalty points or rewards, or the like. Additional examples of data and/or input that can be provided via the user interface presented by the instant application are described below.

In some examples, each session with the instant application can be timed such that the instant application is removed from the user computing device 104 when the session is over. In some examples, the application management component 114 can track and cache/store such session activity with identifiers (e.g., user name, device identifier (ID), merchant identifier (ID), merchant card reader identifier, etc.) and can surface/prepopulate part or some of the tracked data to the user 106 via the user interface 128 when a subsequent session starts with the instant application initialization. In some cases, the tracked data (e.g., session data) can also be used (e.g., as context data) to automatically recommend an instant application based on known historical session activity of the same user and/or similar users when a predefined condition is met (e.g., the user is at the same merchant location). In at least one example, users can be determined to be "similar" based at least in part on comparing data associated with such users. In some examples, such data can be obtained from profile(s) associated with such users that can be stored in a data store associated with the service provider server(s) 102. In at least one example, similarity algorithms (e.g., nearest neighbor, regression similarity, classification similarity, ranking similarity, etc.) can be used by the server(s) to determine similarity between users.

In some examples, the instant application can send an authorization request to the service provider server(s) 102 to request access to data stored by the service provider server(s) 102 (e.g., in the data store(s) 118). The application management component 114 can receive the request and can determine whether to authorize access to at least a portion of the data stored by the service provider server(s) 102. In some examples, the portion of data can be associated with the user 106 and/or the user computing device 104 and can be used for customizing and/or personalizing at least one of the instant application, data presented via a user interface associated with the instant application, and/or the full application with which the instant application is associated.

At operation 210, the application management component 114 can determine whether a request to download the application is received. In some examples, remaining part(s) of the application can be downloaded at a later time. That is, the full application can be downloaded at a later time. In some examples, a recommendation or notification can be presented via the instant application that can prompt the user 106 to download one or more remaining parts of the application to the user computing device 104. If a request to download the application is received, the application management component 114 can facilitate downloading of the application onto the user computing device 104, as illustrated at operation 212.

In some examples, prior to facilitating the downloading of the application onto the user computing device 104, the application management component 114 can access user data associated with the user 106 and can customize and/or personalize at least one of the application or data presented via the application based at least in part on the user data. In some examples, the application management component 114 can utilize input received via the instant application to access the user data. For instance, in some examples, the user 106 can input a name and/or password, a physical address, an email address, payment data, or the like, which can be used by the application management component 114 to access the user data (e.g., from the data store(s) 118). In some examples, the application management component 114 can use an additional or alternative identifier, such as an identifier associated with the user computing device 104 or the like to access the user data.

In some examples, as described above, data input to an instant application can persist so that such data can be integrated into the full application when the remaining part(s) of the application are downloaded onto the user computing device 104. In such examples, based at least in part on receiving a request to download the application, the application management component 114 can store data provided via the instant application. The application management component 114 can associate the data provided via the instant application with the application such that the data can be accessible via the application after the application has been downloaded on the user computing device 104. In some examples, data input to an instant application can be used to customize and/or personalize the application, other part(s) of the application to surface, and/or data presented via user interface(s) associated therewith.

In at least one example, if the user decides to move from an instant application to a full application, the application management component 114 can provide data and context, for example, data obtained from other of the application(s) 120, other contextual data from similar users, in addition to session data obtained by the user computing device 104 during the use of the instant application, through server calls to improve the onboarding and integration experience. In such an example, the service provider server(s) 102 can offer intelligence related to the user's transaction and activity history to better configure the instant application or the full application. That is, context data can be used to personalize or customize an instant application or a full application, or in some examples, data presented via user interface(s) associated therewith.

In an example, consider a user downloads an instant application to pay for a bike rental on their user computing device. In such an example, the instant application allows the user to perform two tasks—rent the bike (physically unlock the bike as an authorized user after payment is confirmed) and pay for the bike rental (enter credit card data on a payment interface within the instant application or through a native payment application). In response to data obtained from the bike rental transaction (e.g., credit card data and/or user identifier), the application management component 114 can determine whether the user or this transaction data matches any other user associated with the service provider, for example using user transaction history, user peer-to-peer payment history, or the like. If the user or a user matching, or otherwise determined to be similar to, the user's profile is detected, the application management component 114 can package and encrypt data and send to the instant application to apply to this user session or a subsequent user session. Alternatively or additionally, the application management component 114 can package and apply this data (for example for risk determination) to configure/transport to a full application at a later time. The application management component 114 can also query the data store(s) 118 for rich data at, or near, the time the user 106 commits to moving from instant application to full application. In some examples, the user 106 can provide a username and/or other credentials to access third-party data sources for the purposes defined above. This can allow a seamless onboarding experience with intelligence obtained from other areas of the service provider server(s) 102 and/or environment 100 described above.

In some examples, if a request to download the application is not received, the application management component 114 can send an indication of an incentive to the user computing device 104, as illustrated at operation 214. In at least one example, the incentive can provide a benefit to the user 106 based at least in part on a determination that one or more conditions associated with the incentive are satisfied. In at least one example, a condition associated with the incentive can require that the application to which the instant application corresponds be downloaded onto the user computing device 104. In at least one example, the indication of the incentive can be presented via the user interface 128. In at least one example, the application management component 114 can determine whether a request to download the application is received (i.e., responsive to the incentive), as illustrated at operation 216. If a request to download the application is received, the application management component 114 can facilitate downloading of the application onto the user computing device 104, as illustrated at operation 212. In such an example, based at least in part on a determination that condition(s) associated with the incentive have been satisfied (e.g., one or more remaining part(s) of the application have been downloaded) the application management component 114 can provide the incentive to the user 106. That is, the application management component 114 can associate the incentive with a user profile of the user, send the incentive via an email, text message, push notification, or the like. In some examples, the process 200 can repeat operations 214 and 216 for a predetermined number of attempts, a predetermined period of time, or the like (e.g., as illustrated by the dashed line between operation 216 and 214).

If a request to download the application is not received, the application management component 114 can refrain from facilitating downloading of the application, as illustrated at operation 218. In some examples, if the application has not been downloaded after the predetermined number of attempts, the predetermined period of time, or the like, the application management component 114 can refrain from providing the application to the user computing device 104 (e.g., for download). In some examples, a prompt to download the application can be blocked and/or hidden.

In some examples, the process 200 can proceed from operation 210 directly to operation 218 if a request to download the application is not received (i.e., the application management component 114 can refrain from sending an incentive), as illustrated by the dashed line between operations 210 and 218.

In some examples, multiple instant applications can be available to the user computing device 104. In some examples, two or more instant applications can be associated with particular, discrete functionalities that can be performed serially and/or in a sequence (and without the user needing to download the full application). For example, a first instant application can be associated with clocking in, a second instant application can be associated with clocking out, and a third instant application can be associated with requesting a payout for compensation (e.g., gratuities earned during time work, compensation owed for time worked, etc.). In some examples, a worker (e.g., an employee, independent contractor, agent, and/or the like) can download each of the instant applications serially such that the worker can clock-in, and later clock-out and request payout for compensation, in that order. In some examples, two or more instant applications can be associated with a same application or a different application. For instance, the first through third instant applications described above can each be associated with a same employer application. In an alternative example, however, the first, the second, and/or the third instant application can be associated with the employer application or a separate payroll application. In at least one example, the instant applications involved in the sequence and/or the order of the sequence can be determined based at least in part on context data, as described herein.

In some examples, previously downloaded instant applications can be used as context data for selecting one or more subsequent instant applications. As an example, based at least in part on a user downloading a first instant application associated with a first merchant, the context determination component 116 can cause a second instant application associated with a second merchant to be downloaded on the user computing device. In at least one example, the second instant application can be associated with a promotion, incentive, reward, or the like to encourage the user to patronize the second merchant. For instance, the second instant application can offer an incentive for making an appointment with and/or purchase from the second merchant and can present a user interface to enable the user to make the appointment. Additional or alternative examples are provided below.

Figure 3:
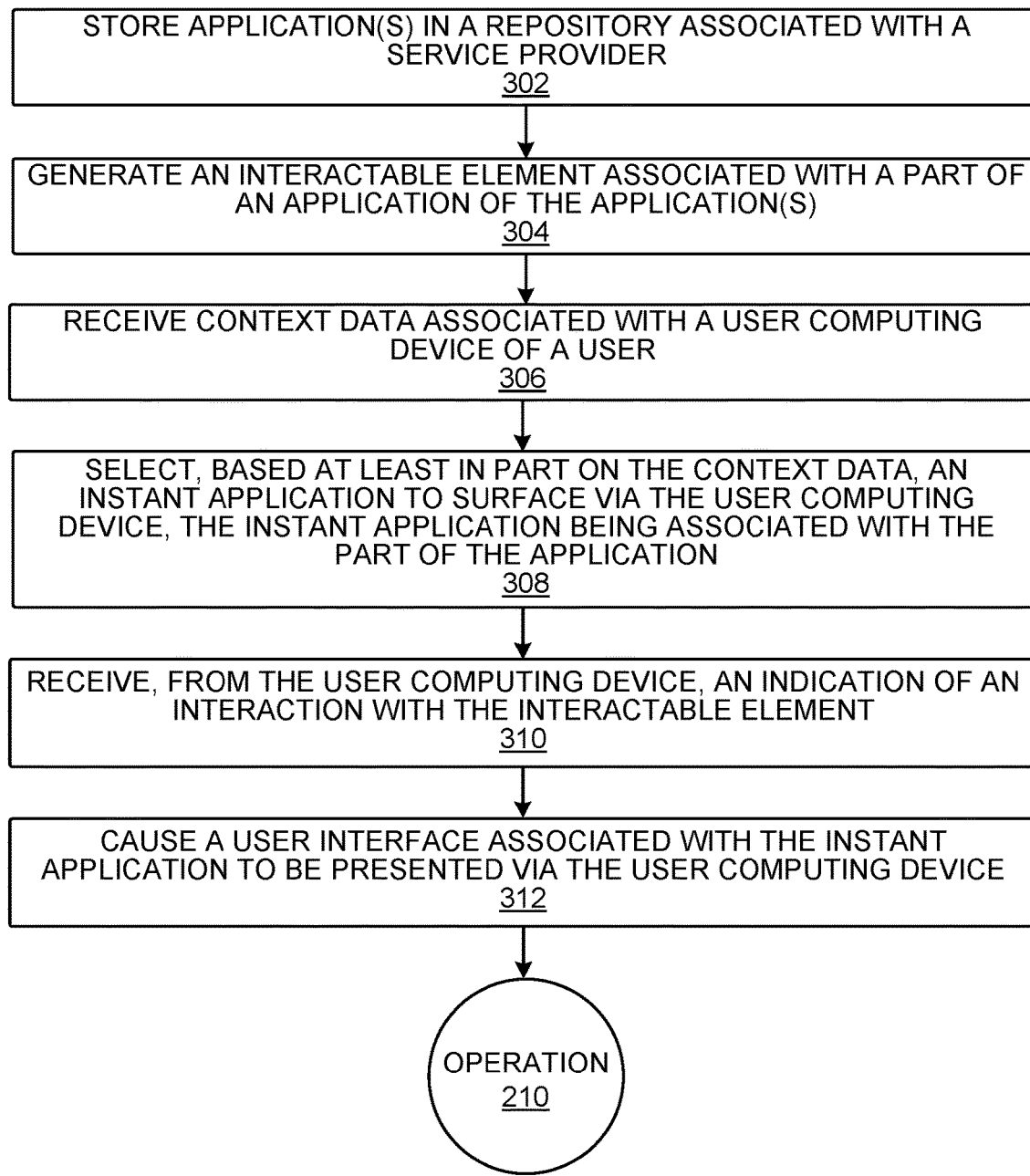
FIG. 3 illustrates an example process for selecting and/or surfacing an instant application based at least in part on context data associated with a computing device.

FIG. 3 illustrates an example process 300 for selecting an instant application based at least in part on context data associated with a user computing device and causing a user interface associated with the selected instant application to be surfaced via the user computing device.

At operation 302, application(s) 120 can be stored in a repository (e.g., the data store(s) 118) associated with a service provider, as described above with reference to operation 202 of FIG. 2.

At operation 304, the application management component 114 can generate an interactable element associated with a part of an application of the application(s) 120. As described above, an interactable element, which can include an identification code, can comprise a QR code, a RFID tag, a barcode, an NFC tag, a URI, an image, etc. In some examples, an interactable element can be affixed to, or otherwise associated with, physical objects, such as tables, designated seating areas, receipts, bicycles, scooters, vehicles, doors, items offered for sale, etc. In some examples, an interactable element can be presented via a computing device. In at least one example, interactable element(s) associated with a part of an application (e.g., an instant application) can be mapped to, or otherwise associated with, the part of the application in the data store(s) 118.

At operation 306, the context determination component 116 can determine context data associated with a user computing device 104 of a user 106, as described above with reference to operation 204 of FIG. 2.

At operation 308, the application management component 114 can select, based at least in part on the context data, an instant application to surface via the user computing device 104, the instant application being associated with the part of the application. Details associated with selecting an instant application are described above with reference to operation 206 of FIG. 2. In some examples, the application management component 114 can cause the interactable element associated with the selected instant application to be presented via the user interface 128 of the user computing device 104. In some examples, the application management component 114 can send the interactable element to the user computing device 104 via a text message, email, push notification, or the like. In at least one example, the application management component 114 can cause the interactable element to be presented via another user computing device (e.g., a buyer-facing display of a point-of-sale device, a merchant computing device, a kiosk, etc.).

At operation 310, the application management component 114 can receive, from the user computing device 104, an indication of an interaction with the interactable element. In at least one example, the user computing device 104 can interact with the interactable element by scanning, reading, or otherwise interacting with the interactable element. The user computing device 104 can send an indication of the interaction to the service provider server(s) 102 and the application management component 114 can receive the indication.

As described above, instant applications can be discoverable. In some examples, instant applications can be discoverable via an interactable element associated with a particular application (or a part thereof). In some examples, an instant application can be discoverable via a banner associated with a web page, a link in a message, a map user interface, a library of recently used instant applications, or the like. In some examples, instant applications can be discoverable based at least in part on a geolocation of a user computing device, a time, a date, an event, etc. Input associated with the banner, link, map user interface, library, etc. can cause an indication of an interaction with the interactable element to be sent to the service provider server(s) 102. In some examples, the indication of the interaction with the interactable element can be first sent to the third-party server(s) 108, which can send the indication of the interactable element to the service provider server(s) 102.

At operation 312, the application management component 114 can cause a user interface associated with the instant application to be presented via the user computing device 104. In at least one example, based at least in part on receiving the indication of the interaction, the application management component 114 can determine which instant application the indication is associated with and can cause the instant application to be downloaded or otherwise provided to the user computing device 104. The instant application can present the user interface 128 such that the user 106 can interact with the instant application via the user interface 128. The process 300 can continue at operation 210, described above with reference to FIG. 2, wherein the application management component 114 can facilitate the remaining part(s) of the application being downloaded on the user computing device 104 (or not).

Figure 4:
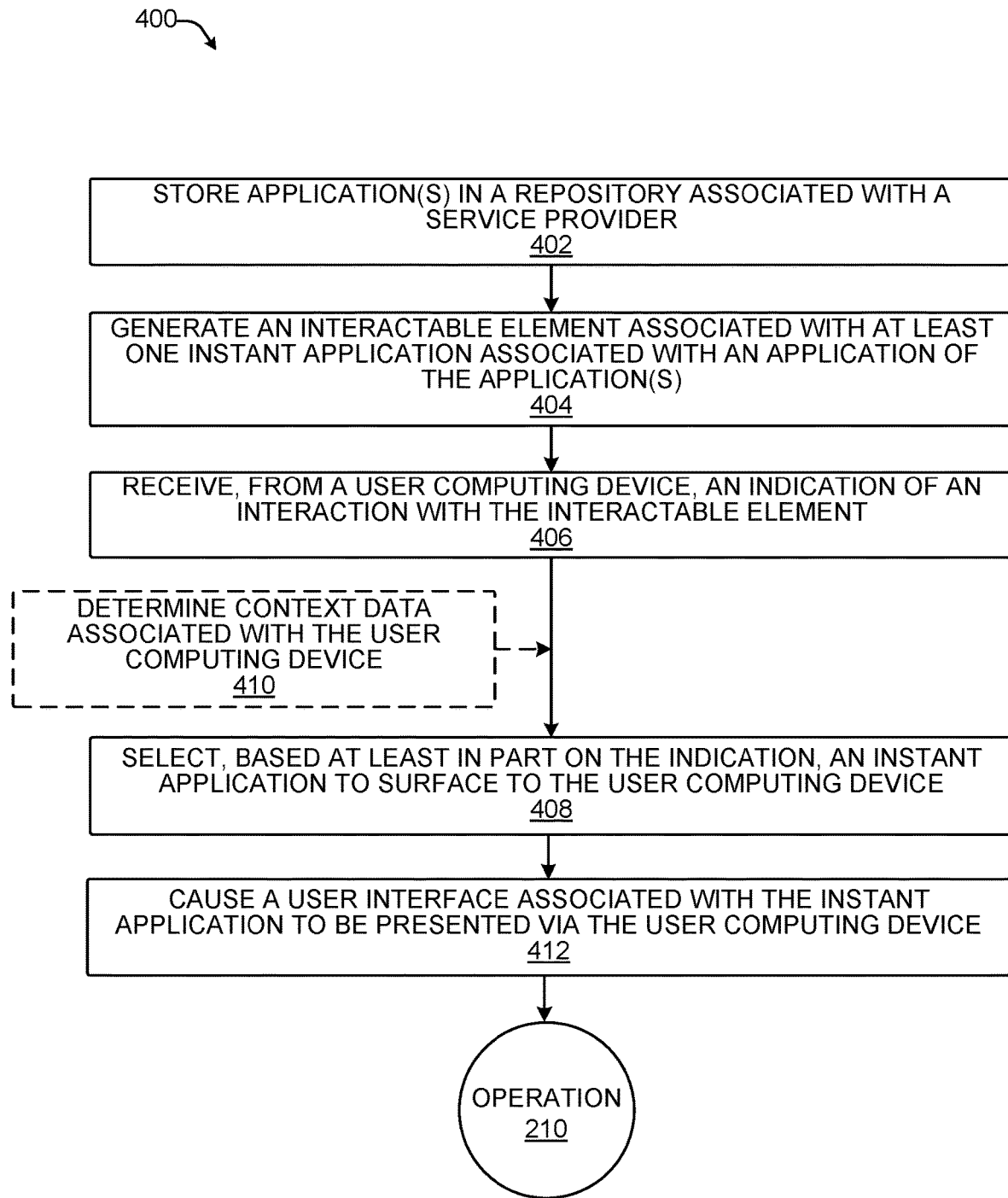
FIG. 4 illustrates an example process for selecting and/or surfacing an instant application based at least in part on context data associated with a computing device vice.

FIG. 4 illustrates an example process 400 for selecting an instant application based at least in part on context data associated with a user computing device and causing a user interface associated with the selected instant application to be surfaced via the user computing device.

At operation 402, application(s) 120 can be stored in a repository (e.g., the data store(s) 118) associated with a service provider, as described above with reference to operation 202 of FIG. 2.

At operation 404, the application management component 114 can generate an interactable element associated with at least one instant application of the application(s) 120. As described above, an interactable element, which can include an identification code, can comprise a QR code, a RFID tag, a barcode, an NFC tag, a URI, an image, etc. In some examples, an interactable element can be a multi-function interactable element that can be associated with multiple instant applications. In some examples, an interactable element—multi-function or not—can be affixed to, or otherwise associated with, physical objects, such as tables, designated seating areas, receipts, bicycles, scooters, vehicles, doors, items offered for sale, etc. In some examples, an interactable element can be presented via a computing device. In at least one example, interactable element(s) associated with a part of an application (e.g., an instant application) can be mapped to, or otherwise associated with, the part of the application in the data store(s) 118.

At operation 406, the application management component 114 can receive, from a user computing device 104, an indication of an interaction with the interactable element. In at least one example, the user computing device 104 can interact with the interactable element by scanning, reading, or otherwise interacting with the interactable element. The user computing device 104 can send an indication of the interaction to the service provider server(s) 102 and the application management component 114 can receive the indication.

As described above, instant applications can be discoverable. In some examples, instant applications can be discoverable via an interactable element associated with a particular application (or a part thereof). In some examples, an instant application can be discoverable via a banner associated with a web page, a link in a message, a map user interface, a library of recently used instant applications, or the like. In some examples, instant applications can be discoverable based at least in part on a geolocation of a user computing device, a time, a date, an event, etc. Input associated with the banner, link, map user interface, library, etc. can cause the indication of the interactable element to be sent to the service provider server(s) 102. In some examples, the indication of the interactable element can be first sent to the third-party server(s) 108, which can send the indication of the interactable element to the service provider server(s) 102.

At operation 408, the application management component 114 can select, based at least in part on the indication, an instant application to surface to the user computing device 104. In at least one example, based at least in part on receiving the indication of the interaction, the application management component 114 can determine which instant application the indication is associated with and can select the instant application based on the indication. In some examples, if the interactable element is associated with a multi-function interactable element, the application management component 114 can utilize context data to determine which instant applications associated with the multi-function interactable element to select. In at least one example, the context determination component 116 can determine context data responsive to receiving the indication of the interactable element. That is, in some examples, the receipt of the indication of the interactable element can initiate a process to determine and/or select which instant application to provide to the user computing device 104.

At operation 410, which can be optional, the context determination component 116 can determine context data associated with a user computing device 104 of a user 106, as described above with reference to operation 204 of FIG. 2. In some examples, the instant application selected in operation 408 can be selected further based at least in part on the context data, as described above.

At operation 412, the application management component 114 can cause a user interface associated with the instant application to be presented via the user computing device 104. In at least one example, based at least in part on selecting an instant application, the application management component 114 can cause the instant application to be downloaded or otherwise provided to the user computing device 104. The instant application can present the user interface 128 such that the user 106 can interact with the instant application via the user interface 128. The process 400 can continue at operation 210, described above with reference to FIG. 2, wherein the application management component 114 can facilitate the remaining part(s) of the application being downloaded on the user computing device 104 (or not).

Figure 5:
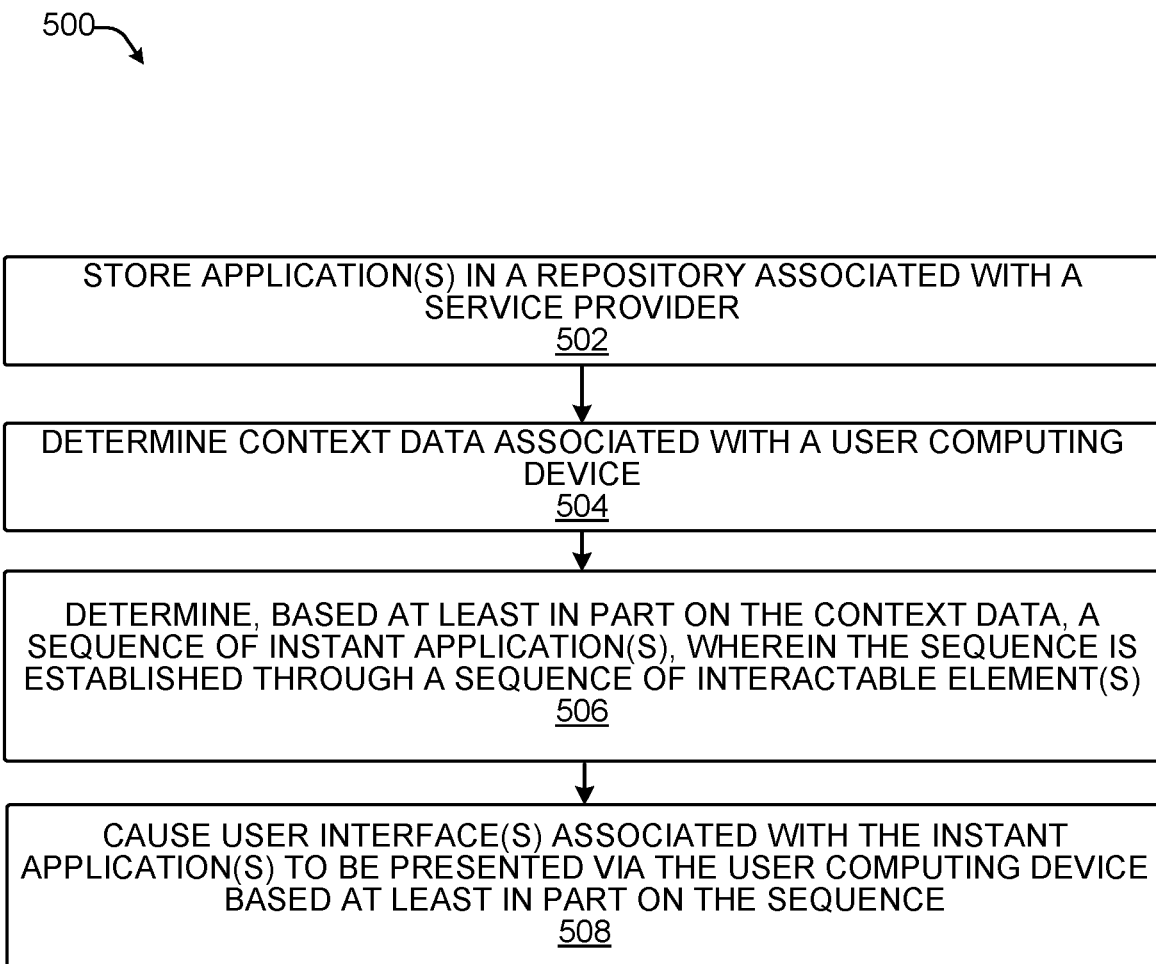
FIG. 5 illustrates an example process associated with determining a sequence of instant application(s) to surface via a user computing device.

As described above, in some examples, multiple instant applications can be available to the user computing device. In some examples, two or more instant applications can be associated with particular, discrete functionalities that can be performed serially and/or in a sequence (and without the user needing to download the full application). FIG. 5 illustrates an example process 500 associated with determining a sequence of instant application(s) to surface via a user computing device.

At operation 502, application(s) 120 can be stored in a repository (e.g., the data store(s) 118) associated with a service provider, as described above with reference to operation 202 of FIG. 2.

At operation 504, the context determination component 116 can determine context data associated with a user computing device 104 of a user 106, as described above with reference to operation 204 of FIG. 2.

At operation 506, the application management component 114 can determine, based at least in part on the context data, a sequence of instant application(s), wherein the sequence is established through a sequence of interactable element(s). In at least one example, the application management component 114 can utilize the context data to determine a sequence of instant application(s). In some examples, previously downloaded instant applications can be used as context data for selecting one or more subsequent instant applications and/or a sequence of instant application(s). As an example, based at least in part on a user downloading a first instant application associated with a first merchant, the context determination component 116 can cause a second instant application associated with a second merchant to be sequentially and automatically (e.g., without further user input) downloaded on the user computing device 104. In at least one example, the second instant application can be associated with a promotion, incentive, reward, or the like to encourage the user to patronize the second merchant. For instance, the second instant application can offer an incentive for making an appointment with and/or purchase from the second merchant and can present a user interface to enable the user to make the appointment. Additional or alternative examples are provided below.

In some examples, a sequence can be determined by the memory and/or network constraints, such that, for example, the first and then the second application, or parts thereof, are downloaded based on memory availability of the user computing device 104. In some examples, the formatting of the applications, or parts thereof, can be adjusted based on device data and attributes. For example, the second application, or part thereof, may be formatted more than the first application, or part thereof.

In some examples, a sequence of instant application(s) can be designated by a developer of an application with which the instant application(s) are associated. In some examples, a sequence of instant application(s) can be determined based at least in part on interaction data associated with users associated with the service provider. Such interaction data can indicate which instant application(s) users interact with and in which order. Trends associated with sequences of instant application(s) can be associated with context data, which can be used by the application management component 114 for determining a sequence of instant application(s).

At operation 508, the application management component 114 can cause user interface(s) associated with the instant application(s) to be presented via the user computing device 104 based at least in part on the sequence. In at least one example, each user interface enables a user 106 of the user computing device 104 to input data for enabling the particular, discrete functionality associated with each of the instant application(s). Further, in at least one example, a portion of the context data can be used to customize a user interface associated with an instant application for the user 106. In at least one example, based at least in part on receiving an indication of an interaction with an interactable element corresponding to an instant application, the application management component 114 can cause a user interface associated with the corresponding instant application to be presented via the user interface 128 of the user computing device 104. The user 106 can interact with the user interface 128 to provide input associated with the corresponding instant application. In some examples, input received via a first user interface associated with a first instant application can be used to customize and/or personalize a second user interface, subsequently presented via the user computing device 104 in association with a second instant application.

In at least one example, the application management component 114 can cause interactable element(s) associated with instant application(s) to be surfaced on the user computing device 104 based at least in part on the sequence. As described above, in some examples, the interactable element(s) can be surfaced via a text message, email, push notification, or the like. In some examples, the interactable element(s) can be presented via another user computing device (e.g., a buyer-facing display of a point-of-sale device, a merchant computing device, a kiosk, etc.). In some examples, the sequence of interactable element(s) can be surfaced at the same time or serially (e.g., one at a time). In some examples, the interactable element(s) can be printed and/or otherwise associated with a physical medium (e.g., a physical object) for presentation, instead of, or in addition to, the interactable element(s) being presented via the user computing device 104. In some examples, the application management component 114 can surface the instant application(s) dynamically and/or intelligently based at least in part on the sequence without causing associated interactable element(s) to be surfaced on the user computing device 104 and/or via another medium. In such examples, the user interface(s) can be presented based at least in part on the context data determined at operation 504 and/or based on input received via user interface(s) presented in association with the sequence.

Figure 6:
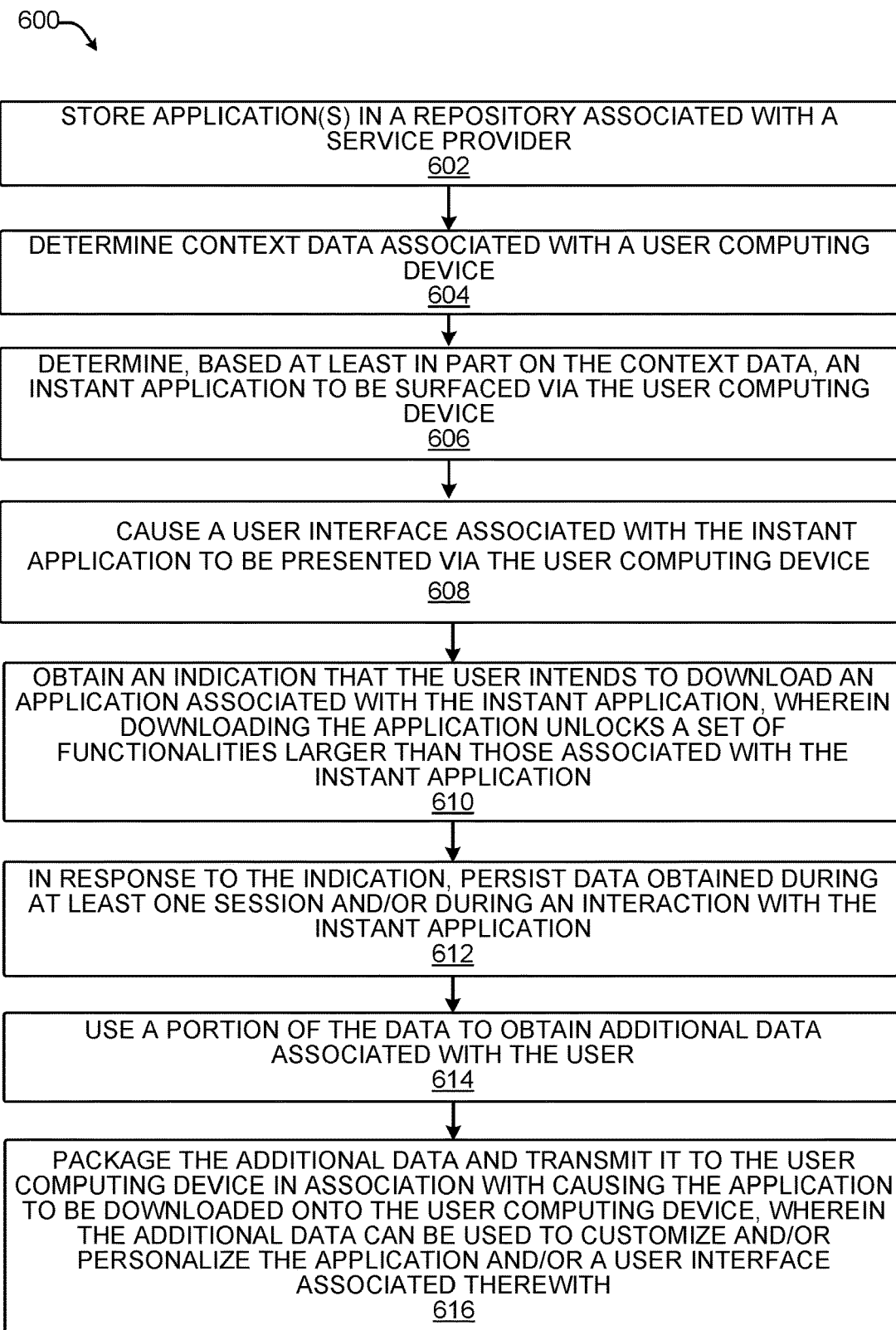
FIG. 6 illustrates an example process for data persistence across devices and/or applications executing on different devices.

FIG. 6 illustrates an example process 600 for persisting data obtained during a session associated with an instant application and transmitting at least a portion of the data to a user computing device when a full application associated with the instant application is downloaded to the user computing device.

At operation 602, application(s) 120 can be stored in a repository (e.g., the data store(s) 118) associated with a service provider, as described above with reference to operation 202 of FIG. 2.

At operation 604, the context determination component 116 can determine context data associated with a user computing device 104 of a user 106, as described above with reference to operation 204 of FIG. 2.

At operation 606, the application management component 114 can select, based at least in part on the context data, an instant application to surface via the user computing device 104, the instant application being associated with the part of the application. Details associated with selecting an instant application are described above with reference to operation 206 of FIG. 2.

At operation 608, the application management component 114 can cause a user interface 128 associated with the instant application to be presented via the user computing device 104. In at least one example, the application management component 114 can send instructions and/or code related to the selected instant application over the network(s) 110 to enable the user computing device 104 to provisionally or temporarily download the instant application. Functionality associated with the instant application can be made available "on demand" or in near-real time. As such, the user can quickly access the functionality, without having to download the entire application. In at least one example, the instant application can present a user interface, which can enable the user 106 of the user computing device 104 to input data for enabling a particular, discrete functionality associated with the instant application. In some examples, a portion of the context data can be used to customize and/or personalize the user interface for the user 106.

At operation 610, the application management component 114 can obtain an indication that the user 106 intends to download an application associated with the instant application, wherein downloading the application unlocks a set of functionalities larger than those associated with the instant application. As described above, an instant application can be associated with a particular, discrete functionality of an application. That is, the application can have a set of functionalities that are larger than the particular, discrete functionality with which the instant application is associated. In some examples, the application management component 114 can receive an indication that the user 106 intends to download the application associated with the instant application onto the user computing device 104. In some examples, such an indication can be a request. In some examples, the indication can be provided via an input to the user interface 128.

At operation 612, in response to the indication, the application management component 114 can persist data obtained during at least one session and/or during an interaction with the instant application. That is, based at least in part on receiving the indication that the user 106 intends to download the application, the application management component 114 can store data input to the instant application. In some examples, the data can be associated with a session and/or an interaction with the instant application.

At operation 614, the application management component 114 can use a portion of the data obtained during at least one session and/or during an interaction with the instant application to obtain additional data associated with the user. In some examples, the portion of the data can be a name and password. In some examples, the portion of the data can be payment data. In some examples, the portion of the data can be an address (e.g., for delivery). Additional examples of data that can be provided via the user interface presented by the instant application are described below. In at least one example, the application management component 114 can use the portion of data to perform a look-up of, or otherwise search, the data store(s) 118 to obtain additional data associated with the user. For example, if a name or password is provided, the name and/or password can be used to obtain data associated with a user profile to which the name and/or password correspond. In an additional or alternative example, if payment data is provided, the payment data can be used to obtain data associated with a user profile to which the payment data corresponds. In an additional or alternative example, if an address is provided, the address can be used to obtain data associated with a user profile to which the address corresponds.

At operation 616, the application management component 114 can package the additional data and transmit it to the user computing device 104 in association with causing the application to be downloaded onto the user computing device 104, wherein the additional data can be used to customize and/or personalize the application and/or data presented via a user interface associated therewith. In at least one example, the application management component 114 can utilize the additional data to customize and/or personalize the application and/or the user interface associated therewith.

Instant applications can be useful for a variety of merchant-facing and/or buyer-facing scenarios. As described above, in at least one example, an application, as described herein, can be associated with a buyer-facing application, a buyer application, or the like. One or more instant applications can be associated with the buyer-facing application such that when individual of the instant applications are downloaded by the user computing device 104, different functionalities associated with the buyer-facing application, the buyer application, or the like can be available to a buyer.

In at least one example, an instant application can enable a buyer to view one or more merchants and can provide an entry point for the buyer to order from individual of the one or more merchants. That is, the portion of the application executable by the user computing device 104 can cause a user interface, such as the user interface 128, to be presented that includes one or more user interface elements associated with one or more merchants. When a buyer interacts with a user interface element, the instant application can enable a buyer to access a menu, an electronic catalog or lookbook (e.g., associated with item data), an application site (e.g., content associated with a progressive web application), or the like associated with the corresponding merchant. In some examples, such data can be presented via an augmented reality device associated with the user computing device 104. In some examples, the instant application can enable the buyer to place an order via an interaction with the menu, catalog or lookbook, application site, or the like. In some examples, different instant applications can facilitate each of the functionalities and/or tasks described above. In some examples, a single instant application can facilitate each of the functionalities and/or tasks described above.

In at least one example, an instant application can be downloaded and accessible responsive to the user computing device 104 scanning, reading, or otherwise interacting with an interactable element associated with an item. In at least one example, related items and/or alternative items can be presented via the instant application (and/or a user interface associated therewith). That is, the portion of the application executable by the user computing device 104 can cause a user interface, such as the user interface 128, to be presented that includes data associated with related items and/or alternative items.

In at least one example, an instant application associated with the merchant and/or a service provider can enable a buyer to place an order to purchase an item (e.g., good or service) from the merchant. That is, the portion of the application executable by the user computing device 104 can cause a user interface, such as the user interface 128, to be presented that includes one or more user interface elements with which the user 106 can interact to order an item from a merchant. For example, a buyer can use an instant application to place an order tableside and/or via a contactless order in a dine-in experience. In another example, an instant application can enable a buyer to place an order from home or a remote location and can facilitate delivery and/or pick-up (e.g., curbside or in-store). In some examples, an instant application that facilitates ordering can be downloaded and/or accessible based at least in part on determining that a buyer is proximate to a merchant, based at least in part on a buyer providing an input to a map user interface identifying a geographic location of interest, or the like (e.g., based at least in part on context data).

In an additional or alternative example, an instant application can be presented after a buyer has ordered an item and the instant application can enable the buyer to checkout (e.g., provide payment data) on the user computing device 104. In some examples, the user computing device 104 can scan, read, or otherwise interact with an interactable element associated with a receipt or a checkout user interface that can cause an instant application to be downloaded on a user computing device 104. In at least one example, the instant application can cause a user interface, such as the user interface 128, to be presented to enable the buyer to provide payment data to pay for item(s) purchased via a transaction (e.g., via a contactless payment). In some examples, an interactable element can be shared with a buyer (e.g., via a social media post, text message, email, or the like) such that when the buyer accesses an associated instant application, the buyer can provide payment data via the instant application (e.g., via a contactless payment).

In some examples, an instant application can be associated with obtaining payment data, for example, during a checkout or payment flow. In at least one example, the instant application can receive payment from payment data stored on the user computing device 104, payment data associated with another application (e.g., a wallet), payment data stored remotely, or the like. In at least one example, the instant application can receive payment data via a payment instrument reader embedded in the user computing device 104 (e.g., an embedded payment instrument reader) and/or paired with the user computing device (e.g., a payment instrument reader device paired to the user computing device). In some examples, the instant application can receive payment data via a secure portal (e.g., via manual input to the secure portal). In examples where the payment data is received via the instant application, the instant application can send the payment data to the service provider server(s) 102 for payment processing (e.g., via the merchant component 112), as described below.

In some examples, an instant application can enable the buyer to split payments for a ticket with one or more other buyers. For instance, the portion of the application executable by the user computing device 104 can cause a user interface, such as the user interface 128, to be presented that enables the buyer to view a ticket associated with the buyer and the one or more other buyers and the buyer can designate how to split the ticket and/or otherwise allocate a portion of the cost of the ticket to the one or more other buyers. In some examples, an instant application can enable the buyer to share item(s) associated with their order by presenting a URI (or other interactable element) that can be shared to other buyers. In such an example, the buyer can share the URI with other buyers who can access the buyer's order. In an example, by sharing the URI, an instance of an instant application can be shared with other users.

Further, an instant application can enable a buyer to provide a gratuity, sign up to receive receipts, collect loyalty, redeem loyalty, etc. That is, the portion of the application executable by the user computing device 104 can cause a user interface, such as the user interface 128, to be presented that enables the buyer to provide a gratuity, sign up to receive receipts, collect loyalty, redeem loyalty, etc. In some examples, an instant application can enable a buyer to pick up an order, track order status, return an item, exchange an item, or the like. That is, the portion of the application executable by the user computing device 104 can cause a user interface, such as the user interface 128, to be presented that enables the buyer to designate a pick-up location for picking up an order, track order status, return an item, exchange an item, or the like.

In at least one example, a buyer can use an instant application to request a worker to visit a table or other designated seating area, reorder an item or items, etc. That is, the portion of the application executable by the user computing device 104 can cause a user interface, such as the user interface 128, to be presented that enables the buyer to request assistance from a worker, place another order, etc.

In some examples, an instant application can present push notifications (e.g., "your order is ready at the counter," "your stylist is ready for you," etc.), recommendations, or the like. Moreover, an instant application can enable a buyer to identify themselves and/or share data with a merchant.

In some examples, the instant application is associated with an incentive to purchase an item from another merchant within a geofence of the user computing device 104. In some examples, the incentive can be applied to a stored balance maintained by a service provider (e.g., from peer-to-peer payments or the like) and/or associated with an account of the user (e.g., associated with the service provider). That is, based at least in part on receiving an indication that the user satisfied the condition of the incentive (e.g., purchased an item from the other merchant), the incentive can be applied to a stored balance maintained by a service provider (e.g., from peer-to-peer payments or the like) and/or associated with an account of the user (e.g., associated with the service provider). In some examples, such incentives can similarly be used for time or other context-based incentives.

In at least one example, an instant application can enable a buyer to book an appointment with a merchant, rebook an appointment with a merchant, modify an appointment with a merchant, cancel an appointment with a merchant, or the like. That is, the portion of the application executable by the user computing device 104 can cause a user interface, such as the user interface 128, to be presented that enables the buyer to make (or rebook), modify, or cancel an appointment. Further, an instant application can enable a buyer to make a reservation, rebook a reservation, modify a reservation, cancel a reservation, or the like. That is, the portion of the application executable by the user computing device 104 can cause a user interface, such as the user interface 128, to be presented that enables the buyer to make (or rebook), modify, or cancel a reservation. In some examples, an instant application can facilitate a payment flow for the appointment and/or reservation, or can present a gratuity user interface to enable the buyer to provide a gratuity. In some examples, different instant applications can facilitate each of the functionalities and/or tasks described above. In some examples, a single instant application can facilitate each of the functionalities and/or tasks described above.

In at least one example, an application can be associated with a merchant-facing application, a merchant application, or the like. In at least one example, an instant application can enable a user to clock-in and/or clock-out. That is, the portion of the application executable by the user computing device 104 can cause a user interface, such as the user interface 128, to be presented that enables a merchant or a worker associated therewith (e.g., an employee, independent contractor, etc.) to clock-in and/or clock-out. In some examples, an instant application can enable a merchant or a worker associated therewith to perform one or more opening or closing procedures, log in to a point-of-sale application, or the like. That is, the portion of the application executable by the user computing device 104 can cause a user interface, such as the user interface 128, to be presented that enables a merchant or a worker associated therewith to declare cash tips, request cash tips, confirm completion of opening or closing procedures, provide credentials to access a point-of-sale application, or the like. In some examples, different instant applications can facilitate each of the functionalities and/or tasks described above. In some examples, a single instant application can facilitate each of the functionalities and/or tasks described above. In some examples, each of the functionalities and/or tasks described above can be performed in a sequence (i.e., serialized) by a user interacting with one or more instant applications.

In at least one example, an instant application can provide a demonstration. That is, the portion of the application executable by the user computing device 104 can cause a user interface, such as the user interface 128, to be presented that enables a merchant or a worker associated therewith to view content associated with a demonstration. Furthermore, for a worker, an instant application can enable the worker to access an order based on proximity to a table or by scanning a code. Furthermore, a manager can access sales metrics, labor metrics, and/or other data that can be used for determining performance and/or identifying opportunities for improvement. In some examples, a merchant can view an appointment or reservation calendar using an instant application. Further, a merchant can use an instant application to create an appointment, add an item to an inventory or catalog, or the like.

In some examples, an instant application can provide an access point to a peer-to-peer payment application. In such an example, an instant application can facilitate onboarding to the peer-to-peer payment application. In some examples, an instant application can facilitate the collection or redemption of rewards or loyalty via the peer-to-peer application.

As noted above, in some examples, different instant applications can facilitate each of the functionalities and/or tasks described above. In some examples, a single instant application can facilitate each of the functionalities and/or tasks described above. In some examples, each of the functionalities and/or tasks described above can be performed in a sequence (i.e., serialized) by a user interacting with one or more instant applications.

Figures below illustrate example scenarios associated with instant applications. The user interfaces described below can be presented via the user interface 128 described above with reference to FIG. 1. Although described with reference to instant applications, techniques described herein can be applicable to full applications as well.

Figure 7C:
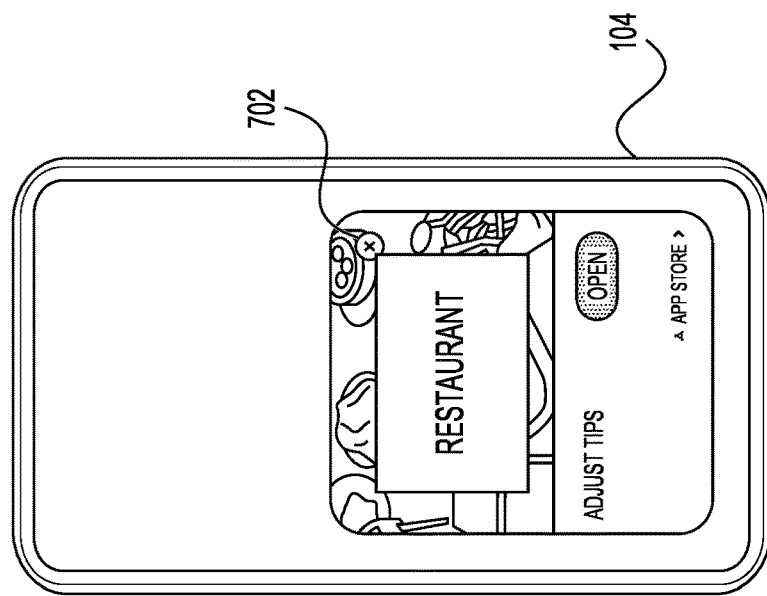
FIGS. 7A-7I illustrate an example of presenting an instant application to enable a user to perform a worker-specific task.
Figure 7B:
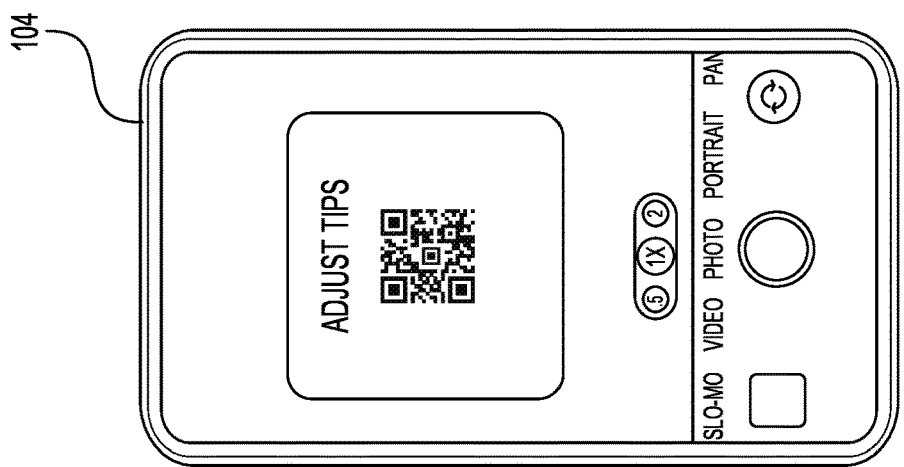
Figure 7A:
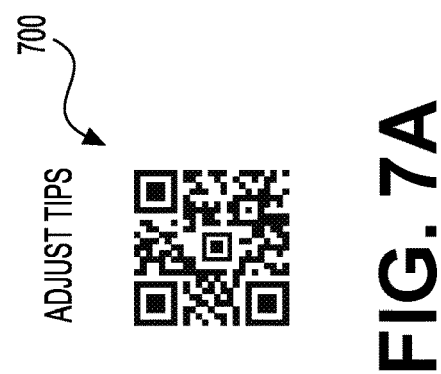

FIGS. 7A-7I illustrate an example of presenting an instant application to enable a user (e.g., worker such as an employee, independent contractor, etc.) to perform a worker-specific task. In one example, the example can be implemented for payroll management, such as to allow workers (e.g., employees, independent contractors, etc.) to manage tips or wages, or other worker-specific procedures. For example, an interactable element 700, such as a QR code, can be displayed on a device or via another medium, such as digital or analog receipts, invoices, etc., as shown in FIG. 7A. That is, FIG. 7A illustrates an example interactable element 700 that can be presented for a worker of a merchant to perform a worker-specific task, such as adjusting tips. In some examples, the interactable element 700 can be presented via a merchant computing device. In other examples, the interactable element 700 can be presented on a sticker, panel, piece of paper, or other physical item. Additional or alternative interactable elements (e.g., other than a QR code) can be used.

In at least one example, the interactable element 700 can have embedded therein transaction specific data, worker ID and passcode, payment proxy (e.g., a payment proxy having a particular syntax such as a monetary currency indicator prefixing one or more alphanumeric characters (e.g., $Cash)), restaurant location, buyer data, etc., to allow the worker at a merchant location to reconcile the tips or daily wage data with the work. In some examples, such embedded data can be determined based at least in part on context data. As shown in the example figure FIG. 7B, the worker can scan the interactable element 700 (e.g., using the user computing device 104), which can trigger the instant application without the need for actual download of a full application. In at least one example, as illustrated in FIG. 7B, a user computing device 104 of the worker (e.g., the user 106) can scan, read, or otherwise interact with the interactable element 700 and send an indication of the interaction to service provider server(s) 102. The service provider server(s) 102 can cause a portion of an application (e.g., an instant application) to be downloaded to the user computing device 104 responsive to receiving the indication. Accordingly, the worker can access functionality for performing a task.

FIG. 7C illustrates an example of a user interface element 702 that can be presented by the instant application, which can enable the worker to adjust tips (e.g., the task). That is, in FIG. 7C, a user interface element 702 associated with the instant application can be presented via the user computing device 104. In some examples, the user interface element 702 can be presented as a pop-up, overlay, or the like. In some examples, a user interface, instead of a user interface element 702, can be presented by the instant application.

Figure 7F:
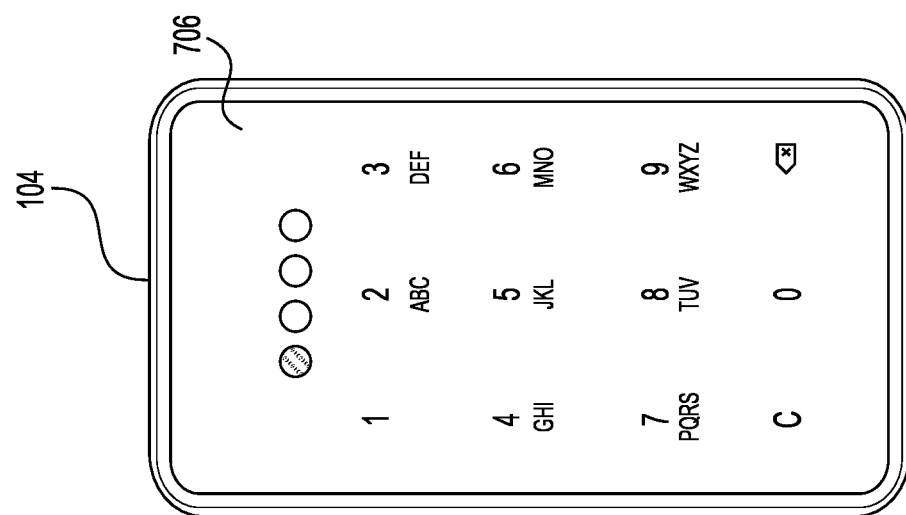
Figure 7E:
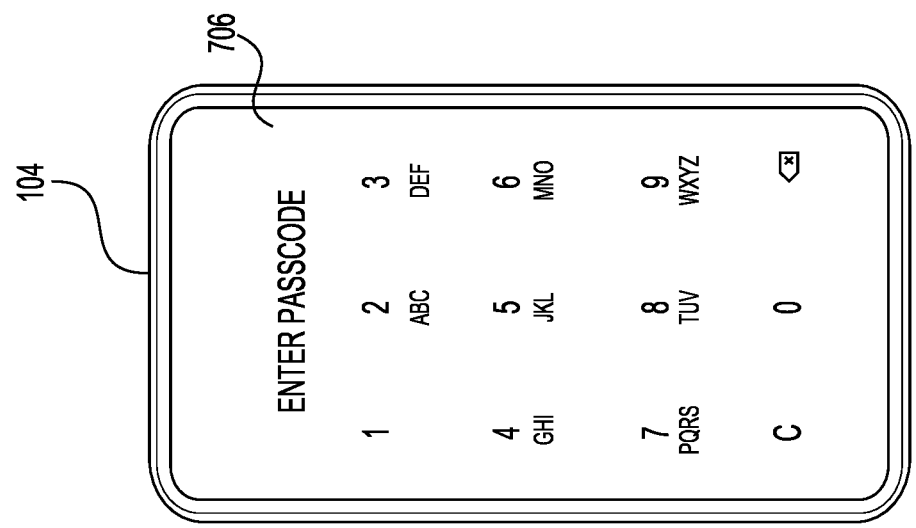
Figure 7D:
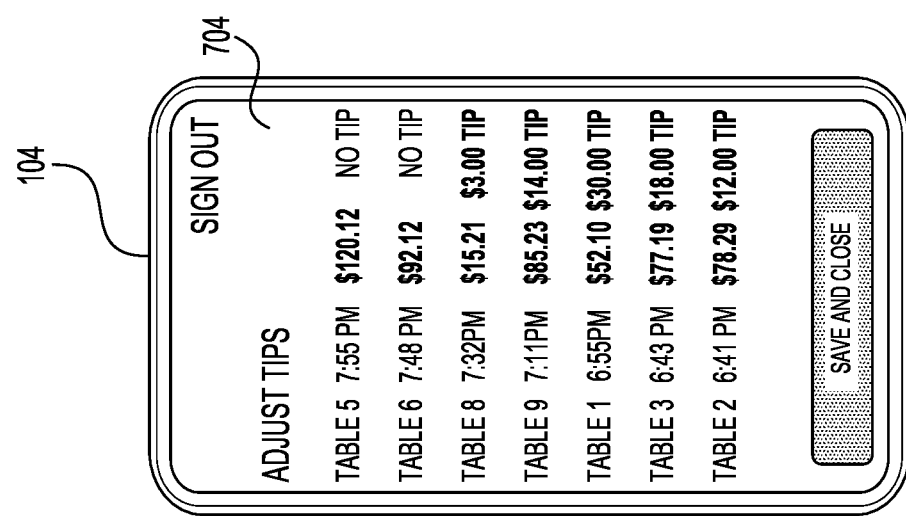

In at least one example, the user interface element 702 can include embedded data, which can be associated with relevant or contextual data (e.g., restaurant name), that can be presented to the worker. In at least one example, the instant application can be associated with a limited set of functionalities (e.g., "adjusting tips") to allow the worker to move money from a merchant account to a worker account (e.g., a bank account of the worker, etc.). On interacting with the user interface element 702, a user interface 704 can be presented via the user computing device 104, as illustrated in FIG. 7D. In at least one example, the user interface 704 can present data associated with worker-specific payroll data, retrieved from a payroll component of the service provider server(s) 102. In some examples, an interaction with the user interface element 702 can cause the user interface 704 to be presented automatically, e.g., through embedded passcode data in the interactable element 700. Other examples may request the worker to enter the passcode data via another user interface 706, as shown in FIGS. 7E and 7F. In FIG. 7E, the instant application can request that the worker input a passcode via a user interface 706, which the worker can do via an interaction with the user interface 706, as illustrated in FIG. 7F. Responsive to providing the passcode, the instant application can present the user interface 704, as illustrated in FIG. 7D.

Figure 7I:
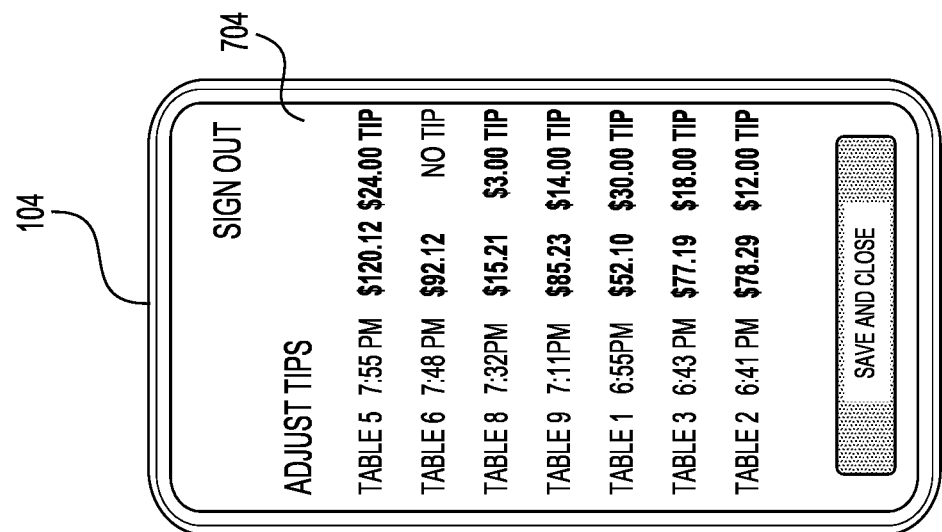
Figure 7H:
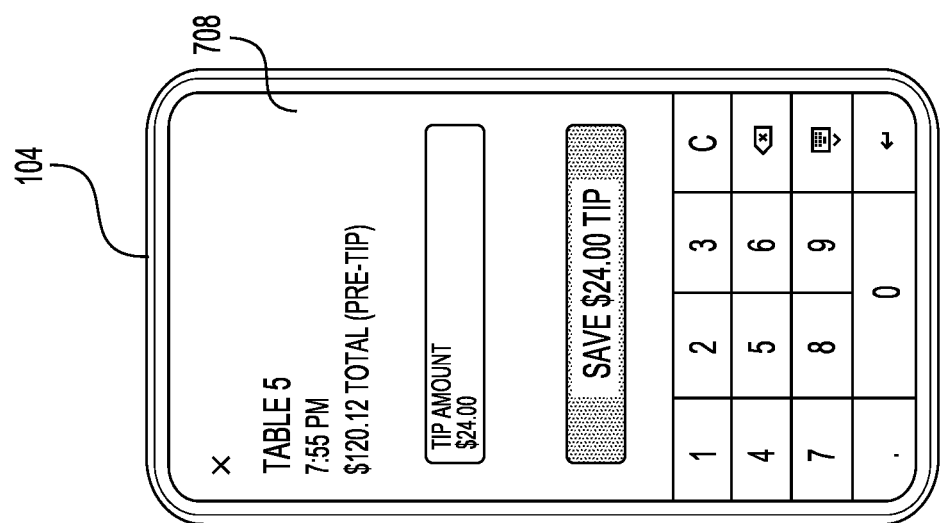
Figure 7G:
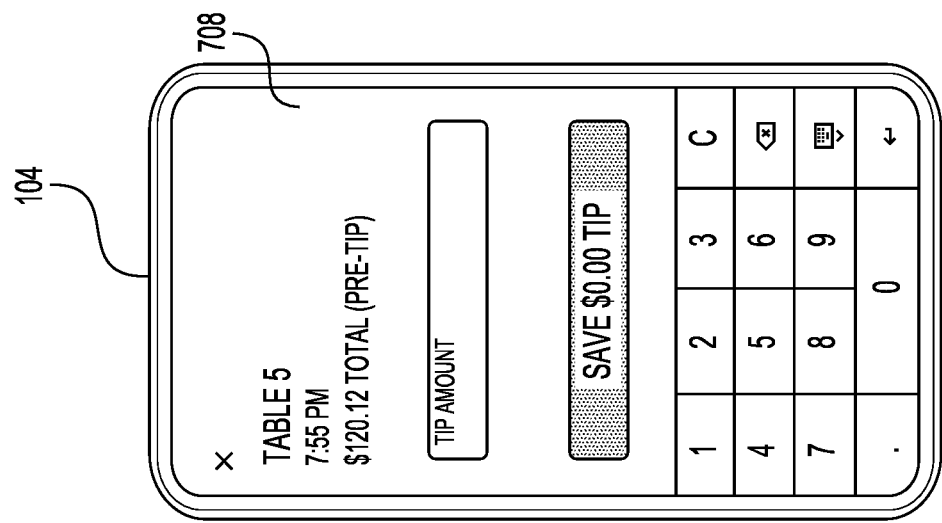

The user interface 704 can include user interface elements associated with payroll history data of the worker, as determined by the payroll component of the service provider server(s) 102. In some implementations, the application management component 114 can parse payroll history data associated with the worker and surface data that is most relevant to the worker, e.g., based on location, context, tips, table number, etc. In some implementations, the worker or a buyer can also interact with the instant application on their devices to enter custom tips for a specific transaction, or adjust tips at a later time, as shown in FIGS. 7G-7I.

In some examples, the worker can select an individual transaction from the user interface 704 (e.g., of FIG. 7D) to adjust the tip as recorded. As illustrated in FIG. 7G, the worker can interact with one of the user interface elements presented in association with the user interface 704 (e.g., of FIG. 7D) to cause another user interface 708 to be presented via the user computing device 104. In an example, the user interface element can be associated with a table served by the worker during their shift (e.g., a transaction associated with said table). In at least one example, the user interface 708 can enable the worker to manually input a tip amount (as illustrated in FIG. 7H), which can be associated with the table/transaction, and presented via the user interface 704. That is, in FIG. 7I, the user interface 704 illustrates a tip associated with the transaction corresponding to "Table 5," wherein the user interface 704 in FIG. 7D does not indicate a tip associated with the same transaction.

In some examples, the user interface can include a selectable element that when selected can cause the full application associated with the instant application to be downloaded on the user computing device. In some examples, the worker may use the instant application to perform the task and may not opt to download the full application.

Figure 8F:
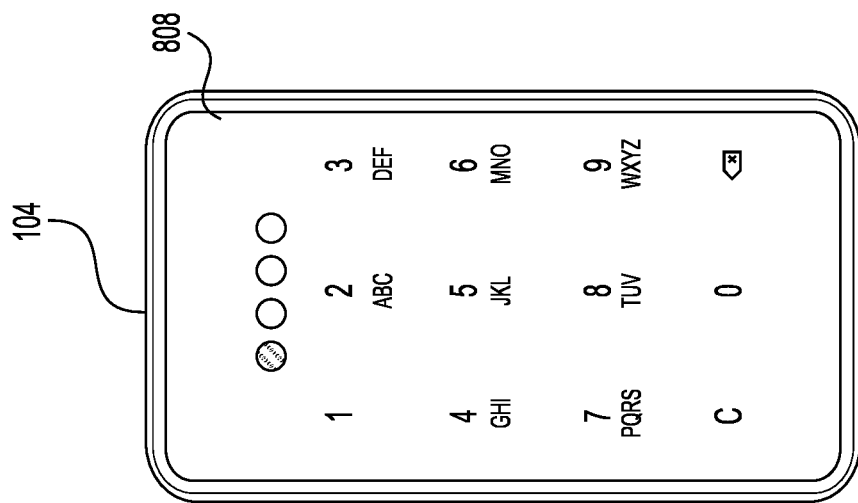

FIGS. 8A-8J illustrate an example of presenting an instant application to enable a user (e.g., worker such as an employee, independent contractor, etc.) to perform a worker-specific task. In one example, the example scenario can be implemented with physical devices or Internet of Things (IoT) devices, such as cash drawers and card readers. FIG. 8A illustrates an example interactable element 800 that can be presented for a worker of a merchant to perform a worker-specific task, such as opening a cash drawer and/or counting application. In some examples, the interactable element 800 can be presented via a merchant computing device. In other examples, the interactable element 800 can be presented on a sticker, panel, piece of paper, or other physical item. For example, an interactable element 800, such as a QR code, can be displayed on a physical device, such as cash drawer, or another medium, such as a receipt, invoice, etc., as shown in FIG. 8A. Additional or alternative interactable elements (e.g., other than a QR code) can be used. In at least one example, the interactable element 800 can have embedded therein device data, transaction data, worker ID and authorization, merchant location, buyer data, etc., to allow a user 106 (e.g., the worker) to physically interact with a hardware, such as a cash drawer.

In at least one example, as illustrated in FIG. 8B, a user computing device 104 of the worker (e.g., the user 106) can scan, read, or otherwise interact with the interactable element 800 and send an indication of the interaction with the interactable element 800 to the service provider server(s) 102. The application management component 114 can cause a portion of an application (e.g., an instant application) to be downloaded to the user computing device 104 responsive to receiving the indication of the interaction with the interactable element 800. Accordingly, the worker can access functionality for performing a task. As shown in FIG. 8B, the worker can scan the interactable element to activate the instant application without the need to download the application associated with the instant application. That is, techniques described herein can create a unique layer of software between one or more hardware devices.

Figure 8E:
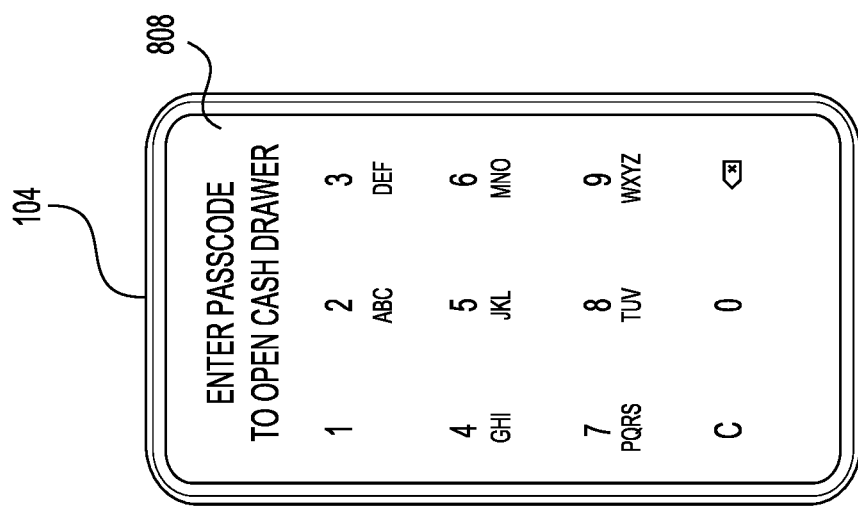
Figure 8D:
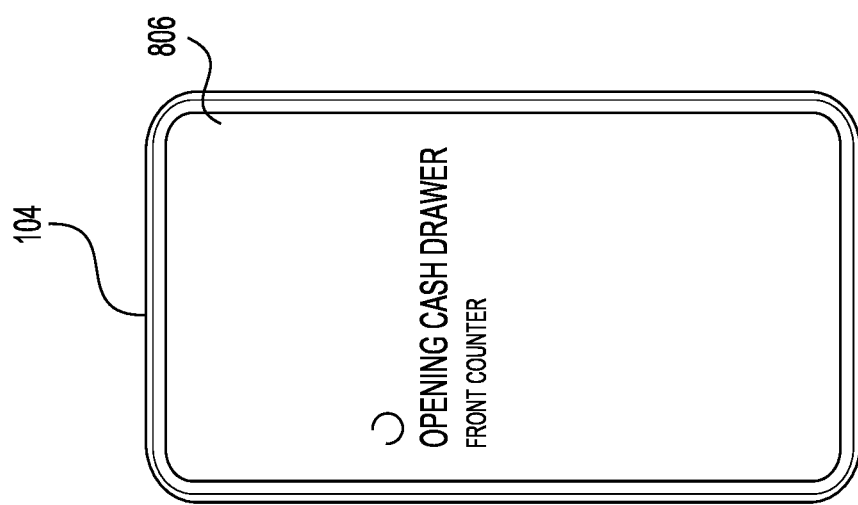

FIG. 8C illustrates an example of a user interface element 802 that can be presented by the instant application, which can enable the worker to open a cash drawer (e.g., the task). In at least one example, the user interface element 802 can be presented as a pop-up, overlay, or the like. In at least one example, the instant application can present a user interface instead of the user interface element 802. In some examples, the user interface element 802 can include a selectable element 804 that when selected, causes the cash drawer to be opened. In at least one example, a user interface 806 can be presented to indicate that an action is being performed (i.e., the cash drawer is being opened), as illustrated in FIG. 8D. In some examples, the user interface 806 can be presented automatically (e.g., based on detecting an actuation of the selectable element 804). In other examples, based at least in part on detecting actuation of the selectable element, the instant application can request that the worker input a passcode via a user interface 808, as illustrated in FIG. 8E, which the worker can do via an interaction with the user interface 808, as illustrated in FIG. 8F. Responsive to providing the passcode, the instant application can perform the task (e.g., open the cash drawer), and the user interface 806 can be presented via the user computing device 104, as illustrated in FIG. 8D. That is, the instant application can send an instruction to a merchant computing device or other device associated with a cash drawer to cause the cash drawer to open.

Figure 8H:
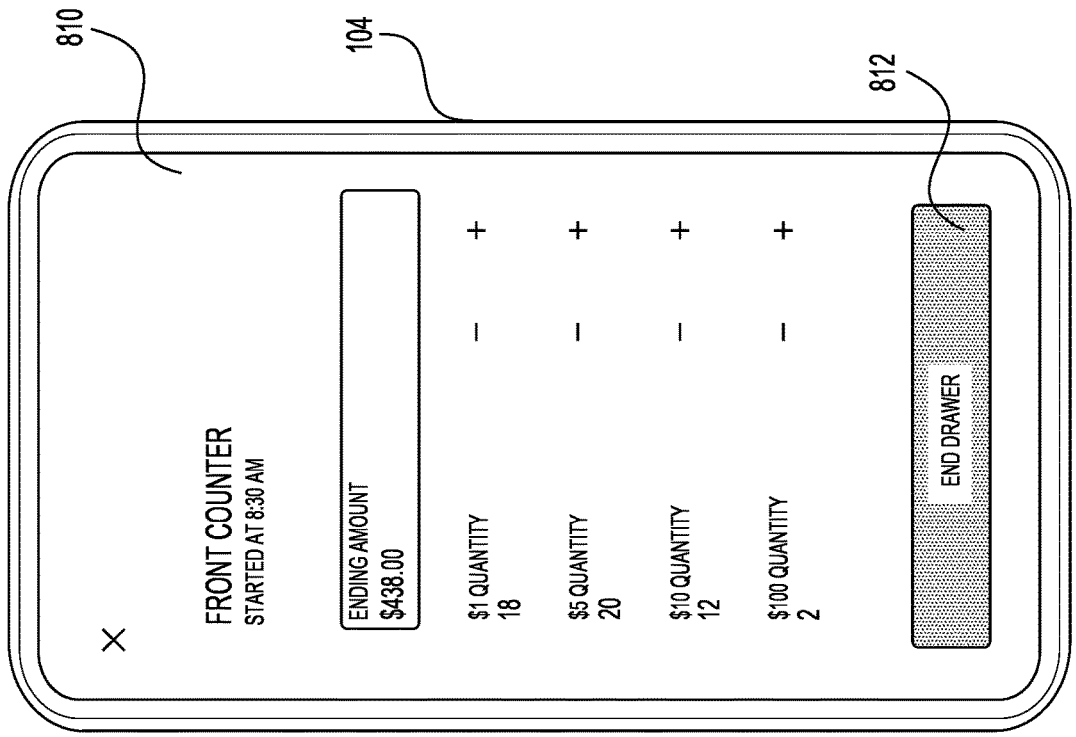
Figure 8G:
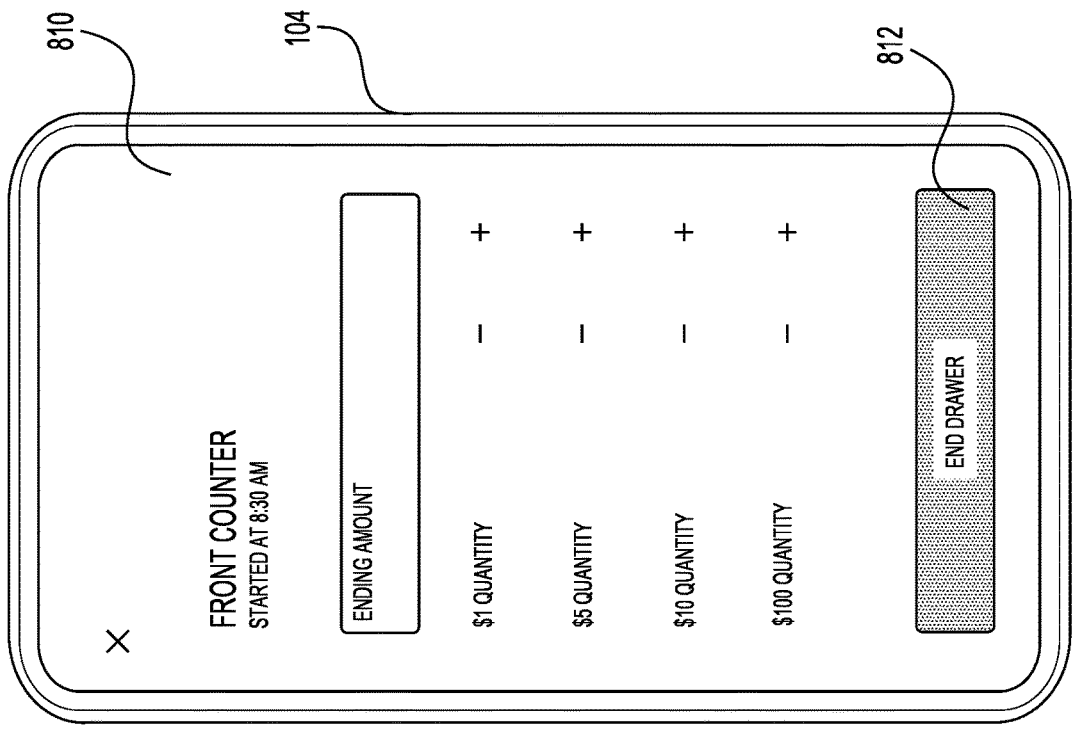

In at least one example, the user interface 802 can present relevant or contextual data (such as merchant name) to the worker with a predefined set of functionalities to allow the worker to interact with the hardware and perform actions. The interactions with the hardware allow the service provider server(s) 102 to respond to the interactions with a software action, such as determine the cash count in case of the hardware being a cash drawer. Example actions associated with temporarily managing hardware, such as a cash drawer, are shown in FIGS. 8G and 8H. FIGS. 8G and 8H illustrate an example of a user interface 810 that can be presented to enable the worker to count cash and indicate amounts of cash via inputs to the user interface 810. In some examples, the user interface 810 can include a selectable element 812, which can be selected to effectuate an action (i.e., "ending drawer") and thereby cause the flow to move from the instant application to specialized hardware. In at least one example, the data input to the user interface 810 can be sent to the service provider server(s) 102 for at least one of storing in the data store(s) 118 and/or synching with data stored in the data store(s) 118.

Figure 8J:
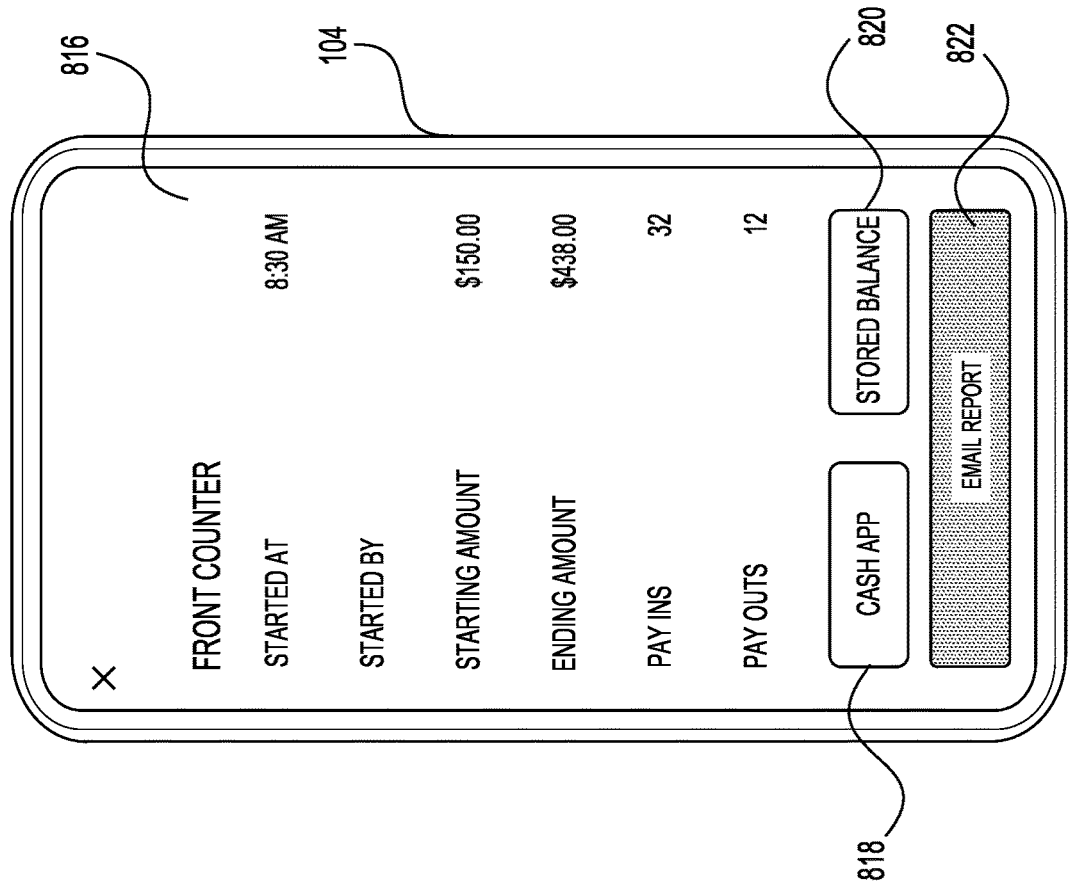
Figure 8I:
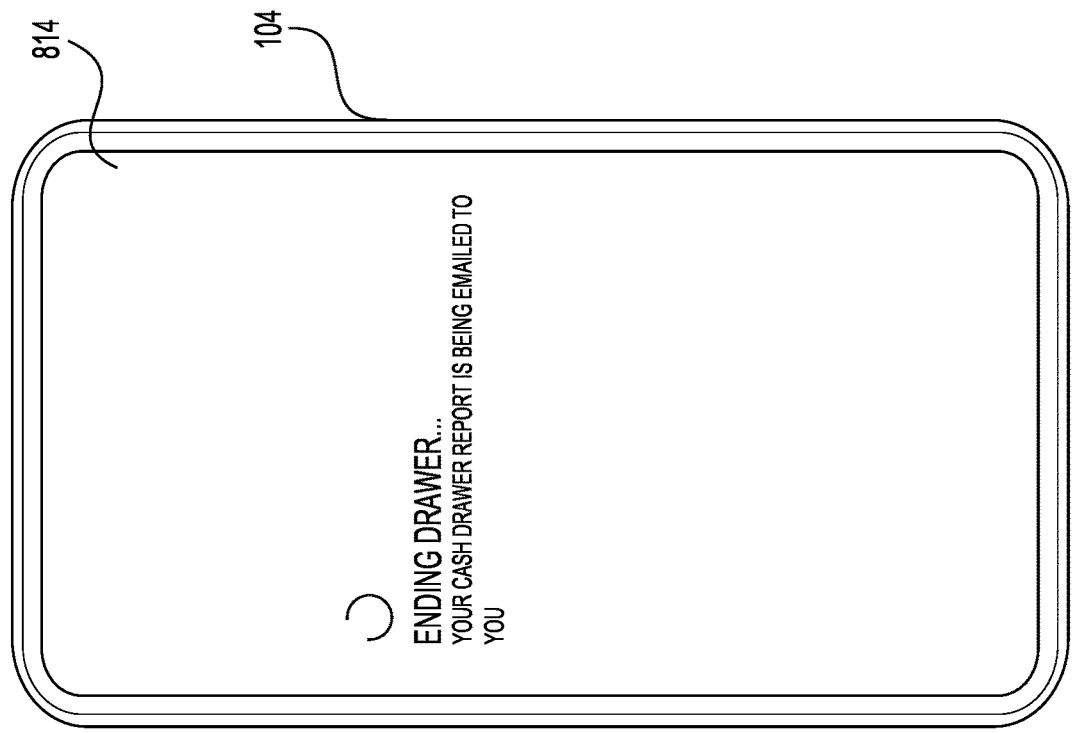

FIG. 8I illustrates an example user interface 814 associated with mailing a cash drawer report to an intended recipient. In some examples, a report can optionally be generated within the instant application to show, e.g., interaction history with the hardware, authorized users, etc., as shown in FIG. 8J. FIG. 8J illustrates an example user interface 816 configured to present a cash drawer report, which can include details associated with when the report was run (e.g., time, date, etc.), the worker who ran the report, the starting amount of cash in the cash drawer, the ending amount of cash in the cash drawer, and the like. In some examples, authorized users can see contextual data, retrieved from merchant server(s) and/or the service provider server(s) 102. In some implementations, the interactable element 800 can be used by the application management component 114 to help parse data and surface data that is most relevant to the worker, e.g., based on location, context, time of the day, authorization level, etc., or propose some on-the-fly recommendations within the instant application. In some examples, the user interface 816 can include one or more selectable elements. For instance, a first selectable element 818 can enable the merchant to request that the cash flow associated with the cash drawer be credited to a first account (e.g., their "CashApp") and/or a second selectable element 820 can enable the merchant to request that the cash flow be credited to a second account (e.g., their "stored balance"). Actuation of such selectable elements can cause another application to be initialized to allow the worker to perform a second set of functionalities, such as settle cash flow from the cash drawer to their "CashApp," their "stored balance," or the like. In some examples, the user interface 816 can include a selectable element 822 that when selected can cause the report to be emailed to an email address of the merchant or the like. The worker can also interact with the user interface 816 to perform specific actions, such as report tampering, etc.

In some examples, the user interface 816 can include a selectable element that can be presented to prompt the worker to download the full application. In some examples, the worker may use the instant application to perform the task and may not opt to download the full application.

FIGS. 8A-8J are described with reference to hardware being a cash drawer. In another example, if the hardware is a payment reader or kitchen display system executing on a computer, the instant application can start a session of interaction with the hardware and track transactions during that session. This can be helpful for shift management, for example. In such examples, based at least in part on detecting an interaction with the interactable element 900, the worker can be presented with a user interface that includes data associated with hardware data, and can therefore have the ability to interact and track interactions via the hardware.

Figure 9C:
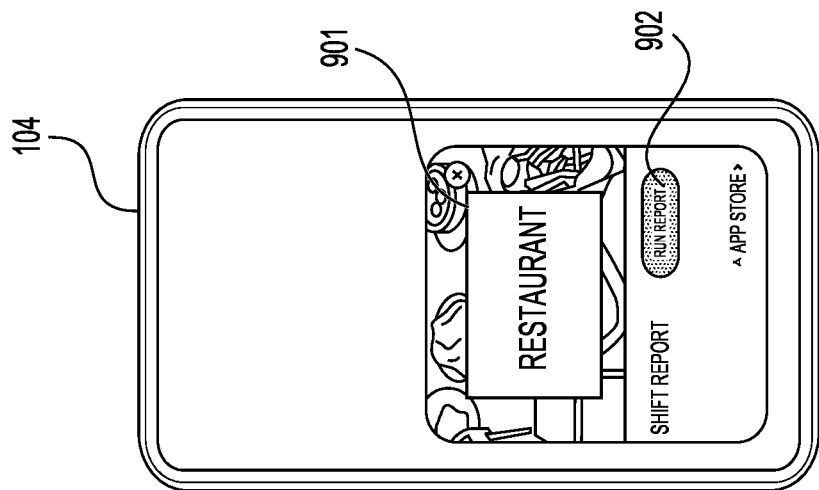
FIGS. 9A-9H illustrate an example of presenting an instant application to enable a user to perform a worker-specific task.
Figure 9B:
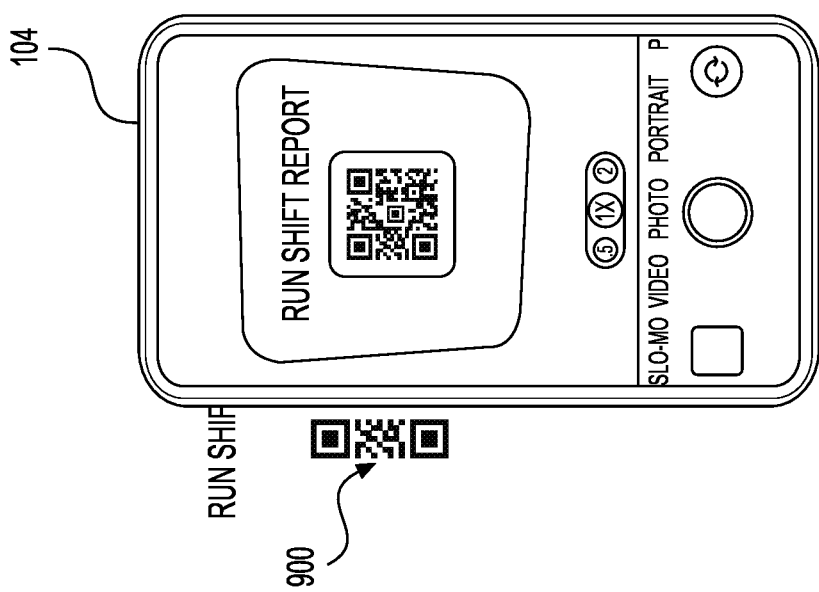
Figure 9A:
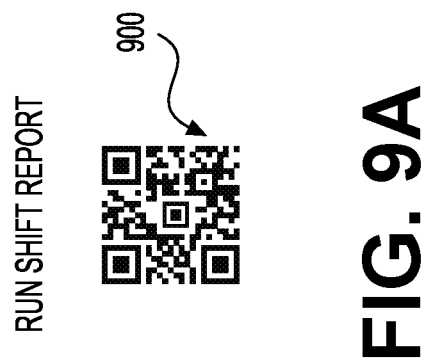

FIGS. 9A-9H illustrate an example of presenting an instant application to enable a user (e.g., worker such as an employee, independent contractor, etc.) to perform a worker-specific task. In one example, the example scenario can be implemented for worker management, such as to allow workers to run shift reports or other close of day procedures. For example, an interactable element 900, such as a QR code, can be displayed on a device or another medium, such as receipts, invoices, etc., as shown in FIG. 9A. That is, FIG. 9A illustrates an example interactable element 900 that can be presented for a worker of a merchant to perform a worker-specific task, such as running a shift report. In some examples, the interactable element 900 can be presented via a merchant computing device. In other examples, the interactable element 900 can be presented on a sticker, panel, piece of paper, or other physical item. Additional or alternative interactable elements (e.g., other than a QR code) can be used. In at least one examples, the interactable element 900 can have embedded therein transaction specific data, worker ID and passcode, a payment proxy, merchant location, buyer data, etc., to allow the worker at a merchant location to survey the past, current and future shifts. In some examples, the embedded data can be determined based at least in part on context data.

As shown in FIG. 9B, the worker can scan the interactable element, which can activate the instant application without downloading the application associated with the instant application. In at least one example, as illustrated in FIG. 9B, a user computing device 104 of the worker (e.g., the user 106) can scan, read, or otherwise interact with the interactable element 900 and an indication of the interaction with the interactable element 900 to the service provider server(s) 102. The application management component 114 can cause a portion of an application (e.g., an instant application) to be downloaded to the user computing device 104 responsive to receiving the indication of the interaction with the interactable element 900. Accordingly, the worker can access functionality for performing a task. FIG. 9C illustrates an example of a user interface element 901 that can be presented by the instant application, which can enable the worker to run a shift report (e.g., the task). In some examples, the user interface element 901 can be presented as a pop-up, overlay, or the like. In at least one example, the instant application can present a user interface instead of the user interface element 901.

Figure 9F:
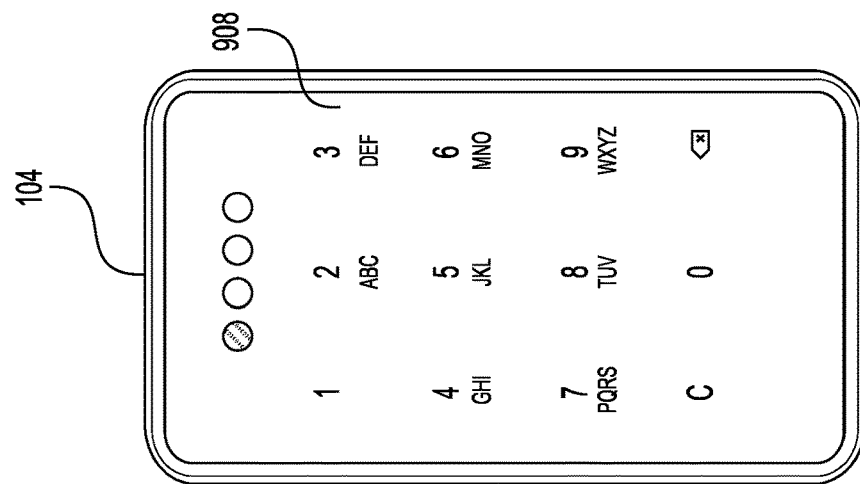
Figure 9E:
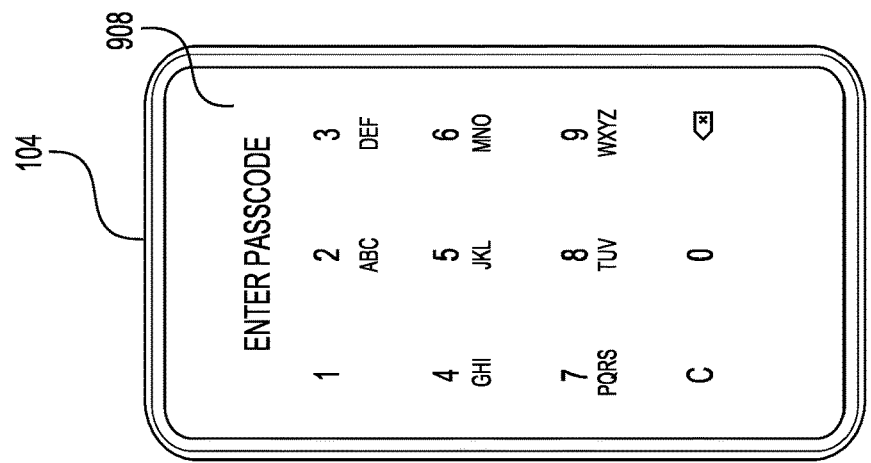
Figure 9D:
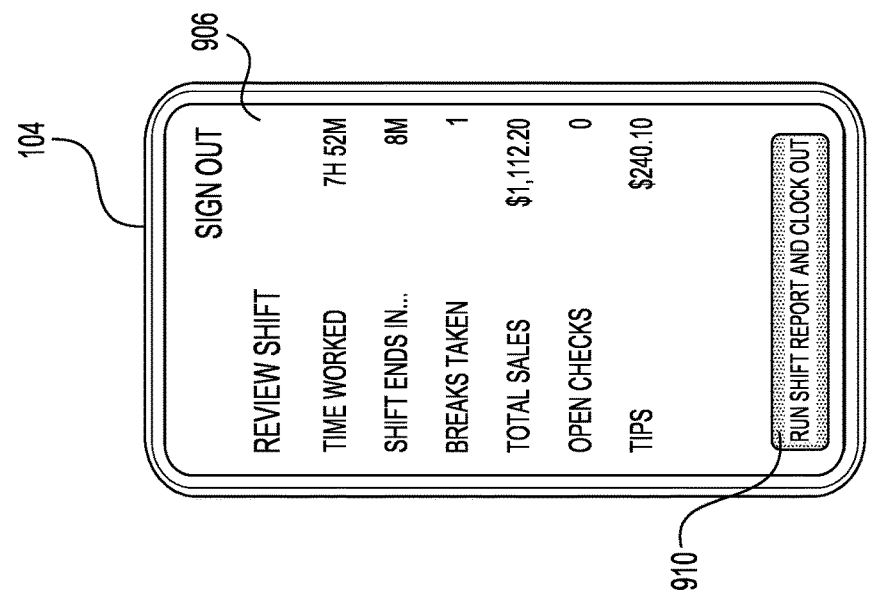

In FIG. 9C, the user interface element 901 can present relevant or contextual data (such as merchant name) to the worker with a predefined set of functionalities (such as "run shift reports") to allow the worker to monitor their own shifts or the shifts of other workers, such as those reporting to them. In at least one example, the user interface element 901 can include a selectable element 902 that, when selected, can cause another user interface 906 to be presented via the user computing device. That is, based at least in part on detecting an interaction with the instant application, the worker can be presented with a user interface 906 that can include specific worker data, retrieved from merchant server(s) and/or service provider server(s) 102, as shown in FIG. 9D. The user interface 906 can present data associated with the worker's history as determined by merchant server(s) and/or the service provider server(s) 102.

Figure 9G:
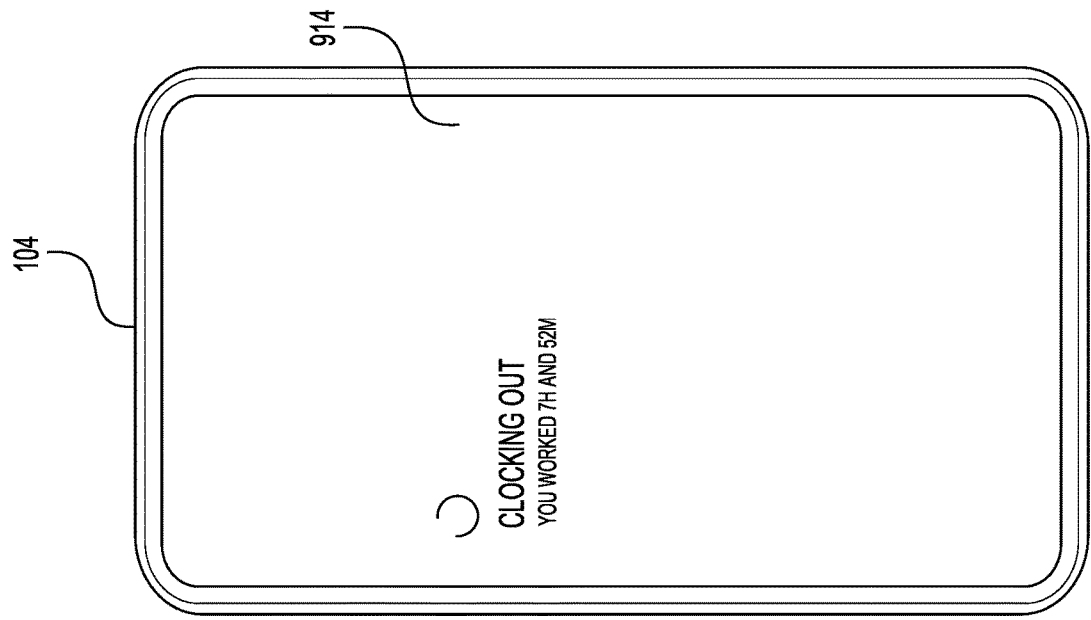
Figure 9H:
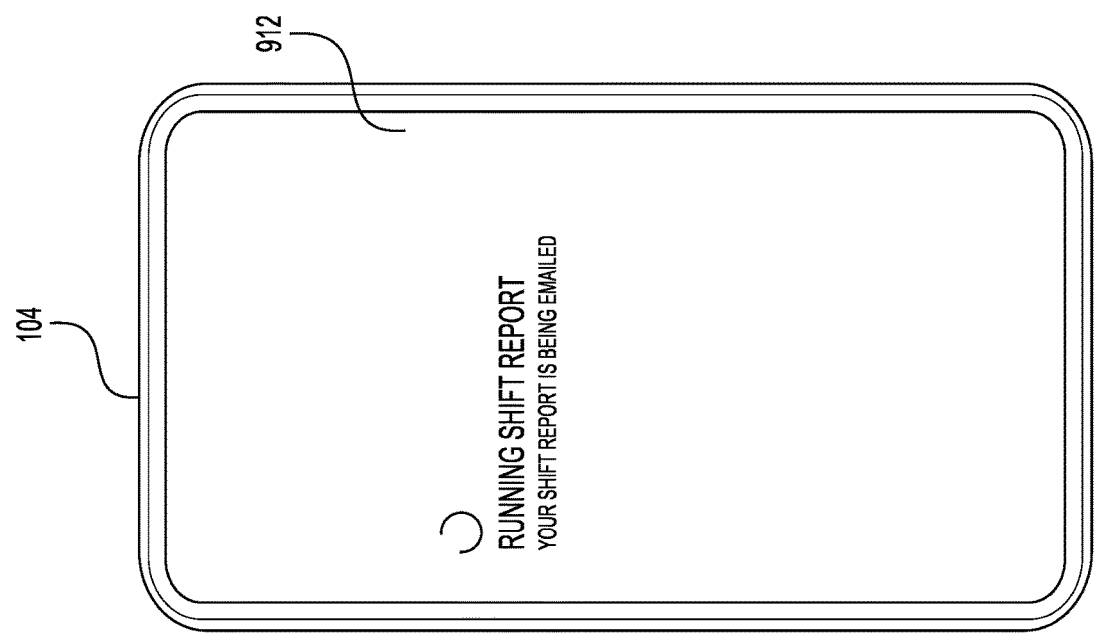

In some examples, the user interface 906 can be presented automatically (e.g., through embedded passcode data in the interactable element 900). In other examples, the instant application may request the worker to enter the authorization data as shown in FIGS. 9E and 9F. In FIG. 9E, the instant application can request that the worker input a passcode via a user interface 908, which the worker can do via an interaction with the user interface 908, as illustrated in FIG. 9F. Responsive to providing the passcode, the instant application can present the user interface 906 that illustrates shift details (e.g., time worked, breaks taken, total sales, total gratuities, open checks, time to close, and/or the like), as illustrated in FIG. 9D. In some examples, the user interface 906 presenting the shift report can include a selectable element 910 that when selected, causes the shift report to be run and to clock out the worker. Based at least in part on actuating the selectable element 910, the instant application can run the shift report and, in some examples, send the shift report to the service provider server(s) 102. In some examples, the instant application can send an indication of the time to the service provider server(s) 102 to clock out the worker. FIGS. 9G and 9H illustrate example user interfaces 912 and 914 that can be presented responsive to the worker actuating the selectable element 910.

In some examples, the interactable element 900 can be used by the application management component 114 for parsing data and surfacing data that is most relevant to the worker, e.g., based on location, context, tips, table number, etc., generate shift reports, or propose some on-the-fly recommendations within the instant application. In some implementations, the worker can also interact with the instant application on the user computing device to perform specific actions, such as clock in or clock out, or adjust shifts, as shown in FIGS. 9D-9F. In some implementations, when the selectable element 910 is selected, another instant application may be initialized to allow the worker to perform a second set of functionalities.

In some examples, the user interface 908 can include a selectable element that can be presented to prompt the worker to download the full application. In some examples, the worker may use the instant application to perform the task and may not opt to download the full application.

Figure 10:
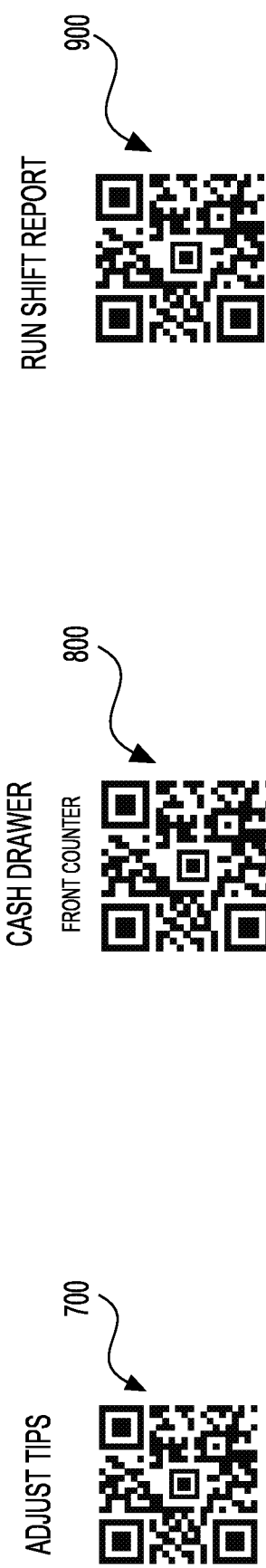
FIG. 10 illustrates an example of a sequence of interactable elements that can be presented to enable a plurality of instant applications to be executed in a particular sequence.

FIG. 10 illustrates an example of a sequence of interactable elements (e.g., interactable elements 700, 800, and 900) that can be presented to enable a plurality of instant applications to be executed in a particular sequence. In some examples, the application management component 114 can determine a sequence associated with a plurality of instant applications, as described above with reference to FIG. 5, and can send a recommendation to a merchant computing device, for example, which can include the sequence. As such, the merchant can display the interactable elements based at least in part on the recommendation. In some examples, the interactable elements can be positioned proximate to one another (and/or other interactable elements) such that a worker can interact with the interactable element serially to perform different tasks, in some examples, without downloading a full application. In some examples, the tasks (and thus interactable elements) and/or order of the tasks can be determined based at least in part on context data and/or data associated with the worker, as described above.

In some examples, the application management component 114 can cause the interactable elements to be presented via a computing device (e.g., a merchant computing device, a kiosk, etc.) based at least in part on the sequence. In at least one example, the application management component 114 can maintain a sequence of such instant applications and triggering actions (such as worker actions and/or interactions) can initialize instant applications based at least in part on the sequence. By presenting interactable elements in a sequence, instant applications can be initialized serially to accomplish a series of tasks. In some examples, each of the interactable elements can be associated with a multi-function interactable element. In such an example, the application management component 114 can utilize context data to determine which instant application to surface at a particular time, as described above with reference to FIG. 4.

Figure 11A:
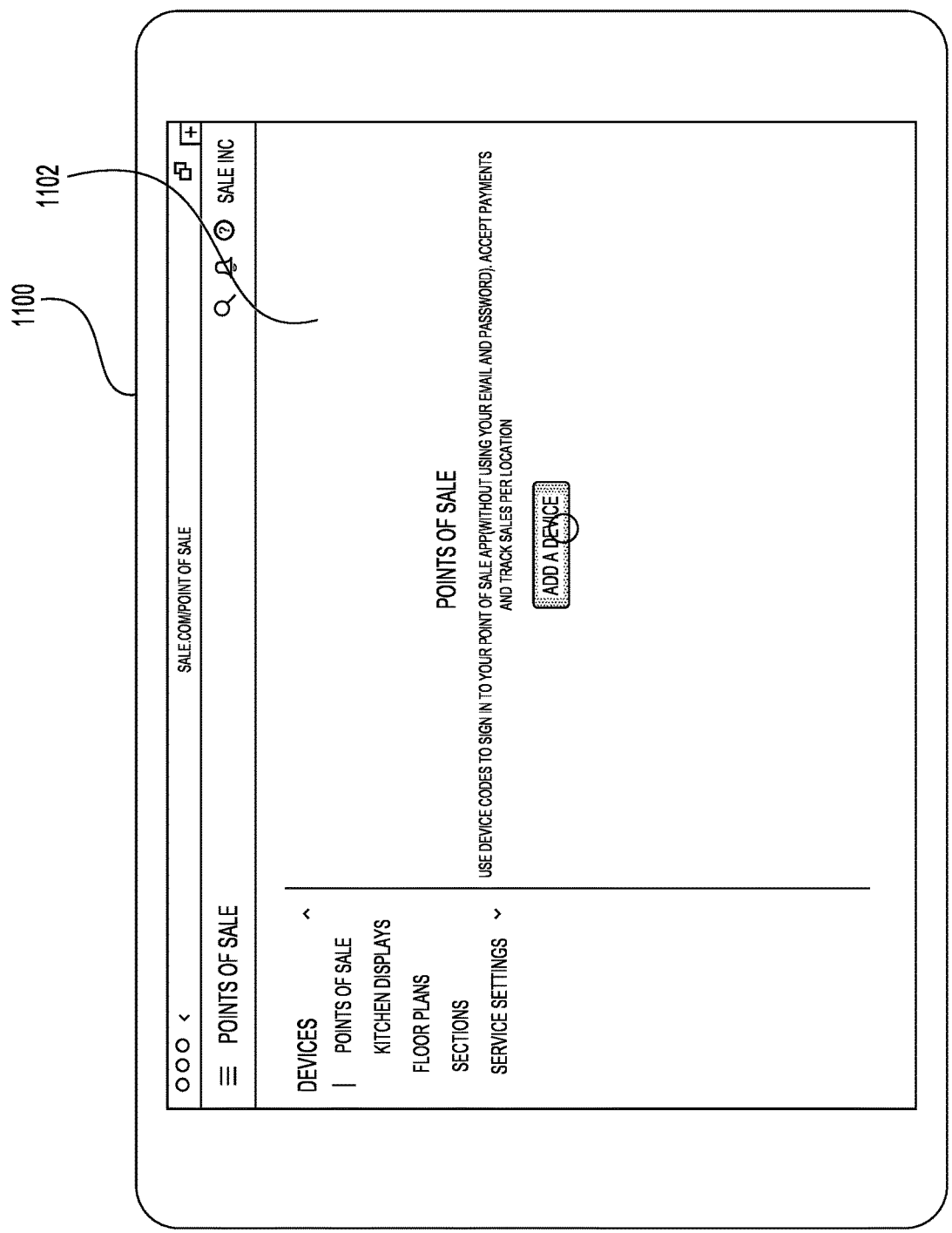
FIGS. 11A-11G illustrate an example of automatically downloading and authenticating a pre-configured application through an interactable element presented via a merchant computing device.
Figure 11B:
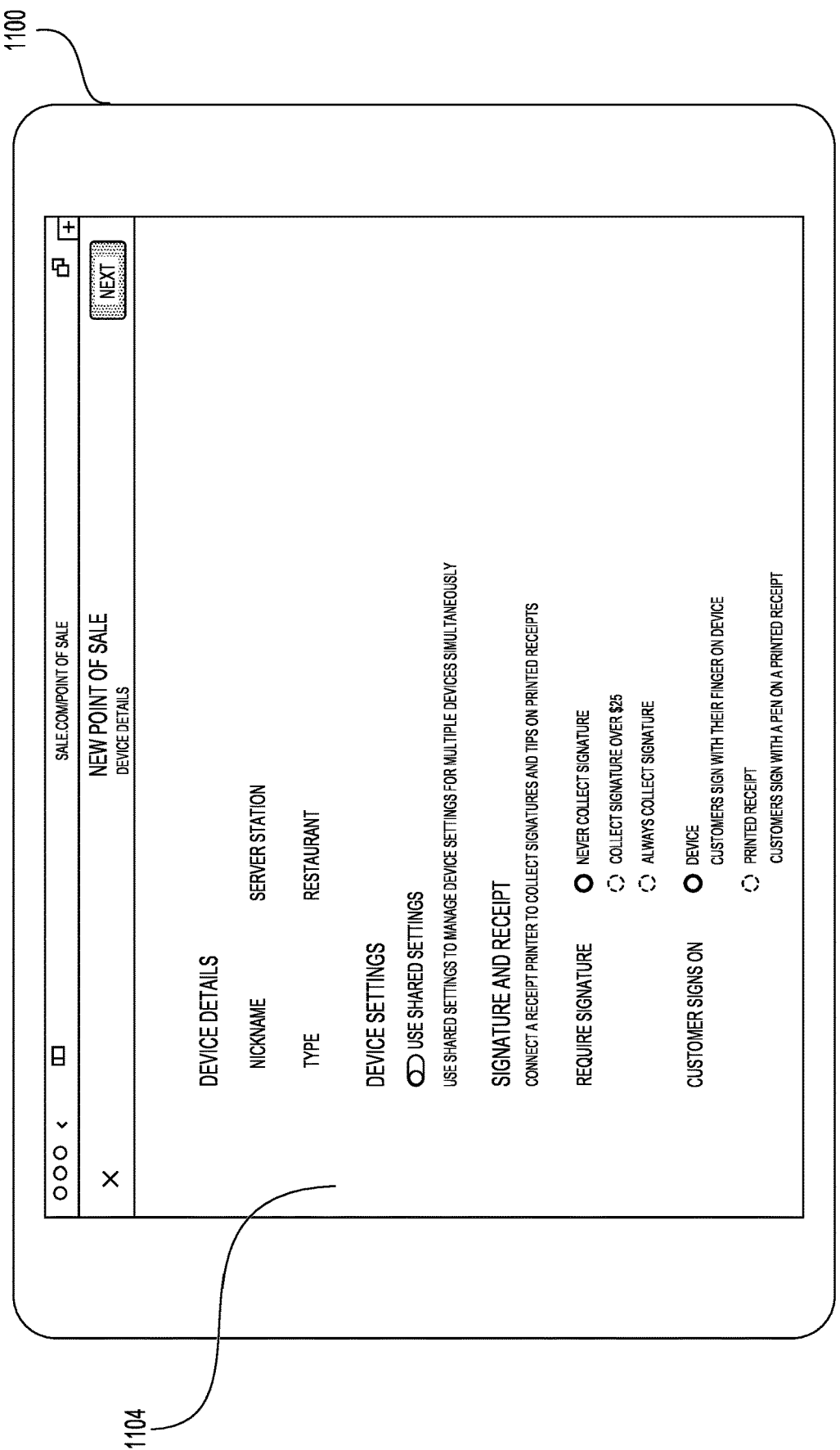
Figure 11C:
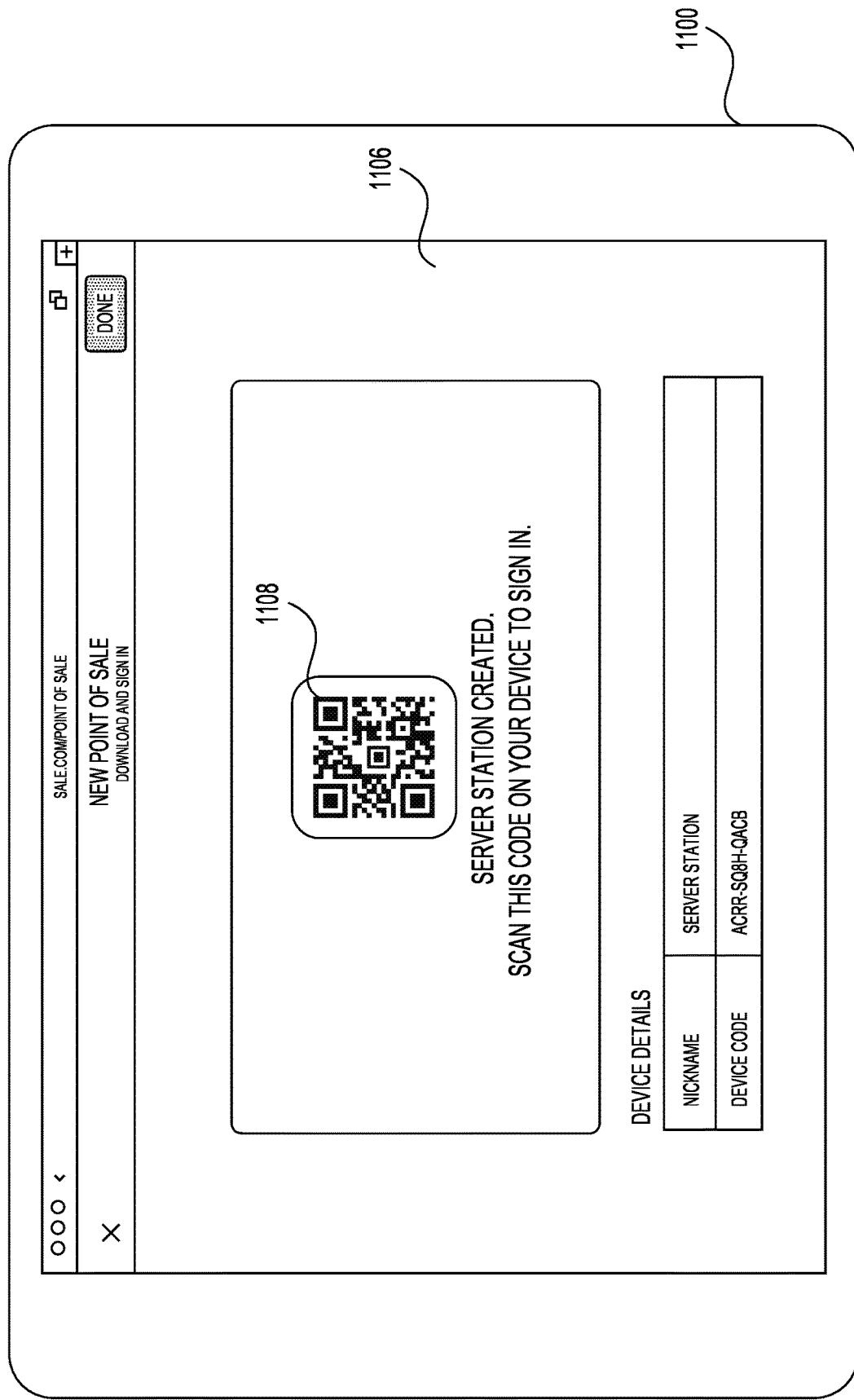

FIGS. 11A-11G illustrate an example of automatically downloading and authenticating a pre-configured application through an interactable element presented via a merchant computing device 1100. For instance, in FIG. 11A, a worker can interact with a user interface 1102 presented by a dashboard on a point-of-sale application (e.g., via a display of the merchant computing device 1100) to use an interactable element to sign-in to the point-of-sale application and thus authenticate (without using an email address and password, for example), which can enable the worker to accept payments and track sales per location (e.g., of merchant businesses). FIG. 11B illustrates a non-limiting example of a user interface 1104 that can be presented via the merchant computing device 1100 and can enable a merchant to customize their point-of-sale application and the use of instant applications associated therewith. In some examples, the user interface 1104 can be presented via the point-of-sale application, or a part thereof (e.g., an instant application associated with the point-of-sale application). From a merchant perspective, the instant application can allow a merchant to view and present preset configurations, such as dashboard settings, pre-configured item combinations, preferred items/services to sell, cart configurations, security/authorization information, etc. Such actions and/or functionalities can be configured by a merchant for their workers to see when they access instant application(s) of the merchant. FIG. 11C illustrates a non-limiting example of a user interface 1106 that can be presented via the merchant computing device 1100. The user interface 1106 can present an interactable element 1108 that can be scanned, read, or otherwise interacted with (e.g., by a user computing device 104) to access the instant application.

In at least one example, a worker (e.g., a user 106) can use a user computing device 104 to scan, read, or otherwise interact with the interactable element 1108. Based at least in part on scanning, reading, or otherwise interacting with the interactable element 1108, the user computing device 104 can send an indication of the interaction to the service provider server(s) 102. The application management component 114 can cause a portion of the point-of-sale application to be downloaded to the user computing device 104 responsive to receiving the indication of the interaction with the interactable element 1108. The receipt of the indication of the interaction with the interactable element 1108 from the user computing device 104 can provide authentication and thus the portion of the point-of-sale application can be automatically downloaded and authenticated on the user computing device 104. The instant application can be associated with a user interface element 1110 that can be presented via a user interface 1111, as illustrated in FIG. 11D. In some examples, the user interface element 1110 can be presented as a pop-up, overlay, or the like. In at least one example, the instant application can present a user interface instead of the user interface element 1110.

In some examples, the instant application downloaded onto the user computing device 104 can provide a particular, discrete functionality (e.g. a limited version of the full point-of-sale application). In at least one example, the point-of-sale application can determine which data can move from one computing device (e.g., the merchant computing device 1100) to another computing device (e.g., the user computing device 104, which can be a merchant's phone, handheld reader, or the like) via an interaction with an interactable element, such as the interactable element 1108. That is, the worker can access functionality for performing a task (without using an email address and password, for example) with persistent data (e.g., worker settings, device code, worker preferences, worker dashboard configurations, full or condensed view of dashboard) transferred from the original device (e.g., the merchant computing device 1100) to a new device (e.g., the user computing device 104) through interaction with an interactable element (e.g., the interactable element 1108). The new device (e.g., the user computing device 104) can then have an instant application with preconfigured settings within the instant application. In FIG. 11D, the user interface element 1110 that can be presented by the instant application can enable the worker to sign-in to the point-of-sale application (e.g., the task) via interaction with a selectable element 1112.

In at least one example, the user interface element 1110 can include a selectable element 1112 that when selected, provides an ability to the user 106 to sign-in to a full application and a view into a full application using the interactable element 1108 and embedded worker data. In such an example, authentication data that was obtained prior to creating the interactable element 1108, for example, as obtained via the user interfaces 1102 and/or 1104 as shown in FIGS. 11A and 11B, can be embedded in the interactable element 1108 by the application management component 114 such that another device scanning, reading, or otherwise interacting with the interactable element 1108 (e.g., the user computing device 104) can also obtain the authorization data. Further, such authorization data can be used in subsequent launches of the same instant application, another instant application on the same user computing device 104 (e.g., determined using device identifiers), or the like. In some examples, authorization can be conditional, timed, and/or valid for a certain number of sessions or instant applications.

Figure 11E:
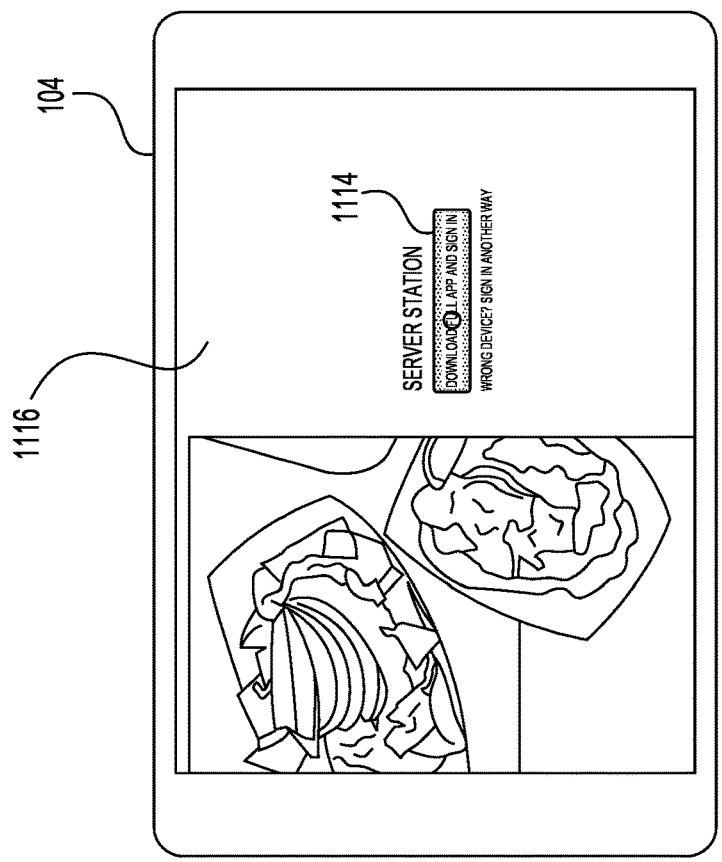
Figure 11D:
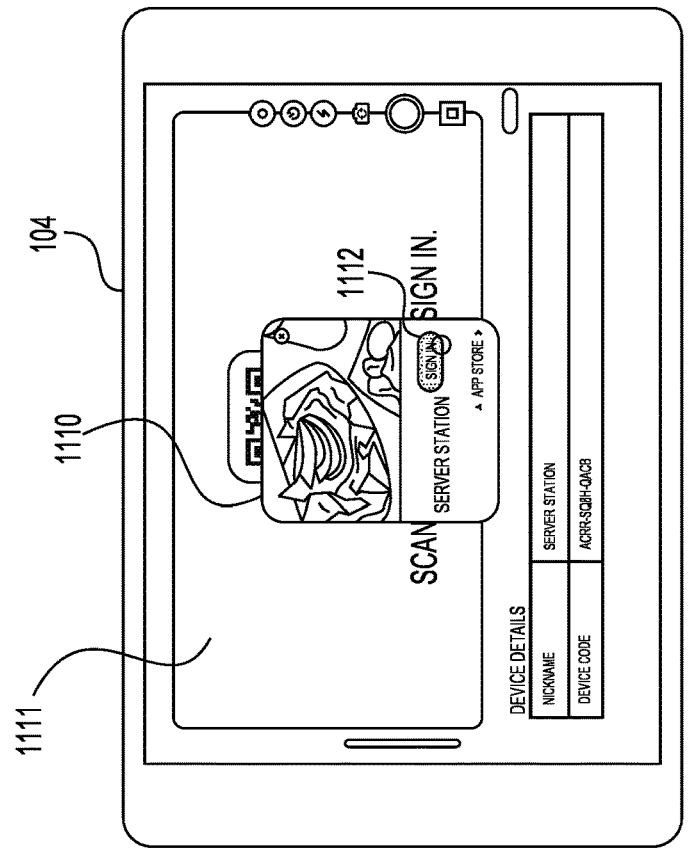

As illustrated in FIG. 11E, a worker can alternatively download the complete application via an interaction with a selectable element 1114 presented via a user interface 1116 and enter a device code (e.g., as presented via the user interface 1106 of FIG. 11C) instead of accessing application functionality via the instant application. FIG. 11E illustrates the user interface 1116 that can be presented to prompt the worker to download the full application. In at least one example, after the user computing device 104 has downloaded the part of the point-of-sale application associated with the instant application, the service provider server(s) 102 can prompt the worker to download the full point-of-sale application. The instant application can detect input indicating a request to download the full point-of-sale application and can send an indication of such input to the service provider server(s) 102. The application management component 114 can then cause the full point-of-sale application to be downloaded onto the user computing device 104. The worker can then have access to all functionality associated with the point-of-sale application.

Figure 11F:
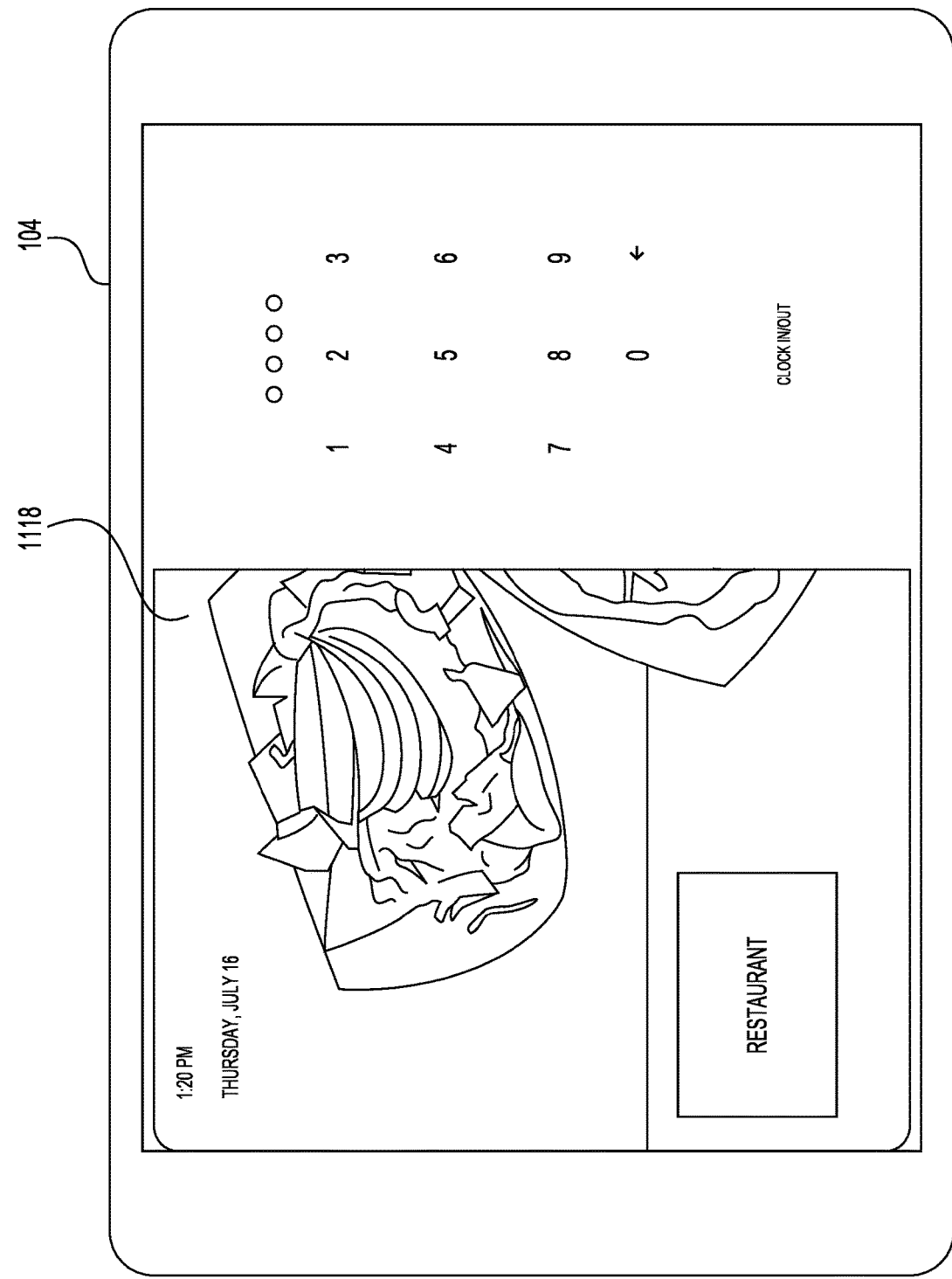
Figure 11G:
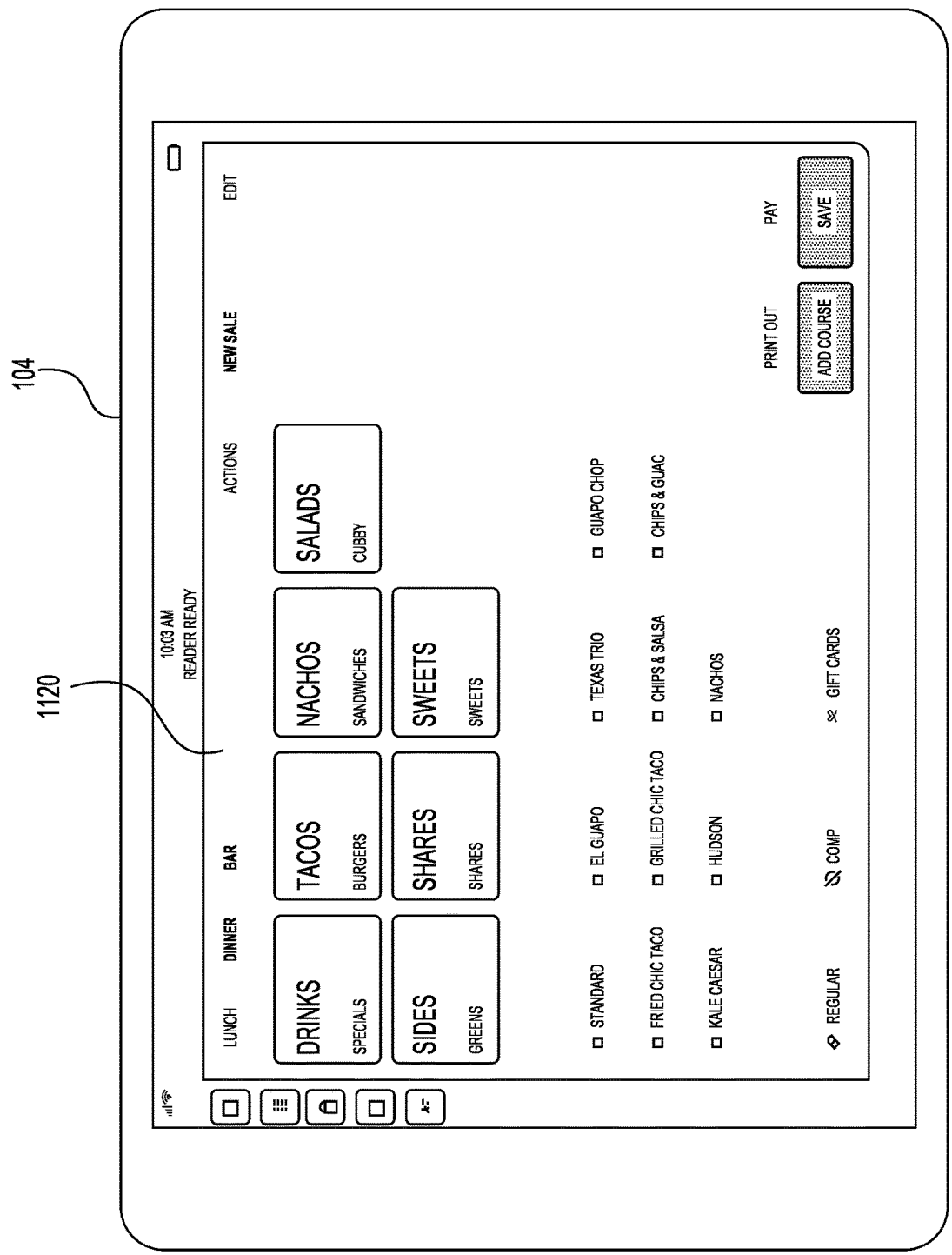

FIG. 11F illustrates a user interface 1118 that can be presented to enable the worker to clock-in or clock-out (e.g., functionality that may not have been available via the instant application) but is available via the full point-of-sale application. FIG. 11G illustrates an example user interface 1120 that can enable a worker to build an order, print a bill, process payment, or the like (e.g., functionality that may not have been available via the instant application) but is available via the full point-of-sale application. In some examples, the graphical user interfaces in FIGS. 11F and 11G can be presented by the full point-of-sale application (after downloading onto the user computing device 104). In some examples, the graphical user interfaces in FIGS. 11F and 11G can be presented by one or more other instant applications (e.g., if the worker does not download the full point-of-sale application).

Figure 12A:
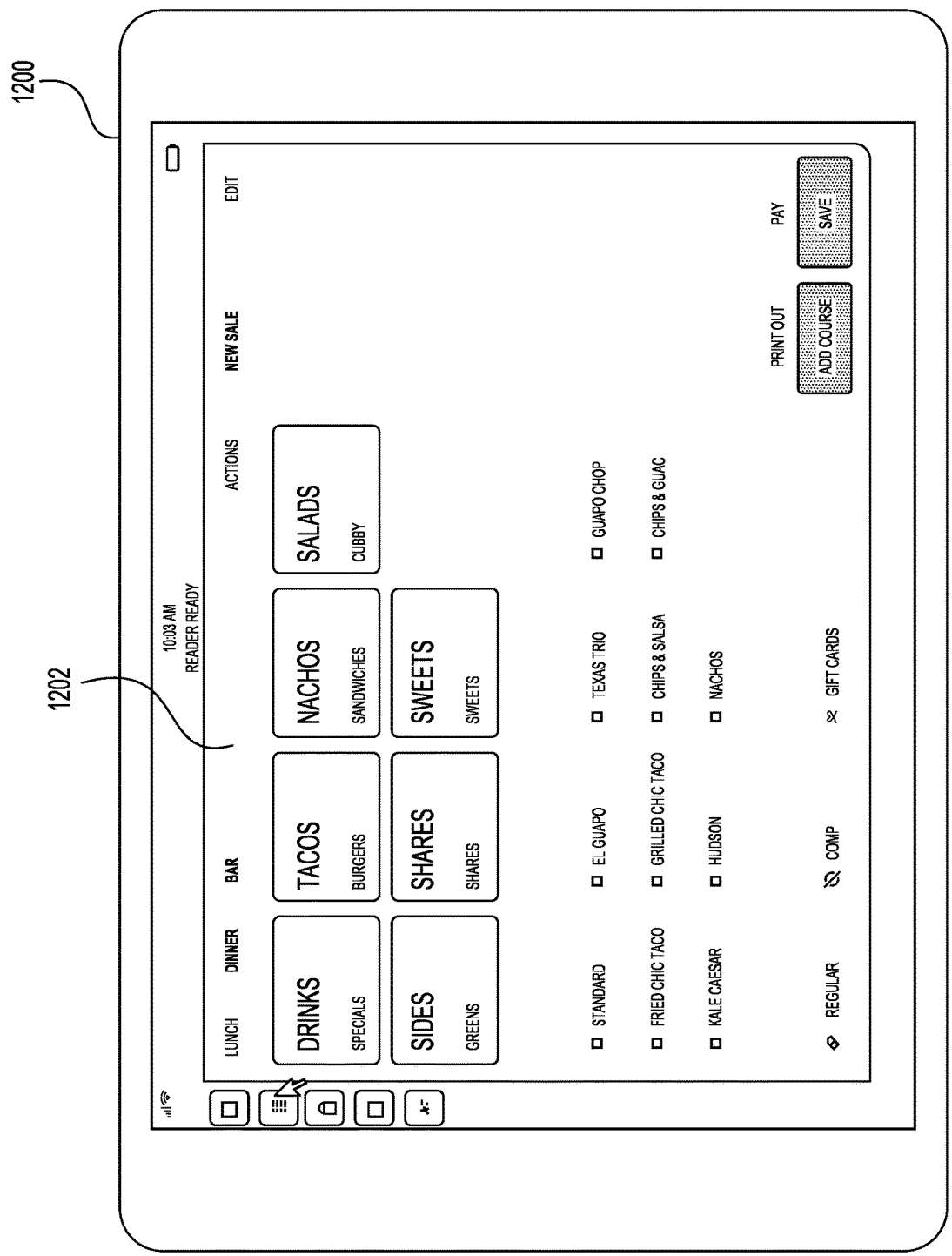
FIGS. 12A-12F illustrate an example of cloning and downloading a pre-configured application through an interactable element presented via a computing device.
Figure 12B:
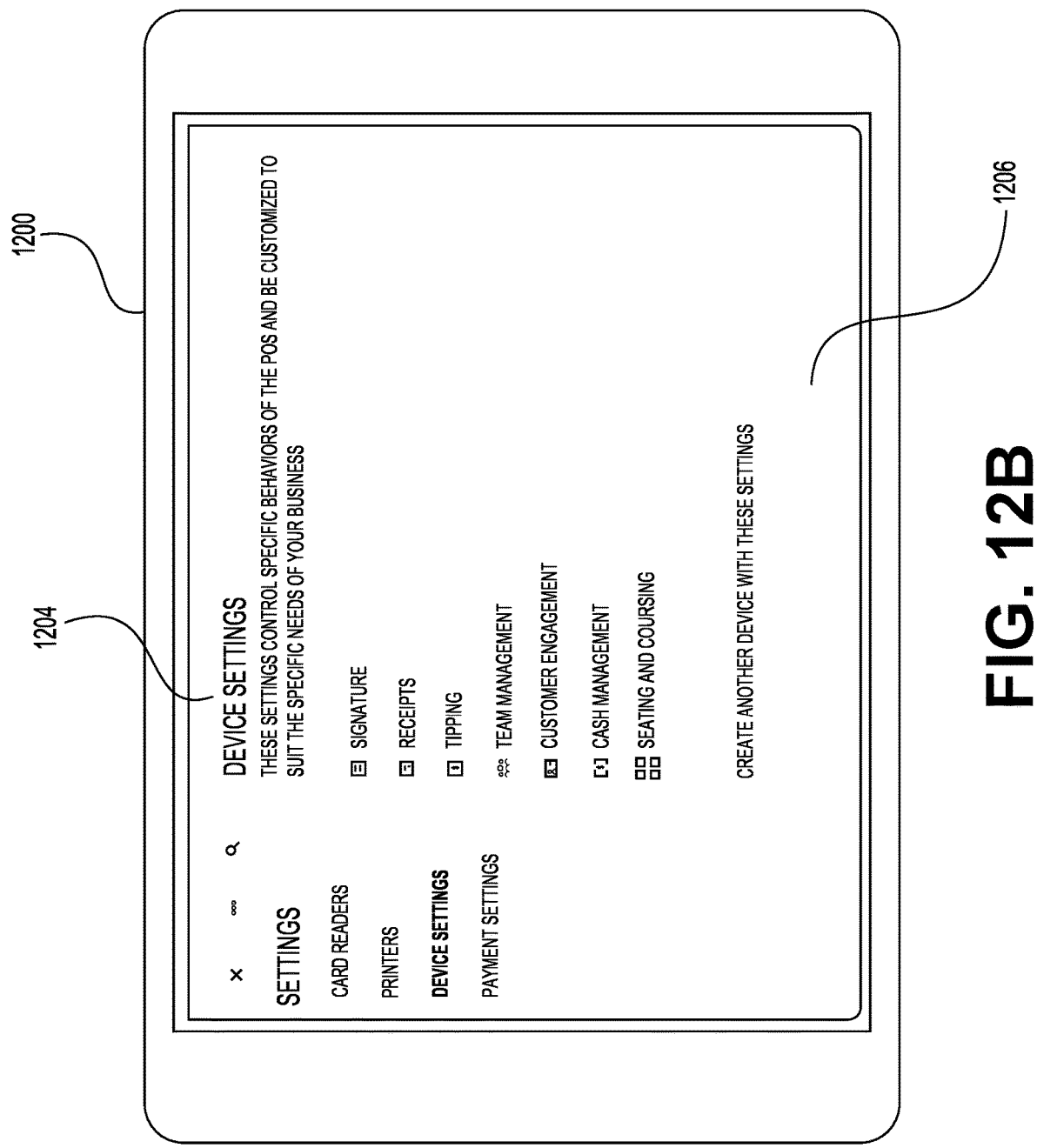
Figure 12C:
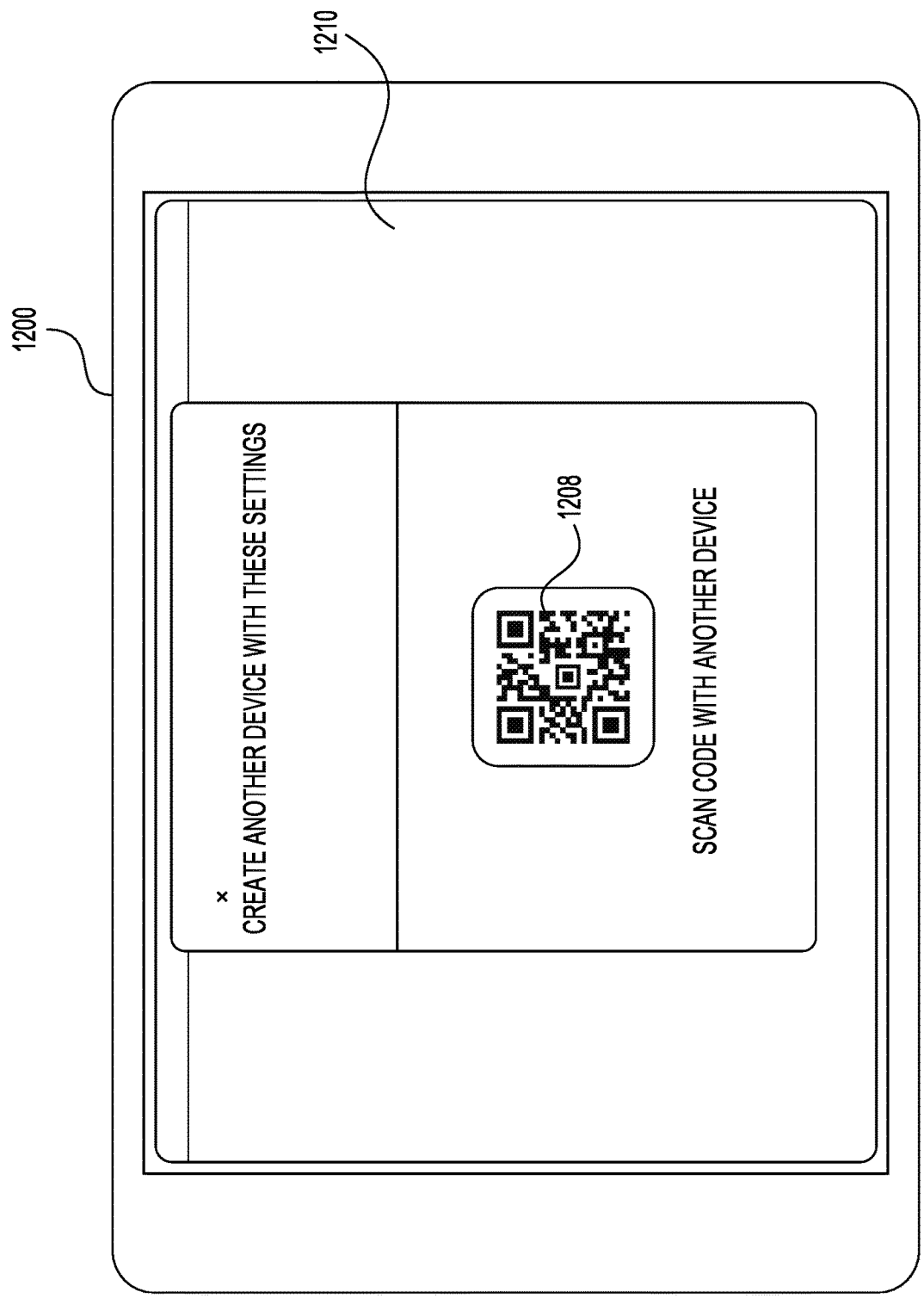

FIGS. 12A-12F illustrate an example of cloning and downloading a pre-configured application through an interactable element presented via a merchant computing device 1200. FIG. 12A illustrates a user interface 1202 that can (i) be presented via a merchant computing device 1200 and (ii) enable a worker of a merchant to build an order, print a bill, process payment, or the like. Such functionality can be available via a point-of-sale application. In at least one example, a worker can interact with the user interface 1202 to access a settings menu, as illustrated in FIG. 12B. The settings menu can be presented via a user interface 1206. In at least one example, the worker can provide an input to associate the same settings with another computing device (e.g., clone the device settings of the merchant computing device 1200 onto a second merchant computer device (e.g., the user computing device 104) at the same location or different location). In at least one example, by providing an input (e.g., selecting a selectable element or the like), the merchant computing device 1200 (e.g., an application executing thereon) can cause an interactable element 1208 to be presented via a user interface 1210 of the merchant computing device 1200, as illustrated in FIG. 12C. In at least one example, the interactable element 1208 can have data embedded therein including worker authorization data, dashboard configuration settings, device code, worker settings, device code, worker preferences, menus, device settings, full or condensed view of dashboard, etc. Such embedded data can enable cloning and transporting such preferences and settings automatically and seamlessly to a new device (e.g., the user computing device 104) through interaction with the interactable element 1208. The new device (e.g., the user computing device 104) can then have an instant application and/or full application downloaded thereon that can be associated with preconfigured settings.

Figure 12D:
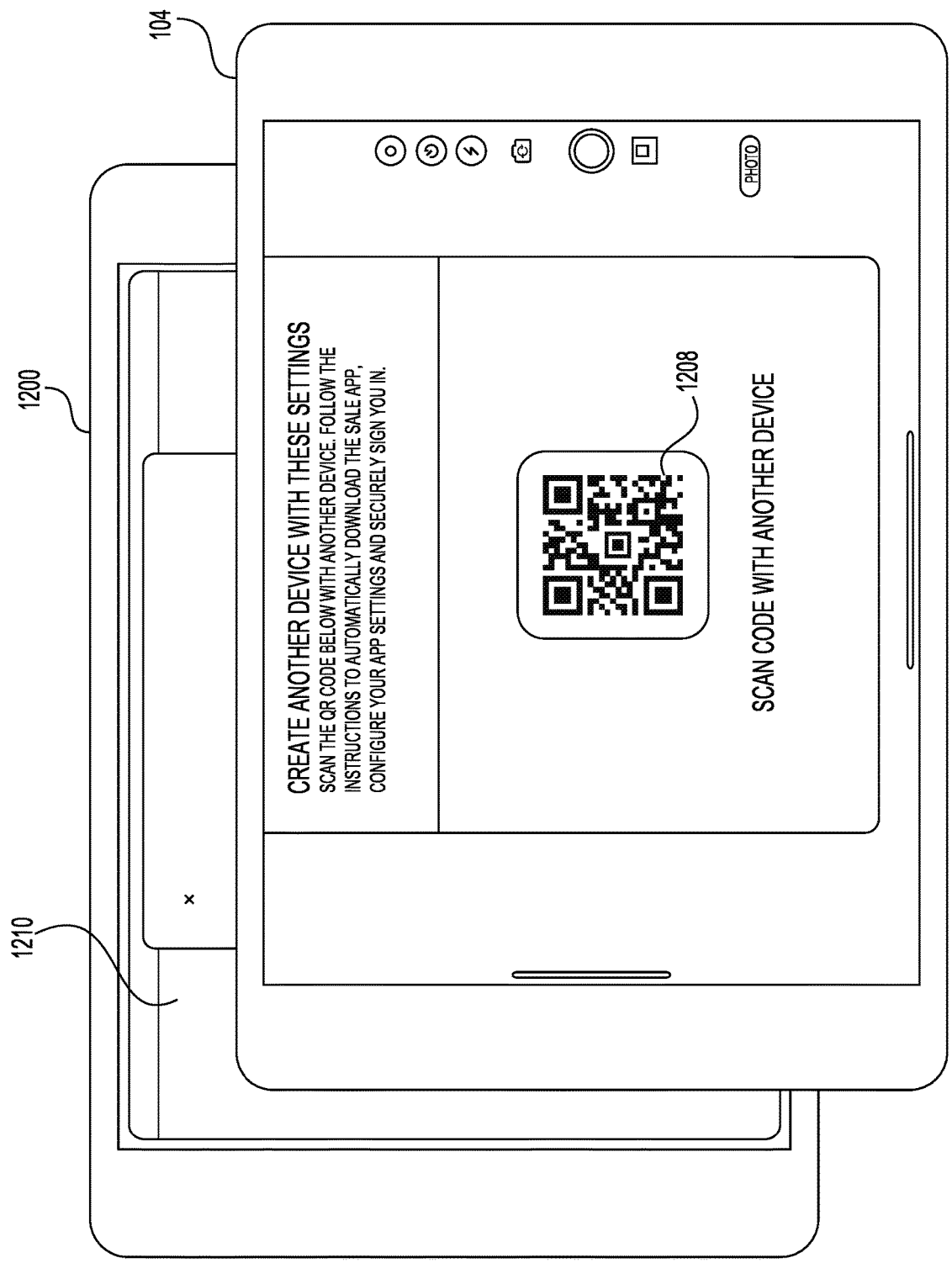

In at least one example, a second merchant computing device (e.g., the user computing device 104) can scan, read, or otherwise interact with the interactable element 1208 as presented via the first merchant computing device 1200, as illustrated in FIG. 12D. In at least one example, based at least in part on scanning, reading, or otherwise interacting with the interactable element 1208, the second merchant computing device (e.g., the user computing device 104) can send an indication of the interaction to the service provider server(s) 102. The application management component 114 can cause a part of the point-of-sale application (e.g., an instant application) to be downloaded to the second merchant computing device (e.g., the user computing device 104) responsive to receiving the indication. In at least one example, the receipt of the indication from the second merchant computing device (e.g., the user computing device 104) can provide authentication and thus the instant application associated with the point-of-sale application can be automatically downloaded to the second merchant computing device (e.g., the user computing device 104) and authenticated. In at least one example, the instant application can be associated with device settings that mirror the device settings of the first merchant computing device 1200.

Figure 12E:
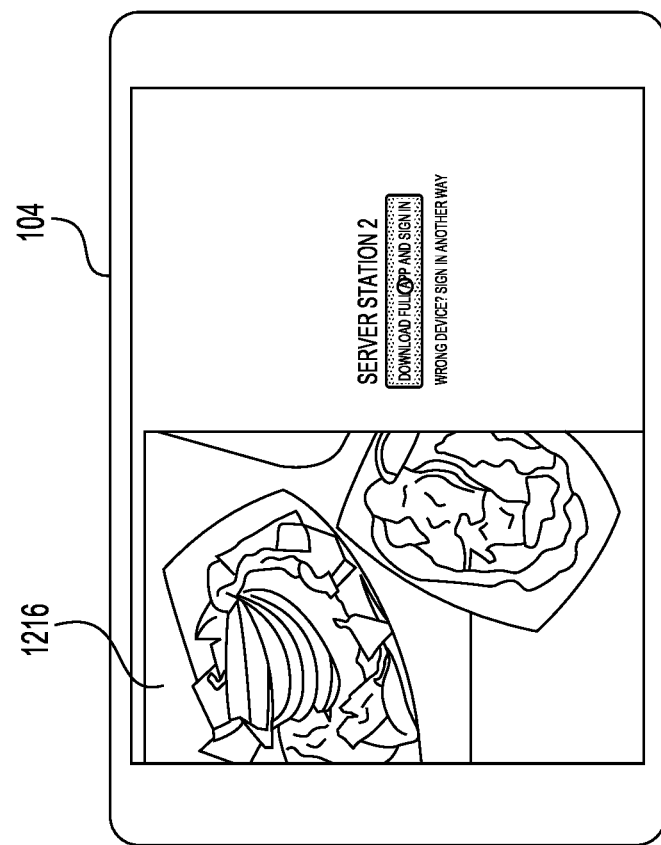

FIG. 12E illustrates a user interface element 1212 that can be presented by the instant application, which can enable the worker to install the point-of-sale application (e.g., the task). In some examples, the user interface element 1212 can be presented as a pop-up, overlay, or the like. In at least one example, the instant application can present a user interface instead of the user interface element 1212. In at least one example, the user interface element 1212 can include a selectable element 1214 that, when selected, can cause the full point-of-sale application to be downloaded onto the second merchant computing device (e.g., the user computing device 104).

Figure 12F:
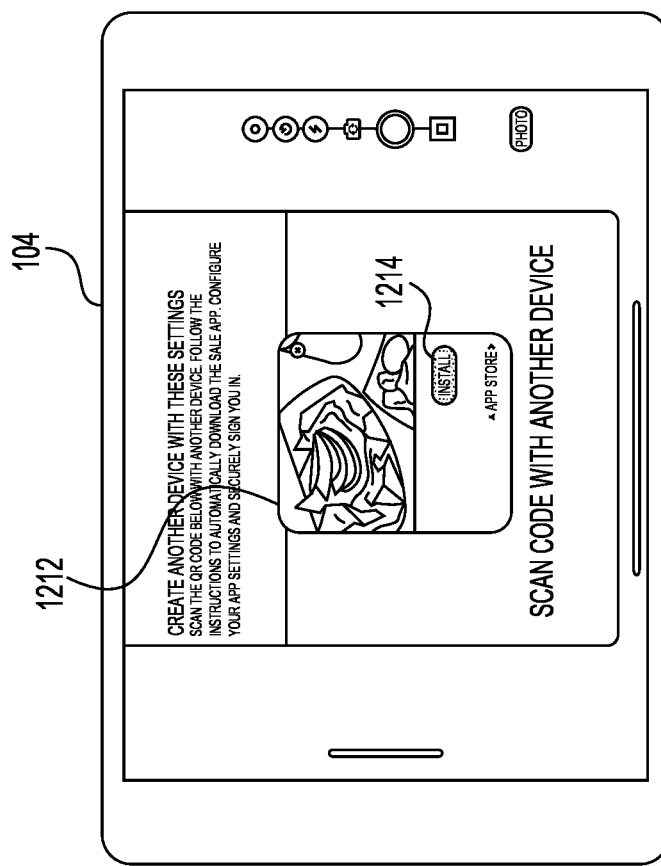

FIG. 12F illustrates a non-limiting example of a user interface 1216 that can be presented via the second merchant computing device (e.g., the user computing device 104) to prompt the worker to download the full application. The instant application can detect input indicating a request to download the full point-of-sale application and can send an indication of such input to the service provider server(s) 102. The application management component 114 can then cause the full point-of-sale application to be downloaded onto the second merchant computing device (e.g., the user computing device 104). The worker can then have access to additional functionality associated with the point-of-sale application. In at least one example, the point-of-sale application can be associated with the same device settings as the first merchant computing device 1200. That is, the second merchant computing device (e.g., the user computing device 104) can be a "clone" of the first merchant computing device 1200, as it pertains to settings of the point-of-sale application.

Figure 13:
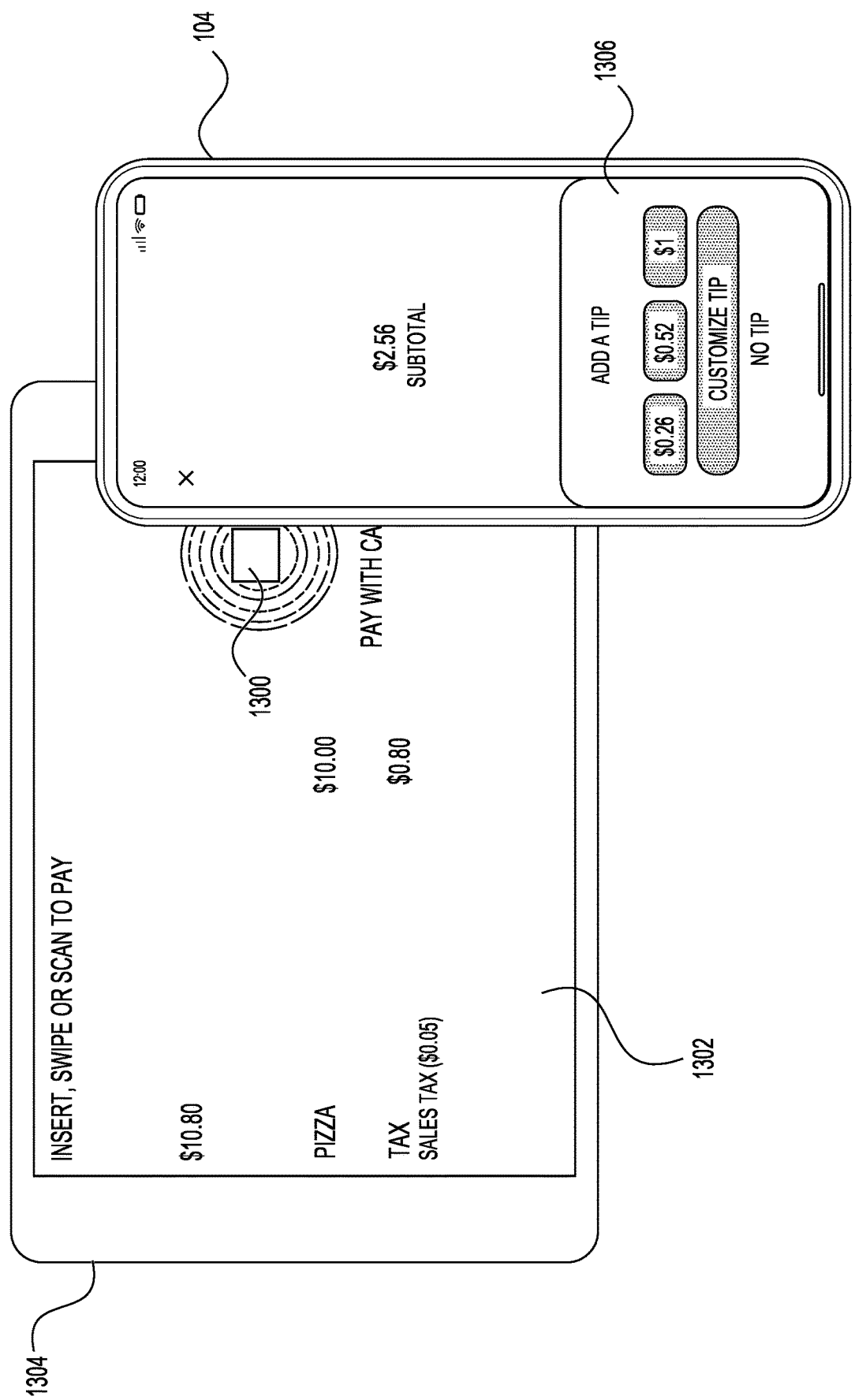
FIG. 13 illustrates an example of performing a buyer-facing functionality via an instant application associated with an interactable element.

FIG. 13 illustrates an example wherein the user 106 can utilize the user computing device 104 to scan, read, or otherwise interact with an interactable element 1300 presented, for example, via a user interface 1302 of a merchant computing device 1304 to perform a buyer-facing functionality via an instant application associated with the interactable element 1300. In some examples, the interactable element 1300 can be associated with data, which can include a payment proxy, that can be embedded in the interactable element 1300 based at least in part on context data. In an example, the instant application can be associated with an ecommerce service associated with the service provider. The instant application can enable a holistic checkout experience (e.g., to allow contactless payments) and facilitate a real-time buyer-facing display (e.g., for payments, for real-time cart building, cart viewing, etc.). The movement of such functionality to user computing devices, such as the user computing device 104, can enable dynamic and personalized features for both buyers and merchants regardless of whether such merchants have buyer-facing displays associated with merchant point-of-sale computing systems.

In at least one example, the instant application can enable the user 106 to provide a tip via their own computing device (e.g., the user computing device 104), enroll in loyalty/rewards, manage loyalty/rewards, redeem loyalty/reward points, collect loyalty/reward points, apply gift cards, apply coupons, review and/or modify an order and/or cart (e.g., a virtual cart), pay with an application (e.g., wallet application, peer-to-peer payment application, etc.) on their own computing device, and/or the like. In at least one example, the user computing device 104 can scan, read, or otherwise interact with the interactable element 1300 and send an indication of the interaction with the interactable element 1300 to the service provider server(s) 102. The application management component 114 can cause a part of an application (e.g., an instant application) to be downloaded to the user computing device 104 responsive to receiving the indication.

In FIG. 13, a user interface element 1306 associated with the instant application can enable the user 106 to add a gratuity, e.g., as the cart is being built. In some examples, the user interface element 1306 can be presented as a pop-up, overlay, or the like. In at least one example, the instant application can present a user interface instead of the user interface element 1306. In some examples, the user interface element 1306 can also include elements to enable the user 106 to view data regarding associated taxes and shipping fees, if applicable, as the cart is being built. In at least one example, the instant application can have additional functionalities to allow the user 106 to view and/or modify a cart, apply rebates/coupons/loyalty/gift cards, etc. via a user interaction with the user interface element 1306 in near real-time. Additional or alternative user interfaces can be presented to enable the buyer to perform other operations as described above, including, but not limited to, redeeming loyalty points, collecting loyalty points, reviewing and/or modifying an order and/or cart, paying with an application (e.g., wallet application, peer-to-peer payment application, etc.) on their user computing device 104, and/or the like.

FIG. 14 illustrates another example wherein the user 106 can utilize the user computing device 104 to scan, read, or otherwise interact with an interactable element 1400 presented to enable the user to provide a tip via their own computing device, redeem loyalty points, collect loyalty points, review and/or modify an order and/or cart, pay with an application (e.g., wallet application, peer-to-peer payment application, etc.) on their user computing device, and/or the like. In some examples, the interactable element 1400 can be affixed to, or otherwise associated with, physical objects (e.g., a sticker, panel, piece of paper, physical item, etc.). In some examples, the interactable element 1400 can be presented via an electronic device (e.g., a buyer-facing display of a point-of-sale device, a user computing device, a kiosk, etc.). In some examples, the interactable element 1400 can be associated with a receipt (e.g., physical receipt, digital receipt, or the like). In some examples, interaction with the interactable element 1400 can cause an instant application to be activated on the user computing device 104. In some examples, the interactable element 1400 can be associated with data, which can include a user identifier, account data, a payment proxy, etc., that can be embedded in the interactable element 1400 based at least in part on context data.

In at least one example, the user computing device 104 can scan, read, or otherwise interact with the interactable element 1400 and send an indication of the interaction with the interactable element 1400 to the service provider server(s) 102. The application management component 114 can cause a part of an application (e.g., an instant application) to be downloaded to the user computing device 104 responsive to receiving the indication. FIG. 14 illustrates an example of a user interface element 1402 that can be presented by the instant application. In some examples, the user interface element 1402 can be presented as a pop-up, overlay, or the like. In at least one example, the instant application can present a user interface instead of the user interface element 1402. In at least one example, by interacting with a selectable element 1404 associated with the user interface element 1402, the instant application can present a user interface 1406, which can enable the user 106 to add a gratuity, redeem rewards, track an order status, review and/or modify an order and/or cart, and/or the like. In some examples, an interaction with the user interface 1406 can modify the order and/or cart during the transaction (i.e., in near-real-time). Additional or alternative user interfaces can be presented to enable the buyer to perform other operations as described above, including, but not limited to, redeeming loyalty points, collecting loyalty points, modify an order and/or cart, paying with an application (e.g., wallet application, peer-to-peer payment application, etc.) on their user computing device 104, and/or the like.

In an example where the interactable element 1400 is associated with a receipt, a merchant can also access the interactable element 1400 on the receipt using a merchant computing device to perform certain actions, such as retrieve transaction data, validate a sale, initiate a return, track tips at the end of the day, reconcile receipts with financial software, etc. In an example, the merchant component 112 can implement NFC, image recognition tools (camera), to manage physical and digital receipts.

In some examples, the user interface 1406 can indicate that the user 106 earned rewards (e.g., loyalty points, a discount, etc.) and can prompt the user 106 to provide additional data (e.g., a phone number, email address, etc.) to claim the rewards. Such data can be sent to the service provider 102 server(s), stored in association with a profile of the user 106 (e.g., in the user data 122), and as such, the user 106 can use the rewards for the current transaction or future transactions.

In at least one example, the user 106 can provide data, such as device identifier, payment data, phone number or another identifier, to facilitate customization and/or personalization of an instant application relevant to the user 106 using preloaded or pre-configured data for a merchant, e.g., a merchant where the user is currently performing a transaction, or where the user is currently paying for a transaction. For example, in response to a phone number, an instant application can be surfaced on the user computing device 104 with user-merchant loyalty relationship. The loyalty/coupons can also be surfaced to incentivize the user 106 to download the full application.

In some examples, an instance of an instant application providing rewards and/or loyalty options can be embedded within an instant or native application of a merchant. For example, if the user 106 is ordering on an application or instant application of a merchant, a field may be auto-populated with loyalty data obtained on-the-fly based on user provided data, or user specific data learned from user data.

Figure 15:
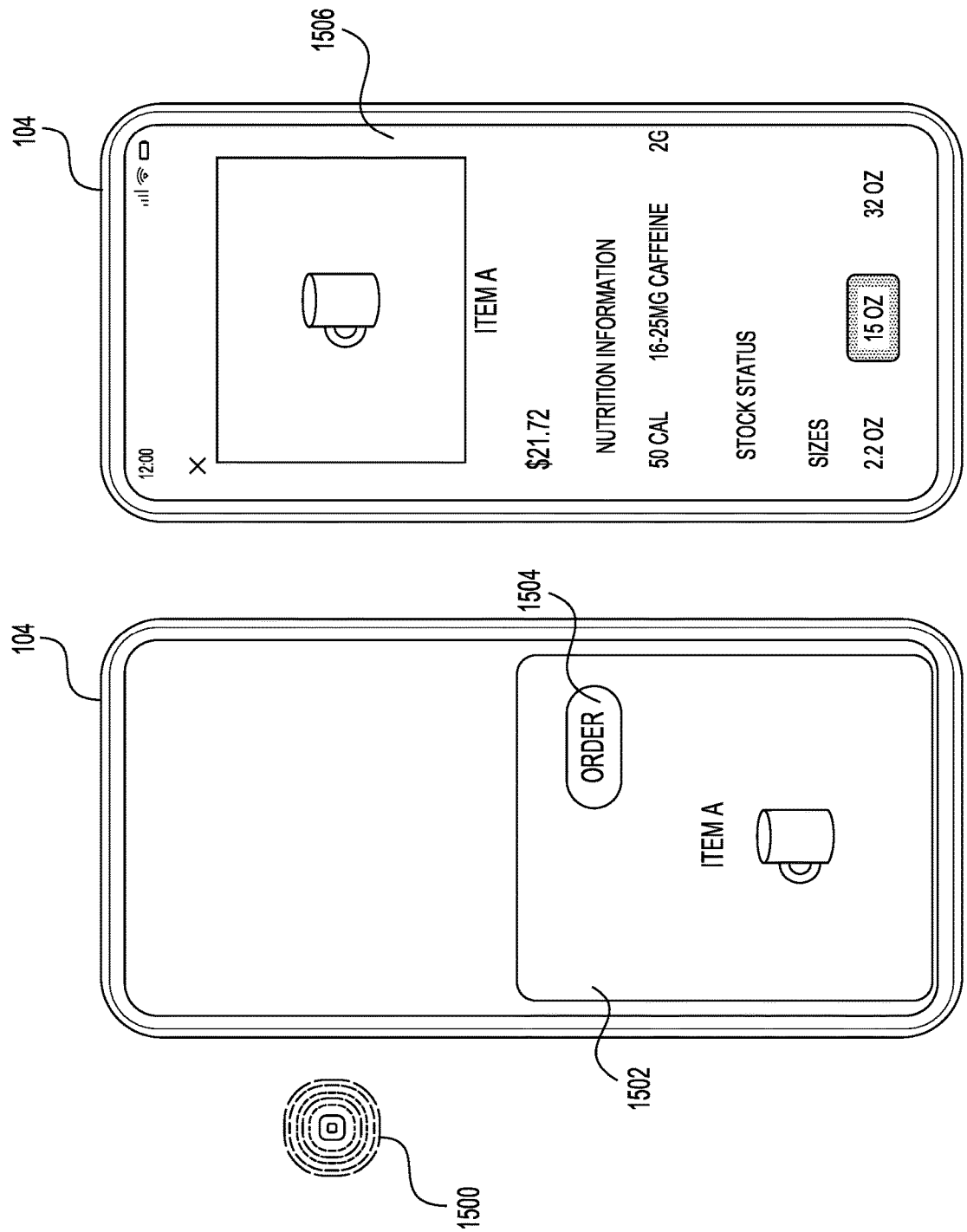
FIG. 15 illustrates an example of utilizing an instant application to enable management and/or ordering of inventory.

In at least one example, instant applications can be useful for item verification, stock tracking, reordering, scan and track item data, product placement, and/or other inventory-based tasks. In some examples, an interactable element can link to inventory management. FIG. 15 illustrates an example wherein a user 106 can utilize a user computing device 104 to scan, read, or otherwise interact with an interactable element 1500 to enable the user 106 to manage and/or order inventory. In FIG. 15, the user 106 can be a merchant. In some examples, the interactable element 1500 can be affixed to, or otherwise associated with, physical objects (e.g., a sticker, panel, piece of paper, physical item, etc.). In some examples, the interactable element 1500 can be presented via an electronic device (e.g., a buyer-facing display of a point-of-sale device, a user computing device, a kiosk, etc.). In some examples, the interactable element 1500 can be proximate an item of inventory (e.g., physically or via an ecommerce user interface). In at least one example, the user computing device 104 can scan, read, or otherwise interact with the interactable element 1500 and send an indication of the interaction with the interactable element 1400 to the service provider server(s) 102. The application management component 114 can cause a part of an application (e.g., an instant application) to be downloaded to the user computing device 104 responsive to receiving the indication.

FIG. 15 illustrates an example of a user interface element 1502 that can be presented by the instant application, which can enable the user to order a new item of inventory (e.g., by interacting with a selectable element 1504 associated with the user interface element 1502). In some examples, the user interface element 1502 can be presented as a pop-up, overlay, or the like. In at least one example, the instant application can present a user interface instead of the user interface element 1502. In some examples, based at least in part on detecting actuation of the selectable element 1504, the instant application can present a user interface 1506. The user interface 1506 can include user interface elements associated with item details, an indication of whether the item is in stock, a price, a fulfillment mechanism, etc. In some examples, the instant application can enable the merchant to purchase new inventory, ask for help, find data associated with inventory items for purchase and/or the like. In some examples, based at least in part on the user 106 purchasing new inventory via the instant application, the new inventory can be added to an inventory database associated with the service provider.

The example provided above can be merchant facing. However, in some examples, such an interactable element 1500 can be used by a buyer (i.e., can be buyer facing) to allow a buyer to obtain item data, determine where an item should be within a store, perform inventory tracking, get real-time updates on an item, receive an indication of whether the right item was picked (e.g., when compared to a wish list or shopping list), whether there are more options, purchase options, shipping and fulfilment options, etc.

FIG. 16 illustrates a plurality of interactable elements 1600(A)-1600(N), which can represent different items and/or bundles of items that can be ordered and/or purchased via a scan, read, or other interaction with the interactable elements. In some examples, the plurality of interactable elements 1600(A)-1600(N) can be affixed to, or otherwise associated with, physical objects (e.g., a sticker, panel, piece of paper, physical item, etc.). In some examples, the plurality of interactable elements 1600(A)-1600(N) can be presented via an electronic device (e.g., a buyer-facing display of a point-of-sale device, a user computing device, a kiosk, etc.). In some examples, the sequence in which the plurality of interactable elements 1600(A)-1600(N) are presented can be recommended and/or determined by the application management component 114, as described above. In some examples, the sequence can be determined based on context data. In at least one example, the user 106 can utilize the user computing device 104 to scan, read, or otherwise interact with one of the interactable elements illustrated in FIG. 16 to order and/or purchase the corresponding item. In some examples, such an order and/or purchase can be made via an instant application.

FIG. 17 illustrates a plurality of interactable elements 1700(A)-1700(N), which can represent different functionalities (e.g., applet actions) that can be availed to the user 106 via the user computing device 104. In some examples, the plurality of interactable elements 1700(A)-1700(N) can be affixed to, or otherwise associated with, physical objects (e.g., a sticker, panel, piece of paper, physical item, etc.). In some examples, the plurality of interactable elements 1700(A)-1700(N) can be presented via an electronic device (e.g., a buyer-facing display of a point-of-sale device, a user computing device, a kiosk, etc.). In some examples, the sequence in which the plurality of interactable elements 1700(A)-1700(N) are presented can be recommended and/or determined by the application management component 114, as described above. In some examples, the sequence can be determined based on context data. In at least one example, the user 106 can utilize the user computing device 104 to scan, read, or otherwise interact with an interactable element to perform a corresponding task. In some examples, such a corresponding task can be performed via an instant application.

FIGS. 18A-18D illustrates a plurality of user interfaces associated with notifications and/or data that can be presented via an instant application, for example, while the user 106 waits in line and/or for a reservation (e.g., at a theme park, restaurant, spa, salon, etc.). In at least one example, the user computing device 104 can scan, read, or otherwise interact with an interactable element 1800. In some examples, the interactable element 1800 can be affixed to, or otherwise associated with, physical objects (e.g., a sticker, panel, piece of paper, physical item, etc.). In some examples, the interactable element 1800 can be presented via an electronic device (e.g., a buyer-facing display of a point-of-sale device, a user computing device, a kiosk, etc.). In at least one example, the user computing device 104 can send an indication of an interaction with the interactable element 1800 to the service provider server(s) 102. The application management component 114 can cause a portion of an application (e.g., an instant application) to be downloaded to the user computing device 104 responsive to receiving the indication. In at least one example, and as illustrated in FIG. 18A, a user interface element 1802 associated with the instant application can be presented via the user computing device 104. In some examples, the user interface element 1802 can be presented as a pop-up, overlay, or the like. In at least one example, the instant application can present a user interface instead of the user interface element 1802. In at least one example, the user interface element 1802 can be associated with a selectable element 1804 to enable the user 106 to open the instant application. Based at least in part on detecting an actuation of the selectable element 1804, the instant application can present a user interface 1806, which can present data to the user 106 while the user 106 waits in line or awaits a reservation.

In some examples, data presented via the user interface 1806, can be based at least in part context data. In some examples, the instant application and/or the application management component 114 can receive updated context data to track the user computing device 104 and can cause updated data to be presented via the user interface 1806 based at least in part on receiving updated context data. In some examples, such context data can include location data, a timestamp, a spot in line, or the like. FIGS. 18B-18D illustrate different types of data that can be presented via the user interface 1806. In some examples, another instant application or application can be embedded in the instant application allow the user to engage with another merchant or perform a different task while they are waiting. These kinds of embedded instant applications or applications can be triggered, for example, by a device state or satisfaction of a condition.

Figure 19F:
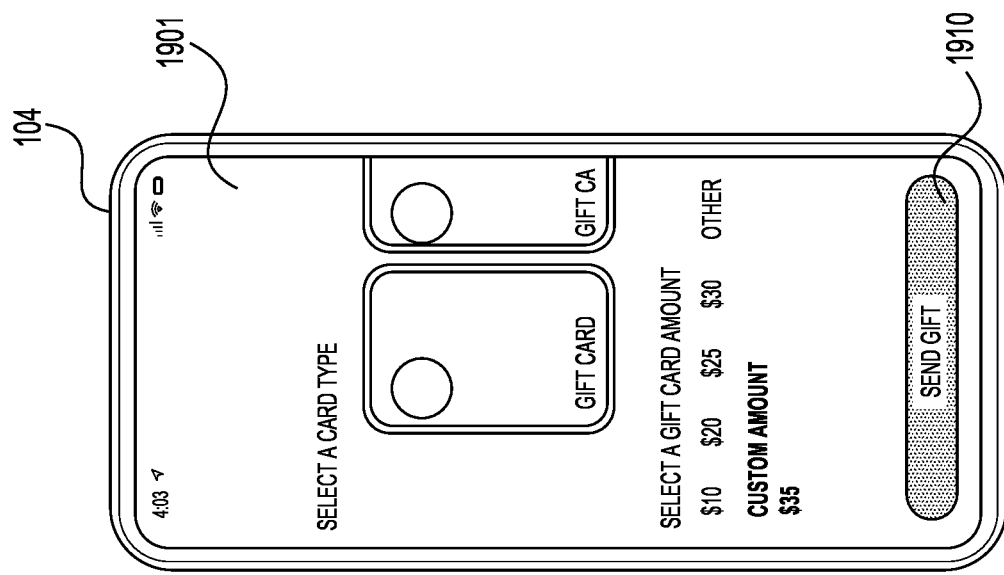

FIGS. 19A-19F illustrate an example where a user 106 can utilize an instant application to order a gift card (or other stored balance card). As illustrated in FIG. 19A, an instant application can present a user interface element 1900 via the user computing device 104. In some examples, the user interface element 1900 can be presented as a pop-up, overlay, or the like. In at least one example, the instant application can present a user interface instead of the user interface element 1900. In some examples, the user interface element 1900 can be presented based at least in part on the user computing device 104 interacting with an interactable element. In some examples, the user interface element 1900 can be presented based at least in part on context data associated with the user computing device 106. In at least one example, the user interface element 1900 can include a selectable element 1902 that, when selected, can cause a user interface 1906 to be presented. The user interface 1906 can enable the user 106 to access a menu of gift cards, amounts to be associated with a gift card, etc., as illustrated in FIG. 19B. In some examples, the user 106 can select a gift card type, select an amount of funds to be associated with the gift card, input a custom amount for the gift card, select a recipient, or the like, as illustrated in FIG. 19C. While FIGS. 19A-19F are directed to gift cards, same or similar techniques can be applicable to any stored balance card or payment instrument.

Figure 19E:
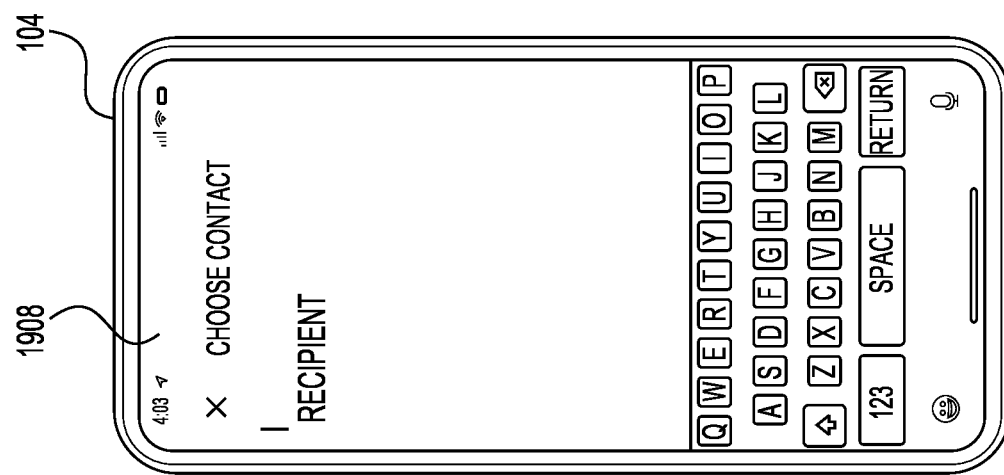
Figure 19D:
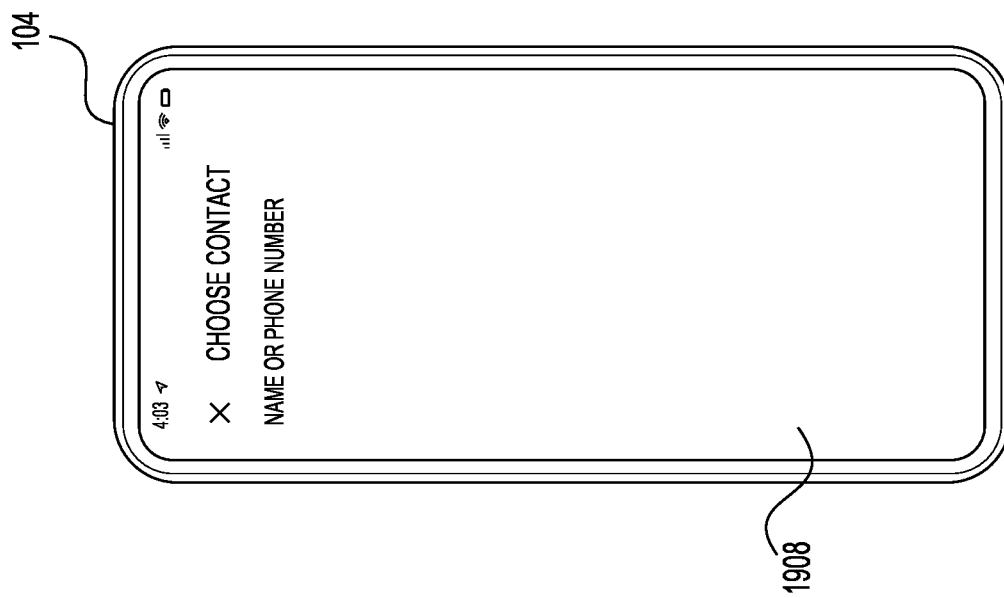

In at least one example, the user 106 can interact with the user interface 1906 to select a selectable element. Based at least in part on detecting a selection of the selectable element, the instant application can present another user interface 1908 from which the user 106 can select a contact as a recipient of a gift card. In at least one example, the instant application can request access to contacts of the user 106 (e.g., as stored on the user computing device and/or as otherwise associated with the user) and the user can interact with the user interface 1908, as illustrated in FIGS. 19D and 19E, to select a recipient of a gift card. In at least one example, the application management component 114 can receive data from the instant application (e.g., associated with a request for a gift card) and can create a data structure representative of the gift card (which can be associated with an identifier, an amount, etc.) based on such data. As illustrated in FIG. 19F, the user interface 1904 can include a selectable element 1910 that when selected can cause the gift card, or an indication associated therewith, to be sent to a user computing device of the recipient.

The application management component 114 can send an indication of the gift card to a user computing device of the recipient. In some examples, the gift card can be accessible via an instant application. In one implementation, an instant application to enable the recipient to use the gift card can be surfaced when certain conditions are met, for example, when the recipient (i.e., the user computing device associated therewith) is at a location of a merchant whose gift card they have. In some examples, a recommendation to use a gift card can be surfaced based on natural language processing of actual conversations, text conversations, buyer chat conversations, and so on. In some examples, a link or other interactable element associated with a text message, email, push notification, etc. can be sent to the user computing device of the recipient and the recipient can access the gift card via the link or other interactable element. In such examples, the gift card can be accessed and/or redeemable via a web browser. In some examples, the gift card can be accessible via a deep link in another application associated with the service provider. If the recipient does not have the other application downloaded and/or an account to use the other application, the service provider can prompt the recipient to download the application to access the gift card.

While FIGS. 19A-19F are described in a buyer-facing example, in some examples, same or similar techniques can be utilized by a merchant to order gift cards (e.g., for sale via a brick-and-mortar store and/or online). That is, the merchant can interact with a user interface associated with an instant application to design gift cards, associated balances with the gift cards, and/or the like.

While examples described above include reference to presentation of a user interface element associated with an instant application that can include a selectable element, that when selected, causes a user interface associated with the instant application to be presented, in some examples, the instant application can present the user interface without first presenting the user interface element and/or selectable element. Furthermore, while described as a user interface element above, such a user interface element can correspond to a user interface associated with an instant application.

Figure 20:
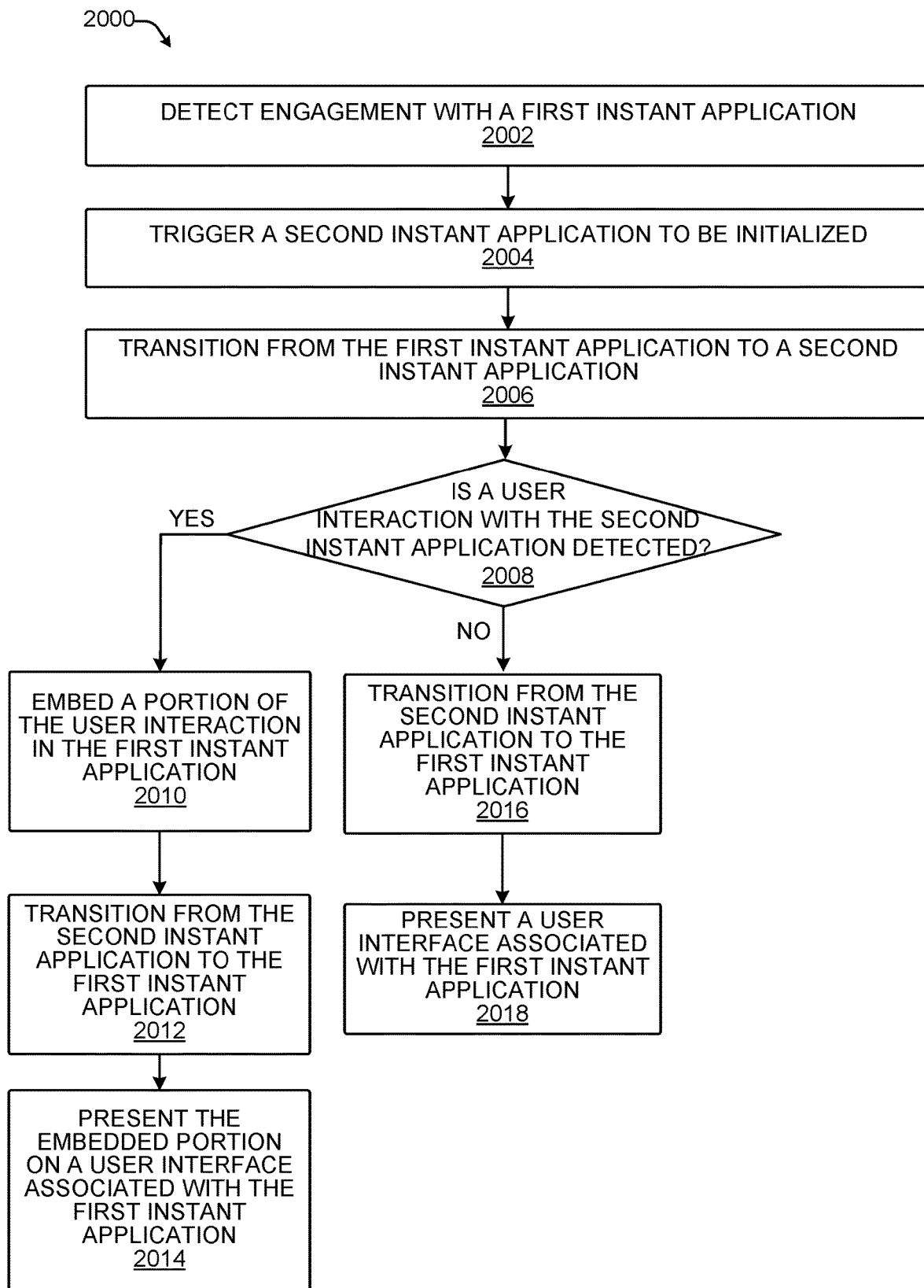
FIG. 20 illustrates an example process for nesting of application(s) or part(s) thereof, within another application, or part thereof.

FIG. 20 illustrates an example process 2000 for nesting of application(s) or part(s) thereof, within another application, or part thereof.

At operation 2002, a first instant application can detect engagement with the first instant application. In at least one example, the first instant application can be associated with a first application. The first application can be associated with a set of functionalities and the first instant application can be associated with a smaller set of functionalities than the first application. In some examples, the first instant application can be associated with a particular, discrete functionality of the set of functionalities associated with the first application.

In at least one example, the first instant application can present a user interface via the user computing device 104. The user interface can present data associated with the first instant application and can enable the user 106 to engage with the first instant application. In some examples, the user interface can present one or more options for engaging with the first instant application. In at least one example, the first instant application can detect engagement with an option presented via the first instant application (e.g., from within the first instant application). In some examples, the user interface can be a home page or main page that includes one or more options associated with one or more merchants. For example, the home page or main page can be a marketplace, can offer coupons, rewards, or incentives from the one or more merchants, or the like. In some examples, the user interface can be associated with an activity user interface that includes one or more options associated with one or more interactions or transactions of the user 106. In some examples, each of the options can correspond to an interaction or transaction and can be associated with parties to the interaction or the transaction. For instance, if an option on the activity user interface is associated with a previous transaction between the user 106 and a merchant, the option can be associated with the merchant. In some examples, each of the options can be associated with an embedded application, or part thereof (e.g., an instant application), associated with the merchant. That is, in some examples, individual of the options can point to, via an embedding, deep link, or the like, a merchant application, or part thereof. Additional details are provided below.

At operation 2004, the first instant application can trigger a second instant application to be initialized. In some examples, the second instant application can be associated with the first application and can be associated with a different particular, discrete functionality or set of functionalities than the first instant application. In at least one example, the second instant application can be associated with a second application that is different than the first application. The second application can be associated with a set of functionalities and the second instant application can be associated with a smaller set of functionalities than the second application. In some examples, the second instant application can be associated with a particular, discrete functionality of the set of functionalities associated with the second application.

In at least one example, based at least in part on detecting engagement with the first instant application, the first instant application can trigger the second instant application to be initialized. In some examples, the option can be associated with an embedding, a deep link, or the like, such that upon detecting engagement with the option the first instant application can trigger initialization of the second instant application. In some examples, the second instant application can be initialized without additional input from the user 106. In some examples, the first instant application can present a user interface element via the user interface prompting the user 106 to provide an input to initialize the second instant application.

At operation 2006, the first instant application can transition to the second instant application. In at least one example, the first instant application can transition to the second instant application based at least in part on initialization of the second instant application. In at least one example, a user interface associated with the second instant application can be presented via the user computing device 104. The user interface can present data associated with the second instant application and can enable the user 106 to engage with the second instant application. In some examples, the user interface can present one or more options for engaging with the second instant application.

At operation 2008, the second instant application can determine whether a user interaction with the second instant application is detected. In at least one example, the second instant application can determine whether a user interaction with the second instant application is detected. Based at least in part on determining that a user interaction with the second instant application is detected (e.g., an interaction between the user and the user interface associated with the second instant application), the second instant application can cause a portion of the user interaction to be embedded in the first instant application. That is, the first instant application can receive an indication from the second instant application of the user interaction and, as illustrated at operation 2010, can embed the user interaction, or an indication thereof, in the first instant application. In at least one example, the second instant application can transition to the first instant application, as illustrated at operation 2012, and the first instant application can present the embedded portion on a user interface associated with the first instant application, as illustrated at operation 2014. In at least one example, a portion of an interaction with the second instant application can be embedded in, or otherwise associated with, the first instant application. In such an example, the portion can be presented via the user interface presented by the first instant application. In at least one example, embedding application(s), part(s) thereof, and/or interaction(s) therewith into other application(s), part(s) thereof, and/or interaction(s) therewith (i.e., "nesting") can ensure that either (a) the formatting of the embedded application(s), part(s) thereof, and/or interaction(s) therewith, as presented via a user interface, is based at least in part on the originating application(s), part(s) thereof, and/or interaction(s) therewith or (b) that the formatting of the embedded application(s), part(s) thereof, and/or interaction(s) therewith, as presented via a user interface, is different than the originating application(s), part(s) thereof, and/or interaction(s) therewith.

If the second instant application does not detect an interaction with the second instant application, the second instant application can transition to the first instant application, as illustrated at operation 2016, and the first instant application can present a user interface associated with the first instant application, as illustrated at operation 2018. In such an example, the user interface may not include any data indicative of user interaction with the second instant application.

In at least one example, if the application with which the first instant application is associated is downloaded to the user computing device, the embedded portion of the interaction with the second instant application can be embedded into the application. That is, in some examples, the embedded portion of the interaction can be stored by the application management component 114 such that when the full application is downloaded, the embedded portion of the interaction can be associated with the application.

In some examples, the first instant application can transition to a second application (e.g., instead of a second instant application). In such examples, interaction(s) with the second application can be embedded into the first instant application and presented via a user interface presented via the first instant application. Further, in some examples, a first application can transition to a second application and/or a part thereof. In such examples, interaction(s) with the second application or part thereof can be embedded into the first application and presented via a user interface presented via the first application. That is, the process 2000 described above with reference to FIG. 20 can be applicable for applications and/or instant applications alike.

In some examples, the first instant application can be associated with a buyer application (e.g., a peer-to-peer payment application, a buyer-facing application, a wallet application, an ecommerce application, or the like) that enables the user 106 to remit payment, redeem loyalty, redeem a coupon, input a gratuity, provide feedback, or the like, and the second instant application can be associated with a merchant application that enables merchant-facing functionality such as building a virtual cart, browsing an online store of a merchant, or the like. In some examples, the first instant application can be associated with a merchant application that enables merchant-facing functionality such as building a virtual cart, browsing an online store of a merchant, or the like and the second instant application can be associated with a buyer application (e.g., a peer-to-peer payment application, a buyer-facing application, a wallet application, an ecommerce application, or the like) that enables the user 106 to remit payment, redeem loyalty, redeem a coupon, input a gratuity, provide feedback, or the like. In some examples, the first instant application can be associated with a waitlist functionality that enables the user 106 to add themselves to a waitlist of a restaurant, movie, attraction, etc., and the second instant application can be associated with an ordering functionality that allows the user 106 to place an order for an item. In some examples, the waitlist functionality and the ordering functionality can be associated with a same point-of-sale application of a merchant. In some examples, the waitlist functionality can be associated with an application associated with a first merchant and the ordering functionality can be associated with a second application of a second merchant.

Figure 21C:
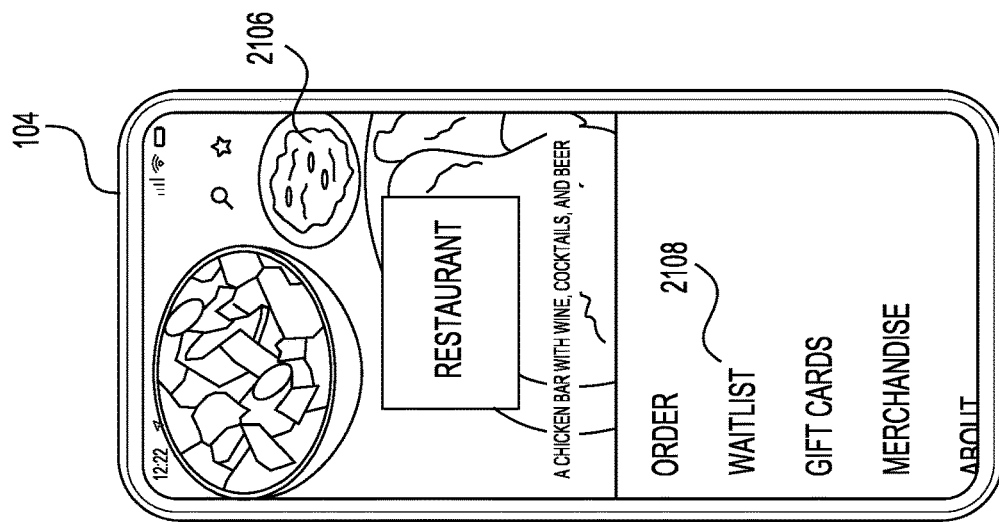
FIGS. 21A-21L illustrate an example of transitioning between nested application(s) or parts thereof.
Figure 21B:
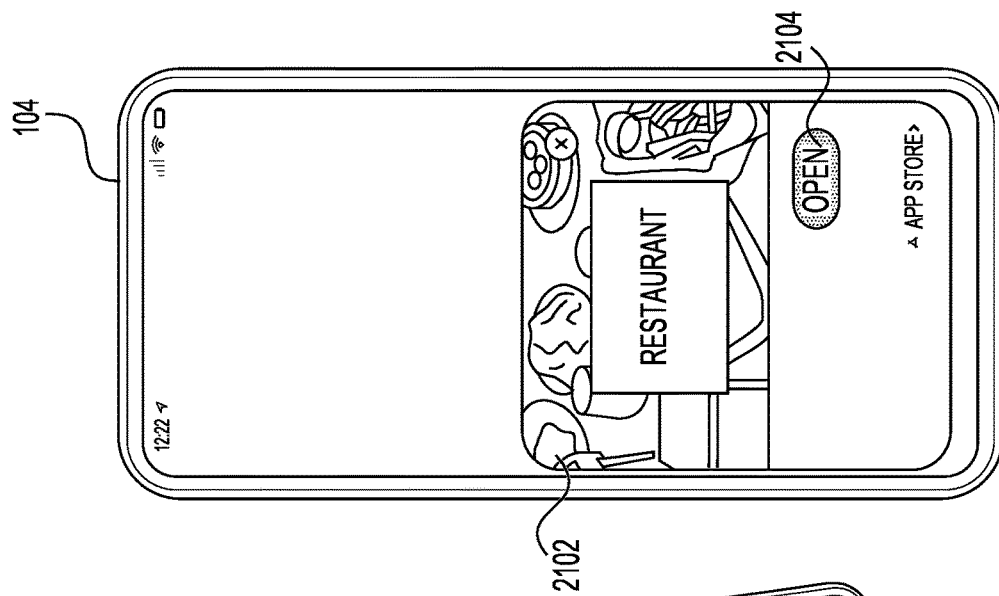
Figure 21A:
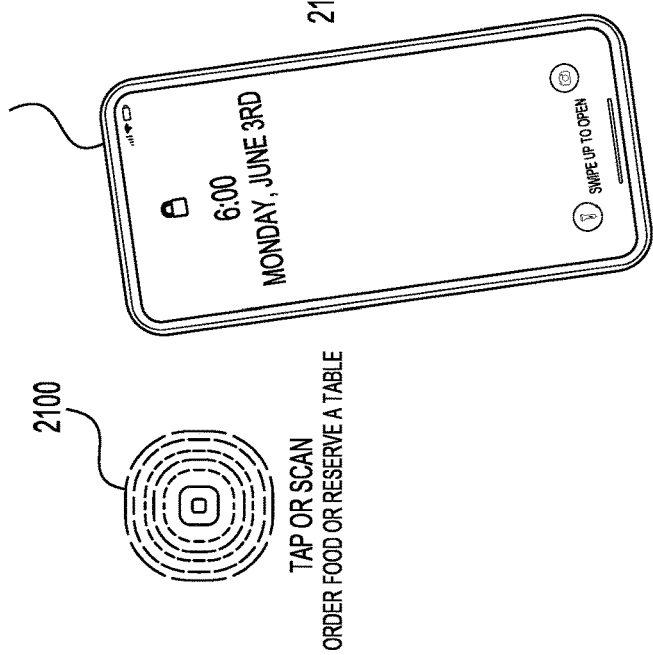

FIGS. 21A-21L illustrate an example of transitioning between nested application(s) or parts thereof. FIG. 21A illustrates an example interactable element 2100 that can be presented for user 106 to perform a task, such as ordering food and/or reserving a table via an instant application associated with a merchant. In some examples, the interactable element 2100 can be presented via a user computing device (e.g., a buyer-facing display of a point-of-sale device, a merchant computing device, a kiosk, etc.). In other examples, the interactable element 2100 can be presented on a sticker, panel, piece of paper, or other physical item. In at least one example, as illustrated in FIG. 21A, the user computing device 104 can scan, read, or otherwise interact with the interactable element 2100 and send an indication of the interaction to the service provider server(s) 102. The application management component 114 can cause a portion of an application (e.g., an instant application) to be downloaded to the user computing device 104 responsive to receiving the indication. Accordingly, the user 106 can access functionality for performing one or more tasks (e.g., ordering, joining a waitlist, ordering a gift card, purchasing merchandise, etc.) via interaction with a user interface. In some examples, the instant application can be downloaded, or otherwise surfaced, via the user computing device 104 without the user computing device 104 having interacted with the interactable element 2100. In some examples, the instant application can be downloaded, or otherwise surfaced, via the user computing device 104 intelligently based on context data associated with the user computing device 104. For instance, in a non-limiting example, the application management component 114 can cause the instant application to be downloaded, or otherwise surfaced, via the user computing device 104 based at least in part on determining that the user computing device 104 is within a threshold distance of a location of a merchant.

FIG. 21B illustrates an example of a user interface element 2102 that can be presented by the instant application to enable the user 106 to access one or more options for interacting with the merchant. In some examples, the user interface element 2102 can be presented as a pop-up, overlay, or the like. In some examples, a user interface, instead of a user interface element 2102, can be presented by the instant application. In at least one example, the user interface element 2102 can include a selectable element 2104, that when selected, causes a user interface 2106 to be presented, as illustrated in FIG. 21C. In at least one example, the user interface 2106 can be presented by the instant application, which can enable the user 106 to select a task to perform (e.g., ordering, joining a waitlist, ordering a gift card, purchasing merchandise, etc.). In some examples, the user interface 2106 can include one or more selectable elements associated with different tasks, that when selected, causes functionality for performing the task to be enabled via the instant application. For instance, if the user 106 actuates a selectable element 2108 associated with joining a waitlist, the instant application can present one or more user interfaces to enable the buyer to join a waitlist.

Figure 21F:
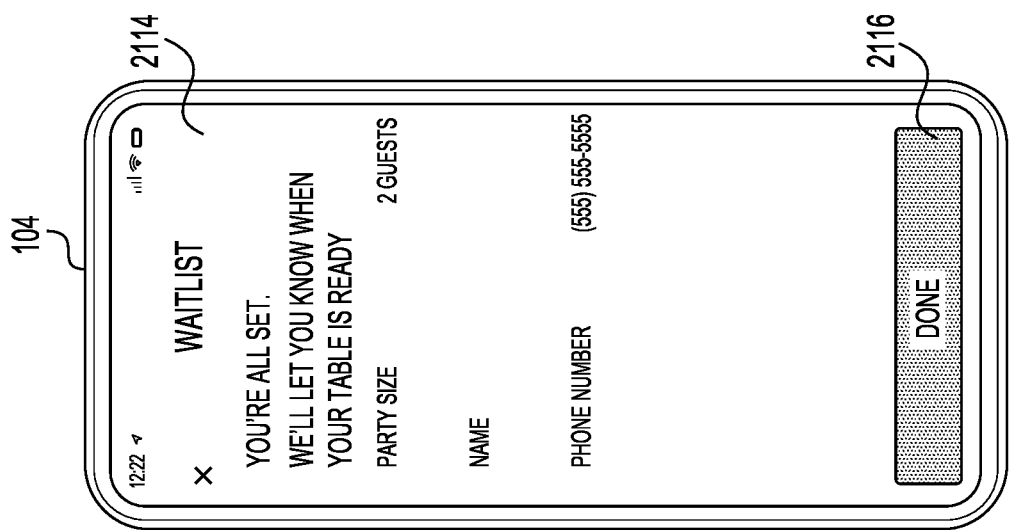
Figure 21E:
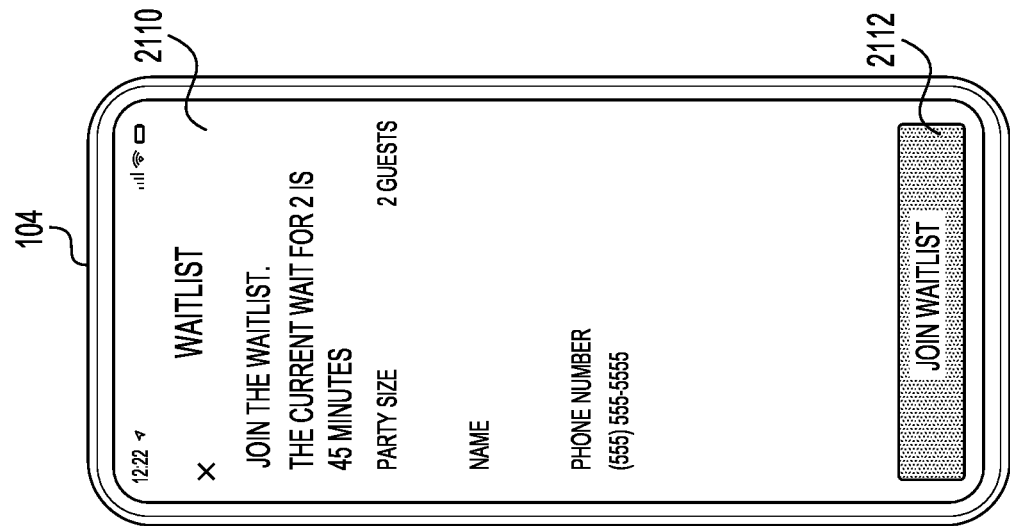
Figure 21D:
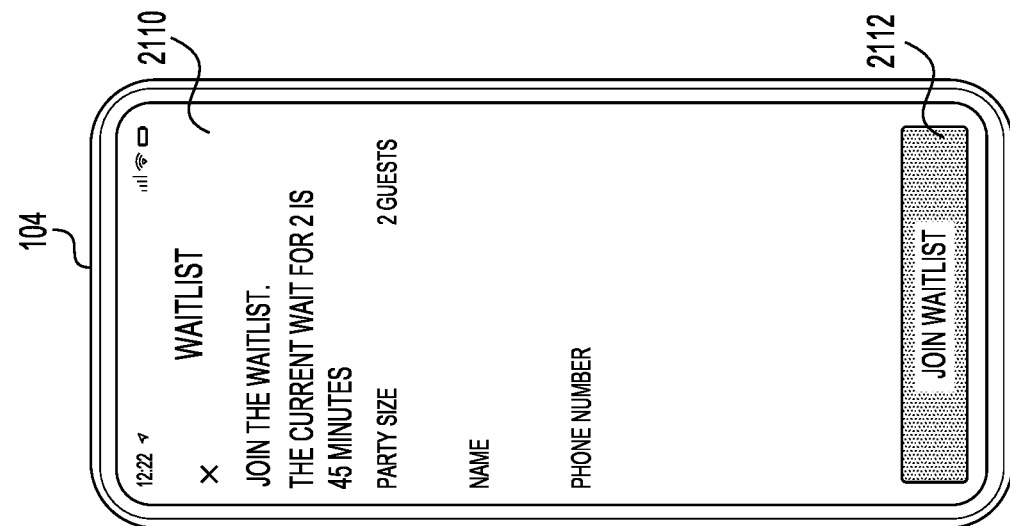

FIGS. 21D-21F illustrate examples of such user interfaces. In at least one example, based at least in part on detecting an input associated with the selectable element 2108, the instant application can cause the user interface 2110 to be presented via the user computing device 104. In at least one example, the user 106 can input data (e.g., party size, name, phone number, etc.) via the user interface 2110. In at least one example, the user interface 2110 can include a selectable element 2112 that when selected can cause the instant application to add the user to a waitlist associated with the merchant. The instant application can send the data input via the user interface 2110 to the service provider server(s) 102 and/or a local merchant computing device associated with the merchant and the user 106 can be added to the waitlist (e.g., an indication of the buyer can be added to a data structure representative of the waitlist). In at least one example, the instant application can present a user interface 2114 that can include a notification confirming that the user 106 has been added to the waitlist. The user interface 2114 can include a selectable element 2116 that can be selected by the user 106 to confirm receipt of such a notification.

Figure 21I:
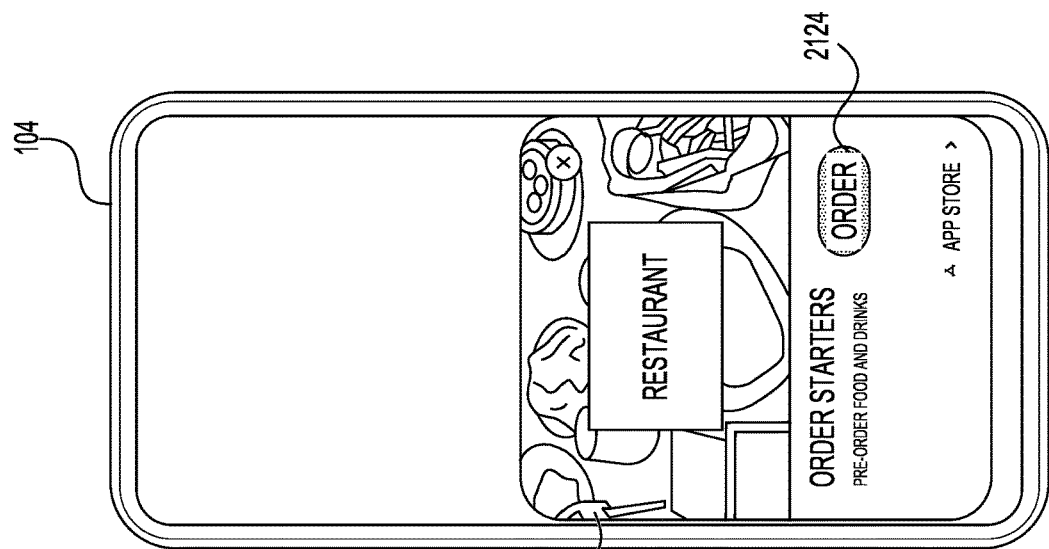
Figure 21H:
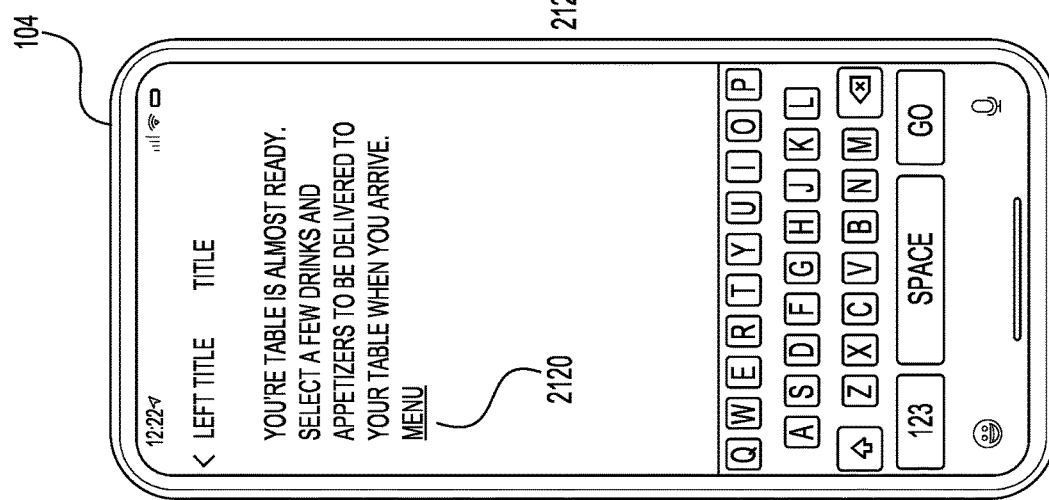
Figure 21G:
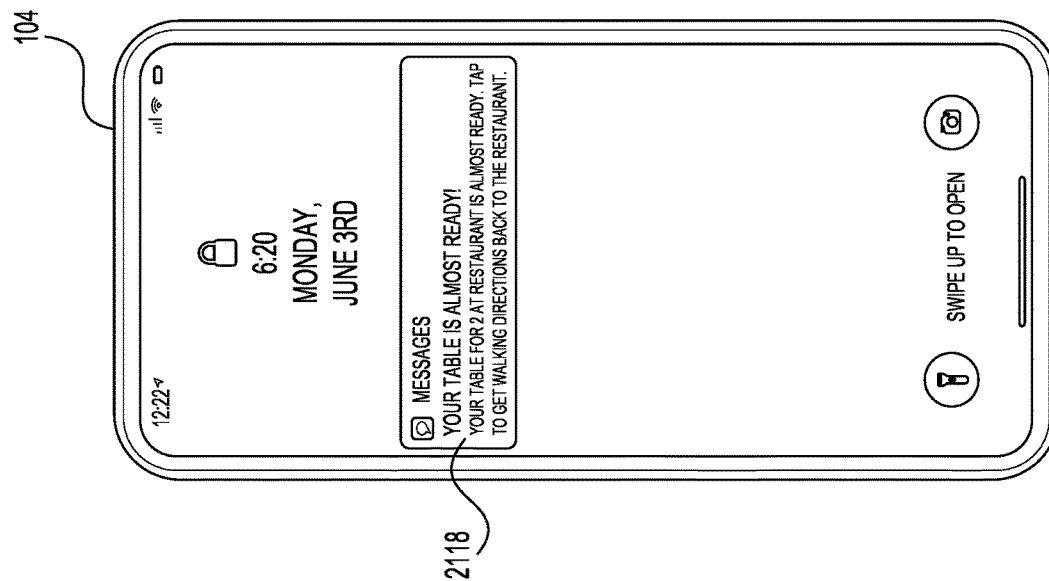
Figure 21L:
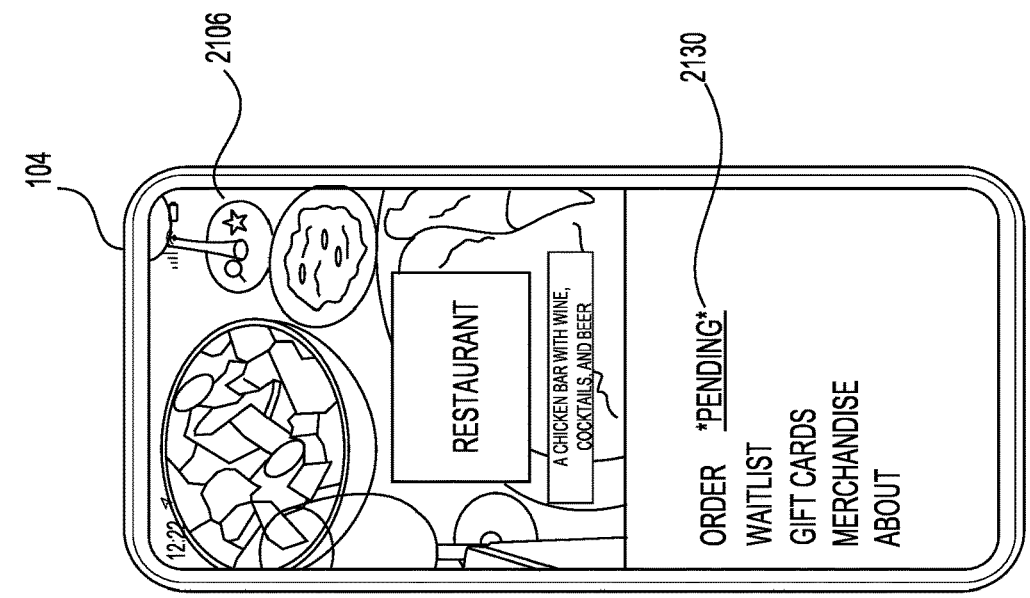

In at least one example, the service provider server(s) 102 and/or the local merchant computing device can send a notification (e.g., email, text message, push notification, etc.) to the user computing device 104, as illustrated in FIG. 21G. That is, in FIG. 21G, a text message 2118 is presented via a user interface of the user computing device 104. In at least one example, based at least in part on detecting an interaction with the text message, another application or instant application can be initialized to enable the user 106 to view the contents of the text message 2118. In at least one example, the text message 2118 can include an interactable element 2120. Based at least in part on detecting an interaction with the interactable element 2120, another instant application can be initialized. For instance, the interactable element 2120 can point to an instant application to enable the user 106 to perform another task (e.g., order a drink, order food, select a table, etc.).

In some examples, the notification can be sent based at least in part on context data. For example, the notification can be sent based at least in part on a location associated with the user computing device 104, a position of the user 106 on the waitlist, a length of time that the user 106 has been on the waitlist, or the like. In some examples, the notification can be sent based at least in part on an interaction between the user computing device 104 and another interactable element associated with the instant application.

Figure 21K:
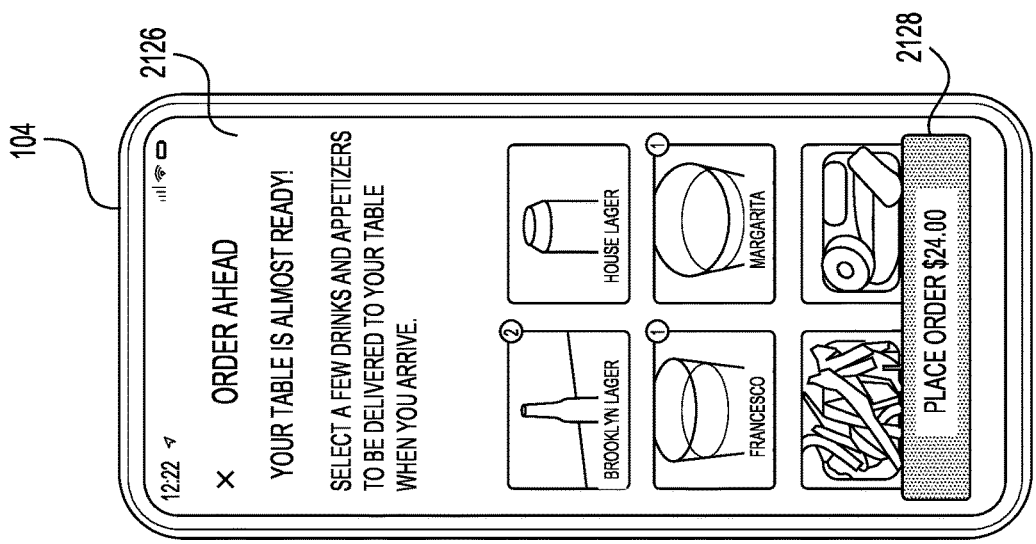
Figure 21J:
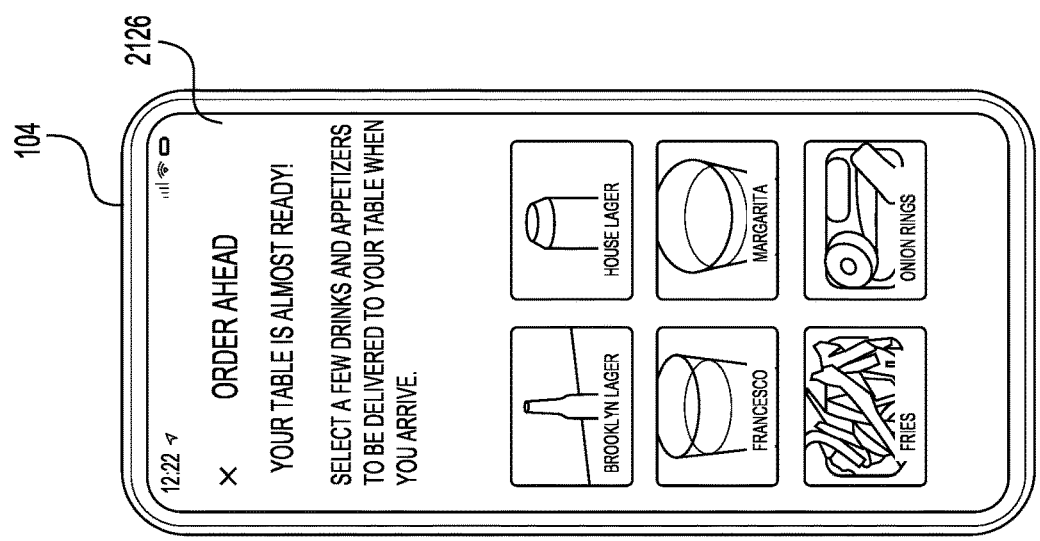

FIGS. 21I-21K illustrate example user interfaces to enable the user 106 to order an item from the merchant. In at least one example, another instant application can be initialized to enable the user 106 to perform another task. That is, based at least in part on detecting an interaction with the notification or the interactable element 2120 associated therewith, or based at least in part on receiving an indication of an interaction with another interactable element associated with the other instant application, the other instant application enabling ordering can be initialized. In some examples, the other instant application can be associated with the same application as the first instant application. In some examples, the other instant application can be associated with a different application. In some examples, if the applications are different, they can be associated with a same service provider. In some examples, if the applications are different, they can be associated with different service providers.

FIG. 21I illustrates an example user interface element 2122 that can be presented by the other instant application to enable the user 106 to place an order. In some examples, the user interface element 2122 can be presented as a pop-up, overlay, or the like. In some examples, a user interface, instead of a user interface element 2122, can be presented by the instant application. In at least one example, the user interface element 2122 can include a selectable element 2124 that, when selected, causes a menu to be presented via the instant application. FIGS. 21J and 21K illustrate an example of a user interface 2126 that can be presented by the instant application to enable the user 106 to place an order. In at least one example, the user 106 can interact with the user interface 2126 to add one or more items to an order. In some examples, the user interface 2126 can be updated to include an indication of which items have been ordered. In at least one example, the user interface 2126 can include a selectable element 2128, that when selected, can cause the instant application to submit a request to order the items to the service provider server(s) 102. In at least one example, the service provider server(s) 102 can receive the order and send the order to a merchant computing device, front-of-house computing device, back-of-house computing device, kitchen display system, and/or the like.

In at least one example, the interaction with the user interface 2126 presented via the other instant application can be provided to the instant application associated with the user interface 2106 and at least a portion of the interaction can be embedded in the instant application associated with the user interface 2106. As such, the user interface 2106 can present a user interface element 2130 that can represent at least a portion of the interaction between the user 106 and the other instant application (i.e., the ordering instant application).

In at least one example, techniques described with reference to FIGS. 21A-21L can be implemented in a retail or restaurant setting. For example, the interactable element 2100 can be presented, in a digital or analog fashion, as shown in FIG. 21A. In at least one example, the interactable element 2100 can have embedded therein device data, transaction data, merchant data, location, buyer data, etc., to allow the user 106 (e.g., a diner, shopper, buyer, etc.) to perform actions, such as make appointments, make reservations, obtain real-time waitlist data, shop at a retail location, adjust delivery options, request curb-side delivery, and so on. As described above with reference to FIGS. 21A-21L, the user 106 can cause an interaction between the user computing device 104 and the interactable element 2100 to join a waitlist, and at a later time, the user 106 can input orders to be delivered when they arrive at their table or are otherwise sat at a restaurant. In at least one example, using at least context data (e.g., from NFC and/or location-aware instant application, etc.), the application management component 114 can provide accurate and real-time data, and predictive alerts to users, such as the user 106, and also enable optimized order-ahead functionalities (e.g., via applications and/or instant applications as described herein). As shown in FIG. 21A, the user 106 can scan, read, or otherwise cause an interaction with the interactable element 2100 to activate the instant application without the need for actual download, to order food or order at a table. In FIG. 21C, embedded data can be presented via the user interface 2106. Such data can be relevant or contextual data (e.g., a merchant name). The user interface 2106, as described above, can enable the user 106 to perform a set of functionalities (e.g., "order" or "join waitlist") to allow the user 106 to interact with the instant application and perform specific actions. On interacting with the interactable element 2100, the user 106 can be presented with the user interface 2106 to provide input, say regarding waitlist, as shown in FIGS. 21D-21F. The data can be relayed along with an indication that it came through an instant application. The data obtained via the user interface 2106 can be used to access and/or track user profile, profiles similar to user profile, to further personalize the experience either before or when the user 106 is at the location of the merchant. In some examples, such personalization or customization can be associated with a download of a full application associated with the instant application, future instant application(s) surfaced to the user 106, and/or data presented via the full application and/or instant application(s).

The instant application described above, in at least one example, can track the user's data, such as location and how far the user 106 (e.g., the user computing device 104) is from the merchant location and/or merchant computing device of the merchant. This can allow a reservation component associated with the service provider server(s) 102 and/or local merchant server(s) to detect in real-time whether the user 106 will be able to make the appointment or reservation and if not, automatically modify their position on the waitlist (cancel if they have walked too far away, move up or down if the distance does not match time it takes to get back to the restaurant/merchant store). This kind of intelligence can also be used to surface custom recommendations to the user 106. For example, the service provider server(s) 102 can surface a recommendation to visit another merchant while the user 106 is on the waitlist—this other merchant, as an example, can be one that is in the same current location as the user 106, one with relatively manageable wait-time, or one that has some network/payment affiliation with the merchant, one that the user 106 usually visits (e.g., as determined by associated user data), etc. In some examples, as shown in FIG. 21H, the reservation component can send action items to allow the user 106 to interact with a second instant application, for example, to allow the user 106 to order drinks or appetizers such that they are ready when the user 106 arrives at the location of the merchant or is sat at their table. The timing of the notification sent to the user computing device 104 and/or the timing of when the order is prepared/ready can be dependent on context data, such as the location of the user 106 (e.g., user computing device 104) with respect to the merchant location.

As described herein, one instant application can be embedded within another instant application and can be triggered under certain conditions. In at least one example, a condition that can trigger a transition between instant applications can include a selection of an option from a user interface of a first instant application, a determination that a user 106 (e.g., user computing device 104) is within a threshold distance of the merchant location, etc. In at least one example, the user 106 can interact with the second instant application, as shown in FIGS. 21I-21K, to place an order. In some examples, to remit a payment, a same or a different instant application can be surfaced. In at least one example, as described above, when the user 106 orders items, such items can be ready when the user 106 arrives at the merchant location and/or is sat at their table. In some examples, the menu items presented via the user interface 2126 can be determined based at least in part on contextual data, retrieved based on past buyer history, or other user data. For example, the item(s) presented, the order of the items, or the like, can be personalized and/or customized for the user 106.

Figure 22J:
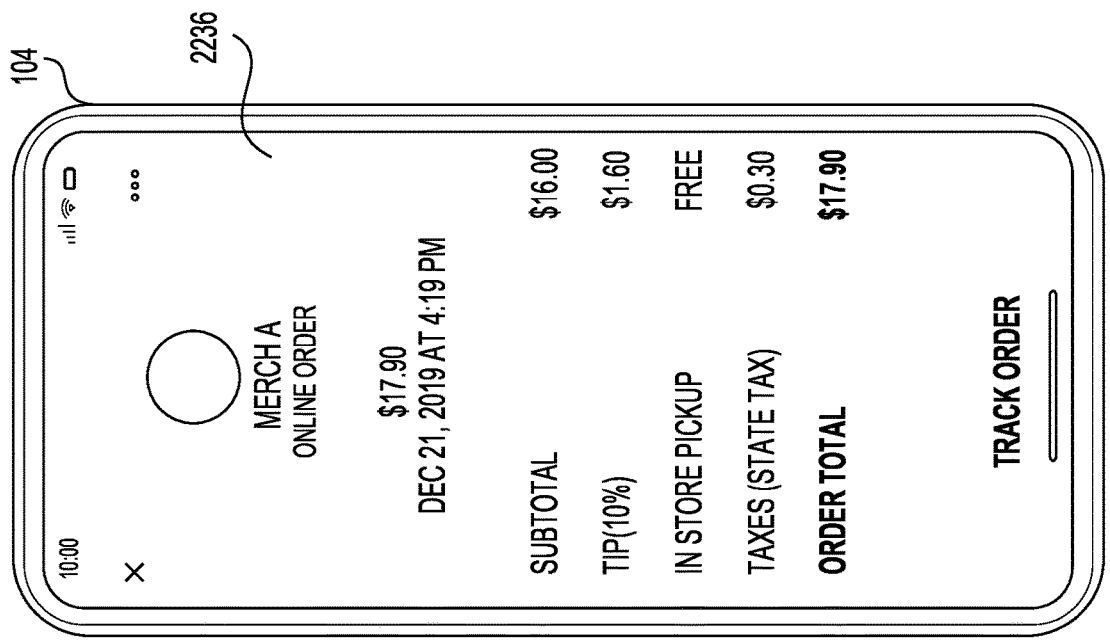

FIGS. 22A-22J illustrate an example process associated with ordering via an instant application. In an example, as described above, instant applications can be discoverable. In some examples, such discovery can be based on context data including but not limited to location of a user computing device 104 of a user 106. In at least one example, a user computing device can be determined to be located within a threshold distance (e.g., a geofence) of a merchant. Based at least in part on determining that the user computing device 104 is located within the threshold distance of the merchant, the application management component 114 can surface an instant application to the user computing device 104. In some examples, a user interface element 2200 associated with the instant application can be presented via the user computing device 104, as illustrated in FIG. 22A. In some examples, the user interface element 2200 can be presented as a pop-up, overlay, or the like. In some examples, a user interface, instead of a user interface element 2200, can be presented by the instant application. In some examples, a text message, email, push notification, or the like, associated with the instant application, can be received by the user computing device 104. In at least one example, the user 106 associated with the user computing device 104 can select a selectable element 2202 (e.g., "order now" or the like) to download an instant application associated with the selectable element 2202. In another example, the user computing device 104 can interact with an interactable element to cause the instant application to be downloaded on the user computing device 104.

In at least one example, a user computing device 104 can send an indication that the selectable element 2202 has been selected (or that another input has been detected) to the service provider server(s) 102. The application management component 114 can cause a part of an application (e.g., an instant application) to be downloaded to the user computing device 104 responsive to receiving the indication. Accordingly, the user 106 can access functionality for performing a task (e.g., placing an order), in some examples, prior to arriving at the physical location of the merchant. In an example, a user interface element 2204 can be presented by the instant application to enable the user 106 to place an order, as illustrated in FIG. 22B. In some examples, the user interface element 2204 can be presented as a pop-up, overlay, or the like. In some examples, a user interface, instead of a user interface element 2204, can be presented by the instant application. In at least one example, responsive to detecting an input associated with the instant application (e.g., selection of a selectable element 2206 associated with the user interface element 2204), the instant application can present a user interface 2208. The user interface 2208 can present data associated with a menu from which the user 106 can browse and place an order, as illustrated in FIG. 22C. In some examples, the user interface 2208 can include additional details associated with an order, such as a pick-up location, pick-up time, or the like. In some examples, recommendations can be presented to the user 106 and/or the user 106 can request assistance via the user interface 2208.

In at least one example, the user 106 can interact with the user interface 2208 to select item(s) to add to an order and, in some examples, can pay for their item(s) via the instant application. FIG. 22D illustrates an example user interface 2210 that can be presented by the instant application to enable the user 106 to pay for item(s) ordered via the instant application. In at least one example, the user interface 2210 can show a payment option as a peer-to-peer payment application (if the peer-to-peer payment application is downloaded on the user computing device 104), another previously downloaded payment application, or another instant application corresponding to payment functionality either related to the current instant application or one that can be nested within the current instant application. That is, in some examples, the user interface 2210 can present an indication of another application, or part thereof, that is embedded in the current instant application. In some examples, an order summary can be presented via a user interface 2212 associated with the instant application, as illustrated in FIG. 22E, which can include user interface elements 2214-2220 to enable the user 106 to continue shopping (e.g., place another order), view loyalty, and/or other order details (e.g., pick-up details, order date and time, order number, etc.).

FIG. 22F illustrates another user interface 2222 that can be presented by the instant application and/or an application, or part thereof, embedded in the instant application. In at least one example, the user interface 2222 can present one or more user interface elements 2224, 2226 associated with an offer for the merchant with whom the order is associated and/or another merchant. For instance, the user interface 2222 can present an offer for another merchant associated with the service provider for use by the user 106. In some examples, the offer can be associated with the same merchant where an order was recently placed. In some examples, the offer can be associated with another, different merchant associated with the service provider. In some examples, the merchant component 112 and/or the buyer component 113 can select offers for merchants that are within a threshold distance of a location of the user computing device 104. In some examples, the offers can be for a discount or other incentive. In some examples, the offers can be time or location restricted. In some examples, the offers can be presented via an embedded application or part thereof at the time the order is place or at a later time. In some examples, the offers can be available via the full application at a later time.

FIG. 22G illustrates an example user interface 2228 associated with an instant application that can include a selectable element, that when selected, causes a full application to be downloaded on the user computing device 104. That is, another application, such as a peer-to-peer payment application, can be recommended to be downloaded (e.g., to remit payment for the order that is in progress). In some examples, based at least in part on detecting a selection of the selectable element, the instant application can send an indication of such to the service provider server(s) 102 and the application management component 114 can cause the full application to be downloaded on the user computing device 104. In at least one example, after the other application (e.g., the peer-to-peer payment application) is downloaded on the user computing device 104, when the user 106 accesses the instant application and/or merchant application from which the user 106 can place an order, data from the peer-to-peer payment application can be downloaded and/or embedded in the user interface 2210 (e.g., as a payment option).

In an example, the user 106 can pay for the order initiated in the instant application (e.g., associated with the merchant) through the peer-to-peer payment application, which can be previously embedded in the instant application or downloaded in association with the order. In at least one example, after using the peer-to-peer payment application for payment of the order, the user 106 can interact with a selectable element (e.g., selectable element 2216) associated with the user interface 2212, for example, to open an instant application or a full application corresponding to the peer-to-peer payment application. In some examples, the selectable element, which can be associated with loyalty, fulfillment, order status, or the like, can point to an embedded instant application and/or application. In some examples, based at least in part on detecting an interaction with a selectable element associated with the user interface 2212, the instant application can initialize another application and/or instant application. In an example, the other application or instant application can be associated with the peer-to-peer payment application.

In an example, the peer-to-peer payment application, or part thereof, can present a user interface 2230 that can include user interface elements representative of interactions between the user 106 and the peer-to-peer payment application, as illustrated in FIG. 22H. In some examples, such an "activity user interface" can list at least a portion of a transaction history using the peer-to-peer payment application, or relevant transactions performed using the peer-to-peer payment application or a payment instrument associated with the payment option. In some examples, the user interface 2230 can present user interface elements to enable the user 106 to perform additional marketplace actions, such as view order status, cancel order, etc. (e.g., instead of the application from where the order originated). In some examples, individual of the transactions presented in the transaction history and/or relevant transactions performed using the peer-to-peer payment application (e.g., as illustrated in the user interface FIG. 22H), can be associated with selectable elements such that when selected, the peer-to-peer payment application, or part thereof, can cause an instant application associated with the corresponding merchant to be surfaced via the user computing device 104. In such an example, individual of the selectable elements can be associated with embedded applications, or parts thereof, deep links, or the like, which point to the other applications, or parts thereof. For instance, if the user 106 selects a transaction with Merchant A (e.g., by selection of a selectable element 2232 associated with the transaction), the peer-to-peer payment application can detect the input, send an indication of the input to the service provider server(s) 102, which can cause an instant application associated with the merchant (e.g., Merchant A) to be surfaced via the user computing device 104, as illustrated by the example user interface in FIG. 22I. The user 106 can then modify the transaction and/or place an order via the instant application associated with the merchant via an interaction with the user interface 2234 shown in FIG. 22I. That is, in at least one example, the user 106 can initiate a new order or modify an existing order through the user interface 2230, for example, by selecting a selectable element 2232 associated with a previous transaction. Based at least in part on detecting a selection of the selectable element 2232, the peer-to-peer payment application, or a part thereof, can transition to an application, or part thereof, associated with the merchant. The application, or part thereof, associated with the merchant can present a user interface 2234 from which the user 106 can view details of previous transaction(s) with the associated merchant, start a new order, redeem rewards, or the like, as illustrated in FIG. 22I.

FIG. 22J illustrates an example user interface 2236 that can be presented by the application, or part thereof, which can confirm the order and provide order details. In some examples, the user 106 can track the order via an interaction with the user interface 2236.

In some examples, the peer-to-peer payment application, or part thereof, can enable a user to modify a transaction and/or place a new order with a merchant without transitioning to another application, or part thereof. In such examples, functionality of the merchant can be embedded or otherwise integrated in the peer-to-peer payment application.

Figure 23:
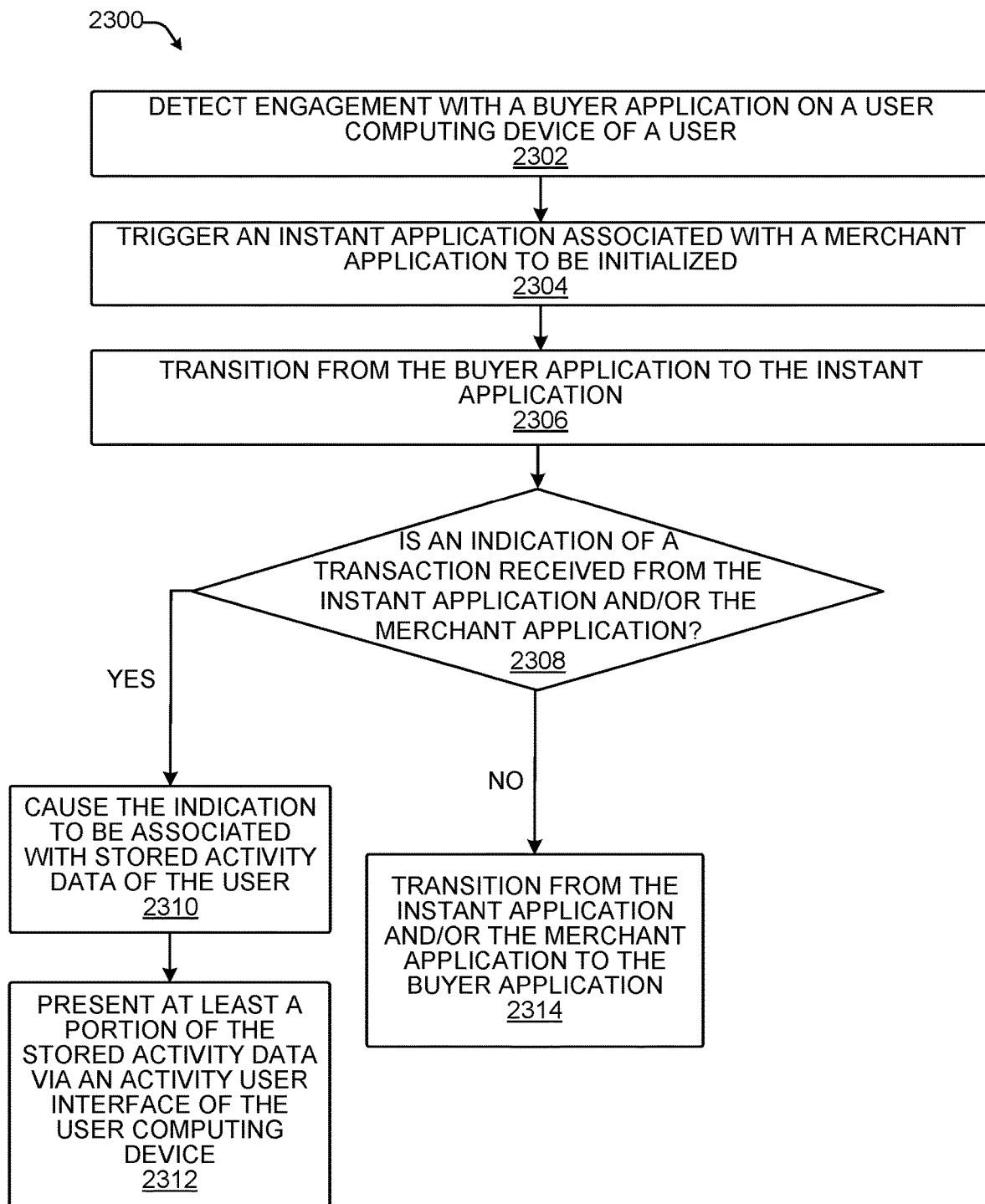
FIG. 23 illustrates an example process for accessing instant application data via an application within which the instant application is embedded or otherwise associated.

FIG. 23 illustrates an example process 2300 for accessing instant application data via an application within which the instant application is embedded or otherwise associated.

At operation 2302, a buyer application can detect engagement from within the buyer application. In at least one example, the buyer application can be associated with a set of functionalities that enable the user 106 to remit payment, redeem loyalty, redeem a coupon, input a gratuity, provide feedback, or the like. In at least one example, the buyer application can be a peer-to-peer payment application that can facilitate peer-to-peer payments between users of a peer-to-peer platform. In some examples, the buyer application can be a mobile payment application, a wallet application, or the like. In some examples, the buyer application can be associated with one or more instant applications. In at least one example, the buyer application can be associated with the service provider such that it can communicate with the buyer component 113 on the service provider server(s) 102 to perform operations as described herein.

In at least one example, the buyer application can present a user interface via the user computing device 104. The user interface can present data associated with the buyer application and can enable the user 106 to engage with the buyer application. In some examples, the user interface can present one or more options for engaging with the buyer application. In at least one example, the buyer application can detect engagement with an option presented via the buyer application. In some examples, the user interface can be a home page or main page that includes one or more options associated with one or more merchants. For example, the home page or main page can be a marketplace, can offer coupons, rewards, or incentives from the one or more merchants, or the like. In some examples, the user interface can be associated with an activity user interface that includes one or more options associated with one or more interactions or transactions of the user 106. In some examples, each of the options can correspond to an interaction or transaction and can be associated with parties to the interaction or the transaction. For instance, if an option on the activity user interface is associated with a previous transaction between the user 106 and a merchant, the option can be associated with the merchant. In some examples, each of the options can be associated with an embedded application, or part thereof (e.g., an instant application), associated with the merchant. That is, in some examples, individual of the options can point to, via an embedding, deep link, or the like, a merchant application, or part thereof. Additional details are provided below.

At operation 2304, the buyer application can trigger an instant application associated with a merchant application to be initialized. In at least one example, the merchant application can be associated with a set of functionalities to enable merchant-facing functionality such a virtual cart building functionality, a browsing functionality (e.g., of an online store of a merchant), a waitlist functionality that enables the user 106 to add themselves to a waitlist of a restaurant, movie, attraction, etc., an ordering functionality that allows the user 106 to place an order for an item. In some examples, the instant application can be associated with a different particular, discrete functionality, which is part of the set of functionalities associated with the merchant application. As described above, in at least one example, the instant application and merchant application can be associated with a same service provider as the buyer application or a different service provider than the buyer application (i.e., a third-party service provider). In some examples, if the instant application and/or merchant application are associated with a third-party service provider, the application management component 114 can exchange data with the relevant third-party server(s) 108 to facilitate operations described herein.

In at least one example, based at least in part on detecting engagement with the buyer application, the buyer application can trigger the instant application to be initialized. In some examples, such engagement can be with an option from within the buyer application and the option can be associated with an embedding, a deep link, or the like. In at least one example, detecting engagement with the option the buyer application can trigger initialization of the instant application. In some examples, the instant application can be initialized without additional input from the user 106. In some examples, the buyer application can present a user interface element via the user interface prompting the user 106 to provide an input to initialize the instant application.

At operation 2306, the buyer application can transition to the instant application. In at least one example, the buyer application can transition to the instant application based at least in part on initialization of the instant application. In at least one example, a user interface associated with the instant application can be presented via the user computing device 104. The user interface can present data associated with the instant application and can enable the user 106 to engage with the instant application. In some examples, the user interface can present one or more options for engaging with the instant application.

In an alternative example, functionality associated with the merchant application can be accessed from within the buyer application. That is, the buyer application can have functionality associated with the merchant application embedded therein such that the user can access such functionality without leaving the buyer application.

At operation 2308, the instant application can determine whether an indication of a transaction is received from the instant application and/or the merchant application. As described above, the instant application can be associated with a merchant application. In some examples, the instant application and/or the merchant application (e.g., if downloaded via the instant application) can enable the user 106 to build a virtual cart and/or otherwise participate in a transaction with the merchant associated with the merchant application. In at least one example, the instant application and/or merchant application can facilitate one or more steps of a payment flow to process payment for the transaction. In such an example, the instant application and/or the merchant application can send an indication of the transaction and, in some examples, transaction data associated with the transaction. In at least one example, the merchant application, and thus the instant application, can communicate with the buyer application and/or the service provider server(s) 102 via an interface, such as an API or the like. In some examples, the merchant application, and thus the instant application, can have buyer application functionality embedded therein (e.g., via an API or other integration mechanism) such that the merchant application processed payment for the transaction via the buyer application functionality. In at least one example, the indication can indicate such.

In some examples, the instant application and/or the merchant application can be integrated with the buyer application for payment processing. That is, in some examples, the instant application and/or the merchant application can allow users to use the buyer application to remit payment for transactions conducted using the instant application and/or the merchant application. In at least one example, the instant application and/or the merchant application can send an indication of the transaction to the buyer application with a request to process payment for the transaction via the buyer application. In at least one example, the buyer application can send one or more communications to the service provider server(s) 102 (e.g., the buyer component 113) to process payment for the transaction. In such an example, the buyer application and/or the buyer component 113 can send an indication of whether the payment was authorized or not to the instant application or the merchant application. In some examples, the integrated buyer application functionality can cause the indication of the transaction and a request to process payment for the transaction to be sent to the service provider server(s) 102 prior to, or instead of, sending the request to the buyer application. In such an example, the buyer component 113 can process payment for the transaction and send an indication of such to the buyer application and the instant application and/or merchant application.

As described above, payment for the transaction can be performed via one or more techniques. In some examples, buyer application functionality can be integrated in the instant application and/or merchant application. That is, there is no need to transition from the instant application and/or the merchant application to the buyer application. In such an example, buyer application functionality can be deep linked and/or embedded into the instant application and/or the merchant application and/or a payment proxy can auto-populate into a payment field for processing payment for the transaction using buyer application functionality. In some examples, the merchant application can transition (back) to the buyer application for the buyer application to process payment for the transaction.

At operation 2310, the buyer application and/or the service provider server(s) 102 can cause the indication (of the transaction) to be associated with stored activity of the user 106. In at least one example, the service provider server(s) 102 can store user data 122 in the data store(s) 118. As described above, in some examples, a user profile and/or a buyer profile can store indications of previous interactions and/or transactions with one or more merchants. In an example, the buyer application can send the indication of the transaction, received from the instant application and/or the merchant application, to the service provider server(s) 102 (e.g., for payment processing or otherwise) and the buyer component 113 can associate the indication with a user profile and/or buyer profile associated with the user 106. In some examples, the service provider server(s) 102 can receive the indication (e.g., prior to the buyer application receiving the indication), associate the indication with the stored activity of the user 106, and send the indication to the buyer application. In such an example, the buyer application may not cause the indication to be associated with the stored activity of the user 106.

At operation 2312, the buyer application can present at least a portion of the stored activity data via an activity user interface of the user computing device 104. In at least one example, the instant application and/or the merchant application can transition back to the buyer application. In some examples, the user 106 can return to the buyer application after completing the transaction with the instant application and/or merchant application. In at least one example, when the buyer application is subsequently accessed, the buyer application can present at least a portion of the stored activity data—which can include transaction data associated with the transaction between the merchant associated with the instant application and/or merchant application—via a user interface. That is, in at least one example, interaction(s) with the instant application and/or the merchant application can be embedded into the buyer application and presented via a user interface presented by the buyer application. In at least one example, the buyer component 113 can send the portion of the stored activity data to be presented via the user interface to the user computing device 104 for such presentation. In at least one example, the activity user interface can present one or more transactions conducted by the user 106 using the buyer application and/or a payment instrument associated therewith. In some examples, individual of the transactions, when presented via the user interface, can be associated with tracking data, fulfillment data, return data, and/or the like.

As described above, in at least one example, embedding application(s), part(s) thereof, and/or interaction(s) therewith into other application(s), part(s) thereof, and/or interaction(s) therewith (i.e., "nesting") can ensure that either (a) the formatting of the embedded application(s), part(s) thereof, and/or interaction(s) therewith, as presented via a user interface, is based at least in part on the originating application(s), part(s) thereof, and/or interaction(s) therewith or (b) that the formatting of the embedded application(s), part(s) thereof, and/or interaction(s) therewith, as presented via a user interface, is different than the originating application(s), part(s) thereof, and/or interaction(s) therewith.

At operation 2314, the instant application and/or the merchant application can transition back to the buyer application. In at least one example, the instant application and/or the merchant application can transition back to the buyer application if no indication is received after a period of time, the user 106 requests to return to the buyer application, and/or the like.

In some examples, the buyer application can transition to the merchant application (e.g., instead of the instant application). In such examples, interaction(s) with the merchant application can be embedded into the buyer application and presented via a user interface presented via the buyer application. Further, in some examples, a buyer application can transition to the merchant application. In such examples, interaction(s) with the merchant application can be embedded into the buyer application and presented via a user interface presented via the buyer application. That is, the process 2300 described above with reference to FIG. 23 can be applicable for applications and/or instant applications alike.

FIGS. 24A-D illustrate an example for implementing the process 2300 described above. FIG. 24A illustrates an example user interface 2400 that can be presented via the user computing device 104. In at least one example, the user interface 2400 can be presented by a buyer application. In at least one example, the buyer application can be associated with a set of functionalities that enable the user 106 to remit payment, redeem loyalty, redeem a coupon, input a gratuity, provide feedback, or the like. In at least one example, the buyer application can be a peer-to-peer payment application that can facilitate peer-to-peer payments between users of a peer-to-peer platform. In some examples, the buyer application can be a mobile payment application, a wallet application, or the like.

In some examples, the user interface 2400 can be associated with an activity user interface that includes one or more options associated with one or more interactions or transactions of the user 106. In some examples, each of the options can correspond to an interaction or transaction and can be associated with parties to the interaction or the transaction. For instance, if an option on the activity user interface is associated with a previous transaction between the user 106 and a merchant, the option can be associated with the merchant. In an example, each of the options can be associated with a selectable element 2402(A)-2402(N). In some examples, based at least in part on detecting engagement with the user interface 2400, such as via selection of a selectable element of the selectable elements 2402(A)-2402(N), the buyer application can trigger the initialization of an associated instant application and/or application. In some examples, each of the options can be associated with an embedded application, or part thereof (e.g., an instant application), associated with a merchant with which the corresponding transaction is associated. That is, in some examples, individual of the options can point to, via an embedding, deep link, or the like, a merchant application, or part thereof.

FIG. 24B illustrates an example of a user interface 2404 that can be presented based at least in part on the buyer application detecting selection of the selectable element 2402(B), which is associated with Merchant B. The user interface 2404 can be presented by a merchant application associated with Merchant B or an instant application associated therewith. That is, the buyer application can detect selection of the selectable element 2402(B) and transition to the merchant application associated with Merchant B (or an instant application associated therewith). The merchant application associated with Merchant B can present the user interface 2404.

In at least one example, the user interface 2404 can enable the user 106 to start a new order, for example, by interacting with a selectable element 2406 on the user interface 2404. In at least one example, the user 106 can interact with the user interface 2404, which can correspond to an online store of the merchant, to add one or more items to a virtual cart. FIG. 24C illustrates an example of a user interface 2408 that can be presented by the merchant application, or a part thereof, to enable the user 106 to review the item(s) associated with the order. As shown, item(s) associated with the order can be presented as user interface element(s) associated with the user interface 2408. In at least one example, the user interface 2408 can include a selectable element 2410 that can enable the user 106 to remit payment. As described above, in some examples, based at least in part on detecting selection of the selectable element 2410 the merchant application and/or part thereof can process payment for the transaction and send an indication of the transaction to the buyer application. In some examples, the merchant application and/or part thereof can process payment using payment processing functionality associated with the buyer application that is integrated in the merchant application. In some examples, the merchant application and/or part thereof can send an indication of the transaction with a request to process payment for the transaction.

FIG. 24D illustrates the user interface 2400 from FIG. 24A. As described above, based at least in part on receiving the indication of the transaction, the buyer application can cause the indication (of the transaction) to be associated with stored activity of the user 106. In at least one example, the service provider server(s) 102 can store user data 122 in the data store(s) 118. As described above, in some examples, a user profile and/or a buyer profile can store indications of previous interactions and/or transactions with one or more merchants. In an example, the buyer application can send the indication of the transaction, received from the instant application and/or the merchant application, to the service provider server(s) 102 (e.g., for payment processing or otherwise) and the buyer component 113 can associate the indication with a user profile and/or buyer profile associated with the user 106. In some examples, the service provider server(s) 102 can receive the indication (e.g., prior to the buyer application receiving the indication), associate the indication with the stored activity of the user 106, and send the indication to the buyer application. In such an example, the buyer application may not cause the indication to be associated with the stored activity of the user 106.

In at least one example, as described above, the buyer application can present at least a portion of the stored activity data via an activity user interface of the user computing device 104. The user interface 2400 can be the activity user interface. In at least one examples, when the buyer application is subsequently accessed (e.g., after the user 106 has completed the transaction with the merchant), the buyer application can present at least a portion of the stored activity data—which can include transaction data associated with the transaction between the merchant associated with the instant application and/or merchant application—via the user interface 2400. That is, in at least one example, interaction(s) with the instant application and/or the merchant application can be embedded into the buyer application and presented via the user interface 2400 presented by the buyer application. The list of transactions has been updated to include a new transaction with Merchant B. The selectable element 2412 can be associated with the new transaction with Merchant B. In some examples, transaction details associated with the transactions can be presented via the user interface 2400. In at least one example, transaction details can be associated with selectable elements such that when selected, the buyer application can present the transaction data to the user 106 via the user interface 2400 (e.g., a pop-up, overlay, or the like) or via another user interface.

In some examples, the user 106 can interact with the user interface 2400 to access embedded applications or parts thereof by interacting with other selectable elements associated with the user interface 2400. For example, in some examples, one or more merchants with whom the user 106 has previously interacted with, the user 106 has most recently interacted with, have been recommended for the user 106, or the like can be presented via one or more selectable elements 2414(A)-2414(N).

Figure 25:
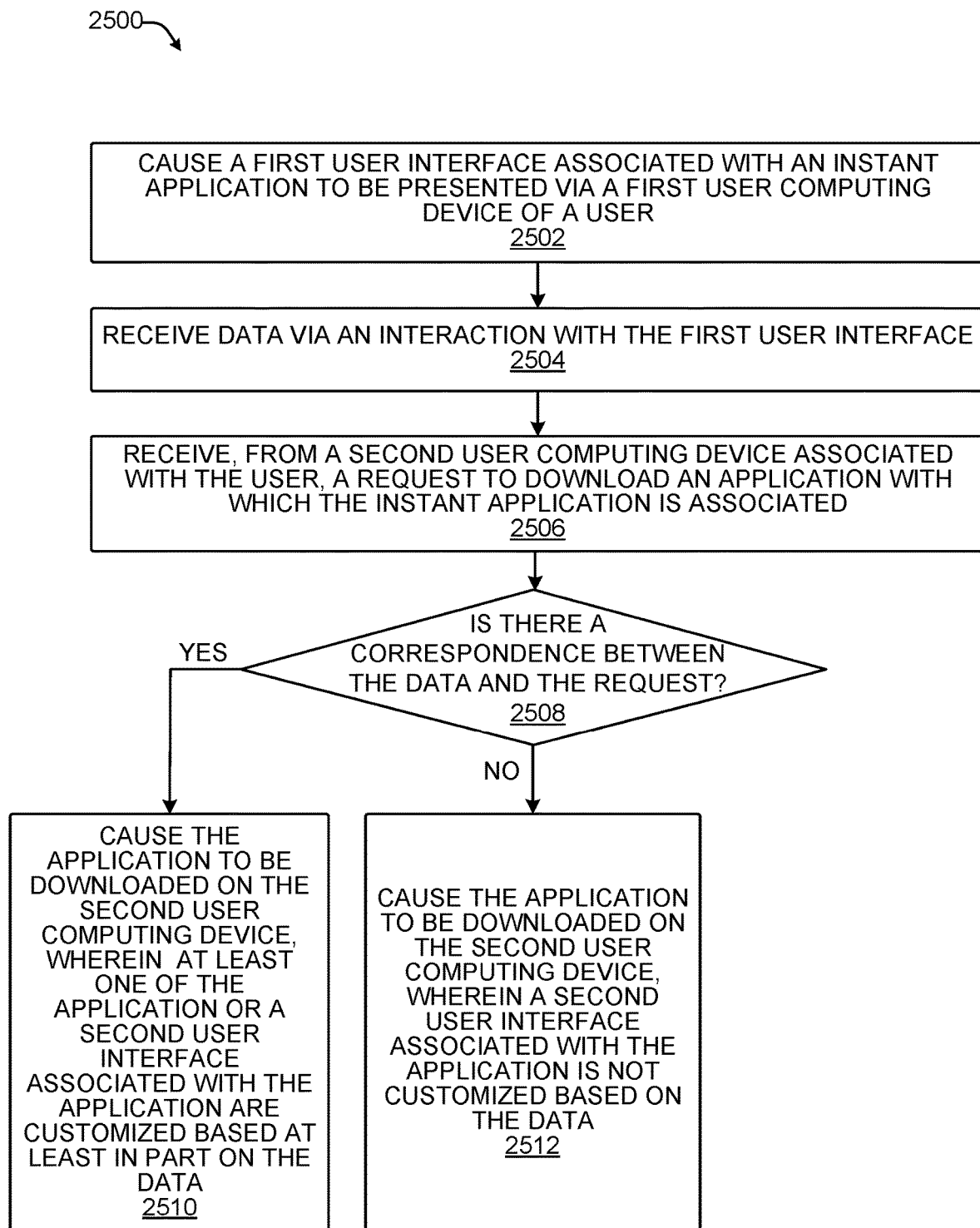
FIG. 25 illustrates an example process for causing data input via an interaction with a user interface presented via an instant application on a computing device of a user to be presented via a user interface associated with a subsequently downloaded application on another computing device of the user.

FIG. 25 illustrates an example process 2500 for causing data input via an interaction with a user interface presented via an instant application on a first user computing device of a user to be presented via a user interface associated with a subsequently downloaded application on a second user computing device of the user.

At operation 2502, the application management component 114 can cause a first user interface associated with an instant application to be presented via a first user computing device of a user 106. In at least one example, an instant application can be downloaded, or otherwise surfaced, on a first user computing device of a user. In some examples, the instant application can be downloaded, or otherwise surfaced, based at least in part on context data. That is, in at least one example, the application management component 114 can determine context data associated with the first user computing device and can cause the instant application (and, thus the first user interface) to be presented based at least in part on the context data.

In some examples, the instant application can be downloaded, or otherwise surfaced, in response to an indication of an interaction between the first user computing device and an interactable element associated with the instant application. In some examples, the interactable element can be affixed to, or otherwise associated with, physical objects (e.g., a sticker, panel, piece of paper, physical item, etc.). In some examples, the interactable element can be presented via an electronic device (e.g., a buyer-facing display of a point-of-sale device, a user computing device, a kiosk, etc.). In some examples, the interactable element can be associated with a physical mailer, a push notification, an email, a text message, or the like. In some examples, an indication of an interaction between the first user computing device and the interactable element can be associated with an identifier, which can be encoded in the interactable element and/or otherwise associated therewith. In some examples, an indication of an interaction between the first user computing device and the interactable element can be associated with identification data such as an account number of the user 106, a physical address of the user 106, a telephone number of the user 106, an email address of the user 106, and/or the like. In some examples, such identification information can be encoded in the interactable element and/or associated therewith.

As described above, the instant application can be associated with a particular, discrete functionality, which can be part of a set of functionalities associated with an application of which the instant application is a part. That is, the application can be associated with a set of functionalities that is larger than the particular, discrete functionality of the instant application. The instant application can present a first user interface via the first user computing device.

At operation 2504, the application management component 114 can receive data via an interaction with the first user interface. In at least one example, the user 106 can interact with the user interface to provide an input. Data associated with such an input can be sent to the service provider server(s) 102. In some examples, such data can be a name and password. In some examples, such data can be payment data. In some examples, such data can be an address (e.g., for delivery). In some examples, additional or alternative data can be input via the interaction. In some examples, such data can be associated with an identifier and/or identification data. In some examples, the identification data can be received during the interaction.

At operation 2506, the application management component 114 can receive, from a second user computing device associated with the user 106, a request to download an application with which the instant application is associated. In an example, the user 106 can access the instant application on their mobile computing device but may desire to download the associated application via their tablet computing device. In another example, the user 106 can access the instant application on their tablet computing device but may desire to download the associated application on a merchant computing device. In at least one example, the second user computing device can send a request to download the application to the service provider server(s) 102. In some examples, the request to download can be received in association with an indication of an interaction between the second user computing device and an interactable element presented via the first user interface. In some examples, the request can be associated with an identifier and/or identification data.

At operation 2508, the application management component 114 can determine whether there is a correspondence between the data and the request. In some examples, the application management component 114 can analyze data received via the interaction and/or the request to determine whether there is a correspondence between the data and the request. That is, the application management component 114 can analyze the data and/or the request to determine if there is a correspondence between the first user computing device and the second user computing device.

In some examples, the data and the request can be associated with identifiers. For example, the interactable element can be associated with an identifier. That is, an identifier can be embedded in the interactable element. In some examples, the mechanism throughout which the second request is received can be associated with the same identifier. For example, in some examples, the user 106 can cause an interaction between the same interactable element and the second user computing device. In some examples, the instant application can provide the identifier and/or another interactable element encoded with the identifier that can trigger the request for the application by the second user computing device. The application management component 114 can determine whether a first identifier associated with the data and a second identifier associated with the request are the same or otherwise correspond, the application management component 114 can determine a correspondence between the data and the request, and thus the first user computing device and the second user computing device.

In some examples, the data and the request can be associated with identification data (e.g., an account number, a physical address, a telephone number, an email address, a device identifier, or the like). In some examples, at least some identification data can be known by the application management component 114 prior to receiving the data and/or the request. In some examples, at least some of the identification data can be encoded in the interactable element. In some examples, the interactable element can be mapped to, or otherwise associated with at least some identification data. In some examples, identification data can be provided via the first user interface. In some examples, identification data can be provided in association with the request. In some examples, the application management component 114 can determine whether first identification data associated with the data and second identification data associated with the request is associated with a same user (e.g., user profile). Based at least in part on determining that the first and second identification data are associated with the same user, the application management component 114 can determine a correspondence between the data and the request, and thus the first user computing device and the second user computing device.

In some examples, location data associated with the interaction and location data associated with the request can be received by the application management component 114. That is, in some examples, the data received via the interaction with the first user interface can be associated with first location data and the request can be associated with second location data. The application management component 114 can determine whether the first location data and the second location data correspond to a same location and/or are within a threshold distance of one another. Based at least in part on determining that the first location data and the second location data correspond to a same location and/or are within a threshold distance of one another, the application management component 114 can determine a correspondence between the data and the request, and thus the first user computing device and the second user computing device.

In at least one example, based at least in part on receiving the request to download the application and determining there is a correspondence between the data and the request (and thus the first user computing device and the second user computing device), the application management component 114 can store session data of a session of the instant application. In some examples, the session data can be associated with the data received via the interaction with the first user interface at operation 2504. In at least one example, the session data can be used to customize the application and/or data presented via a user interface associated with the application, that can be presented via the second user computing device.

The application management component 114 can receive the request and can cause the application to be downloaded on the second user computing device, as illustrated at operation 2508.

At operation 2510, the application management component 114 can cause the application to be downloaded on the second user computing device, wherein at least one of the application or a second user interface associated with the application is customized based at least in part on the data. In at least one example, based at least in part on determining a correspondence between the data and the request (i.e., "yes" at operation 2508), the application management component 114 can customize and/or personalize at least one of the application or the second user interface with data received via the interaction with the first user interface. In some examples, as described above, session data can be associated with the application and can be presented via the second user interface and/or used to customize and/or personalize data presented via the second user interface. That is, in at least one example, session data can be preserved from the first user computing device and transferred to the second user computing device, while the application and/or the user interface associated therewith is customized and/or personalized for the second user computing device.

In some examples, the first user computing device and the second user computing device can be associated with different device characteristics. In some examples, the second user computing device can present a user interface that is configured or otherwise presented based at least in part on the device characteristic(s) of the second user computing device. For example, the second user computing device can be associated with a different display, different display ratio, different orientation, or the like than the first user computing device. In such an example, the second user interface can be presented at least in part on the second user computing device characteristic(s), which may cause the second user interface to appear different than the first user interface.

At operation 2514, the application management component 114 can cause the application to be downloaded on the second user computing device, wherein a second user interface associated with the application is not customized based on the data. In at least one example, if no correspondence is determined between the data received via the interaction and the request, the application management component 114 can cause the application to be downloaded on the second user computing device and can cause a user interface to be presented via the application, but the user interface may not be customized and/or personalized for the user 106.

As described below, in some examples, an instant application can be associated with a payment functionality, wherein the application associated therewith is associated with a payment processing service. In some examples, an instant application can be associated with a demonstration of a service and the application associated therewith can be associated with a full-scale offering of the service. Additional details are provided below.

Figure 26A:
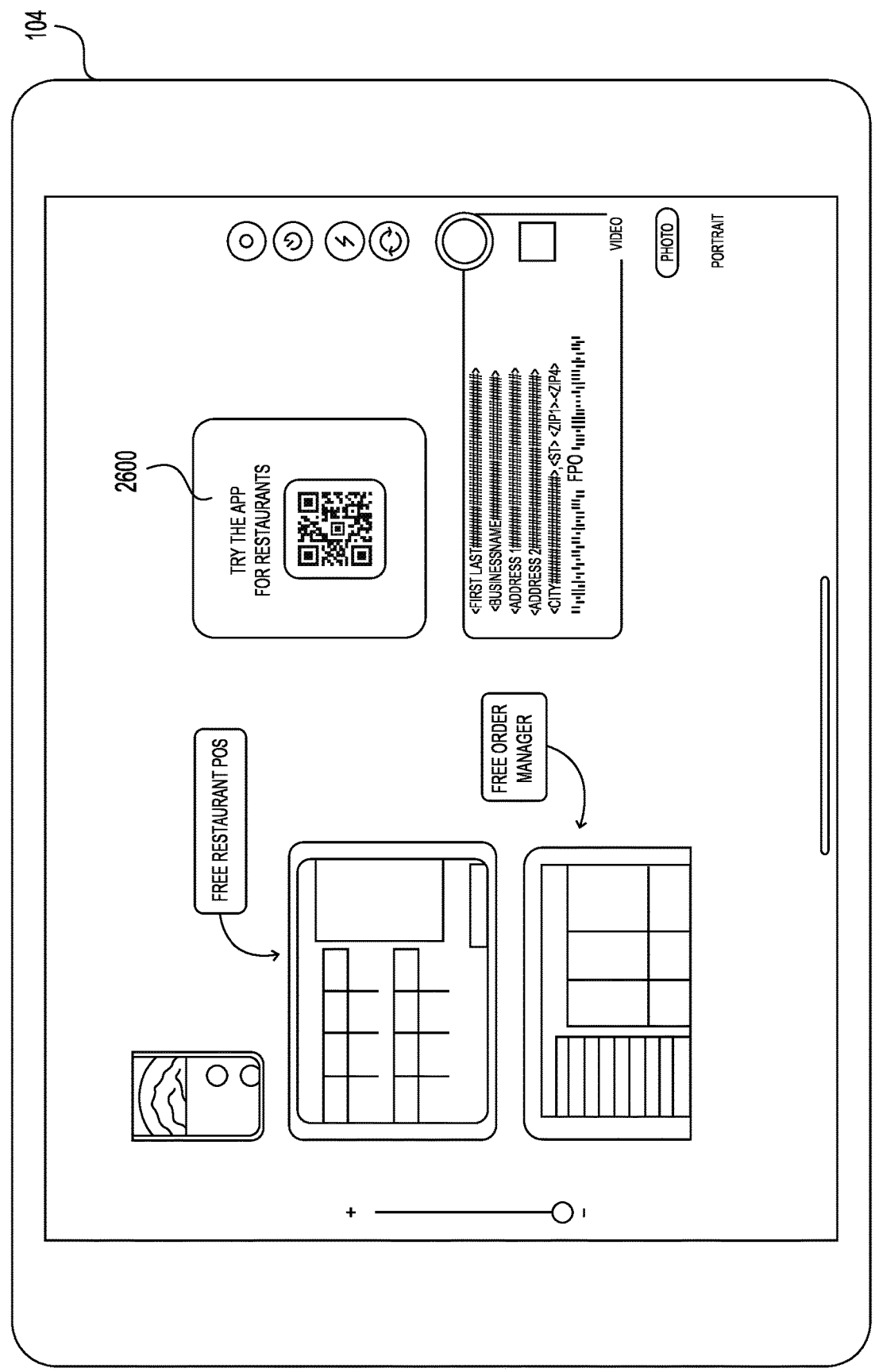
FIGS. 26A-26D illustrate an example of creating a mock experience for a user.
Figure 26B:
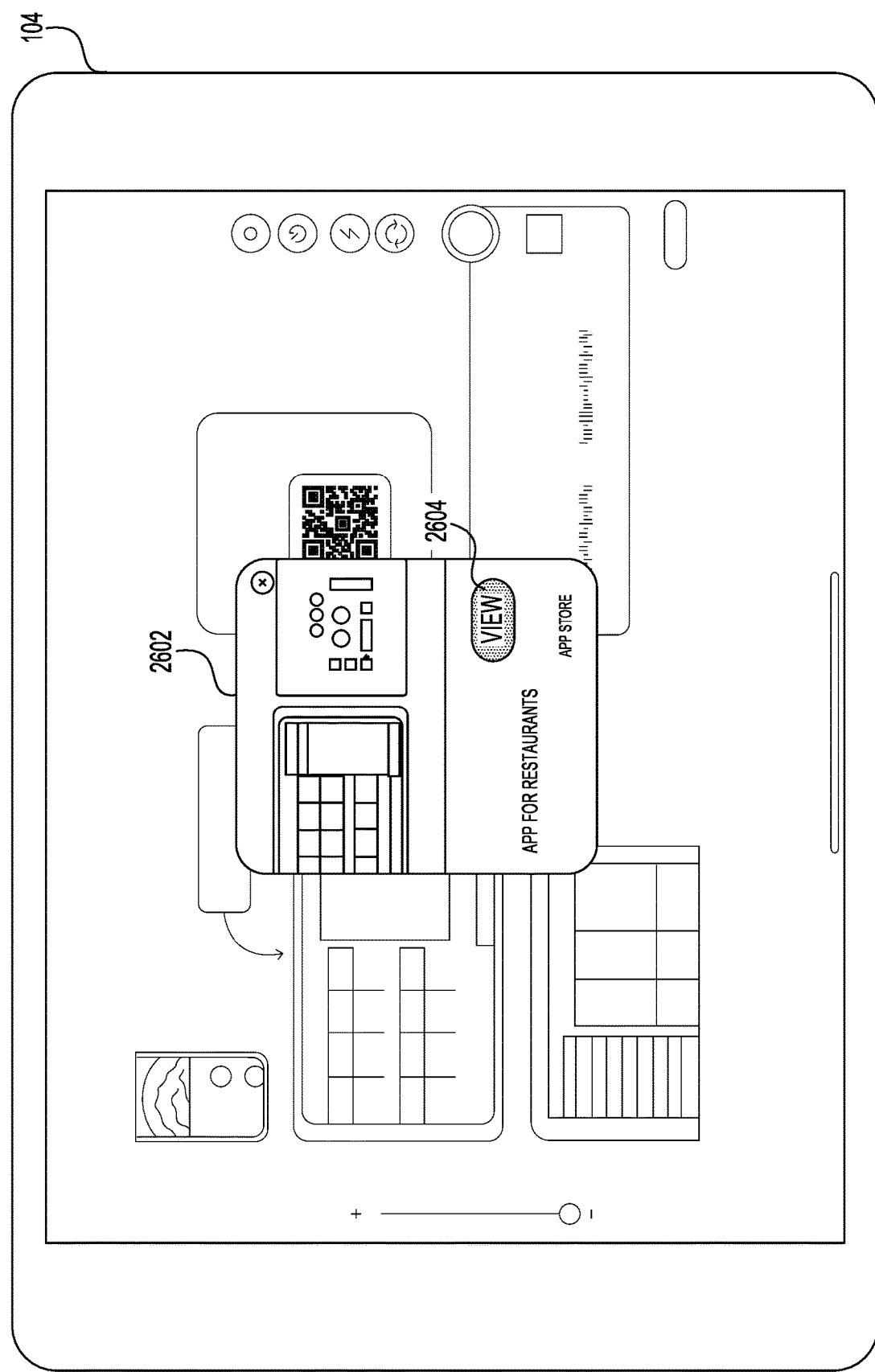

FIGS. 26A-26D illustrate an example of creating a mock experience (e.g., a demonstration) for a user 106, such as a new merchant (e.g., a merchant new to the service provider). In FIG. 26A, the interactable element 2600 is displayed in association with a physical mailer (e.g., in analog fashion), but can be associated with an additional or alternative channel or medium. In at least one example, the interactable element 2600 can have embedded therein, transaction data, merchant data, location data, buyer data, an identifier, etc., to trigger downloading of an instant application that creates a mock or trial experience for the merchant before the merchant decides to download the full application, purchase software, purchase an item, etc. In some examples, the interactable element 2600 can have embedded therein data that has predefined restaurant or retail settings. In at least one example, the user 106 can scan, read, or otherwise interact with the interactable element 2600, for example, using the user computing device 104. In at least one example, the user computing device 104 can send an indication of the interaction to the service provider server(s) 102 and the application management component can cause an instant application associated with the interactable element 2600 to be downloaded, or otherwise surfaced on the user computing device 104. In at least one example, a user interface element 2602 associated with the instant application can be presented via the user computing device 104, as illustrated in FIG. 26B. In some examples, the user interface element 2602 can be presented as a pop-up, overlay, or the like. In some examples, a user interface, instead of a user interface element 2602, can be presented by the instant application.

Figure 26C:
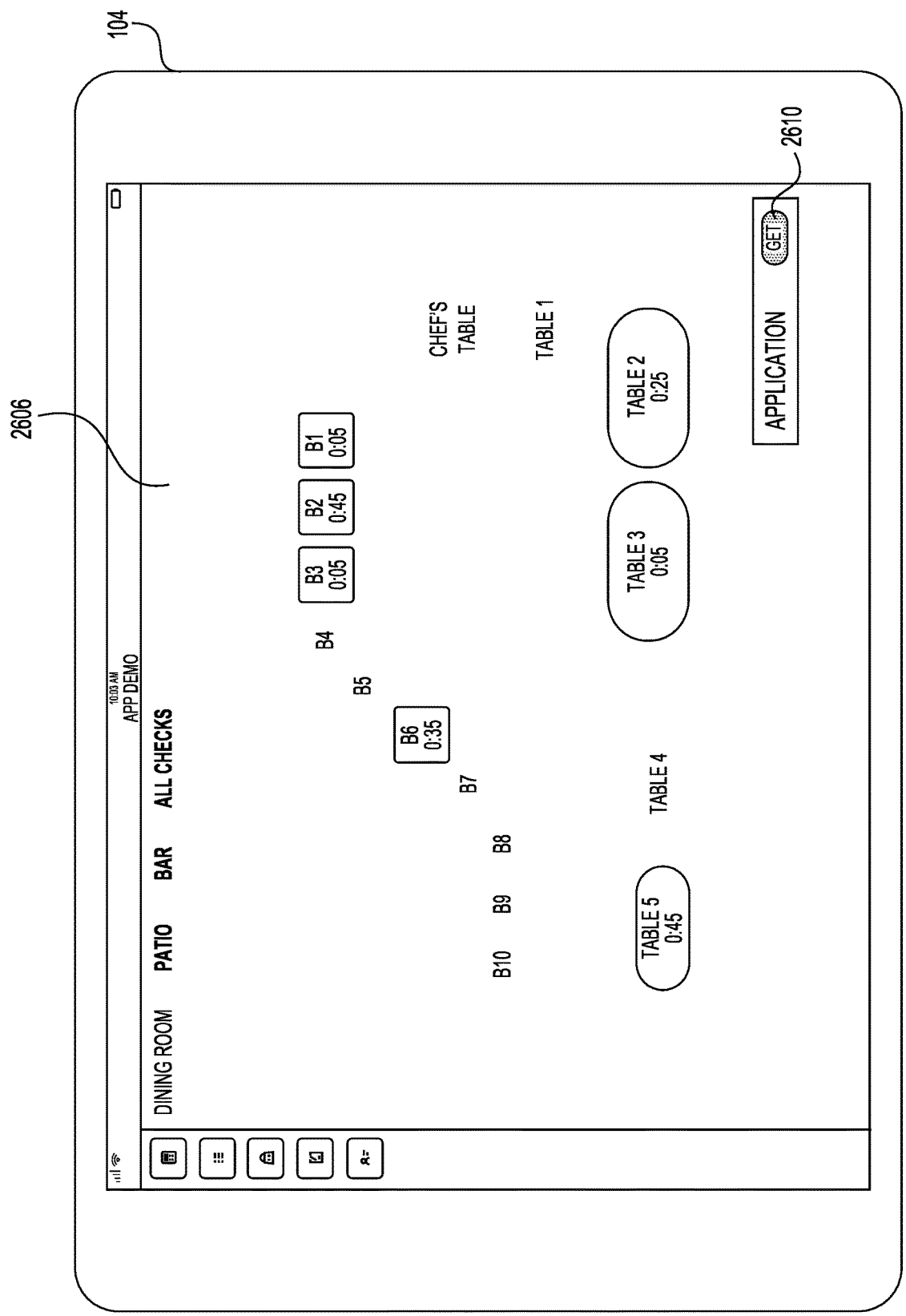
Figure 26D:
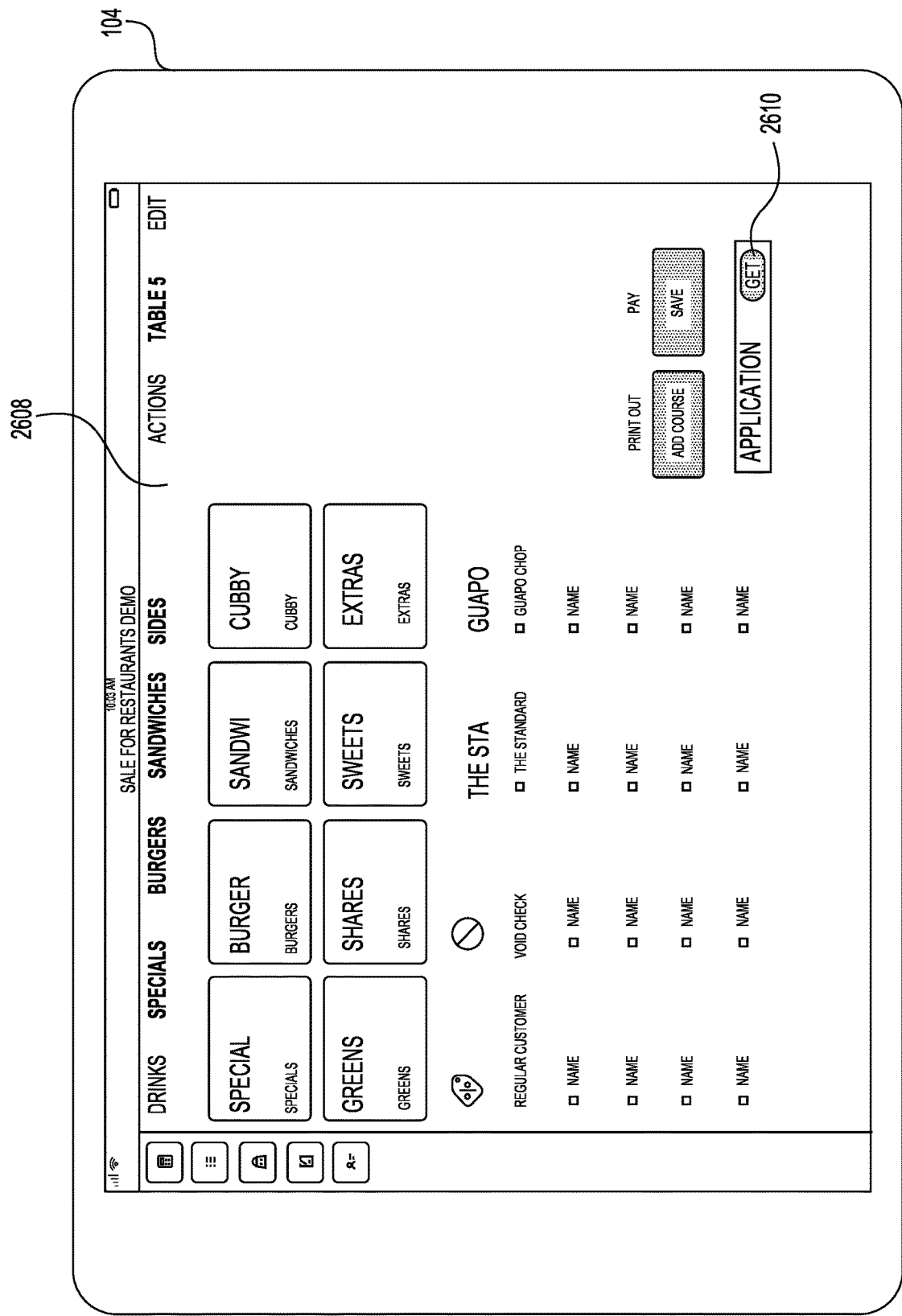

In some examples, data embedded in the interactable element 2600 (e.g., transaction data, merchant data, location data, buyer data, an identifier, predefined restaurant or retail settings, etc.) can be used to customized and/or personalize the user interface element 2602. That is, in at least one example, based at least in part on the user 106 causing an interaction between the user computing device 104 and the interactable element 2600, the instant application can be downloaded onto the user computing device 104. In at least one example, the user 106 can interact with a selectable element 2604 presented via the user interface element 2602 to initialize the demonstration, for example, of how software works and/or can be used. For example, as shown in FIG. 26C, the instant application can present a user interface 2606, which can represent a mock restaurant floor layout. In some examples, the user 106 can interact with the user interface 2606 to demo at least a part of the application with which the instant application is associated. As another example, as shown in FIG. 26D, the instant application can present a user interface 2608 that can demonstrate how a menu can be presented. In some examples, the user 106 can interact with the user interface 2606 to demo at least a part of the application with which the instant application is associated. In some examples, such the user interface 2606 and/or the user interface 2608 can include a selectable element 2610 that when selected can cause the full application to be downloaded on the user computing device 104. As described above, in some examples, if the full application is downloaded, any data input into the instant application can be transferred to the full application and, in some examples, can be used to customize and/or personalize the application and/or data presented via a user interface associated therewith. In some examples, the full application can be downloaded to a different user computing device. In some examples, as described above, based at least in part on determining a correspondence between the data input to the instant application and the request to download the full application on a different user computing device, data input via interactions with the instant application can be transferred to the full application and presented via a user interface on a different user computing device.

In some examples, the application management component 114 can obtain merchant data, from the data store(s) 118 and/or third-party data store(s) (e.g., via APIs to third-party data store(s) (e.g., map APIs, menu aggregators, food ordering platforms, search engines, social networks, etc.)), and further embed pointers to such data in the interactable element 2600. In some examples, such data can be used to provide an experiential payment processing or ecommerce platform availed via service(s) of the service provider. While instant applications are used to describe some examples here, such techniques can also be implemented using light-weight web applications. To target specific restaurants or merchants, the specific configuration or menus can be custom generated, for example by embedding the merchant's address location, merchant's name, or similar identifier, or identifier of a similar merchant, to better inform the demonstrative experience.

FIGS. 27A-27G illustrate an example of sharing an instant application with another user, for example as a referral. In one example, a user can interact with a user interface 2700 that is presented via a merchant computing device 2702. In at least one example, the user interface 2700 can present a dashboard and can include a selectable element 2704 to enable a merchant to share a referral with another user, such as a new merchant (e.g., a merchant that is not currently using service(s) of the service provider). In some examples, techniques described with reference to FIGS. 27A-27G can use shared data to track and improve the quality of referral experience, the conversion success, and discoverability of services as described herein.

In at least one example, an interactable element can be generated and communicated, in a digital or analog fashion, as described above. For example, generation and communication of the interactable element can be triggered via an interaction with the user interface 2700 (e.g., by detecting a selection of the selectable element 2704). In some examples, the referral can be associated with a payment processing service and/or any other service provided by the service provider, as described herein. In at least one example, based on detecting the selection of the selectable element 2704, an application on the merchant computing device 2702 (e.g., a point-of-sale application) can cause another user interface 2706 to be presented via the merchant computing device 2702. In at least one example, the user interface 2706 can be associated with an instant application that can be sent to another user (e.g., user computing device associated therewith). In at least one example, the instant application can be automatically created/populated, instantly personalized with the data associated with the merchant, and can be shared through one or more communication channels. For instance, in at least one example, based at least in part on detecting selection of a selectable element 2708 associated with the user interface 2706, a pop-up, overlay, or other user interface element 2710 can be presented to enable the merchant to select another user to whom the referral is to be sent. In at least one example, an interactable element associated with the instant application can be associated with a text message, email, push notification or the like. For example, FIG. 27D illustrates an example user interface 2712 associated with an email composition user interface wherein an interactable element associated with the instant application is embedded in an email to be sent to another user. FIG. 27E illustrates an example user interface 2714 presenting an email as received via the user computing device 104 of the other user (e.g., user 106). In at least one example, an interactable element associated with the instant application can be embedded, or otherwise associated with the email. In some examples, the interactable element can be used to track when the instant application is shared or forwarded or acted on, using a tracking identifier. In at least one example, an interactable element can have embedded therein, transaction data, merchant data, location, buyer data, etc., to trigger downloading of an instant application that creates a flow for the user 106 before the user 106 decides to download the full application, purchase software, or allow payments for an item, etc. Once the instant application is shared, it can show up in the sharing medium, e.g., email of the user, as shown in FIG. 27E. In at least one example, the user 106 can select a selectable element 2716 associated with the user interface 2714 to cause the instant application to be downloaded on the user computing device 104 and/or otherwise initialize the instant application on the user computing device 104. FIG. 27F illustrates an example of a user interface 2718 that can be presented by the instant application to allow the user 106 to create an account, set up payments, or the like.

In at least one example, user 106 can interact with the instant application (e.g., via the user interface 2178) to try one or more features of the application to determine whether they want to download the full application and/or sign-up for a service associated therewith. As illustrated in FIG. 27F, the user interface 2718 can provide details associated with the referral and next steps. In at least one example, the application management component 114 can infer data about the user 106 (e.g., based at least in part on input provided via the instant application), such as merchant category code (MCC), identity verification data (IDV), third-party data sources, etc. to further condense and create a customized and/or personalized experience. Such data can also be used to surface one set of functionalities (kitchen display system, reservations) to one referral (restaurant) and another set (payments, appointments) to a second referral (retail store). As illustrated by the user interface 2720 in FIG. 27G, the instant application can enable the user 106 to perform one or more tasks (e.g., take payments) without downloading the full application. That is, in some examples, the instant application can enable the recipient to perform one or more tasks via a condensed onboarding flow (e.g., relative to the onboarding described above with reference to FIG. 27F). In such an example, the user 106 can be taken through a payment tutorial flow or can be instructed to create a new item. If the user 106 desires to explore further, the full application can be promoted for download.

In some examples, instead of or in addition to a condensed flow, the user 106 can be presented with a sandbox or a shell of the full application to allow the user 106 to perform a predefined task, such as take payments. The shell too can be made to look like their current items, services, and software. In one implementation, since the user 106 is a new merchant and the service provider does not have risk data on the user 106, data associated with the merchant can be used to underwrite the transactions of the user 106 at least until additional data is obtained for the user 106. In such an example, the instant application can obtain such approval from the merchant at the time the referral is created or obtain approval conditions that are to be checked before underwriting the user 106 using the merchant's data. Underwriting transactions can also be done automatically based on the credit and risk standing of the merchant and the risk associated with their transactions. Accordingly, the user 106 can be provisionally activated to perform one or more tasks, such as take payments, enable software as a service (SAAS), transfer funds, virtual payments, etc. Based at least in part on the foregoing, the methods and system can offer at least an acquisition channel that can be customized and/or personalized, experiential, and allows one party to underwrite for another either for a full suite of functionalities or a limited one.

In some examples, the user 106 can explore functionality of the application via the user computing device 106 but may want to download the full application on another computing device. In some examples, the user 106 can request to download the full application via an interaction with the user interface 2720, via an interaction between the user computing device 106 and the other computing device, or the like. In at least one example, as described above with reference to FIG. 23, the application management component 114 can cause the application to be downloaded on the other computing device. In some examples, data input via the user computing device 106 can be stored and transferred to the other computing device. In some examples, such data can be used to customized and/or personalize the application and/or data presented via a user interface associated therewith. In some examples, the user interface presented via the other computing device can additionally or alternatively be customized and/or personalized based at least in part on device characteristics of the other computing device.

In at least one example, the merchant (e.g., the referee) can receive a notification (e.g., via the merchant computing device 2702) that a new user has signed up and/or they can receive notification to claim reward after the first payment has been made by the new user.

Techniques described herein are examples of techniques that can be implemented using instant applications. The user interfaces described above are illustrative but should not be construed as limiting. That is, additional or alternative user interfaces can be presented via computing devices, which can include additional or alternative data and/or additional or alternative configurations.

Figure 28:
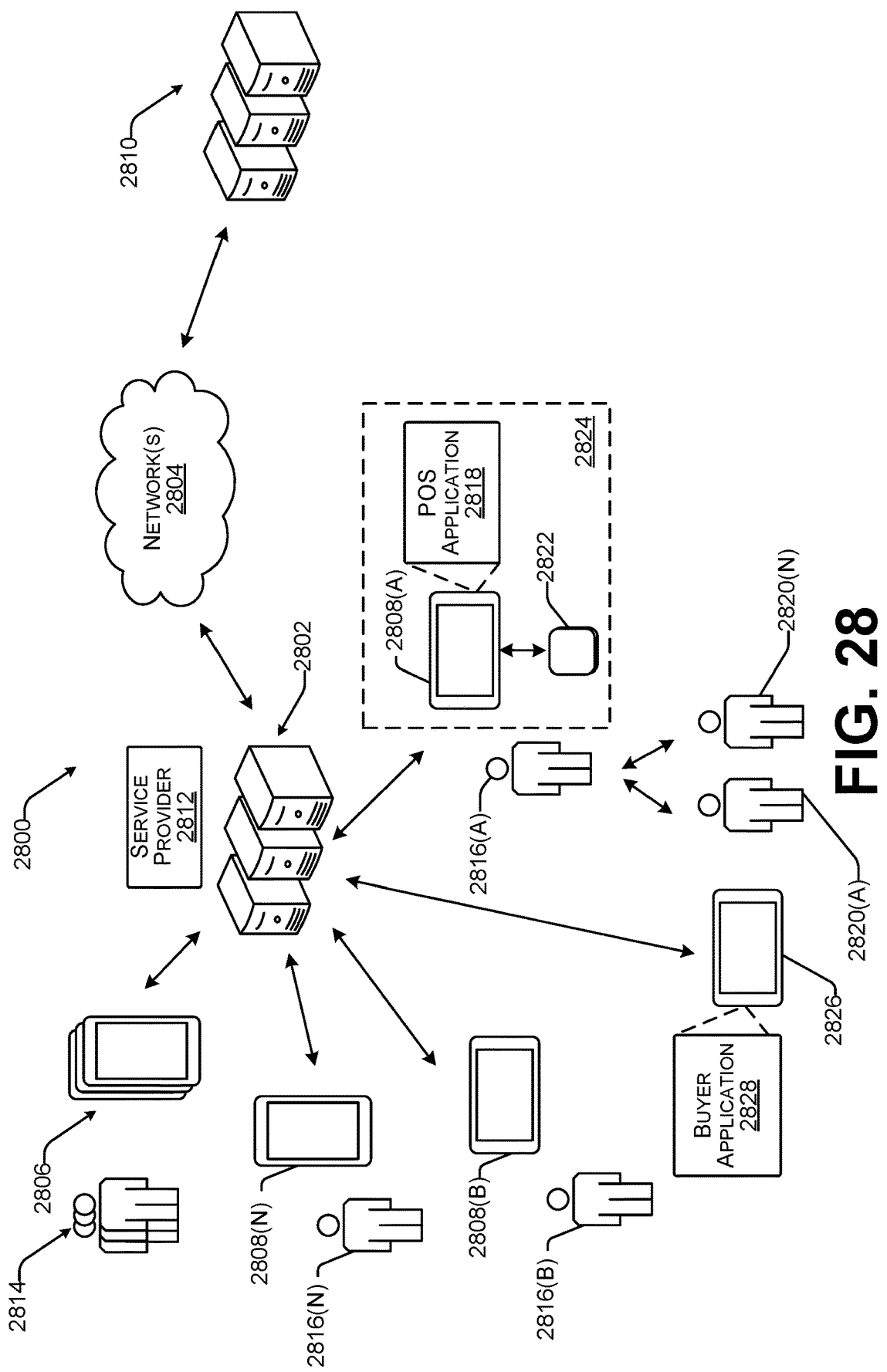
FIG. 28 illustrates an example environment for implementing techniques described herein.

FIG. 28 illustrates an example environment 2800. The environment 2800 includes server computing device(s) 2802 that can communicate over network(s) 2804 with user computing devices 2806 (which, in some examples can be merchant devices 2808 (individually, 2808(A)-2808(N))) and/or server computing device(s) 2810 associated with third-party service provider(s). The server computing device(s) 2802 can be associated with a service provider 2812 that can provide one or more services for the benefit of users 2814, as described below. Actions attributed to the service provider 2812 can be performed by the server computing device(s) 2802. Techniques described above with reference to FIGS. 1-27 can be performed by components of the environment 2800.

In at least one example, the server computing device(s) 2802 can correspond to the service provider server(s) 102, the network(s) 2804 can correspond to the network(s) 110, and the server computing device(s) 2810 can correspond to the third-party server(s) 108 as described above with reference to FIG. 1.

The environment 2800 can include a plurality of user computing devices 2806, as described above. The user computing device 104 of FIG. 1 can correspond to one of the user computing devices of the plurality of user computing devices 2806. Each one of the plurality of user computing devices 2806 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user computing devices can be operable by users 2814. The users 2814 can be referred to as customer, buyers, merchants, sellers, borrowers, employees, employers, payors, payees, couriers, and so on. The user 106 of FIG. 1 can correspond to any one of the users 2814. The users 2814 can interact with the user computing devices 2806 via user interfaces presented via the user computing devices 2806. In at least one example, a user interface can be presented via a web browser, or the like. In other examples, a user interface can be presented via an application, such as a mobile application or desktop application, which can be provided by the service provider 2812 or which can be an otherwise dedicated application. In some examples, individual of the user computing devices 2806 can have an instance or versioned instance of an application, which can be downloaded from an application store, for example, which can present the user interface(s) described herein. In some examples, a user interface can be presented via a part of an application (i.e., an instant application), as described herein. In at least one example, a user 2814 can interact with the user interface via touch input, spoken input, or any other type of input.

As described above, in at least one example, the users 2814 can include merchants 2816 (individually, 2816(A)-2816(N)). In an example, the merchants 2816 can operate respective merchant devices 2808, which can be user computing devices 2806 configured for use by merchants 2816. For the purpose of this discussion, a "merchant" can be any entity that offers items (e.g., goods or services) for purchase or other means of acquisition (e.g., rent, borrow, barter, etc.). The merchants 2816 can offer items for purchase or other means of acquisition via brick-and-mortar stores, mobile stores (e.g., pop-up shops, food trucks, etc.), online stores, combinations of the foregoing, and so forth. In some examples, at least some of the merchants 2816 can be associated with a same entity but can have different merchant locations and/or can have franchise/franchisee relationships. In additional or alternative examples, the merchants 2816 can be different merchants. That is, in at least one example, the merchant 2816(A) is a different merchant than the merchant 2816(B) and/or the merchant 2816(C).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN)s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 2808 can have an instance of a POS application 2818 stored thereon. The POS application 2818 can configure the merchant device 2808 as a POS terminal, which enables the merchant 2816(A) to interact with one or more buyers 2820. As described above, the users 2814 can include buyers, such as the buyers 2820 shown as interacting with the merchant 2816(A). For the purpose of this discussion, a "buyer" can be any entity that acquires items from merchants. While only two buyers 2820 are illustrated in FIG. 28, any number of buyers 2820 can interact with the merchants 2816. Further, while FIG. 28 illustrates the buyers 2820 interacting with the merchant 2816(A), the buyers 2820 can interact with any of the merchants 2816.

In at least one example, interactions between the buyers 2820 and the merchants 2816 that involve the exchange of funds (from the buyers 2820) for items (from the merchants 2816) can be referred to as "transactions." In at least one example, the POS application 2818 can determine transaction data associated with the POS transactions. Transaction data can include payment information, which can be obtained from a reader device 2822 associated with the merchant device 2808(A), user authentication data, purchase amount information, point-of-purchase information (e.g., item(s) purchased, date of purchase, time of purchase, etc.), etc. The POS application 2818 can send transaction data to the server computing device(s) 2802. Furthermore, the POS application 2818 can present a UI to enable the merchant 2816(A) to interact with the POS application 2818 and/or the service provider 2812 via the POS application 2818.

In at least one example, the merchant device 2808(A) can be a special-purpose computing device configured as a POS terminal (via the execution of the POS application 2818). In at least one example, the POS terminal may be connected to a reader device 2822, which is capable of accepting a variety of payment instruments, such as credit cards, debit cards, gift cards, short-range communication based payment instruments, and the like, as described below. In at least one example, the reader device 2822 can plug in to a port in the merchant device 2808(A), such as a microphone port, a headphone port, an audio-jack, a data port, or other suitable port. In additional or alternative examples, the reader device 2822 can be coupled to the merchant device 2808(A) via another wired or wireless connection, such as via a Bluetooth®, BLE, and so on. Additional details are described below with reference to FIG. 28. In some examples, the reader device 2822 can read information from alternative payment instruments including, but not limited to, wristbands and the like.

In some examples, the reader device 2822 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 2822, and communicate with the server computing device(s) 2802, which can provide, among other services, a payment processing platform. The server computing device(s) 2802 associated with the service provider 2812 can communicate with server computing device(s) 2810, as described below. In this manner, the POS terminal and reader device 2822 may collectively process transaction(s) between the merchants 2816 (e.g., merchant 2816(A)-2816(N)) and buyers 2820 (e.g., buyer 2820(A)-2820(N)). In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While, the POS terminal and the reader device 2822 of the POS system 2824 are shown as separate devices, in additional or alternative examples, the POS terminal and the reader device 2822 can be part of a single device. In some examples, the reader device 2822 can have a display integrated therein for presenting information to the buyers 2820. In additional or alternative examples, the POS terminal can have a display integrated therein for presenting information to the buyers 2820. POS systems, such as the POS system 2824, may be mobile, such that POS terminals and reader devices may process transactions in disparate locations across the world. POS systems can be used for processing card-present transactions and card-not-present (CNP) transactions, as described below.

A card-present transaction is a transaction where both a buyer 2820 and his or her payment instrument are physically present at the time of the transaction. Card-present transactions may be processed by swipes, dips, taps, or any other interaction between a physical payment instrument (e.g., a card), or otherwise present payment instrument, and a reader device 2822 whereby the reader device 2822 is able to obtain payment data from the payment instrument. A swipe is a card-present transaction where a buyer 2820(A) slides a card, or other payment instrument, having a magnetic strip through a reader device 2822 that captures payment data contained in the magnetic strip. A dip is a card-present transaction where a buyer 2820(A) inserts a payment instrument having an embedded microchip (i.e., chip) into a reader device 2822 first. The dipped payment instrument remains in the payment reader until the reader device 2822 prompts the buyer 2820(A) to remove the card, or other payment instrument. While the payment instrument is in the reader device 2822, the microchip can create a one-time code which is sent from the POS system 2824 to the server computing device(s) 2810 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a buyer 2820 may tap or hover his or her payment instrument (e.g., card, electronic device such as a smart phone running a payment application, etc.) over a reader device 2822 to complete a transaction via short-range communication (e.g., NFC, RFID, Bluetooth®, BLE, etc.). Short-range communication enables the payment instrument to exchange information with the reader device 2822. A tap may also be called a contactless payment.

A CNP transaction is a transaction where a card, or other payment instrument, is not physically present at the POS such that payment data is required to be manually keyed in (e.g., by a merchant, buyer, etc.), or payment data is required to be recalled from a card-on-file data store, to complete the transaction.

In at least one example, a buyer 2820(A) can interact with one of the user computing devices 2806 (e.g., a buyer device 2826). In at least one example, the buyer device 2826 can have an instance of a buyer application 2828 installed thereon. In at least one example, the buyer application 2828 can present one or more user interfaces to enable the buyer 2820(A) to send and/or receive funds via a peer-to-peer payment platform, as described above. In some examples, as described above, the buyer application 2828 can exchange communications with the merchant device 2808(A) and/or the server computing device(s) 2802 to process contactless payments. That is, in at least one example, the buyer application 2828 can enable the buyer to participate in a peer-to-peer transaction with the merchant via the peer-to-peer payment platform and payment processing platform described herein.

The POS system 2824, the server computing device(s) 2802, and/or the server computing device(s) 2810 may exchange payment information and transaction data to determine whether transactions are authorized. For example, the POS system 2824 may provide encrypted payment data, user authentication data, purchase amount information, point-of-purchase information, etc. (collectively, transaction data) to server computing device(s) 2802 over the network(s) 2804. The server computing device(s) 2802 may send some of the transaction data, as described above and otherwise described herein, to the server computing device(s) 2810. As described above, in at least one example, the server computing device(s) 2810 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server computing device(s) 2810 associated therewith) can send a fund transfer request to a server computing device of a card payment network (e.g., Mastercard®, VISA®, etc.) to determine whether the transaction is authorized or deficient. In at least one example, the service provider 2812 can serve as an acquirer and connect directly with the card payment network.

The card payment network (e.g., the server computing device(s) 2810 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server computing device(s) 2810 associated therewith) can make a determination as to whether the buyer has the capacity to absorb the relevant charge associated with the payment transaction. In at least one example, the service provider 2812 can serve as an issuer and/or can partner with an issuer. The transaction is either approved or rejected by the issuer and/or the card payment network (e.g., the server computing device(s) 2810 associated therewith), and a payment authorization message is communicated from the issuer to the POS device via a path opposite of that described above, or via an alternate path.

As described above, the server computing device(s) 2810, which can be associated with payment service provider(s), may determine whether the transaction is authorized based on the transaction data, as well as information relating to parties to the transaction (e.g., the buyer 2820 and/or the merchant 2816(A)). The server computing device(s) 2810 may send an authorization notification over the network(s) 2804 to the server computing device(s) 2802, which may send the authorization notification to the POS system 2824 over the network(s) 2804 to indicate whether the transaction is authorized. The server computing device(s) 2802 may also transmit additional information such as transaction identifiers to the POS system 2824. In one example, the server computing device(s) 2802 may include a merchant application and/or other functional components for communicating with the POS system 2824 and/or the server computing device(s) 2810 to authorize or decline transactions.

Based on the authorization notification that is received by the POS system 2824 from server computing device(s) 2802, the merchant 2816(A) may indicate to the buyer 2820 whether the transaction has been approved. In some examples, approval may be indicated at the POS system 2824, for example, at a display of the POS system 2824. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider 2812 can provide, among other services, payment processing platforms, inventory management services, catalog management services, business banking services, financing services, lending services, reservation management services, web-development services, payroll services, employee management services, appointment services, loyalty tracking services, restaurant management services, order management services, fulfillment services, peer-to-peer payment services, onboarding services, identity verification (IDV) services, and so on. In some examples, the users 2814 can access all of the services of the service provider 2812. In other examples, the users 2814 can have gradated access to the services, which can be based on risk tolerance, IDV outputs, subscriptions, and so on. In at least one example, access to such services can be availed to the merchants 2816 via the POS application 2818. In additional or alternative examples, each service can be associated with its own access point (e.g., application, web browser, etc.).

The service provider 2812 can offer payment processing platforms for processing payments on behalf of the merchants 2816, as described above. For example, the service provider 2812 can provision payment processing software, payment processing hardware and/or payment processing platforms to merchants 2816, as described above, to enable the merchants 2816 to receive payments from the buyers 2820 when conducting POS transactions with the buyers 2820. For instance, the service provider 2812 can enable the merchants 2816 to receive cash payments, payment card payments, and/or electronic payments from buyers 2820 for POS transactions and the service provider 2812 can process transactions on behalf of the merchants 2816.

As the service provider 2812 processes transactions on behalf of the merchants 2816, the service provider 2812 can maintain accounts or balances for the merchants 2816 in one or more ledgers. For example, the service provider 2812 can analyze transaction data received for a transaction to determine an amount of funds owed to a merchant 2816(A) for the transaction. In at least one example, such an amount can be a total purchase price less fees charged by the service provider 2812 for providing the payment processing platforms. Based on determining the amount of funds owed to the merchant 2816(A), the service provider 2812 can deposit funds into an account of the merchant 2816(A). The account can have a stored balance, which can be managed by the service provider 2812. The account can be different from a conventional bank account at least because the stored balance is managed by a ledger of the service provider 2812 and the associated funds are accessible via various withdrawal channels including, but not limited to, scheduled deposit, same-day deposit, instant deposit, and a linked payment instrument.

A scheduled deposit can occur when the service provider 2812 transfers funds associated with a stored balance of the merchant 2816(A) to a bank account of the merchant 2816(A) that is held at a bank or other financial institution (e.g., associated with the server computing device(s) 2810). Scheduled deposits can occur at a prearranged time after a POS transaction is funded, which can be a business day after the POS transaction occurred, or sooner or later. In some examples, the merchant 2816(A) can access funds prior to a scheduled deposit. For instance, the merchant 2816(A) may have access to same-day deposits (e.g., wherein the service provider 2812 deposits funds from the stored balance to a linked bank account of the merchant on a same day as POS transaction, in some examples prior to the POS transaction being funded) or instant deposits (e.g., wherein the service provider 2812 deposits funds from the stored balance to a linked bank account of the merchant on demand, such as responsive to a request). Further, in at least one example, the merchant 2816(A) can have a payment instrument that is linked to the stored balance that enables the merchant to access the funds without first transferring the funds from the account managed by the service provider 2812 to the bank account of the merchant 2816(A).

In at least one example, the service provider 2812 may provide inventory management services. That is, the service provider 2812 may provide inventory tracking and reporting. Inventory management services may enable the merchant 2816(A) to access and manage a database storing data associated with a quantity of each item that the merchant 2816(A) has available (i.e., an inventory). Furthermore, in at least one example, the service provider 2812 can provide catalog management services to enable the merchant 2816(A) to maintain a catalog, which can be a database storing data associated with items that the merchant 2816(A) has available for acquisition (i.e., catalog management services). In at least one example, the catalog may include a plurality of data items and a data item of the plurality of data items may represent an item that the merchant 2861(A) has available for acquisition. The service provider 2812 can offer recommendations related to pricing of the items, placement of items on the catalog, and multi-party fulfilment of the inventory.

In at least one example, the service provider 2812 can provide business banking services, which allow the merchant 2816(A) to track deposits (from payment processing and/or other sources of funds) into an account of the merchant 2816(A), payroll payments from the account (e.g., payments to employees of the merchant 2816(A)), payments to other merchants (e.g., business-to-business) directly from the account or from a linked debit card, withdrawals made via scheduled deposit and/or instant deposit, etc. Furthermore, the business banking services can enable the merchant 2816(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 2816 to visualize their cash flow to track their financial health, set aside money for upcoming obligations (e.g., savings), organize money around goals, etc.

In at least one example, the service provider 2812 can provide financing services and products, such as via business loans, consumer loans, fixed term loans, flexible term loans, and the like. In at least one example, the service provider 2812 can utilize one or more risk signals to determine whether to extend financing offers and/or terms associated with such financing offers.

In at least one example, the service provider 2812 can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider 2812 can offer different types of capital loan products. For instance, in at least one example, the service provider 2812 can offer a daily repayment loan product, wherein a capital loan is repaid daily, for instance, from a portion of transactions processed by the payment processing platform on behalf of the borrower. Additionally and/or alternatively, the service provider 2812 can offer a monthly repayment loan product, wherein a capital loan is repaid monthly, for instance, via a debit from a bank account linked to the payment processing platform. The credit risk of the merchant may be evaluated using risk models that take into account factors, such as payment volume, credit risk of similarly situated merchants, past transaction history, seasonality, credit history, and so on.

Additionally or alternatively, the service provider 2812 can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 2816. The service provider 2812 can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider 2812 (e.g., from payments owed to the merchant from payments processed on behalf of the merchant, funds transferred to the merchant, etc.). The service provider 2812 can offer specific financial products, such as payment instruments, tied specifically to the loan products. For example, in one implementation, the service provider 2812 associates capital to a merchant or buyer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider 2812 can provide web-development services, which enable users 2814 who are unfamiliar with HTML, XML, Javascript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 2816. In at least one example, the service provider 2812 can recommend and/or generate content items to supplement omni-channel presences of the merchants 2816. That is, if a merchant of the merchants 2816 has a web page, the service provider 2812—via the web-development or other services—can recommend and/or generate additional content items to be presented via other channel(s), such as social media, email, etc.

Furthermore, the service provider 2812 can provide payroll services to enable employers to pay employees for work performed on behalf of employers. In at least one example, the service provider 2812 can receive data that includes time worked by an employee (e.g., through imported timecards and/or POS interactions), sales made by the employee, gratuities received by the employee, and so forth. Based on such data, the service provider 2812 can make payroll payments to employee(s) on behalf of an employer via the payroll service. For instance, the service provider 2812 can facilitate the transfer of a total amount to be paid out for the payroll of an employee from the bank of the employer to the bank of the service provider 2812 to be used to make payroll payments. In at least one example, when the funds have been received at the bank of the service provider 2812, the service provider 2812 can pay the employee, such as by check or direct deposit, often a day, a week, or more after when the work was actually performed by the employee. In additional or alternative examples, the service provider 2812 can enable employee(s) to receive payments via same-day or instant deposit based at least in part on risk and/or reliability analyses performed by the service provider 2812.

Moreover, in at least one example, the service provider 2812 can provide employee management services for managing schedules of employees. Further, the service provider 2812 can provide appointment services for enabling users 2814 to set schedules for scheduling appointments and/or users 2814 to schedule appointments.

In some examples, the service provider 2812 can provide restaurant management services to enable users 2814 to make and/or manage reservations, to monitor front-of-house and/or back-of-house operations, and so on. In such examples, the merchant device(s) 2808 and/or server computing device(s) 2802 can be configured to communicate with one or more other computing devices, which can be located in the front-of-house (e.g., POS device(s)) and/or back-of-house (e.g., kitchen display system(s) (KDS)). In at least one example, the service provider 2812 can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider 2812 can provide fulfilment services, which can use couriers for delivery, wherein couriers can travel between multiple locations to provide delivery services, photography services, etc. Couriers can be users 2814 who can travel between locations to perform services for a requesting user 2814 (e.g., deliver items, capture images, etc.). In some examples, the courier can receive compensation from the service provider 2812. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider 2812 can receive requests for courier services, automatically assign the requests to active couriers, and communicate dispatch instructions to couriers via user interface (e.g., application, web browser, or other access point) presented via respective devices 2806.

In some examples, the service provider 2812 can provide omni-channel fulfillment services. For instance, if a buyer places an order with a merchant and the merchant cannot fulfill the order because one or more items are out of stock or otherwise unavailable, the service provider 2812 can leverage other merchants and/or sales channels that are part of the platform of the service provider 2812 to fulfill the buyer's order. That is, another merchant can provide the one or more items to fulfill the order of the buyer. Furthermore, in some examples, another sales channel (e.g., online, brick-and-mortar, etc.) can be used to fulfill the order of the buyer.

In some examples, the service provider 2812 can enable conversational commerce via conversational commerce services, which can use one or more machine learning mechanisms to analyze messages exchanged between two or more users 2814, voice inputs into a virtual assistant or the like, to determine intents of user(s) 2814. In some examples, the service provider 2812 can utilize determined intents to automate buyer service, offer promotions, provide recommendations, or otherwise interact with buyers in real-time. In at least one example, the service provider 2812 can integrate products and services, and payment mechanisms into a communication platform (e.g., messaging, etc.) to enable buyers to make purchases, or otherwise transact, without having to call, email, or visit a web page or other channel of a merchant. That is, conversational commerce alleviates the need for buyers to toggle back and forth between conversations and web pages to gather information and make purchases.

In at least one example, the service provider 2812 (e.g., the server computing device(s) 2802) can provide a peer-to-peer payment service, via a peer-to-peer payment platform as described herein, that enables peer-to-peer payments between two or more users 2814. In at least one example, the service provider 2812 can communicate with instances of a payment application (or other access points) installed on devices 2806 configured for operation by users, such as the buyers 2820(A)-2820(N). An example of such a payment application is the buyer application 2828 described above, which can be installed on a buyer device 2826. In an example, an instance of the payment application executing on a first device operated by a payor can send a request to the service provider 2812 to transfer an amount of funds (e.g., fiat currency or non-fiat currency such as cryptocurrency, securities, and related assets) from an account of the payor to an account of a payee (e.g., a peer-to-peer payment). In at least one example, the buyer 2820(A) can be a payor and/or a payee (i.e., a user) and the payment processing platform described herein can be a payor and/or a payee on behalf of one or more merchants. The service provider 2812 can facilitate the transfer and can send a notification to an instance of the payment application executing on a second mobile device operated by the payee that the transfer is in process (or has been completed). In some examples, the service provider 2812 can send additional or alternative information to the instances of the payment application (e.g., low balance to the payor, current balance to the payor or the payee, etc.). In some implementations, the payor and/or payee can be identified automatically, e.g., based on context, proximity, prior transaction history, and so on. In other examples, the payee can send a request for funds to the payor prior to the payor initiating the transfer of funds. The funds transferred can be associated with any digital currency type, including, but not limited to, cash, cryptocurrency, etc. In some embodiments, the service provider 2812 funds the request to payee on behalf of the payor, to speed up the transfer process and compensate for any lags that may be attributed to payor's financial network.

In some implementations, the service provider 2812 can trigger the peer-to-peer payment process through identification of a "payment proxy" having a particular syntax. For example, the syntax includes a monetary currency indicator prefixing one or more alphanumeric characters (e.g., $Cash). The currency indicator operates as the tagging mechanism that indicates to a computer system to treat the inputs as a request from the sender to transfer cash, where detection of the syntax (which includes one or more alphanumeric characters tagged by a monetary currency indicator) triggers a transfer of cash. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. The peer-to-peer process can be initiated through a particular application executing on the user computing devices 2806 (e.g., the buyer application 2828).

In some embodiments, the peer-to-peer process can be implemented within a forum context. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. The forum can be employed by a content provider to enable users of the forum to interact with one another, (e.g., through creating messages, posting comments, etc.). In some embodiments, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application context, such as a messaging application context. The term "messaging application," as used here, refers to any messaging application that enables communication between users (e.g., sender and recipient of a message) over a wired or wireless communications network, through use of a communication message. The messaging application can be employed by the service provider 2812. For instance, the service provider 2812 can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user computing device 2806 (e.g., mobile device or conventional personal computer (PC)) based on instructions transmitted to and from the server computing device(s) 2802 (which, in such an example can be called a "messaging server"). In some instances, the messaging application can include a payment application with messaging capability that enables users of the payment application to communicate with one another. In such instances, the payment application can be executed on the user computing device 2806 based on instructions transmitted to and from the server computing device(s) 2802 (e.g., the payment service discussed in this description or another payment service that supports payment transactions).

In at least some embodiments, the peer-to-peer process can be implemented within a landing page context. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider 2812 can generate the landing page to enable the recipient to conveniently receive one or more payments from one or more senders. In some embodiments, the personalized location address identifying the landing page is a uniform resource locator (URL) that incorporates the payment proxy. In such embodiments, the landing page is a web page, e.g., www.cash.me/$Cash.

In at least one example, a user 2816(A) may be new to the service provider 2812 such that the user 2816(A) that has not registered (e.g., subscribed to receive access to one or more services offered by the service provider) with the service provider 2812. The service provider 2812 can offer onboarding services for registering a potential user 2816(A) with the service provider 2812. In some examples, onboarding can involve presenting various questions, prompts, and the like to a potential user 2816(A) to obtain information that can be used to generate a profile for the potential user 2816(A). In at least one example, the service provider 2812 can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 2816(A) providing all necessary information, the potential user 2816(A) can be onboarded to the service provider 2812. In such an example, any limited or short-term access to services of the service provider 2812 can be transitioned to more permissive (e.g., less limited) or longer-term access to such services.

The service provider 2812 can be associated with IDV services, which can be used by the service provider 2812 for compliance purposes and/or can be offered as a service, for instance to third-party service providers (e.g., associated with the server computing device(s) 2810). That is, the service provider 2812 can offer IDV services to verify the identity of users 2814 seeking to use or using their services. Identity verification requires a buyer (or potential buyer) to provide information that is used by compliance departments to prove that the information is associated with an identity of a real person or entity. In at least one example, the service provider 2812 can perform services for determining whether identifying information provided by a user 2814 accurately identifies the buyer (or potential buyer) (i.e., Is the buyer who they say they are?).

The service provider 2812 is capable of providing additional or alternative services and the services described above are offered as a sampling of services. In at least one example, the service provider 2812 can exchange data with the server computing device(s) 2810 associated with third-party service providers. Such third-party service providers can provide information that enables the service provider 2812 to provide services, such as those described above. In additional or alternative examples, such third-party service providers can access services of the service provider 2812. That is, in some examples, the third-party service providers can be subscribers, or otherwise access, services of the service provider 2812.

Techniques described herein can be configured to operate in both real-time/online and offline modes. "Online" modes refer to modes when devices are capable of communicating with the service provider 2812 (e.g., the server computing device(s) 2802) and/or the server computing device(s) 2810 via the network(s) 2804. In some examples, the merchant device(s) 2808 are not capable of connecting with the service provider 2812 (e.g., the server computing device(s) 2802) and/or the server computing device(s) 2810, due to a network connectivity issue, for example. In additional or alternative examples, the server computing device(s) 2802 are not capable of communicating with the server computing device(s) 2810 due to network connectivity issue, for example. In such examples, devices may operate in "offline" mode where at least some payment data is stored (e.g., on the merchant device(s) 2808) and/or the server computing device(s) 2802 until connectivity is restored and the payment data can be transmitted to the server computing device(s) 2802 and/or the server computing device(s) 2810 for processing.

In at least one example, the service provider 2812 can be associated with a hub, such as an order hub, an inventory hub, a fulfillment hub and so on, which can enable integration with one or more additional service providers (e.g., associated with the additional server computing device(s) 2810). In some examples, such additional service providers can offer additional or alternative services and the service provider 2812 can provide an interface or other computer-readable instructions to integrate functionality of the service provider 2812 into the one or more additional service providers.

Techniques described herein are directed to services provided via a distributed system of user computing devices 2806 that are in communication with one or more server computing devices 2802 of the service provider 2812. That is, techniques described herein are directed to a specific implementation—or, a practical application—of utilizing a distributed system of user computing devices 2806 that are in communication with one or more server computing devices 2802 of the service provider 2812 to perform a variety of services, as described above. The unconventional configuration of the distributed system described herein enables the server computing device(s) 2802 that are remotely-located from end-users (e.g., users 2814) to intelligently offer services based on aggregated data associated with the end-users, such as the users 2814 (e.g., data associated with multiple, different merchants and/or multiple, different buyers), in some examples, in near-real time. Accordingly, techniques described herein are directed to a particular arrangement of elements that offer technical improvements over conventional techniques for performing payment processing platforms and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider 2812, and those outside of the control of the service provider 2812, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing platforms and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 2814 and user computing devices 2806. Furthermore, such features are changed dynamically based on the profiles of the users involved interacting with the GUIs. As such, techniques described herein are directed to improvements to computing systems.

Figure 29:
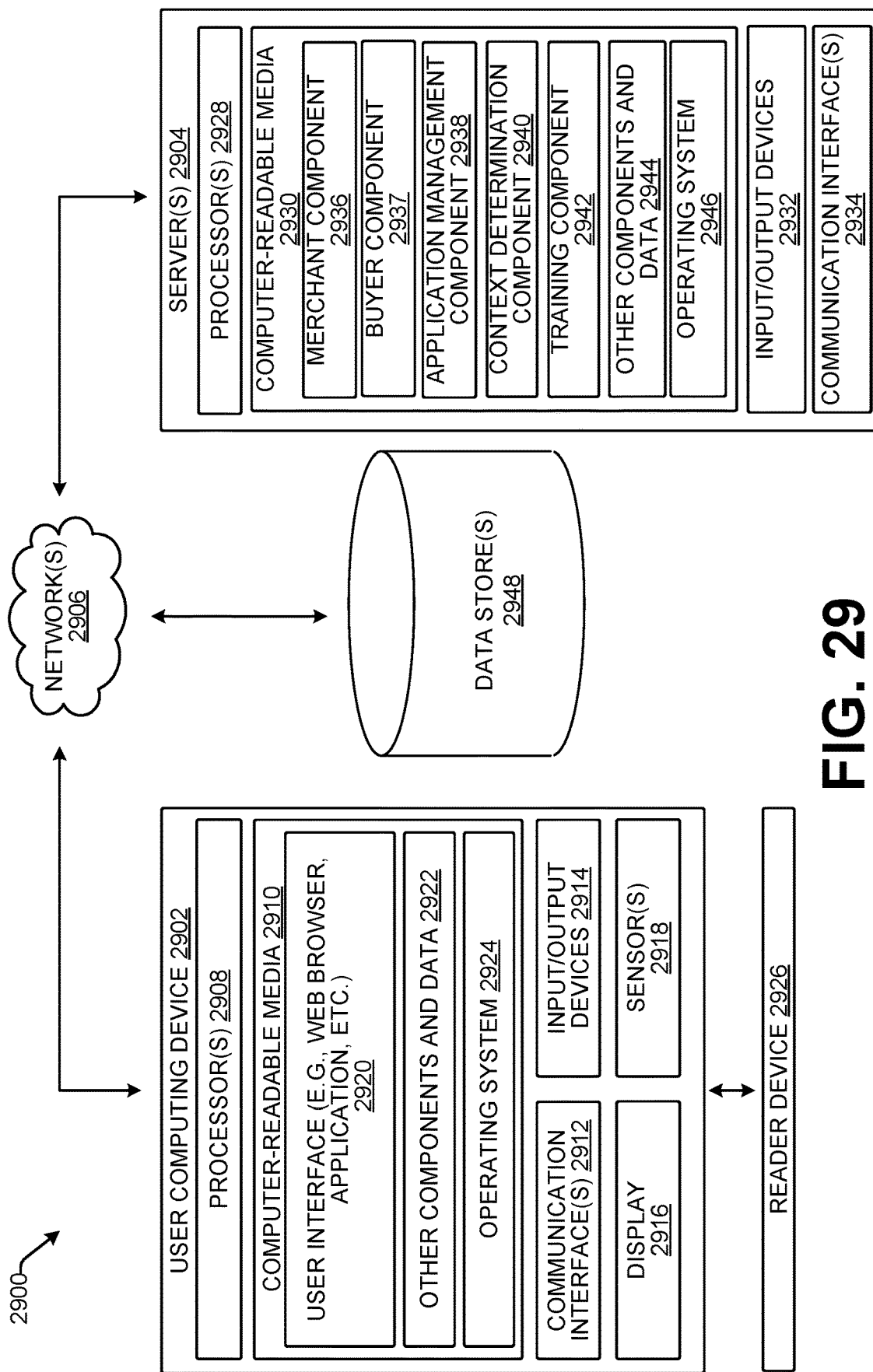
FIG. 29 illustrates an illustrative block diagram illustrating a system for performing techniques described herein.

FIG. 29 depicts an illustrative block diagram illustrating a system 2900 for performing techniques described herein. The system 2900 includes a user computing device 2902, that communicates with server computing device(s) (e.g., server(s) 2904) via network(s) 2906 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user computing device 2902 is illustrated, in additional or alternate examples, the system 2900 can have multiple user computing devices, as described above with reference to FIG. 25.

In at least one example, the user computing device 2902 can correspond to the user computing device 104, the server(s) 2904 can correspond to the service provider server(s) 102, and the network(s) 2906 can correspond to the network(s) 110 as described above with reference to FIG. 1.

In at least one example, the user computing device 2902 can be any suitable type of computing device, e.g., portable, semi-portable, semi-stationary, or stationary. Some examples of the user computing device 2902 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user computing device 2902 can be any computing device capable of sending communications and performing the functions according to the techniques described herein. The user computing device 2902 can include devices, e.g., payment card readers, or components capable of accepting payments, as described below.

In the illustrated example, the user computing device 2902 includes one or more processors 2908, one or more computer-readable media 2910, one or more communication interface(s) 2912, one or more input/output (I/O) devices 2914, a display 2916, and sensor(s) 2918.

In at least one example, each processor 2908 can itself comprise one or more processors or processing cores. For example, the processor(s) 2908 can be implemented as one or more microprocessors, microcomputers, microcontrollers, digital signal processors, central processing units, state machines, logic circuitries, and/or any devices that manipulate signals based on operational instructions. In some examples, the processor(s) 2908 can be one or more hardware processors and/or logic circuits of any suitable type specifically programmed or configured to execute the algorithms and processes described herein. The processor(s) 2908 can be configured to fetch and execute computer-readable processor-executable instructions stored in the computer-readable media 2910.

Depending on the configuration of the user computing device 2902, the computer-readable media 2910 can be an example of tangible non-transitory computer storage media and can include volatile and nonvolatile memory and/or removable and non-removable media implemented in any type of technology for storage of data such as computer-readable processor-executable instructions, data structures, program modules or other data. The computer-readable media 2910 can include, but is not limited to, RAM, ROM, EEPROM, flash memory, solid-state storage, magnetic disk storage, optical storage, and/or other computer-readable media technology. Further, in some examples, the user computing device 2902 can access external storage, such as RAID storage systems, storage arrays, network attached storage, storage area networks, cloud storage, or any other medium that can be used to store data and that can be accessed by the processor(s) 2908 directly or through another computing device or network. Accordingly, the computer-readable media 2910 can be computer storage media able to store instructions, modules or components that can be executed by the processor(s) 2908. Further, when mentioned, non-transitory computer-readable media exclude media such as energy, carrier signals, electromagnetic waves, and signals per se.

The computer-readable media 2910 can be used to store and maintain any number of functional components that are executable by the processor(s) 2908. In some implementations, these functional components comprise instructions or programs that are executable by the processor(s) 2908 and that, when executed, implement operational logic for performing the actions and services attributed above to the user computing device 2902. Functional components stored in the computer-readable media 2910 can enable a user interface 2920 to be presented so that users can interact with the user computing device 2902, and thus the server(s) 2904 and/or other networked devices. In at least one example, the user interface 2920 can be presented via a web browser, or the like. In other examples, the user interface 2920 can be presented via an application, such as a mobile application or desktop application, which can be provided by a service provider 412 associated with the server(s) 2904, or which can be an otherwise dedicated application. In some examples, the user interface 2920 can be presented via an instant application, as described above. In at least one example, a user can interact with the user interface via touch input, spoken input, gesture, or any other type of input. The word "input" is also used to describe "contextual" input that may not be directly provided by the user via the user interface 2920. For example, user's interactions with the user interface 2920 are analyzed using, e.g., natural language processing techniques, to determine context or intent of the user, which may be treated in a manner similar to "direct" user input.

Depending on the type of the user computing device 2902, the computer-readable media 2910 can also optionally include other functional components and data, such as other modules and data 2922, which can include programs, drivers, etc., and the data used or generated by the functional components. In addition, the computer-readable media 2910 can also store data, data structures and the like, that are used by the functional components. Further, the user computing device 2902 can include many other logical, programmatic and physical components, of which those described are merely examples that are related to the discussion herein.

In at least one example, the computer-readable media 2910 can include additional functional components, such as an operating system 2924 for controlling and managing various functions of the user computing device 2902 and for enabling basic user interactions.

The communication interface(s) 2912 can include one or more interfaces and hardware components for enabling communication with various other devices, such as over the network(s) 2906 or directly. For example, communication interface(s) 2912 can enable communication through one or more network(s) 2906, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 2906 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user computing device 2902 can further include one or more input/output (I/O) devices 2914. The I/O devices 2914 can include speakers, a microphone, a camera, and various user controls (e.g., buttons, a joystick, a keyboard, a keypad, etc.), a haptic output device, and so forth. The I/O devices 2914 can also include attachments that leverage the accessories (audio-jack, USB-C, Bluetooth, etc.) to connect with the user computing device 2902.

In at least one example, user computing device 2902 can include a display 2916. Depending on the type of computing device(s) used as the user computing device 2902, the display 2916 can employ any suitable display technology. For example, the display 2916 can be a liquid crystal display, a plasma display, a light emitting diode display, an OLED (organic light-emitting diode) display, an electronic paper display, or any other suitable type of display able to present digital content thereon. In at least one example, the display 2916 can be an augmented reality display, a virtually reality display, or any other display able to present and/or project digital content. In some examples, the display 2916 can have a touch sensor associated with the display 2916 to provide a touchscreen display configured to receive touch inputs for enabling interaction with a graphic interface presented on the display 2916. Accordingly, implementations herein are not limited to any particular display technology. Alternatively, in some examples, the user computing device 2902 may not include the display 2916, and data can be presented by other means, such as aurally, haptically, etc.

In addition, the user computing device 2902 can include sensor(s) 2918. The sensor(s) 2918 can include a GPS device able to indicate location data. Further, the sensor(s) 2918 can include, but are not limited to, an accelerometer, gyroscope, compass, proximity sensor, camera, microphone, and/or a switch.

In some examples, the GPS device can be used to identify a location of a user. In at least one example, the location of the user can be used by the service provider 2812, described above, to provide one or more services. That is, in some examples, the service provider 2812 can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location data availed by the GPS device). In some examples, location can be used for facilitating peer-to-peer payments between nearby users and/or for sending users notifications regarding available appointments with merchant(s) located proximate to the users. In at least one example, location can be used for taking payments from nearby buyers when they leave a geofence, or location can be used to initiate an action responsive to users entering a brick-and-mortar store of a merchant. Location can be used in additional or alternative ways as well.

Additionally, the user computing device 2902 can include various other components that are not shown, examples of which include removable storage, a power source, such as a battery and power control unit, a barcode scanner, a printer, a cash drawer, and so forth.

In addition, in some examples, the user computing device 2902 can include, be connectable to, or otherwise be coupled to a reader device 2926, for reading payment instruments and/or identifiers associated with other objects. In some examples, as described above, the reader device 2926 can plug in to a port in the user computing device 2902, such as a microphone port, a headphone port, an audio-jack, a data port, or other suitable port. In additional or alternative examples, the reader device 2926 can be coupled to the user computing device 2902 via another wired or wireless connection, such as via a Bluetooth®, BLE, and so on. The reader device 2926 can include a read head for reading a magnetic strip of a payment card, and further can include encryption technology for encrypting the data read from the magnetic strip. Additionally or alternatively, the reader device 2926 can be an EMV payment reader, which in some examples, can be embedded in the user computing device 2902. Moreover, numerous other types of readers can be employed with the user computing device 2902 herein, depending on the type and configuration of the user computing device 2902.

The reader device 2926 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 2926 may include hardware implementation, such as slots, magnetic tracks, and rails with one or more sensors or electrical contacts to facilitate detection and acceptance of a payment instrument. That is, the reader device 2926 may include hardware implementations to enable the reader device 2926 to interact with a payment instrument via a swipe (i.e., a card-present transaction where a buyer slides a card having a magnetic strip through a payment reader that captures payment data contained in the magnetic strip), a dip (i.e., a card-present transaction where a buyer inserts a card having an embedded microchip (i.e., chip) into a payment reader first until the payment reader prompts the buyer to remove the card), or a tap (i.e., a card-present transaction where a buyer may tap or hover his or her electronic device such as a smart phone running a payment application over a payment reader to complete a transaction via short-range communication) to obtain payment data associated with a buyer. Additionally or optionally, the reader device 2926 may also include a biometric sensor to receive and process biometric characteristics and process them as payment instruments, given that such biometric characteristics are registered with the service provider and connected to a financial account with a bank server.

The reader device 2926 may include processing unit(s), computer-readable media, a reader chip, a transaction chip, a timer, a clock, a network interface, a power supply, and so on. The processing unit(s) of the reader device 2926 may execute one or more modules and/or processes to cause the reader device 2926 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program modules, program data, and/or one or more operating systems. Depending on the exact configuration and type of the reader device 2926, the computer-readable media may include volatile memory (such as RAM), non-volatile memory (such as ROM, flash memory, miniature hard drive, memory card, or the like), or some combination thereof. In at least one example, the computer-readable media of the reader device 2926 may include at least one module for performing various functions as described herein.

The reader chip may perform functionalities to control the operations and processing of the reader device 2926. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock 296, which may provide a clock signal indicating a time. Furthermore, the reader chip may perform functionality to control the network interface, which may interface with the network(s) 2906, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 2926. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the buyer, an address of the buyer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the buyer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user computing device 2902, which can be a POS terminal, and the reader device 2926 are shown as separate devices, in additional or alternative examples, the user computing device 2902 and the reader device 2926 can be part of a single device, which may be a battery-operated device. In such an example, components of both the user computing device 2902 and the reader device 2926 may be associated with the single device. In some examples, the reader device 2926 can have a display integrated therewith, which can be in addition to (or as an alternative of) the display 2916 associated with the user computing device 2902.

The server(s) 2904 can include one or more servers or other types of computing devices that can be embodied in any number of ways. For example, in the example of a server, the modules, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 2904 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 2904 can be located together or separately, and organized, for example, as virtual servers, server banks and/or server farms. The described functionality can be provided by the servers of a single merchant or enterprise, or can be provided by the servers and/or services of multiple different buyers or enterprises.

In the illustrated example, the server(s) 2904 can include one or more processors 2928, one or more computer-readable media 2930, one or more I/O devices 2932, and one or more communication interfaces 2934. Each processor 2928 can be a single processing unit or a number of processing units, and can include single or multiple computing units or multiple processing cores. The processor(s) 2928 can be implemented as one or more microprocessors, microcomputers, microcontrollers, digital signal processors, central processing units, state machines, logic circuitries, and/or any devices that manipulate signals based on operational instructions. For example, the processor(s) 2928 can be one or more hardware processors and/or logic circuits of any suitable type specifically programmed or configured to execute the algorithms and processes described herein. The processor(s) 2928 can be configured to fetch and execute computer-readable instructions stored in the computer-readable media 2930, which can program the processor(s) 2928 to perform the functions described herein.

The computer-readable media 2930 can include volatile and nonvolatile memory and/or removable and non-removable media implemented in any type of technology for storage of data, such as computer-readable instructions, data structures, program modules, or other data. Such computer-readable media 2930 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 2904, the computer-readable media 2930 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 2930 can be used to store any number of functional components that are executable by the processor(s) 2928. In many implementations, these functional components comprise instructions or programs that are executable by the processors 2928 and that, when executed, specifically configure the one or more processors 2928 to perform the actions attributed above to the service provider 412 and/or payment processing service. Functional components stored in the computer-readable media 2930 can optionally include a merchant component 2936, a buyer component 2937, an application management component 2938, a context determination component 2940, a training component 2942, and one or more other components and data 2944.

Functionality associated with the merchant component 2936, the buyer component 2937, the application management component 2938, the context determination component 2940, which can correspond to the merchant component 112, the buyer component 113, the application management component 114, and the context determination component 116 of FIG. 1, are described above with reference to FIG. 1. The training component 2942 can be configured to train models using machine-learning mechanisms. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a data store associated with the user computing device(s) 2902 and/or the server(s) 2904 for use at a time after the data models have been trained (e.g., at runtime).

The one or more other components and data 2944 can include programs, drivers, etc., and the data used or generated by the functional components. Further, the server(s) 2904 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Components are typically functional such that they that may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). In additional and/or alternative examples, the component(s) may be implemented as computer-readable instructions, various data structures, and so forth via at least one processing unit to configure the computing device(s) described herein to execute instructions and to perform operations as described herein.

In some examples, a module may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 2930 can additionally include an operating system 2946 for controlling and managing various functions of the server(s) 2904.

The communication interface(s) 2934 can include one or more interfaces and hardware components for enabling communication with various other devices, such as over the network(s) 2906 or directly. For example, communication interface(s) 2934 can enable communication through one or more network(s) 2906, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 2906 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 2904 can further be equipped with various I/O devices 2932. Such I/O devices 2932 can include a display, various user interface controls (e.g., buttons, joystick, keyboard, mouse, touch screen, biometric or sensory input devices, etc.), audio speakers, connection ports and so forth.

In at least one example, the system 2900 can include a data store 2948 that can be configured to store data that is accessible, manageable, and updatable. In some examples, the data store 2948 can be integrated with the user computing device 2902 and/or the server(s) 2904. In other examples, as shown in FIG. 29, the data store 2948 can be located remotely from the server(s) 2904 and can be accessible to the server(s) 2904. The data store 2948 can comprise multiple databases and/or servers connected locally and/or remotely via the network(s) 2906. In at least one example, the data store(s) 2948 can correspond to the data store(s) 118 described above with reference to FIG. 1. As described above, the data store(s) 2948 can store user profiles, which can include merchant profiles, buyer profiles, and so on. Furthermore, in at least one example, the data store(s) 2948 can store inventory database(s) and/or catalog database(s). As described above, an inventory can store data associated with a quantity of each item that a merchant has available to the merchant. Furthermore, a catalog can store data associated with items that a merchant has available for acquisition. The data store(s) 2948 can store additional or alternative types of data as described herein, including but not limited to, applications.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to FIGS. 28 and 29 for convenience and ease of understanding. However, the methods illustrated are not limited to being performed using components described in FIGS. 28 and 29, and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some examples, one or more blocks of the process can be omitted entirely. Moreover, the methods can be combined in whole or in part with each other or with other methods.

Example Clauses

A. A method comprising: storing applications in a repository associated with one or more computing devices of a service provider, wherein individual of the applications are associated with one or more parts that are accessible as one or more instant applications, and wherein each instant application of the one or more instant applications is associated with a particular, discrete functionality; determining, by the one or more computing devices, context data associated with a user computing device; selecting, by the one or more computing devices and based at least in part on the context data, an instant application of the one or more instant applications to be surfaced on the user computing device; and causing, by the one or more computing devices, a user interface associated with the instant application to be presented via the user computing device, wherein the user interface enables a user of the user computing device to input data for enabling the particular, discrete functionality associated with the instant application, and wherein a portion of the context data is used to customize the user interface for the user.

B. The method as clause A recites, further comprising: selecting, based at least in part on the context data, at least one other instant application of the one or more instant applications to be surfaced on the user computing device; determining a sequence for surfacing the instant application and the at least one other instant application; and causing the user interface associated with the instant application and another user interface associated with the other instant application to be presented based at least in part on the sequence.

C. The method as clause A or B recites, further comprising: receiving an indication of an interaction with an interactable element associated with the instant application; and selecting the instant application further based at least in part on receiving the indication.

D. The method as any of clauses A-C recites, further comprising, at a time after the user interface is presented, causing the application to be downloaded on the user computing device, wherein downloading the application enables a set of functionalities larger than the particular, discrete functionality associated with the instant application.

E. The method as clause D recites, further comprising: prior to causing the application to be downloaded on the user computing device, accessing, based at least in part on the input data, user data associated with the user; and customizing at least one of the application or data presented via the application based at least in part on the user data.

F. The method as clause D or E recites, further comprising: prior to causing the application to be downloaded on the user computing device, receiving, from the user computing device, a request to download the application; based at least in part on receiving the request to download the application, storing data provided via the user interface associated with the instant application; and associating the data provided via the user interface with the application, wherein the data provided via the user interface is accessible via the application after the application has been downloaded on the user computing device.

G. A system comprising: one or more processors; and one or more computer-readable media that, when executed by the one or more processors, cause the system to perform operations comprising: storing one or more applications in a repository associated with a service provider, wherein at least a part of an application of the one or more applications is associated with a particular, discrete functionality; determining context data associated with a user computing device; selecting, based at least in part on the context data, the application from the one or more applications, wherein at least the part of the application is to be surfaced on the user computing device; and causing a user interface associated with at least the part of the application to be presented via the user computing device, wherein the user interface enables a user of the user computing device to input data for enabling the particular, discrete functionality, and wherein a portion of the context data is used to customize the user interface for the user.

H. The system as clause G recites, the operations further comprising: receiving, from the application, an authorization request to authorize access to data stored in association with the system; and causing at least a portion of the data stored in association with the system to be surfaced via the user interface.

I. The system as clause G or H recites, the operations further comprising: generating an interactable element associated with at least the part of the application; and selecting the application further based at least in part on receiving, from the user computing device, an indication of an interaction with the interactable element.

J. The system as any of clauses G-I recites, the operations further comprising: accessing, in the repository and based at least in part on an identifier associated with the user computing device, user data associated with the user; and customizing the user interface further based at least in part on the user data.

K. The system as any of clauses G-J recites, the operations further comprising: receiving, over a period of time, location data associated with the user computing device, wherein at least a portion of the context data is based at least in part on the location data; and selecting the application further based at least in part on determining that a location of the user computing device is proximate to an entity associated with the application.

L. The system as any of clauses G-K recites, the operations further comprising, wherein at least a portion of the context data is associated with an indication of a wait time associated with the user computing device, the operations further comprising causing the user interface associated with at least the part of the application to be presented via the user computing device based at least in part on the wait time.

M. The system as any of clauses G-L recites, wherein the user interface associated with at least the part of the application is only associated with the part of the application, which is associated with an instant application having fewer functionalities than the application, the operations further comprising causing the application to be downloaded on to the user computing device at a time after the user interface is presented.

N. One or more computer-readable media that, when executed by one or more processors, cause the one or more processors to perform operations comprising: storing one or more applications in a repository associated with a service provider, wherein at least a part of an application of the one or more applications is associated with a particular, discrete functionality; determining context data associated with a user computing device; selecting, based at least in part on the context data, the application from the one or more applications, wherein at least the part of the application is to be surfaced on the user computing device; and causing a user interface associated with at least the part of the application to be presented via the user computing device, wherein the user interface enables a user of the user computing device to input data for enabling the particular, discrete functionality, and wherein a portion of the context data is used to customize the user interface for the user.

O. The one or more computer-readable media of clause N, the operations further comprising: accessing data associated with at least one of an entity associated with the application or the user; and customizing at least one of the application, the part of the application, or data presented via the user interface based at least in part on the data.

P. The one or more computer-readable media of clause N or O, the operations further comprising: generating an interactable element associated with at least the part of the application; associating the interactable element with one or more other interactable elements associated with one or more other parts of at least one of the application or another application to generate a multi-function interactable element; receiving, from the user computing device, an indication of an interaction with the multi-function interactable element; and determining, based at least in part on the context data, to cause the user interface associated with at least the part of the application to be presented prior to causing one or more other user interfaces associated with the one or more other parts of at least one of the application or another application associated with the multi-function interactable element to be presented.

Q. The one or more computer-readable media of any of clauses N-P, wherein the particular, discrete functionality is associated with adding inventory to an inventory database associated with the service provider.

R. The one or more computer-readable media of any of clauses N-Q, wherein the particular, discrete functionality is associated with at least one of ordering one or more stored balance cards or associating funds with a stored balance card.

S. The one or more computer-readable media of any of clauses N-R, wherein the particular, discrete functionality is associated with redeeming loyalty in association with a transaction to be processed by the service provider.

T. The one or more computer-readable media of any of clauses N-S, wherein the particular, discrete functionality is associated with at least one of clocking in for a shift, clocking out of a shift, or inputting gratuity associated with a shift.

U. A computer-implemented method comprising: detecting engagement with an option from within a first instant application on a user computing device, wherein the first instant application is associated with a first particular, discrete functionality; triggering a second instant application to be initialized in response to the engagement, wherein the second instant application is associated with a second particular, discrete functionality; transitioning provisionally from the first instant application to the second instant application to allow access to the second particular, discrete functionality associated with the second instant application; receiving an indication of a user interaction with the second instant application; embedding a portion of the user interaction in the first instant application; and presenting the embedded portion of the user interaction on a user interface associated with the first instant application via the user computing device.

V. The computer-implemented method as clause U recites, wherein the first instant application is associated with an application, the application being associated with a set of functionalities larger than the first particular, discrete functionality associated with the first instant application.

W. The computer-implemented method as clause V recites, further comprising, at a time after the portion of the user interaction is embedded into the first instant application, causing the application to be downloaded onto the user computing device, wherein the portion of the user interaction embedded in the first instant application is embedded in the application.

X. The computer-implemented method as any of clauses U-W recites, wherein the first particular, discrete functionality is associated with a buyer application and enables payment via the buyer application and the second particular, discrete functionality is associated with a merchant application and enables building of a virtual cart.

Y. The computer-implemented method as clause X recites, wherein the buyer application is a peer-to-peer payment application.

Z. The computer-implemented method as any of clauses U-Y recites, wherein the first particular, discrete functionality is associated with a waitlist tracking functionality provided by a merchant application and the second particular, discrete functionality is associated with an ordering functionality provided by the merchant application.

AA. The computer-implemented method as any of clauses U-Z recites, further comprising: generating an interactable element associated with the first instant application; and providing the first instant application to the user computing device based at least in part on receiving, from the user computing device, an indication of an interaction with the interactable element.

AB. The computer-implemented method as any of clauses U-AA recites, wherein the second instant application is initialized without further input from the user.

AC. A system comprising: one or more processors; and one or more computer-readable media that, when executed by the one or more processors, cause the system to perform operations comprising: detecting engagement with a first application; triggering a second application to be initialized in response to the engagement; transitioning provisionally from the first application to the second application; receiving an indication of a user interaction with the second application; embedding a portion of the user interaction in the first application; and presenting the embedded portion of the user interaction on a user interface associated with the first application via a user computing device.

AD. The system as clause AC recites, wherein the first application is associated with a first particular, discrete functionality, and wherein the first particular, discrete functionality is associated with an instant application, the first application being associated with a set of functionalities larger than the first particular, discrete functionality associated with the instant application, and wherein the engagement with the first application is with the instant application.

AE. The system as clause AD recites, wherein the first particular, discrete functionality is availed via a partial download of the first application, the operations further comprising, at a time after the portion of the user interaction is embedded in the first application, causing the first application to be downloaded completely onto the user computing device.

AF. The system as clause AD or AE recites, wherein the first application is a buyer application and the first particular, discrete functionality enables payment via the buyer application and the second application is a merchant application, wherein the merchant application is associated with a second particular, discrete functionality that enables building of a virtual cart, and wherein the user interaction is with the second particular, discrete functionality.

AG. The system as any of clauses AD-AF recites, wherein the first particular, discrete functionality is associated with a waitlist tracking functionality and the second application is associated with a second particular, discrete functionality that is associated with an ordering functionality, and wherein the user interaction is with the second particular, discrete functionality.

AH. The system as any of clauses AC-AG recites, wherein the first application and the second application are associated with different service providers.

AI. One or more computer-readable media that, when executed by one or more processors, cause the one or more processors to perform operations comprising: detecting engagement with a first application; triggering a second application to be initialized in response to the engagement; transitioning provisionally from the first application to the second application; receiving an indication of a user interaction with the second application; embedding a portion of the user interaction in the first application; and presenting the embedded portion of the user interaction on a user interface associated with the first application via a user computing device.

AJ. The one or more computer-readable media as clause AI recites, wherein the first application is associated with a first particular, discrete functionality, and wherein the first particular, discrete functionality is associated with an instant application, the first application being associated with a set of functionalities larger than the first particular, discrete functionality associated with the instant application, and wherein the engagement with the first application is with the instant application.

AK. The one or more computer-readable media as clause AJ recites, wherein the first particular, discrete functionality is availed via a partial download of the first application, the operations further comprising, at a time after the portion of the user interaction is embedded in the first application, causing the first application to be downloaded completely onto the user computing device.

AL. The one or more computer-readable media as clause AJ or AK recites, wherein the first application is a buyer application and the first particular, discrete functionality enables payment via the buyer application and the second application is a merchant application, wherein the merchant application is associated with a second particular, discrete functionality associated with an online store of a merchant associated with the merchant application, and wherein the user interaction is with the second particular, discrete functionality.

AM. The one or more computer-readable media as any of clauses AJ-AL recites, wherein the first application is a merchant application and the first particular, discrete functionality enables building of a virtual cart, and the second application is a buyer application, wherein the buyer application enables payment for one or more items associated with the virtual cart, and wherein the user interaction is with the second particular, discrete functionality.

AN. The one or more computer-readable media as any of clauses AJ-AM recites, wherein the first particular, discrete functionality is associated with a waitlist tracking functionality and the second application is associated with a second particular, discrete functionality that is associated with an ordering functionality, and wherein the user interaction is with the second particular, discrete functionality.

AO. A method, implemented at least in part by one or more computing devices associated with a service provider, the method comprising: causing a first user interface associated with an instant application associated with a particular, discrete functionality of an application to be presented via a first user computing device of a user; receiving data via an interaction with the first user interface associated with the instant application; receiving a request to download the application from a second user computing device of the user; causing the application to be downloaded on the second user computing device of the user; and causing the data received via the interaction with the first user interface associated with the instant application to be presented via a second user interface associated with the application on the second user computing device, wherein the data is presented via the second user interface based at least in part on device characteristics of the second user computing device.

AP. The method as clause AO recites, wherein the application is associated with a set of functionalities that is larger than the particular, discrete functionality of the instant application.

AQ. The method as clause AO or AP recites, further comprising: generating an interactable element associated with the instant application; and causing the first user interface to be presented based at least in part on receiving, from the first user computing device, an indication of an interaction with the interactable element.

AR. The method as clause AQ recites, wherein the interactable element is associated with at least one of a physical mailer, a push notification, an email, or a text message.

AS. The method as any of clauses AO-AR recites, further comprising: determining context data associated with the first user computing device of the user; and causing the first user interface associated with the instant application to be presented via the first user computing device of the user based at least in part on the context data.

AT. The method as any of clauses AO-AS recites, further comprising: based at least in part on receiving the request to download the application from the second user computing device of the user, storing session data received via a session associated with the instant application, wherein the session data includes the data received via the interaction with the first user interface; sending the session data to the second user computing device of the user; and customizing the second user interface based at least in part on the session data.

AU. A system comprising: one or more processors; and one or more computer-readable media that, when executed by the one or more processors, cause the system to perform operations comprising: causing a first user interface associated with an instant application associated with a particular, discrete functionality of an application to be presented via a first user computing device of a user; receiving data via an interaction with the first user interface associated with the instant application; receiving a request to download the application from a second user computing device of the user; causing the application to be downloaded on the second user computing device of the user; and causing the data received via the interaction with the first user interface associated with the instant application to be associated with the application on the second user computing device.

AV. The system as clause AU recites, wherein the data is associated with session data of a session of the instant application.

AW. The system as clause AU or AV recites, the operations further comprising: generating an interactable element associated with the instant application, wherein the interactable element is associated with a first identifier of the user; and causing the first user interface to be presented based at least in part on receiving, from the first user computing device, an indication of an interaction with the interactable element, wherein the data is associated with the first identifier.

AX. The system as clause AW recites, wherein the request is associated with a second identifier, the operations further comprising: determining that the first identifier and the second identifier are associated with a same user; determining a correspondence between the first user computing device and the second user computing device based at least in part on determining that the first identifier and the second identifier are associated with the same user; based at least in part on determining the correspondence between the first user computing device and the second user computing device, storing session data received via a session associated with the instant application, wherein the session data includes the data received via the interaction with the first user interface; sending the session data to the second user computing device of the user; and customizing at least one of the application or data presented via a second user interface associated with the application based at least in part on the session data.

AY. The system as any of clauses AU-AX recites, the operations further comprising: determining first location data associated with the first user computing device; determining second location data associated with the second user computing device; determining, based at least in part on the first location data and the second location data, that the first user computing device is within a threshold distance of the second user computing device; determining a correspondence between the first user computing device and the second user computing device based at least in part on determining that the first user computing device is within a threshold distance of the second user computing device; based at least in part on determining the correspondence between the first user computing device and the second user computing device, storing session data received via a session associated with the instant application, wherein the session data includes the data received via the interaction with the first user interface; sending the session data to the second user computing device of the user; and customizing at least one of the application or data presented via a second user interface associated with the application based at least in part on the session data.

AZ. The system as any of clauses AU-AY recites, wherein the data is associated with first identification data associated with the user, and wherein the request is associated with second identification data, the operations further comprising: determining that the first identification data corresponds with the second identification data; determining a correspondence between the first user computing device and the second user computing device based at least in part on determining that the first identification data corresponds with the second identification data; based at least in part on determining the correspondence between the first user computing device and the second user computing device, storing session data received via a session associated with the instant application, wherein the session data includes the data received via the interaction with the first user interface; sending the session data to the second user computing device of the user; and customizing at least one of the application or data presented via a second user interface associated with the application based at least in part on the session data.

BA. The system as clause AZ recites, wherein the first identification data comprises at least one of an account number, a physical address, a telephone number, or an email address associated with the user and wherein the second identification data comprises at least one of the account number, the physical address, the telephone number, or the email address associated with the user.

BB. The system as any of clauses AU-BA recites, the operations further comprising: determining context data associated with the first user computing device of the user; and causing the first user interface associated with the instant application to be presented via the first user computing device of the user based at least in part on the context data.

BC. One or more computer-readable media that, when executed by one or more processors, cause the one or more processors to perform operations comprising: causing a first user interface associated with an instant application associated with a particular, discrete functionality of an application to be presented via a first user computing device of a user; receiving data via an interaction with the first user interface associated with the instant application; receiving a request to download the application from a second user computing device of the user; causing the application to be downloaded on the second user computing device of the user; and causing the data received via the interaction with the first user interface associated with the instant application to be associated with the application on the second user computing device.

BD. The one or more computer-readable media as clause BC recites, wherein the application is associated with a set of functionalities that is larger than the particular, discrete functionality of the instant application.

BE. The one or more computer-readable media as clause BC or BD recites, the operations further comprising: generating an interactable element associated with the instant application; and causing the first user interface to be presented based at least in part on receiving an indication of an interaction with the interactable element via the first user computing device of the user.

BF. The one or more computer-readable media as any of clauses BC-BE recites, the operations further comprising: determining a first device characteristic associated with the first user computing device, wherein the first user interface is presented based at least in part on the first device characteristic; and determining a second device characteristic associated with the second user computing device, wherein a second user interface associated with the application is presented, via the second user computing device based at least in part on the second device characteristic.

BG. The one or more computer-readable media as any of clauses BC-BF recites, wherein the instant application is associated with a demonstration of functionality of the application.

BH. The one or more computer-readable media as any of clauses BC-BG recites, wherein the instant application is associated with a payment.

BI. A computer-implemented method comprising: detecting engagement with an option from within a buyer application on a computing device of a buyer; triggering an instant application associated with a merchant to be initialized in response to the engagement, wherein the instant application is associated with a particular, discrete functionality of a merchant application of the merchant; transitioning from the buyer application to the instant application to allow access to the particular, discrete functionality associated with the instant application; receiving, from the instant application, an indication of a transaction between the merchant and the buyer for processing payment of the transaction via the buyer application; and associating the indication of the transaction with stored activity data of one or more transactions of the buyer, wherein the one or more transactions are associated with the buyer application.

BJ. The computer-implemented method as clause BI recites, wherein the buyer application is a peer-to-peer payment application.

BK. The computer-implemented method as clause BI or BJ recites, wherein the option is associated with a user interface of the buyer application that includes a plurality of options associated with a plurality of merchants.

BL. The computer-implemented method as clause BK recites, wherein the user interface is an activity user interface of the buyer application that presents at least a portion of the stored activity data.

BM. The computer-implemented method as clause BL recites, wherein individual of the plurality of options are associated with individual of the one or more transactions.

BN. The computer-implemented method as any of clauses BI-BM recites, wherein the merchant application is associated with a set of functionalities that is larger than the particular, discrete functionality of the instant application.

BO. The computer-implemented method as any of clauses BI-BN recites, wherein the buyer application and the merchant application are associated with a same service provider.

BP. The computer-implemented method as any of clauses BI-BO recites, wherein the buyer application is associated with a first service provider and the merchant application is associated with a second service provider that is different than the first service provider, and wherein the merchant application is integrated with the buyer application via an application programming interface.

BQ. A system comprising: one or more processors; and one or more computer-readable media that, when executed by the one or more processors, cause the system to perform operations comprising: detecting engagement with a buyer application on a computing device of a buyer; triggering a particular, discrete functionality of a merchant application of the merchant to be initialized in response to the engagement; accessing, from the buyer application, the merchant application to allow access to the particular, discrete functionality associated with the merchant application; and receiving an indication of a transaction between the merchant and the buyer, wherein the indication of the transaction is associated with stored activity data of one or more transactions of the buyer, wherein the one or more transactions are associated with the buyer application.

BR. The system as clause BQ recites, wherein the particular, discrete functionality is associated with an instant application embedded in the buyer application, and wherein the merchant application is associated with a larger set of functionalities than the particular, discrete functionality.

BS. The system as clause BQ or BR recites, wherein the engagement is with an option that is associated with a user interface of the buyer application that includes a plurality of options associated with a plurality of merchants.

BT. The system as any of clauses BQ-BS recites, wherein the engagement is with an option that is associated with a user interface of the buyer application that includes a plurality of options, wherein each option of the plurality of options points to an embedded application associated with a corresponding merchant of a plurality of merchants.

BU. The system as clause BT recites, wherein individual of the plurality of options are associated with individual of the one or more transactions associated with the buyer application.

BV. The system as clause BT or BU recites, wherein a transaction of the one or more transactions is awaiting fulfillment, and wherein a particular option associated with the transaction is associated with tracking data associated with fulfillment.

BW. The system as any of clauses BQ-BV recites, wherein the indication is received from one or more server computing devices associated with the buyer application and the indication indicates that payment for the transaction has been processed by the one or more server computing devices.

BX. The system as any of clauses BQ-BW recites, wherein the indication is received from the merchant application and indicates that payment for the transaction was processed via buyer application functionality embedded in the merchant application.

BY. One or more computer-readable media that, when executed by one or more processors, cause the one or more processors to perform operations comprising: detecting engagement with a buyer application on a computing device of a buyer; triggering a particular, discrete functionality of a merchant application of the merchant to be initialized in response to the engagement; transitioning from the buyer application to the merchant application to allow access to the particular, discrete functionality associated with the merchant application; and receiving an indication of a transaction between the merchant and the buyer, wherein the indication of the transaction is associated with stored activity data of one or more transactions of the buyer, wherein the one or more transactions are associated with the buyer application.

BZ. The one or more computer-readable media as clause BY recites, wherein the particular, discrete functionality is associated with an instant application embedded in the buyer application, and wherein the merchant application is associated with a larger set of functionalities than the particular, discrete functionality.

CA. The one or more computer-readable media as clause BY or BZ recites, wherein the indication indicates that payment for the transaction has been processed by one or more server computing devices associated with the buyer application.

CB. The one or more computer-readable media as any of clauses BY-CA recites, wherein the indication indicates that payment for the transaction was processed via buyer application functionality embedded in the merchant application.

While the example clauses described above are described with respect to one particular implementation, it should be understood that, in the context of this document, the content of the example clauses can also be implemented via a method, device, system, a computer-readable medium, and/or another implementation. Additionally, any of examples A-CB may be implemented alone or in combination with any other one or more of the examples A-CB.

What is claimed is:

1. A computer-implemented method comprising:
   detecting, by one or more processors of a buyer computing device of a buyer and via a first user interface of a buyer application, a selection of an interactable element of a plurality of interactable elements within the buyer application, wherein the interactable element corresponds to an instant application embedded in the buyer application, wherein the instant application is associated with a merchant and is accessible via the buyer application, and wherein the instant application enables a particular discrete functionality of a plurality of functionalities of a merchant application;
   in response to detecting the selection of the interactable element, downloading, by the one or more processors, the instant application, wherein the instant application is a subset of the merchant application;
   based at least in part on downloading the instant application, presenting, by the one or more processors, a second user interface of the instant application to enable the buyer to engage with the instant application to access the particular discrete functionality of the merchant application and no other functionality of the plurality of functionalities;
   receiving, by the one or more processors from the instant application and via the second user interface, an indication of a transaction between the merchant and the buyer for processing a payment for the transaction via the buyer application;
   storing data including an indication of an association between the transaction and stored activity data of one or more transactions of the buyer, wherein the one or more transactions are associated with the buyer application;
   sending, by the one or more processors from the instant application and to the buyer application, the indication of the transaction and a request to process the payment for the transaction;
   sending, by the one or more processors from the buyer application and to a service provider server, the request to process the payment for the transaction; and
   based at least in part on receiving an indication of processing of the payment for the transaction between the merchant and the buyer, presenting, by the one or more processors, transaction data associated with the transaction via an updated first user interface of the buyer application or a third user interface of the buyer application, wherein the indication of processing of the payment indicates that the payment for the transaction has been processed.

2. The computer-implemented method as claim 1 recites, wherein the buyer application is a peer-to-peer payment application.

3. The computer-implemented method as claim 1 recites, wherein the interactable element is associated with the first user interface of the buyer application and the plurality of interactable elements are associated with a plurality of merchants.

4. The computer-implemented method as claim 3 recites, wherein the first user interface is an activity user interface of the buyer application that presents at least a portion of the stored activity data.

5. The computer-implemented method as claim 4 recites, wherein an individual of the plurality of interactable elements are associated with an individual of the one or more transactions.

6. The computer-implemented method as claim 1 recites, wherein the buyer application and the merchant application are associated with a same service provider.

7. The computer-implemented method as claim 1 recites, wherein the buyer application is associated with a first service provider and the merchant application is associated with a second service provider that is different than the first service provider, and wherein the merchant application is integrated with the buyer application via an application programming interface.

8. The computer-implemented method as claim 1 recites, wherein downloading the instant application comprises surfacing or prepopulating tracked data associated with the buyer.

9. The computer-implemented method as claim 8 recites, wherein transitioning from the first user interface of the buyer application to the second user interface of the instant application comprises presenting embedded data via the second user interface of the instant application, wherein the embedded data comprises the tracked data associated with the buyer.

10. The computer-implemented method as claim 1 recites, wherein the interactable element is associated with the first user interface of the buyer application and the plurality of interactable elements are associated with a plurality of merchants.

11. The computer-implemented method as claim 1 recites, wherein the indication of processing of the payment indicates that the payment for the transaction has been processed by one or more server computing devices associated with the buyer application.

12. The computer-implemented method as claim 1 recites, wherein the indication of processing of the payment indicates that the payment for the transaction has been processed via buyer application functionality embedded in the merchant application.

13. A system comprising:
one or more processors; and
one or more computer-readable media that, when executed by the one or more processors, cause the system to perform operations comprising:
detecting, by a buyer computing device of a buyer and via a first user interface of a buyer application, a selection of an interactable element of a plurality of interactable elements within the buyer application, wherein the interactable element corresponds to an instant application embedded in the buyer application, wherein the instant application is associated with a merchant and is accessible via the buyer application, and wherein the instant application enables a particular discrete functionality of a plurality of functionalities of a merchant application;
in response to detecting the selection of the interactable element, downloading the instant application, wherein the instant application is a subset of the merchant application;
based at least in part on downloading the instant application, presenting a second user interface of the instant application to enable the buyer to engage with the instant application to access the particular discrete functionality of the merchant application and no other functionality of the plurality of functionalities;
receiving, from the instant application and via the second user interface, an indication of a transaction between the merchant and the buyer for processing a payment for the transaction via the buyer application;
storing data including an indication of an association between the transaction and stored activity data of one or more transactions of the buyer, wherein the one or more transactions are associated with the buyer application;
sending, from the instant application and to the buyer application, the indication of the transaction and a request to process the payment for the transaction;
sending, from the buyer application and to a service provider server, the request to process the payment for the transaction; and
based at least in part on receiving an indication of processing of the payment for the transaction between the merchant and the buyer, presenting transaction data associated with the transaction via an updated first user interface of the buyer application or a third user interface of the buyer application, wherein the indication of processing of the payment indicates that the payment for the transaction has been processed.

14. The system as claim 13 recites, wherein an individual of the plurality of interactable elements are associated with an individual of the one or more transactions associated with the buyer application.

15. The system as claim 13 recites, wherein the transaction is one of the one or more transactions and is awaiting fulfillment, and wherein a particular interactable element associated with the transaction is associated with tracking data associated with fulfillment.

16. The system as claim 13 recites, wherein the indication of processing of the payment is received from one or more server computing devices associated with the buyer application and the indication indicates that the payment for the transaction has been processed by the one or more server computing devices associated with the buyer application.

17. The system as claim 13 recites, wherein the indication of processing of the payment is received from the merchant application and indicates that the payment for the transaction has been processed via buyer application functionality embedded in the merchant application.

18. One or more non-transitory computer-readable media that, when executed by one or more processors, cause the one or more processors to perform operations comprising:
detecting, by a buyer computing device of a buyer and via a first user interface of a buyer application, a selection of an interactable element of a plurality of interactable elements within the buyer application, wherein the interactable element corresponds to an instant application embedded in the buyer application, wherein the instant application is associated with a merchant and is accessible via the buyer application, and wherein the instant application enables a particular discrete functionality of a plurality of functionalities of a merchant application;
in response to detecting the selection of the interactable element, downloading the instant application, wherein the instant application is a subset of the merchant application;
based at least in part on downloading the instant application, presenting a second user interface of the instant application to enable the buyer to engage with the instant application to access the particular discrete functionality of the merchant application and no other functionality of the plurality of functionalities;
receiving, from the instant application and via the second user interface, an indication of a transaction between the merchant and the buyer for processing a payment for the transaction via the buyer application;
storing data including an indication of an association between the transaction and stored activity data of one or more transactions of the buyer, wherein the one or more transactions are associated with the buyer application;
sending, from the instant application and to the buyer application, the indication of the transaction and a request to process the payment for the transaction;
sending, from the buyer application and to a service provider server, the request to process the payment for the transaction; and
based at least in part on receiving an indication of processing of the payment for the transaction between the merchant and the buyer, presenting transaction data associated with the transaction via an updated first user interface of the buyer application or a third user interface of the buyer application, wherein the indication of processing of the payment indicates that the payment for the transaction has been processed.

19. The one or more non-transitory computer-readable media as claim 18 recites, wherein the indication of processing of the payment indicates that the payment for the transaction has been processed by one or more server computing devices associated with the buyer application.

20. The one or more non-transitory computer-readable media as claim 18 recites, wherein the indication of processing of the payment indicates that the payment for the transaction has been processed via buyer application functionality embedded in the merchant application.

* * * * *